United States Patent
Narazaki et al.

[11] Patent Number: 5,942,169
[45] Date of Patent: Aug. 24, 1999

[54] OPTIMIZATION OF OVERMOLDING METHOD FOR THREE-DIMENSIONAL HOLLOW MOLDED ARTICLE

[75] Inventors: Norio Narazaki; Yutaka Shiraishi; Osamu Kakinoki, all of Hiratsuka, Japan

[73] Assignee: Mitsubishi Engineering-Plastics Corp,, Tokyo, Japan

[21] Appl. No.: 08/561,835

[22] Filed: Nov. 27, 1995

[30] Foreign Application Priority Data

| Nov. 25, 1994 | [JP] | Japan | 6-315508 |
| Nov. 25, 1994 | [JP] | Japan | 6-315509 |
| Jan. 19, 1995 | [JP] | Japan | 7-024813 |
| Sep. 13, 1995 | [JP] | Japan | 7-260822 |

[51] Int. Cl.$^6$ .............. B29C 45/14; B29C 45/76
[52] U.S. Cl. ........... 264/40.1; 264/266; 264/271.1; 425/120; 425/144; 425/170
[58] Field of Search .................. 264/40.1, 255, 264/271.1, 328.8, 265, 266, 275, 277, 278, 254, 250, 259; 425/120, 144, 170

[56] References Cited

U.S. PATENT DOCUMENTS

| 4,351,786 | 9/1982 | Mueller | 264/263 |
| 4,725,165 | 2/1988 | Langran | 264/259 |
| 4,762,584 | 8/1988 | Andreasen et al. | 264/278 |
| 4,811,472 | 3/1989 | Kobayashi | 264/276 |
| 5,069,838 | 12/1991 | Mori et al. | 264/278 |
| 5,245,955 | 9/1993 | Husted | 264/271.1 |
| 5,266,262 | 11/1993 | Narayama et al. | 264/278 |
| 5,409,655 | 4/1995 | Crockett | 264/266 |
| 5,560,882 | 10/1996 | Daguett | 264/271.1 |

FOREIGN PATENT DOCUMENTS

| 59-198116 | 11/1984 | Japan . |
| 62-218117 | 9/1987 | Japan . |
| 63-277851 | 11/1988 | Japan . |
| 3-239516 | 10/1991 | Japan . |
| 5-305679 | 11/1993 | Japan . |

*Primary Examiner*—Angela Ortiz
*Attorney, Agent, or Firm*—Wenderoth, Lind & Ponack, L.L.P.

[57] ABSTRACT

A method of over-molding used to produce a three-dimensional hollow molded article employs a core made of resin having a hollow portion. The core is placed in a cavity of a mold. Molten resin is injected into a space formed by the core and a cavity wall of the mold through a resin injection portion. In this way at least part of the outer surface of the core is covered with resin. Deformation of the core due to the pressure of the resin during injection is prevented in one of a number of different ways. The over-molding method is optimized by calculating a temperature distribution and a pressure distribution of the molten resin in the step of injecting the molten resin into the space by numerical analysis. The displacement distribution and for the stress distribution of the core caused by pressure applied to the core by flow of the molten resin is calculated by a numerical analysis on the basis of the calculated temperature distribution and pressure distribution. The form of the hollow molded article, the form of the core, the form of the mold, and the molding conditions can thereby be optimized on the basis of at least one of the calculated displacement distribution and the stress distribution so as to minimize deformation of the core.

18 Claims, 152 Drawing Sheets

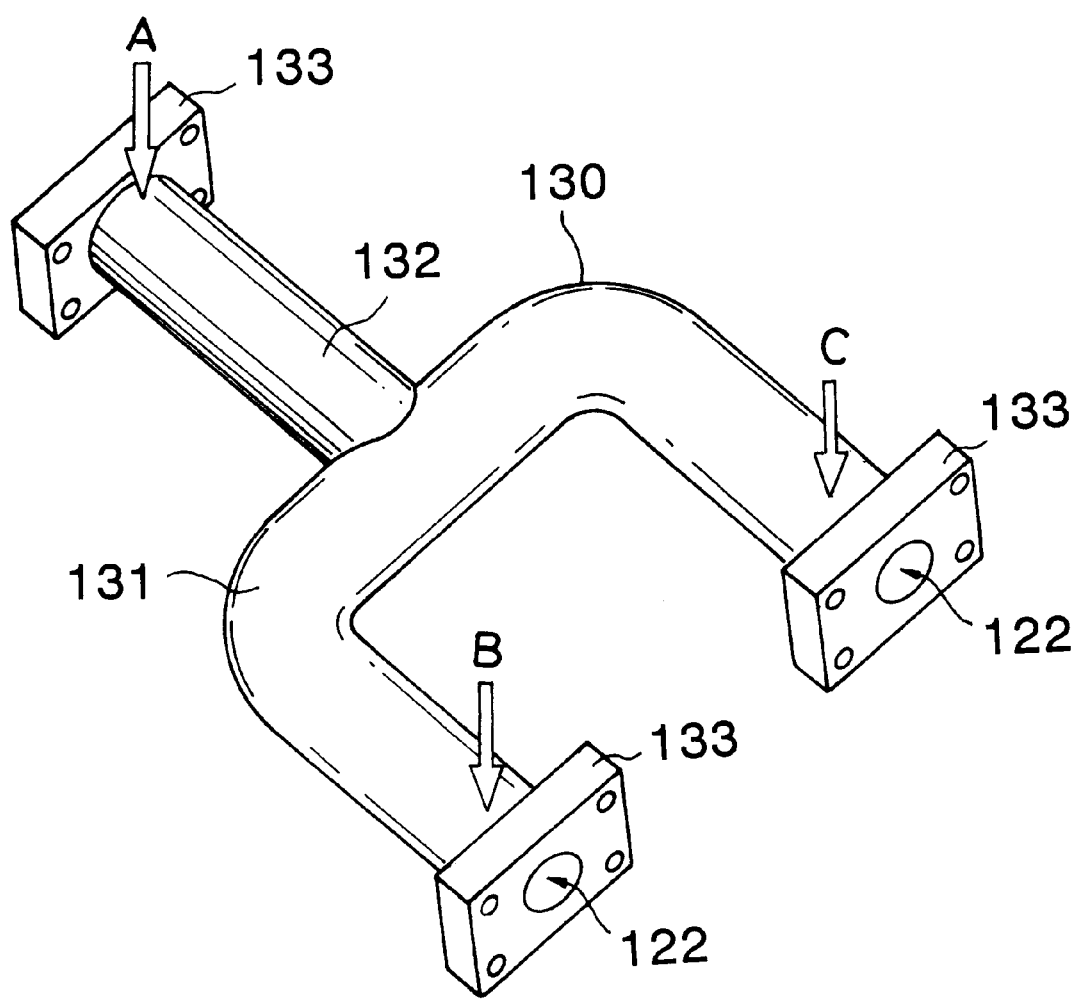

Fig. 43
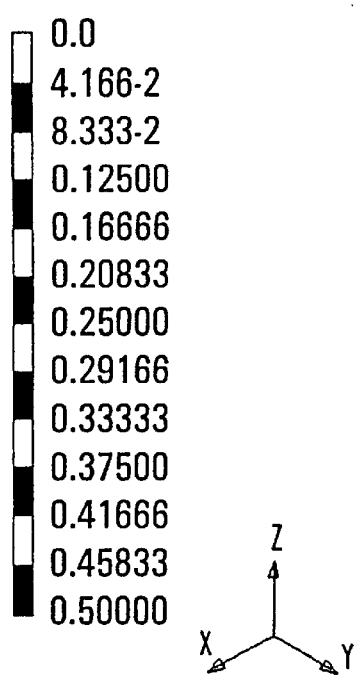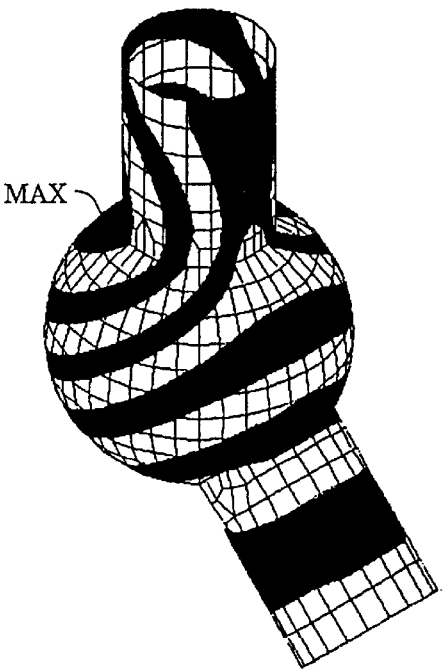
Fig. 44
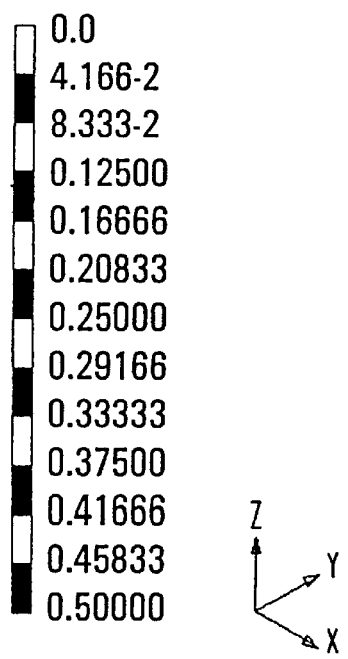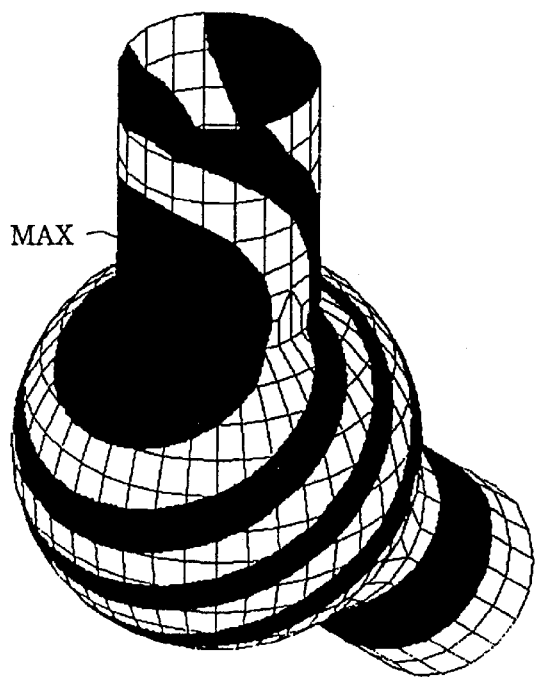

*Fig. 45*
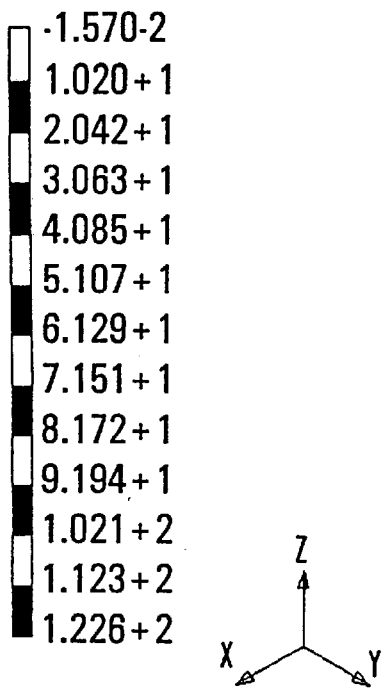
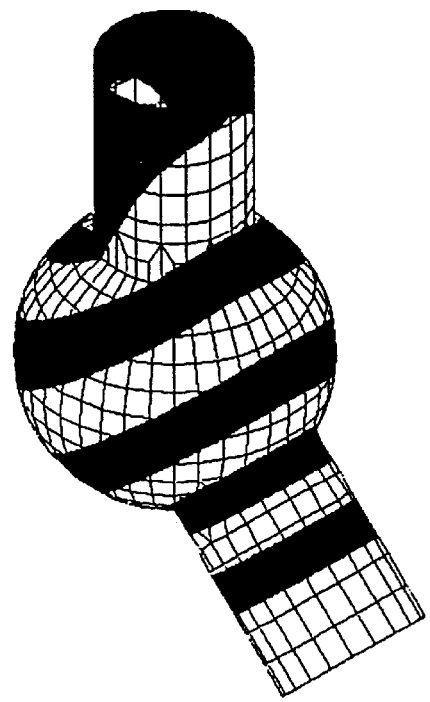
*Fig. 46*
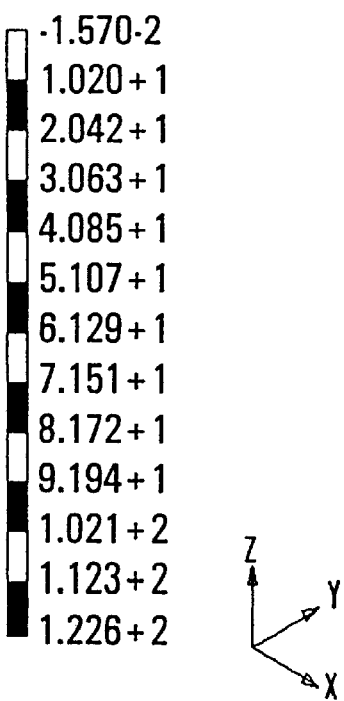
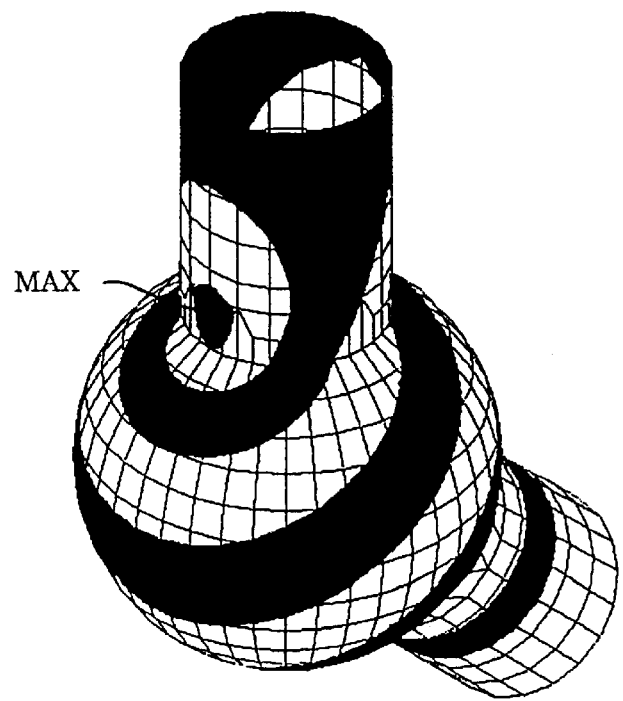

Fig. 47
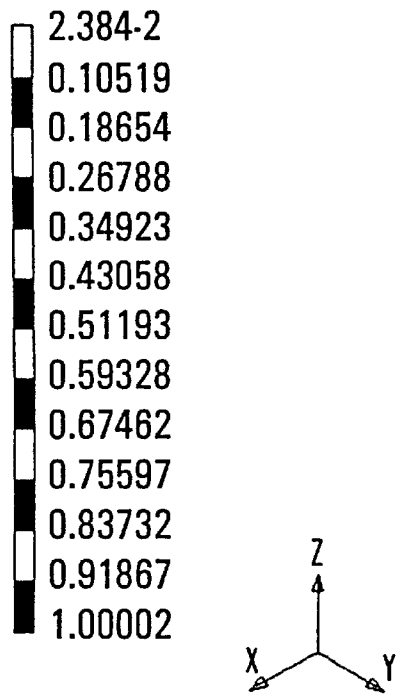
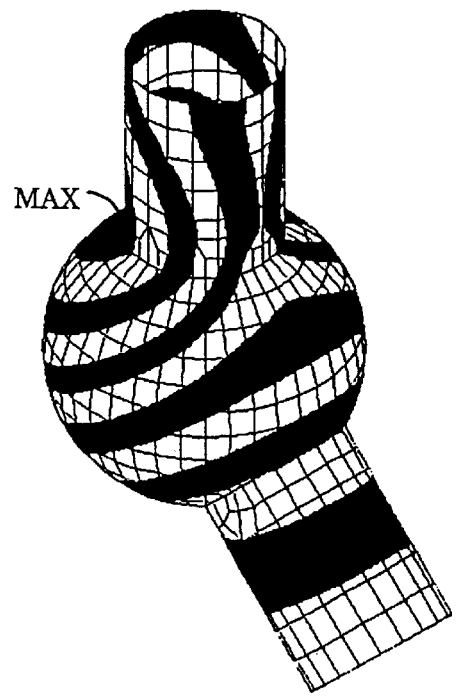
Fig. 48
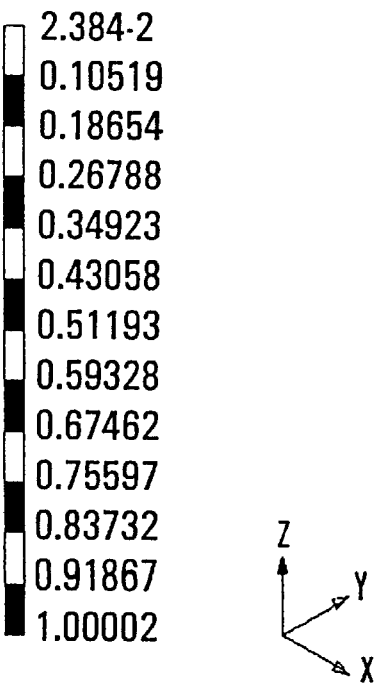
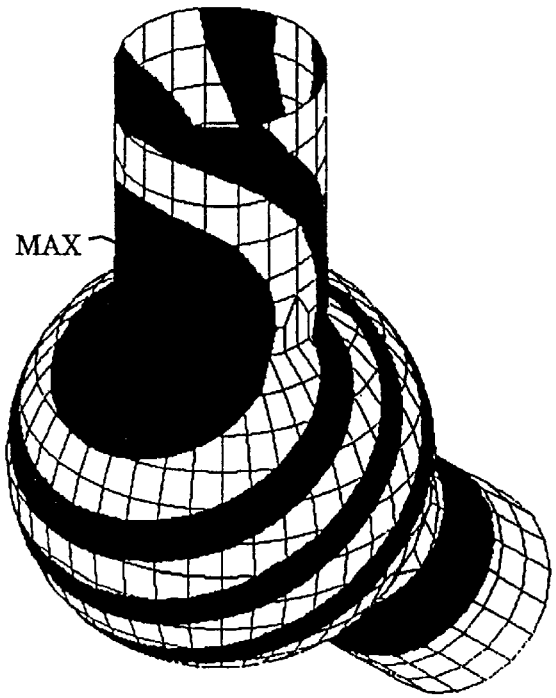

Fig. 49
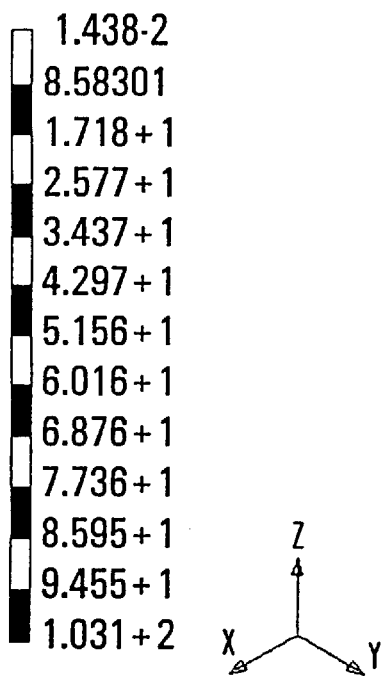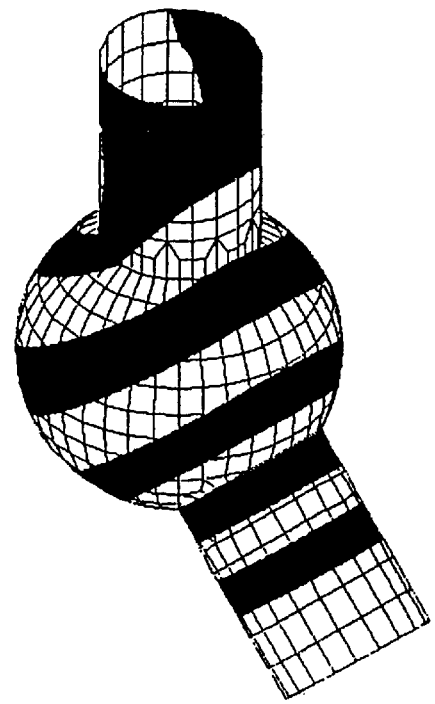
Fig. 50
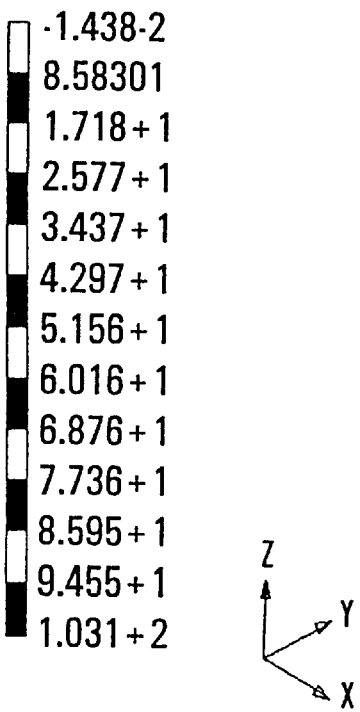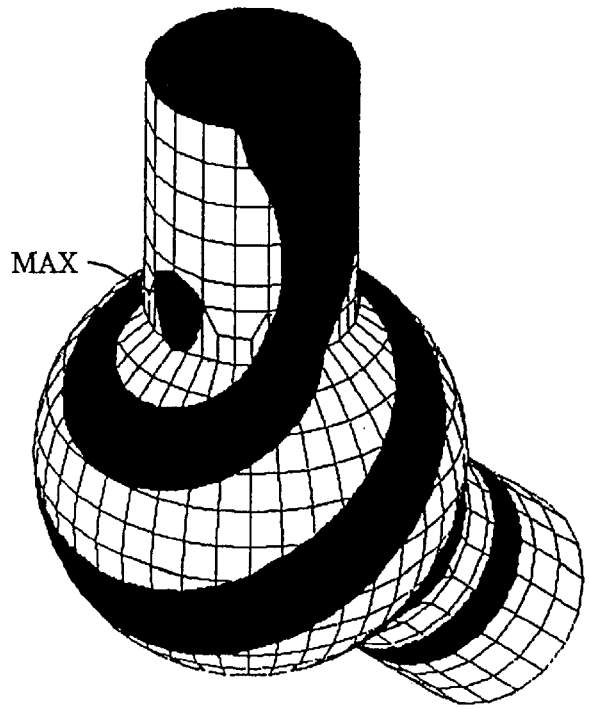

Fig. 51
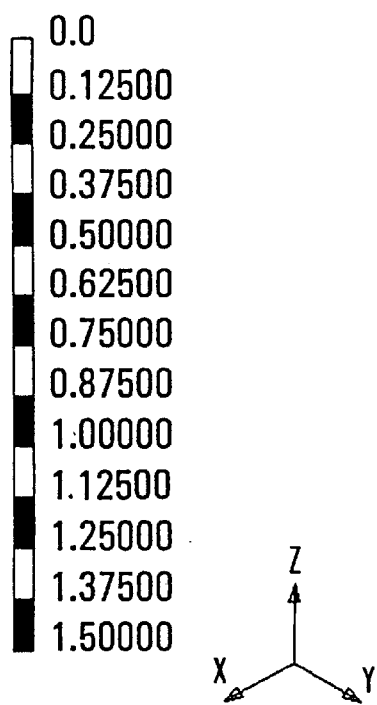
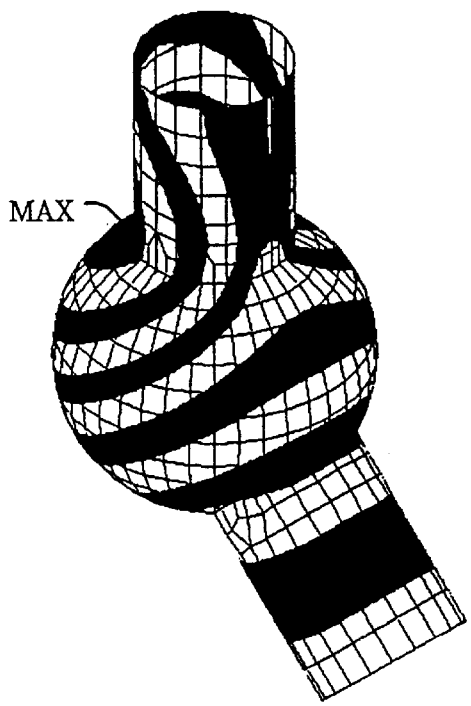
Fig. 52
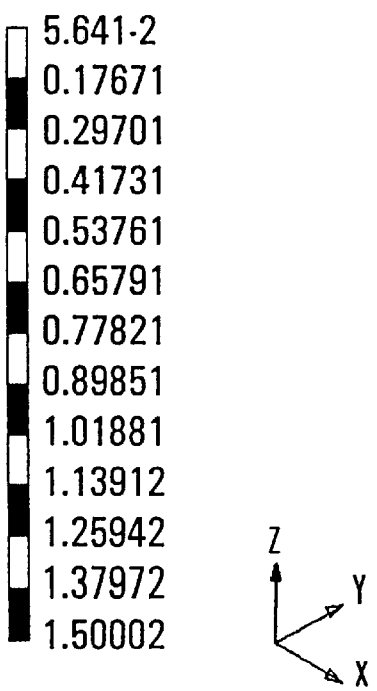
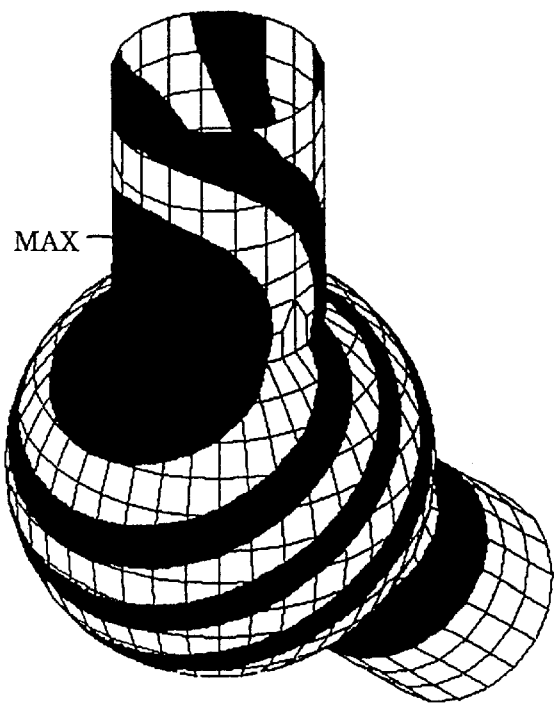

Fig. 53
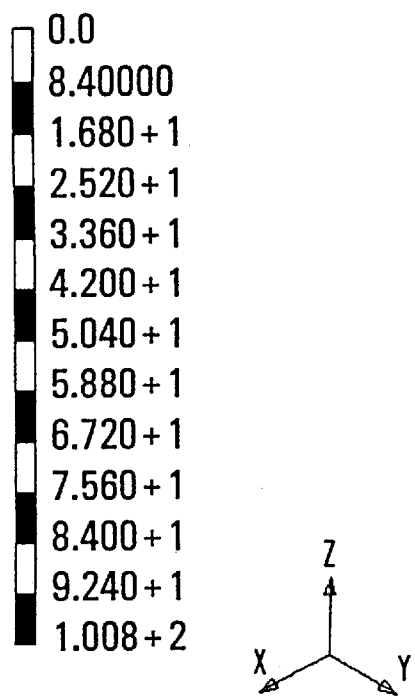
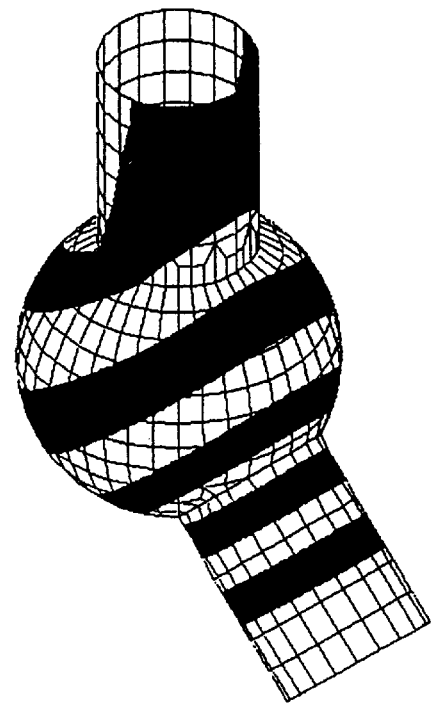
Fig. 54
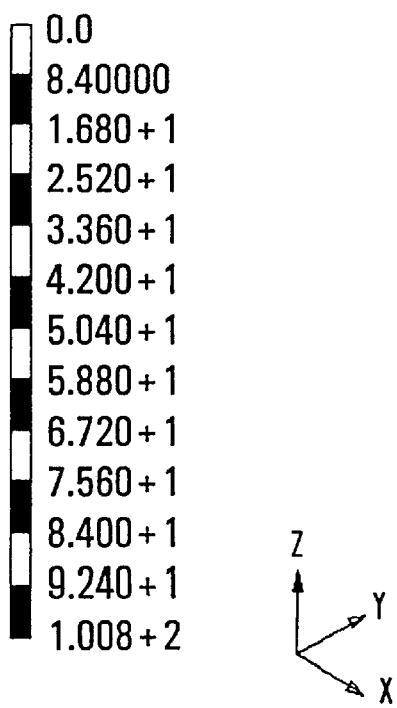
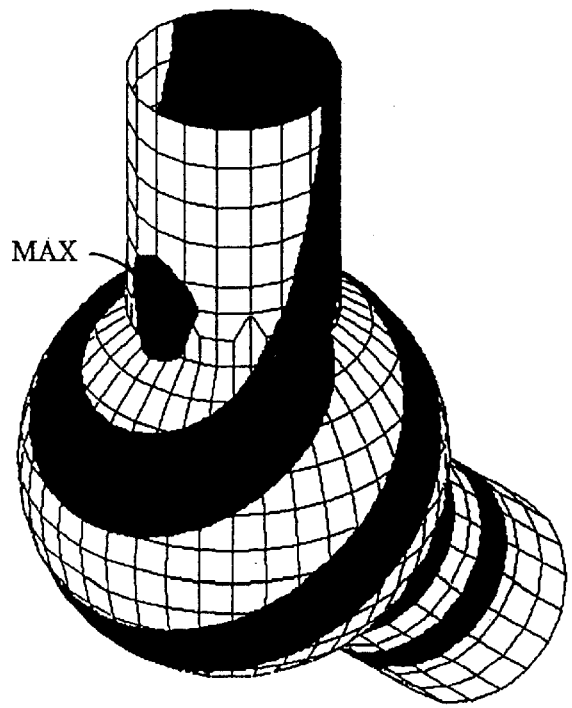

Fig. 55
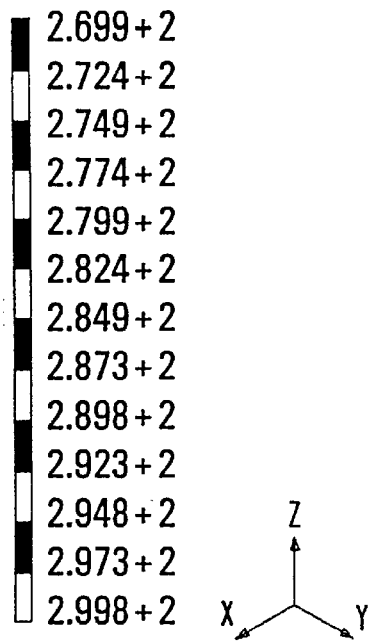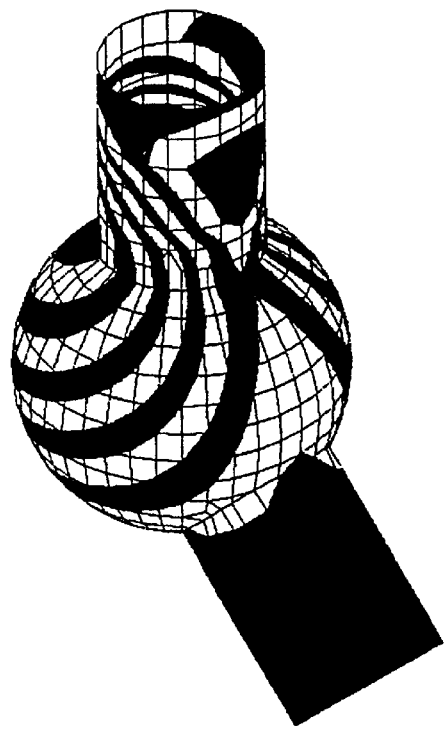
Fig. 56
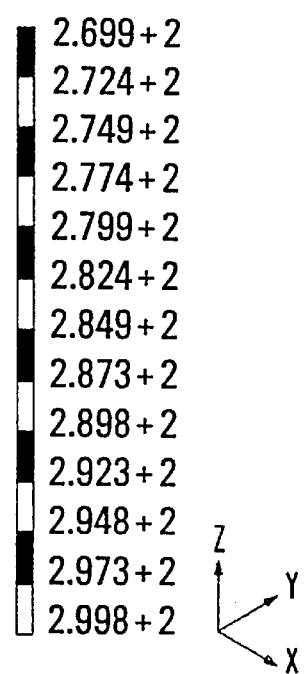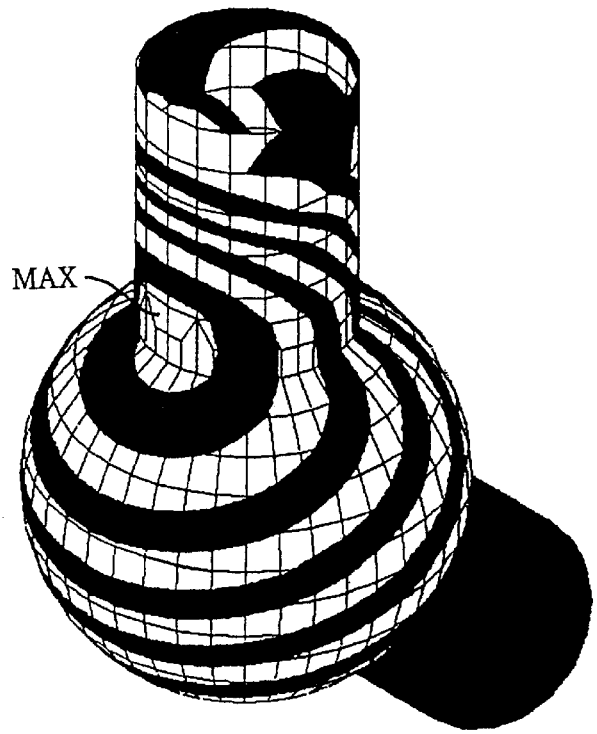

Fig. 57
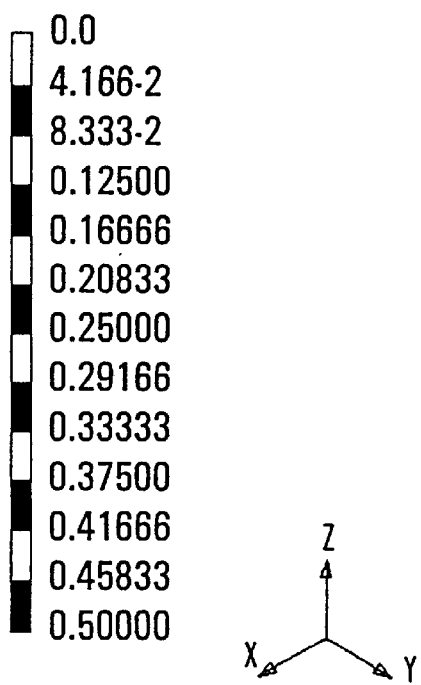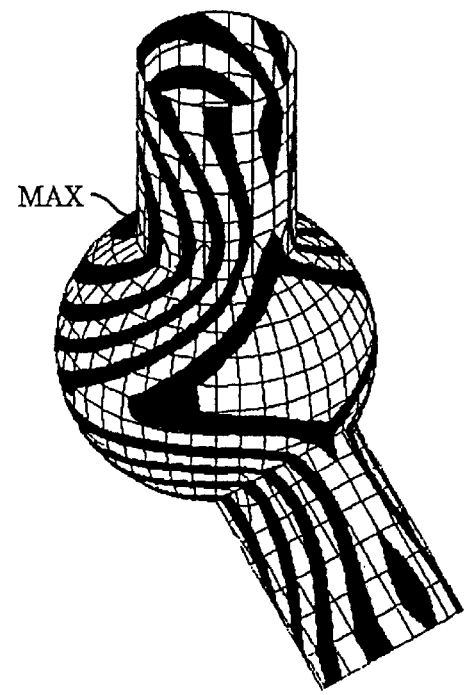
Fig. 58
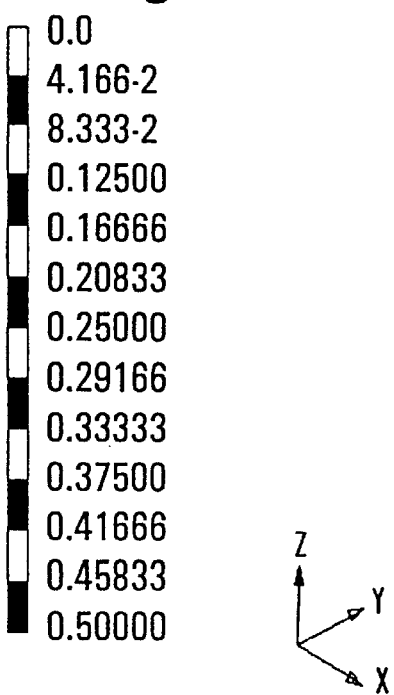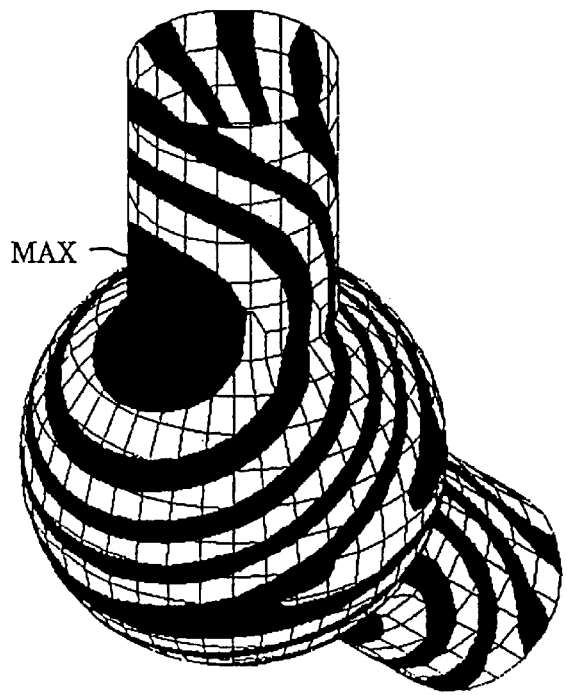

Fig. 59
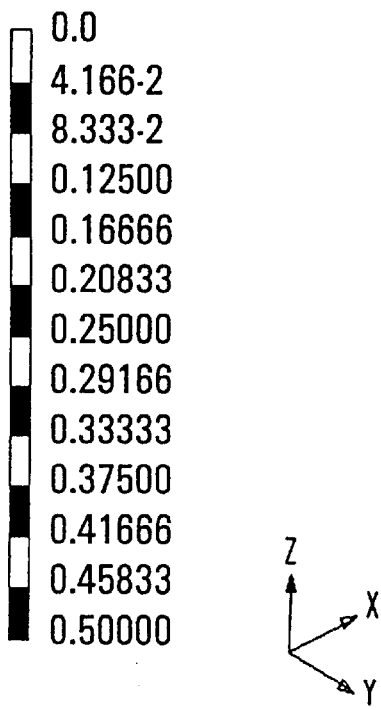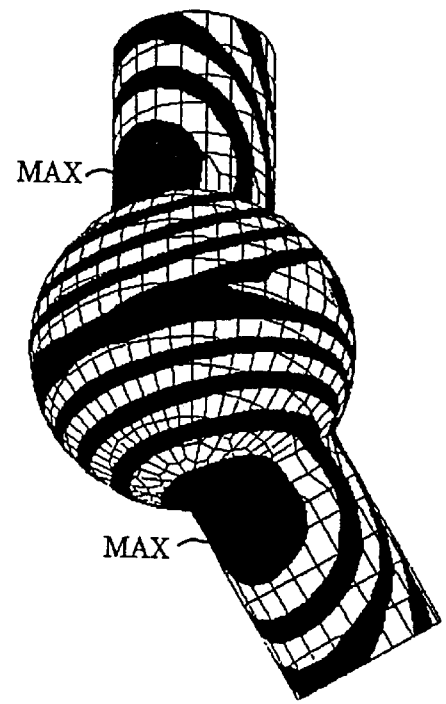
Fig. 60
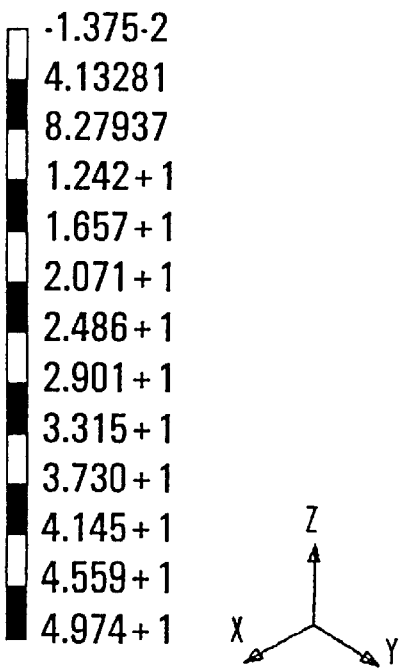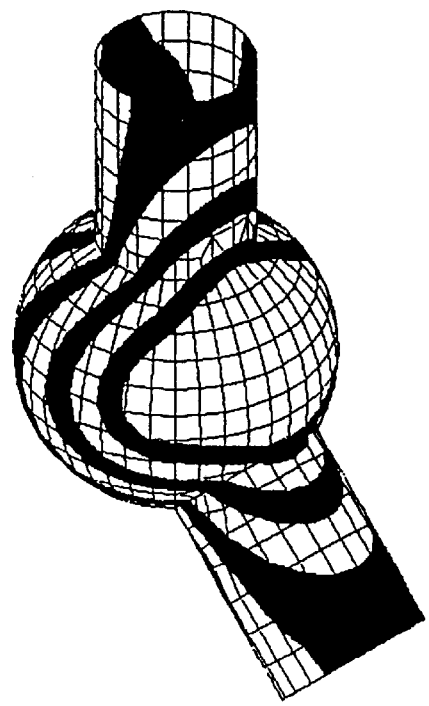

Fig. 61
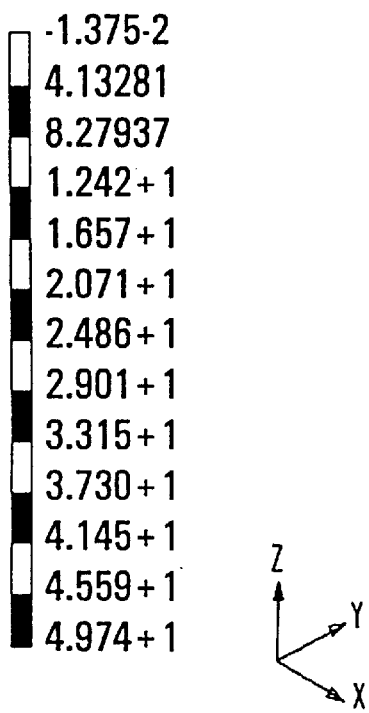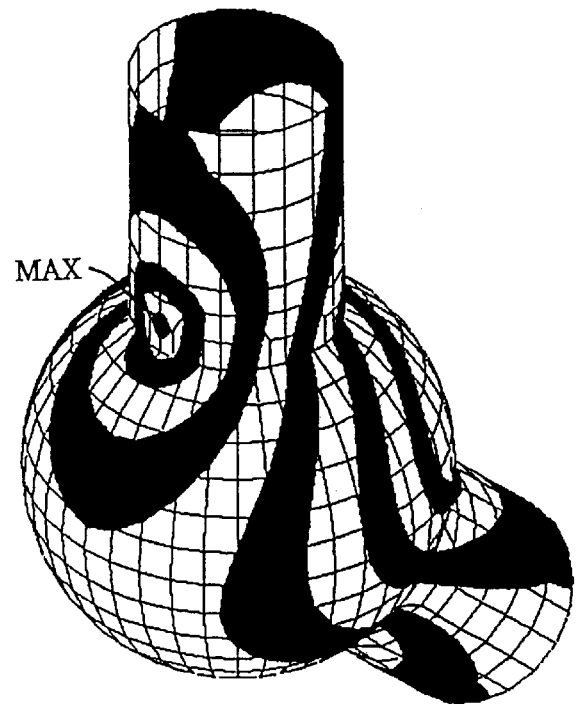
Fig. 62
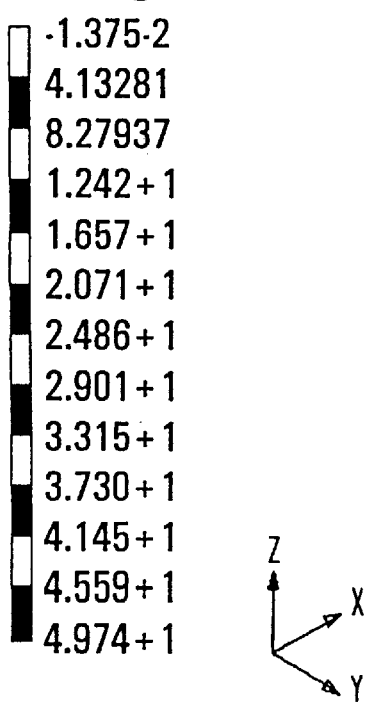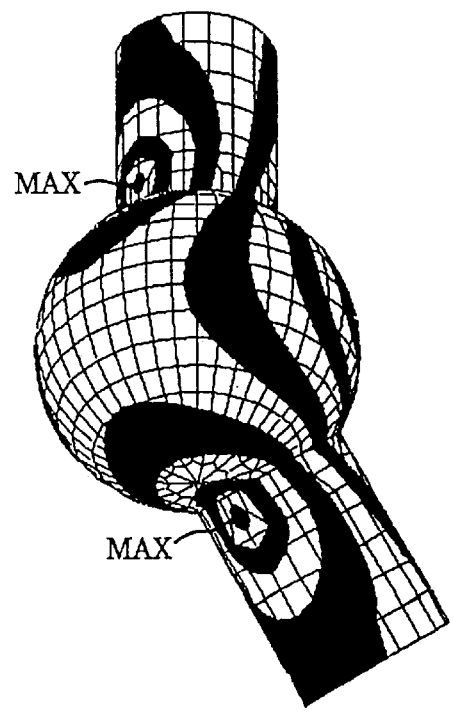

Fig. 63
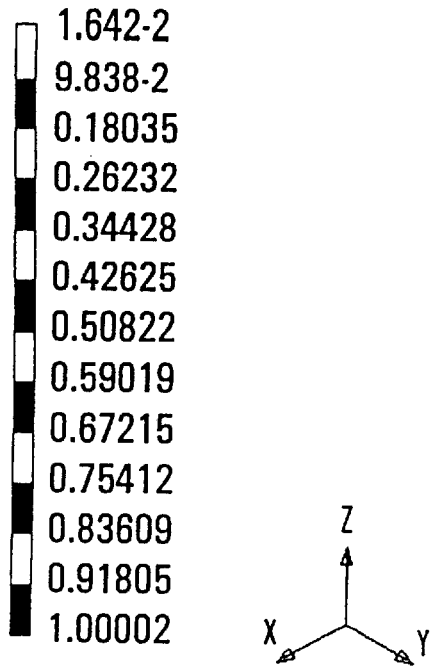
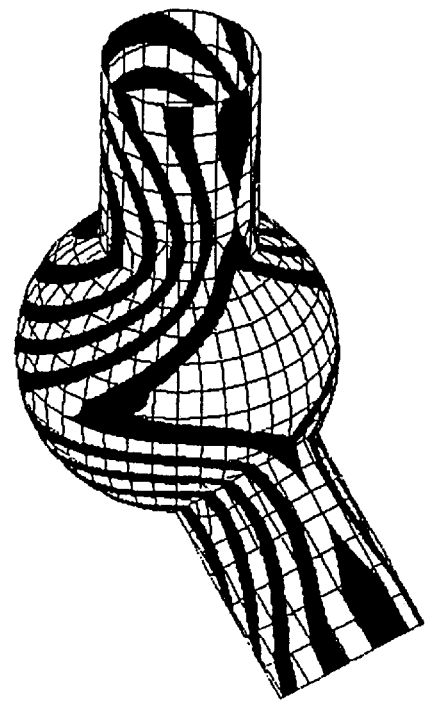
Fig. 64
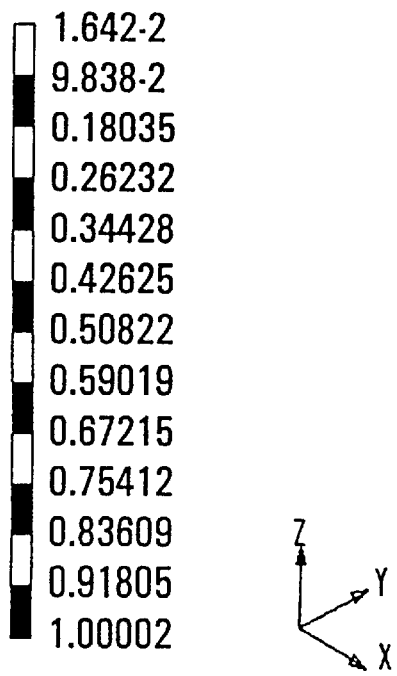
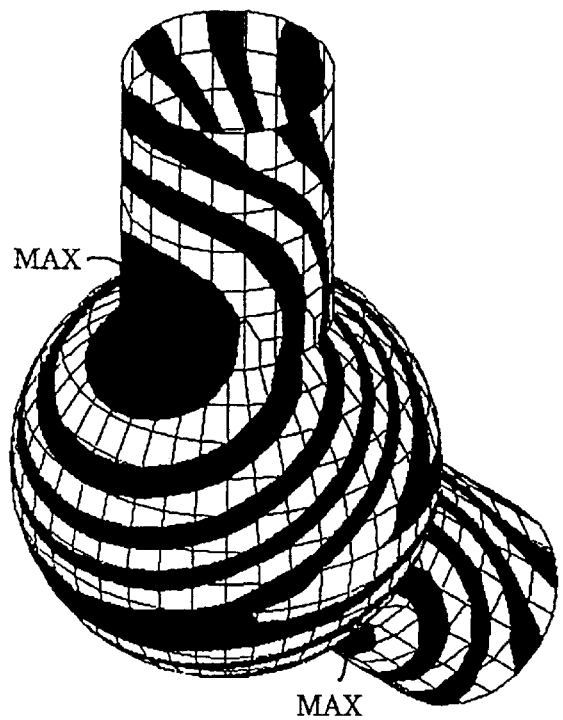

Fig. 65
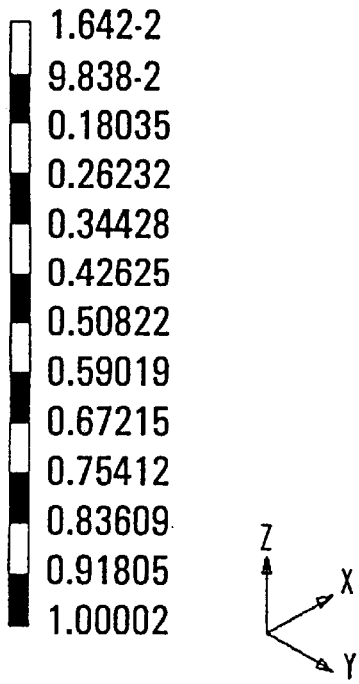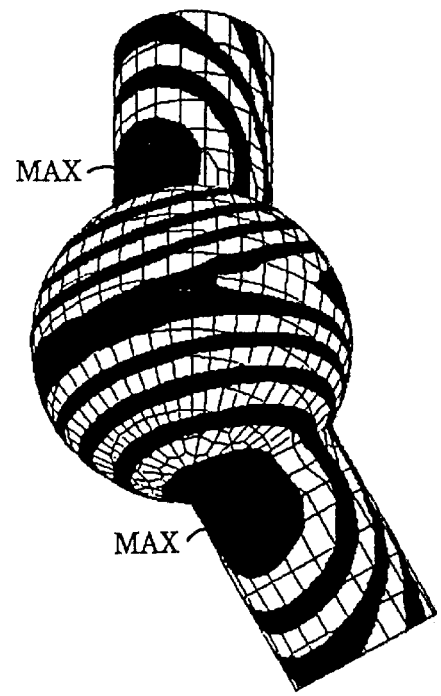
Fig. 66
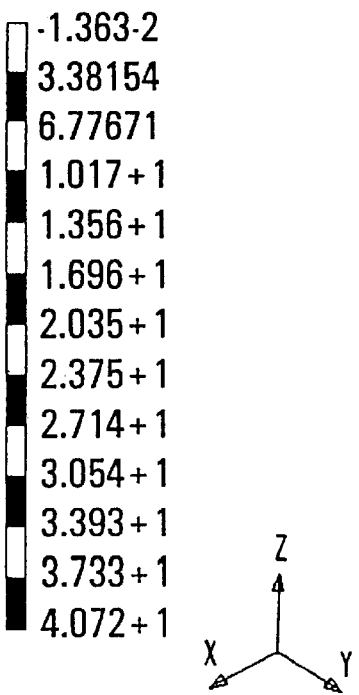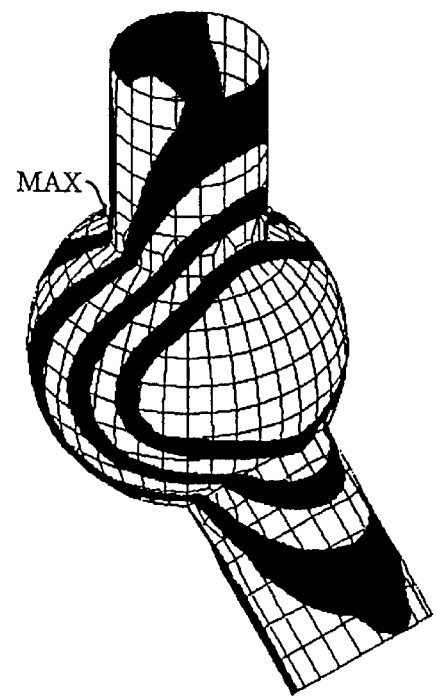

Fig. 67
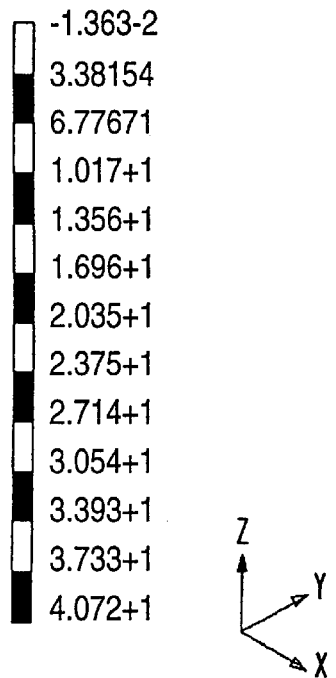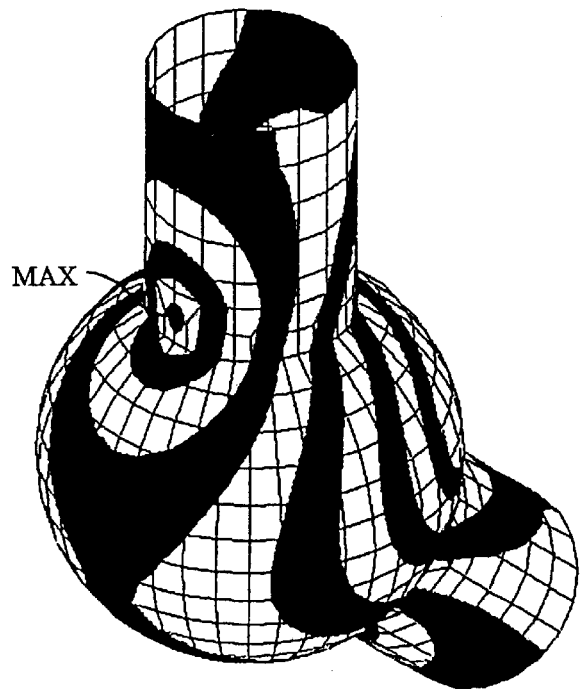
Fig. 68
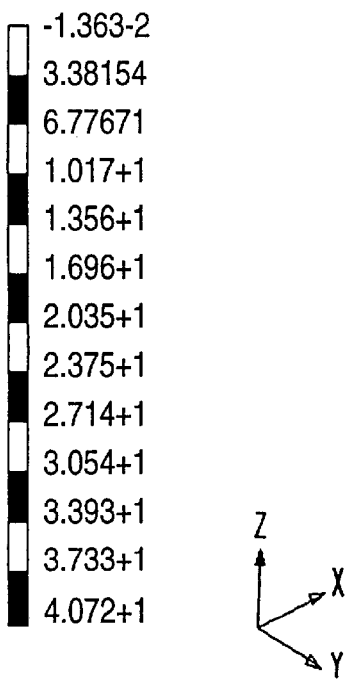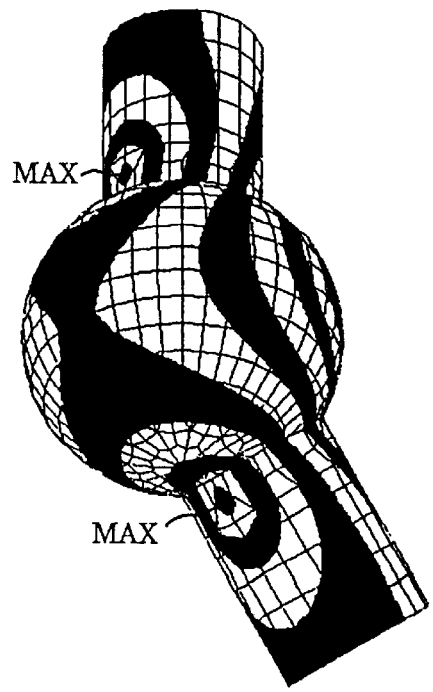

Fig. 69
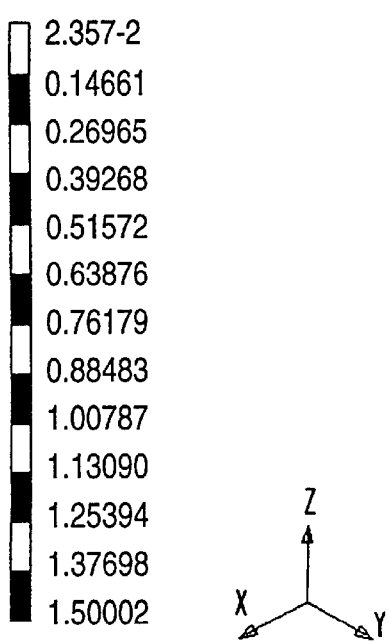
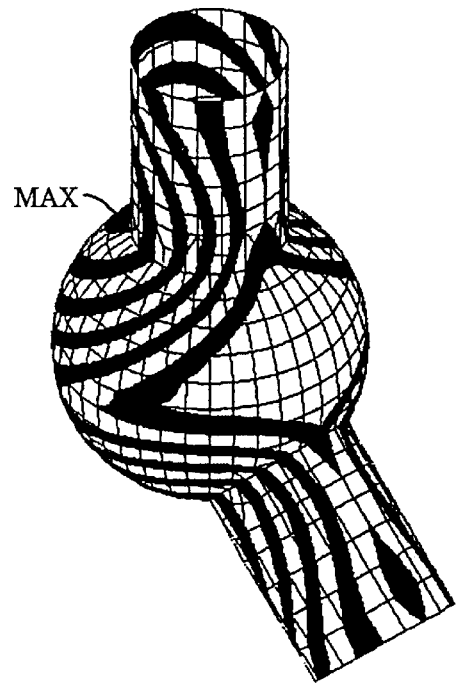
```
2.357-2
0.14661
0.26965
0.39268
0.51572
0.63876
0.76179
0.88483
1.00787
1.13090
1.25394
1.37698
1.50002
```
Fig. 70
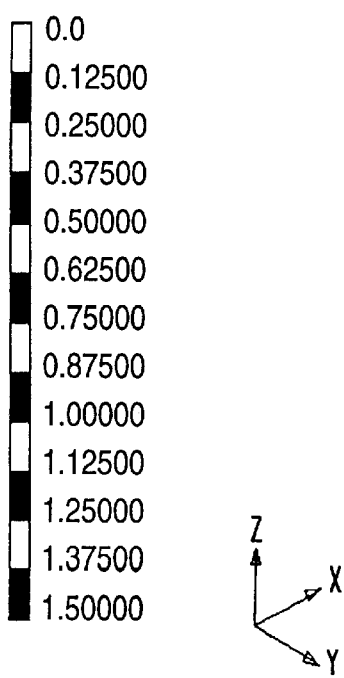
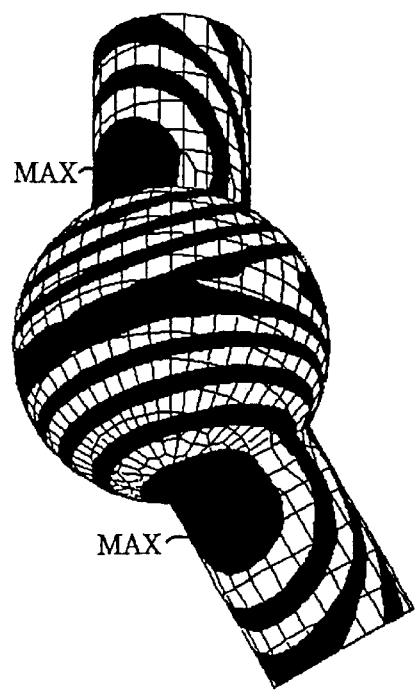
```
0.0
0.12500
0.25000
0.37500
0.50000
0.62500
0.75000
0.87500
1.00000
1.12500
1.25000
1.37500
1.50000
```

Fig. 71
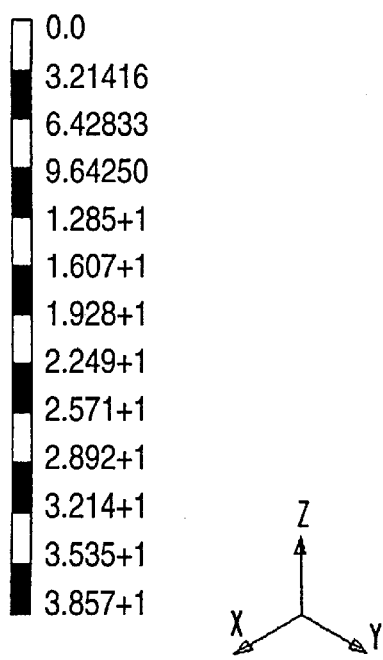
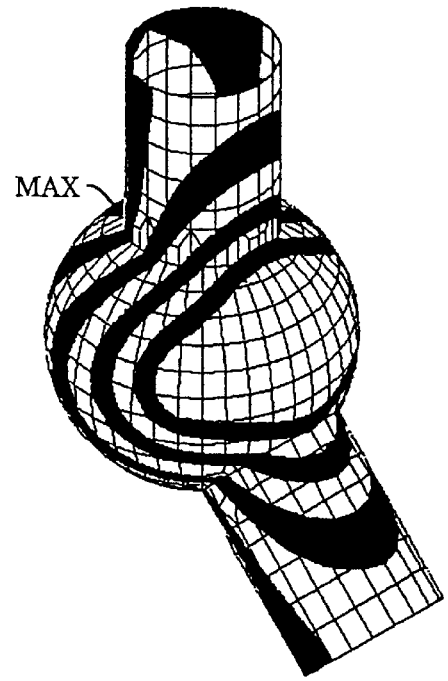
Fig. 72
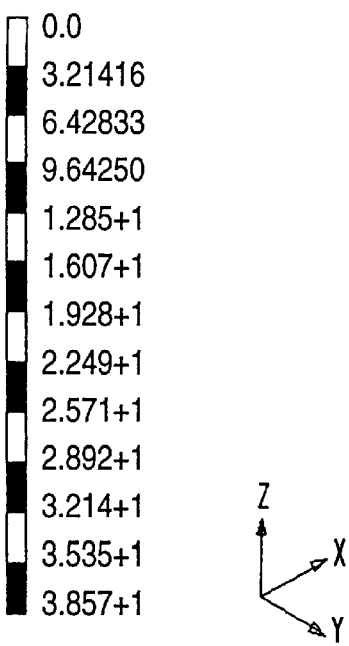
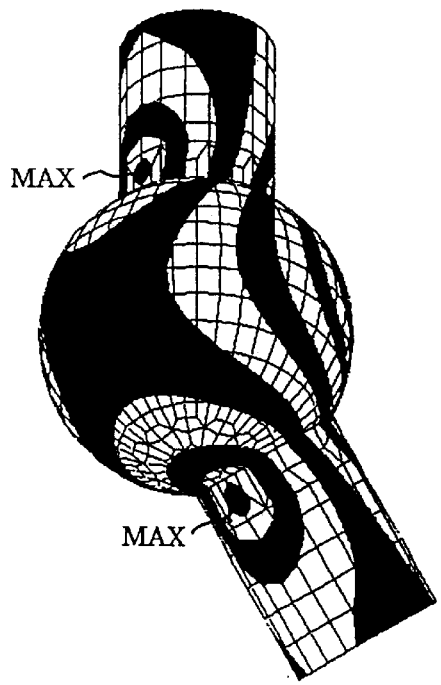

Fig. 73
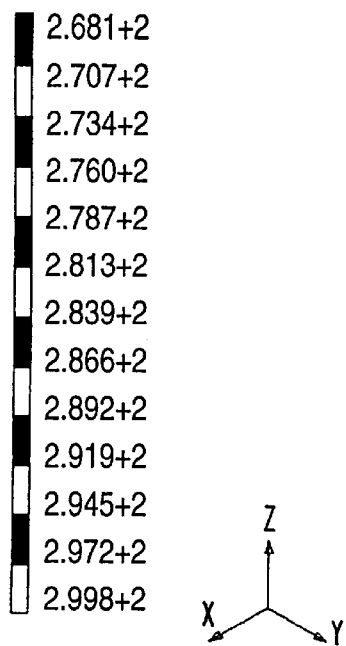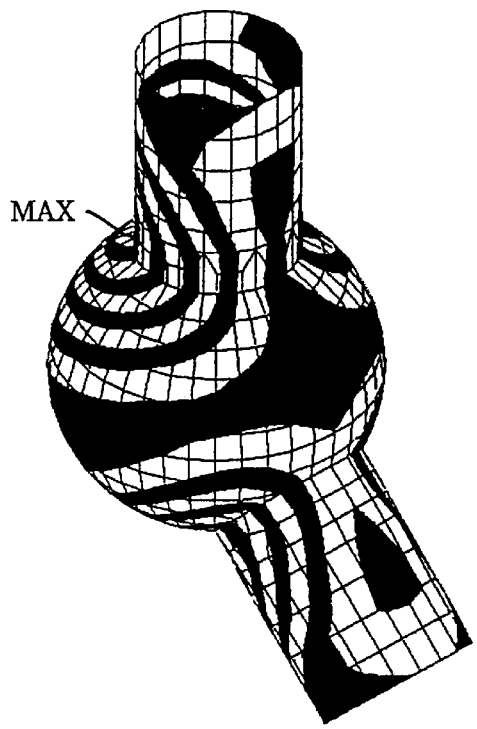
Fig. 74
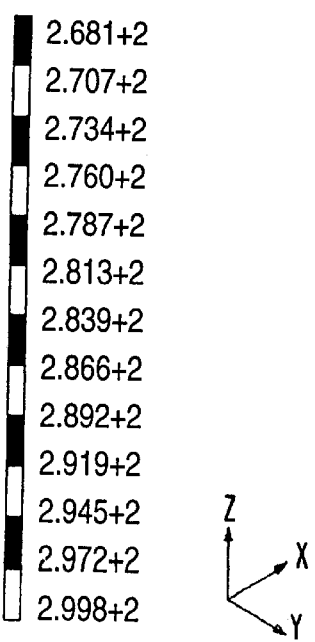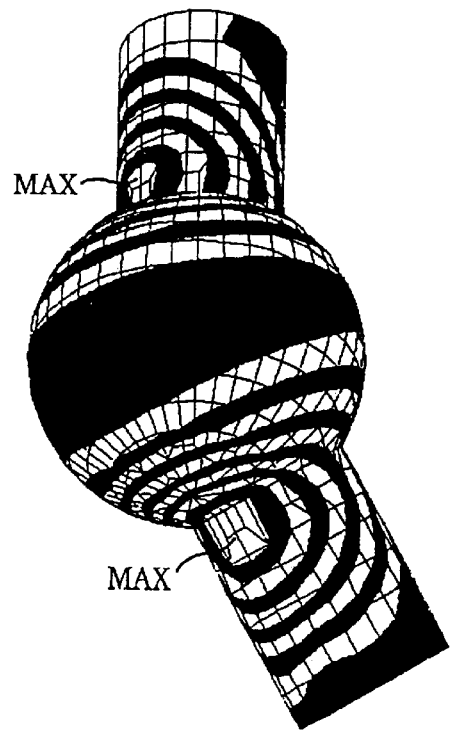

Fig. 75
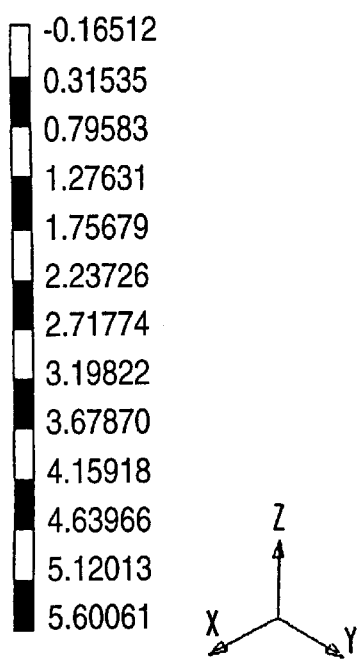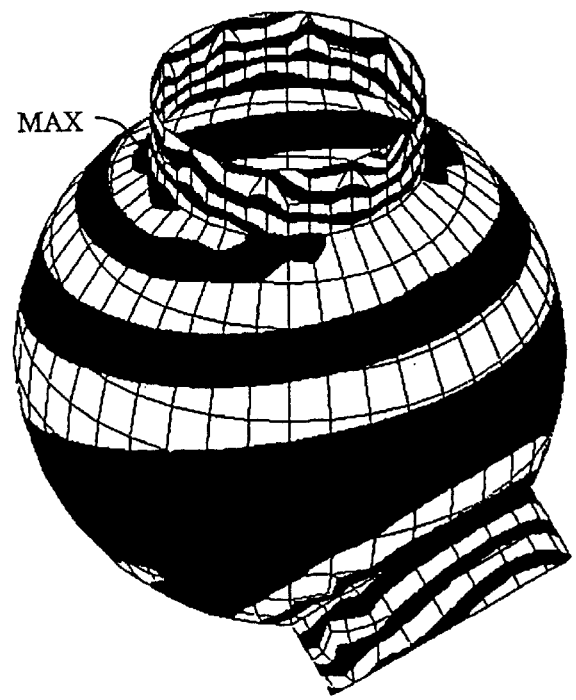
Fig. 76
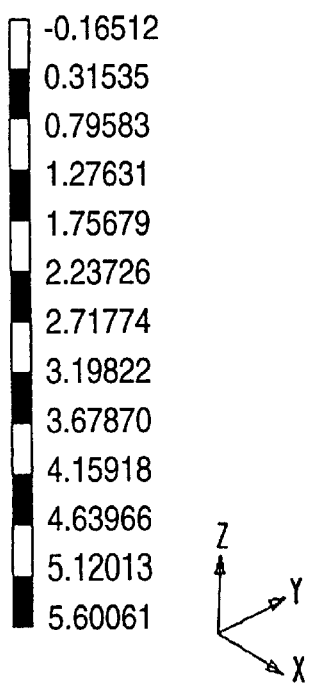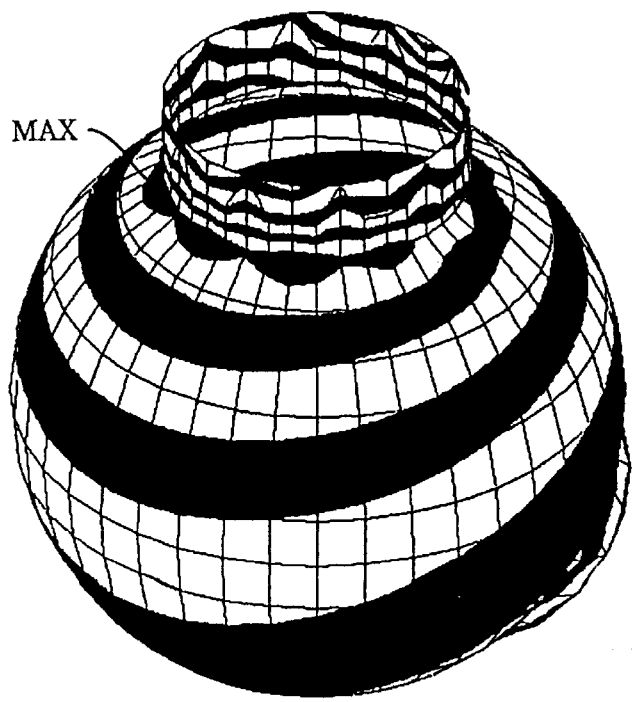

Fig. 77
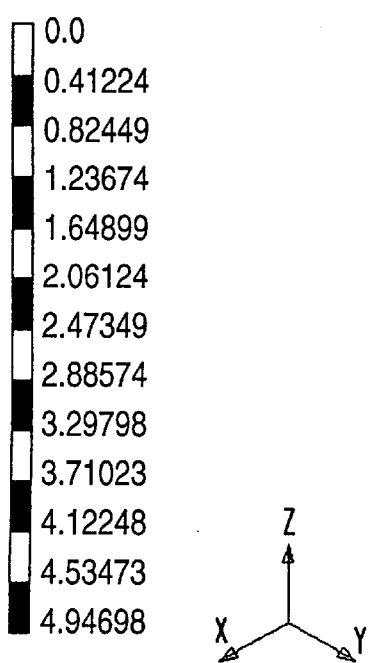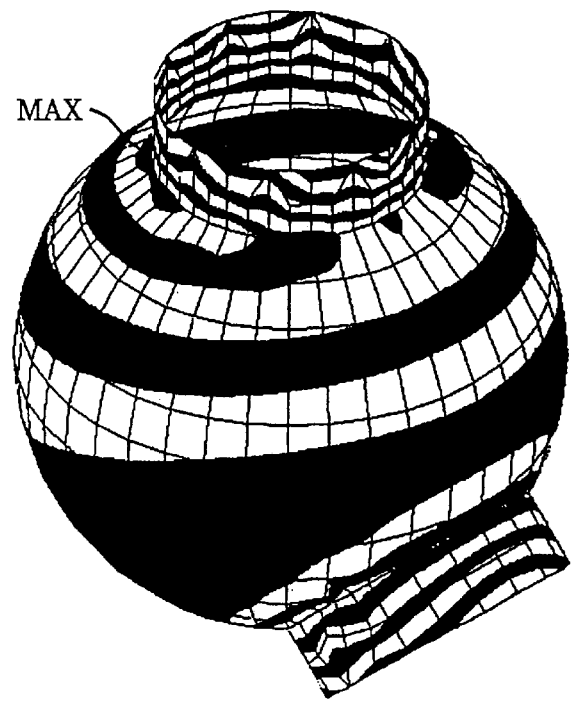
Fig. 78
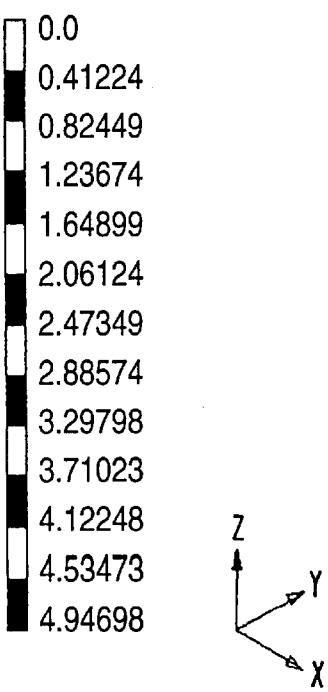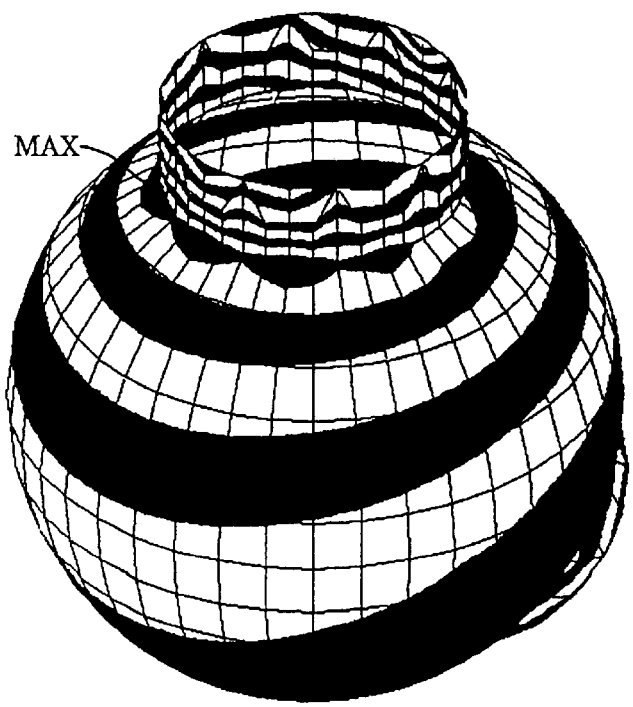

Fig. 81
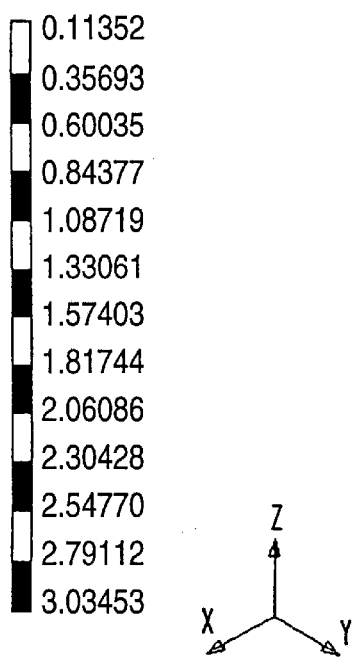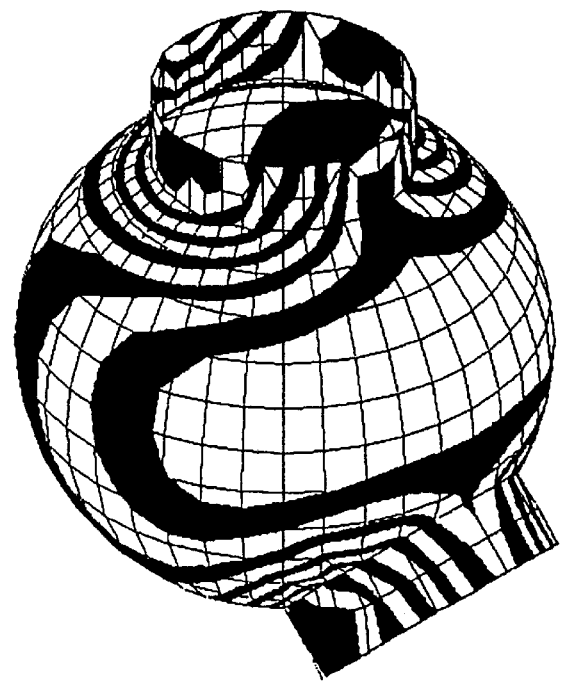
Fig. 82
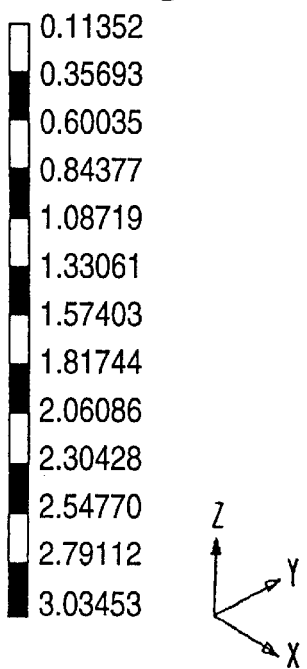

Fig. 83
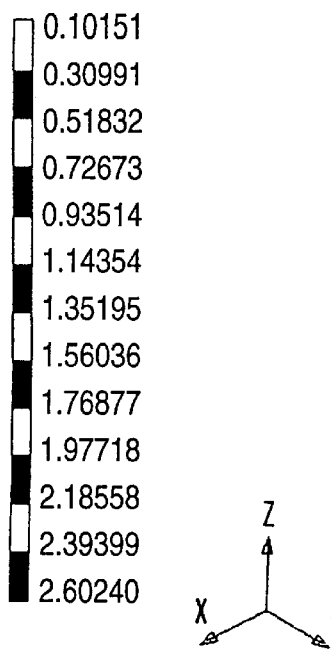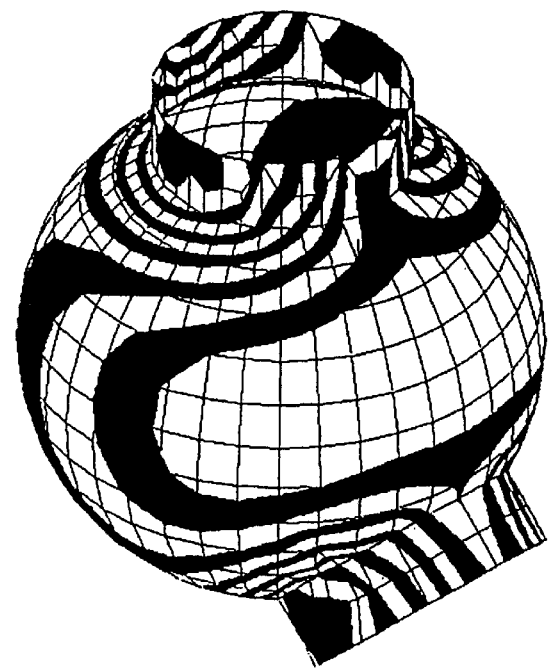
Fig. 84
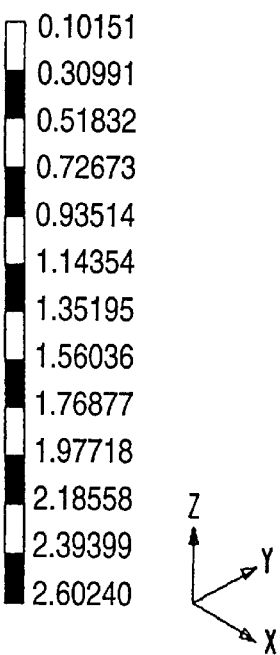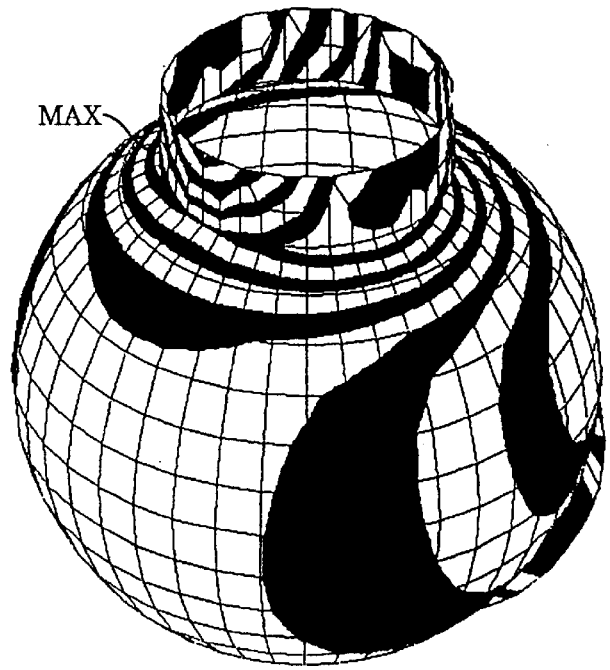

Fig. 85
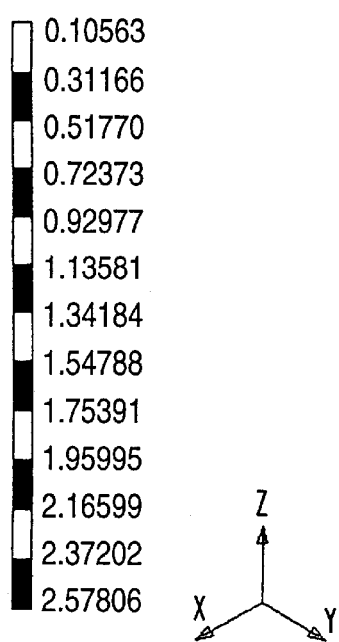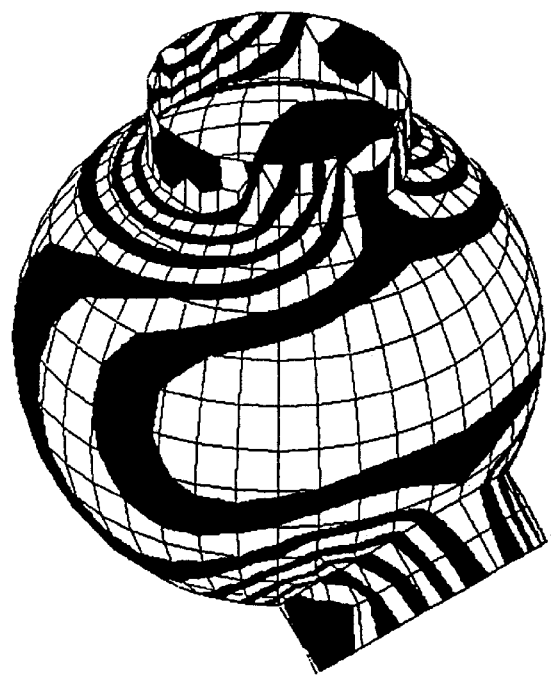
Fig. 86
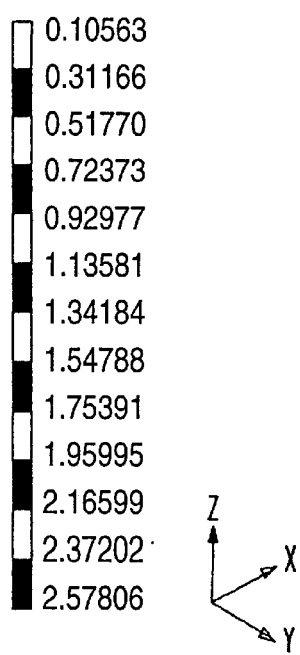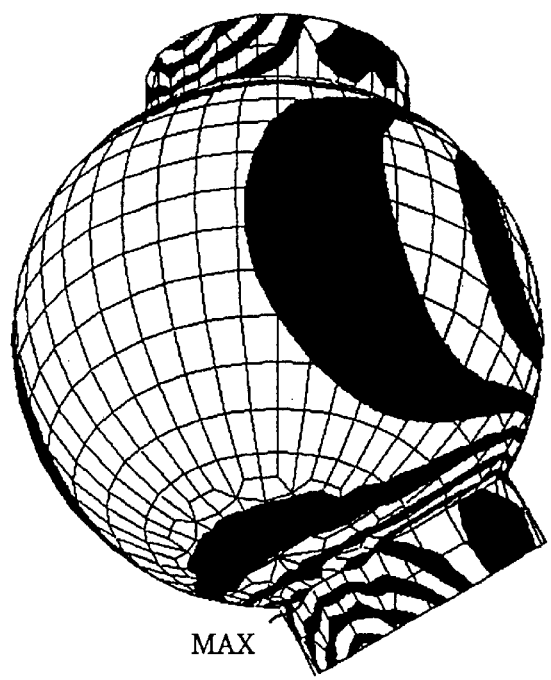

Fig. 87
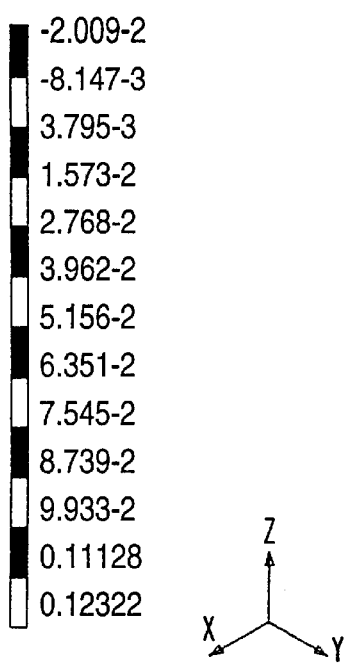
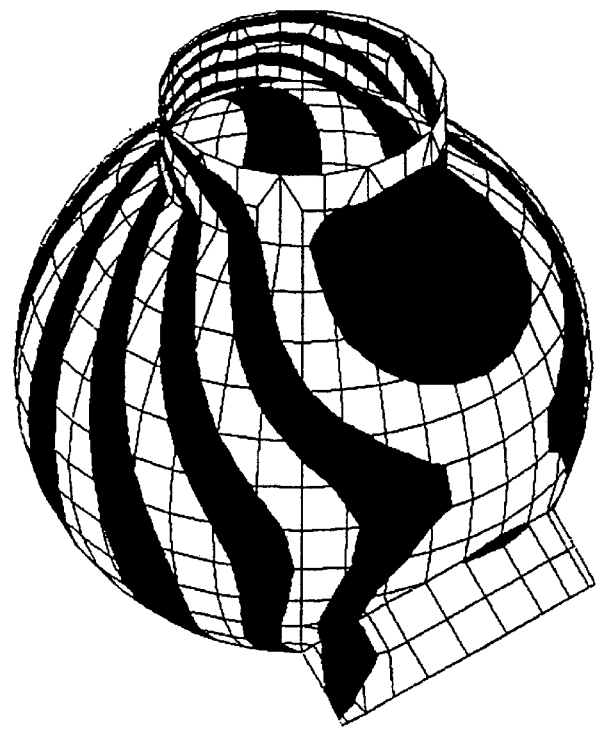
Fig. 88
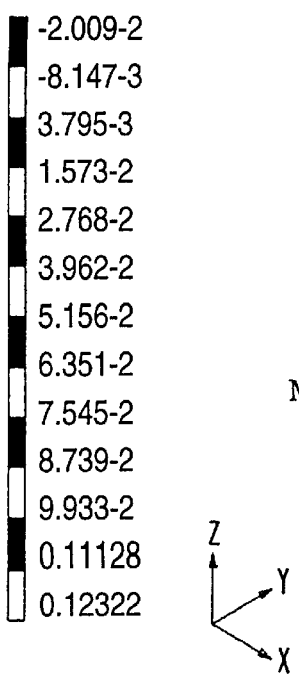
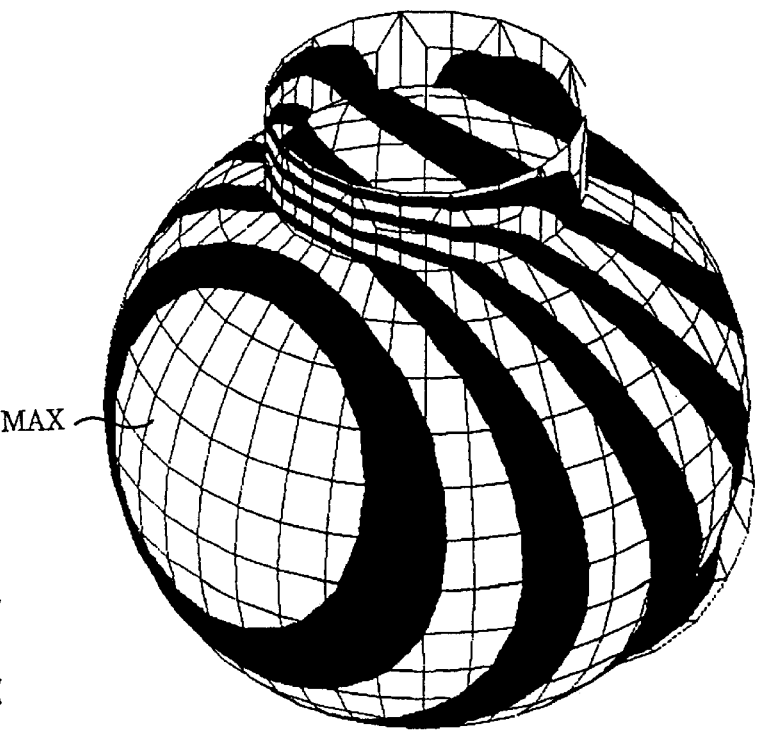

Fig. 89
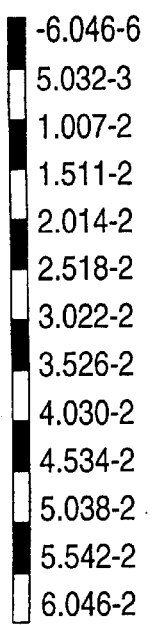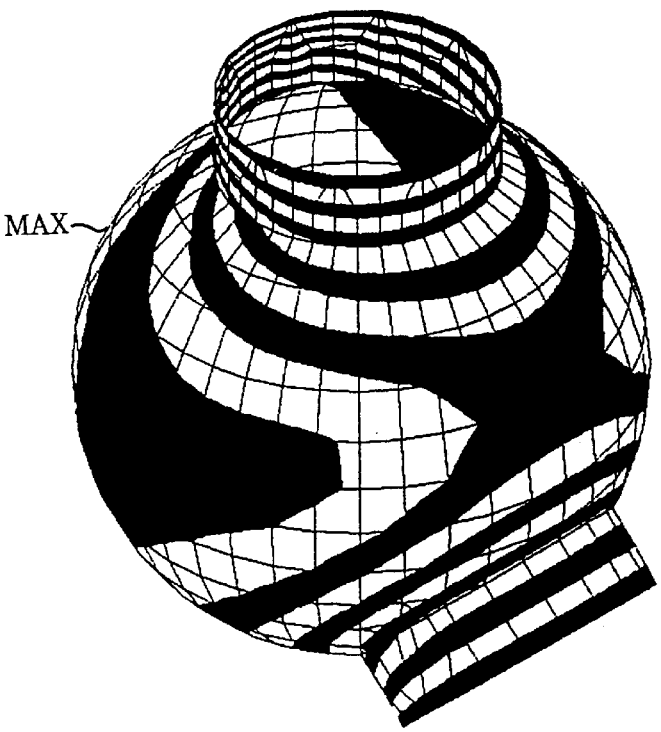
Fig. 90
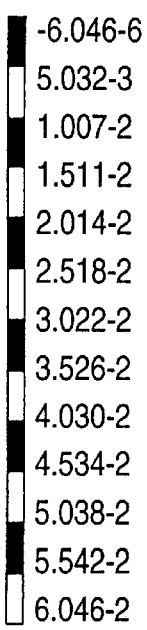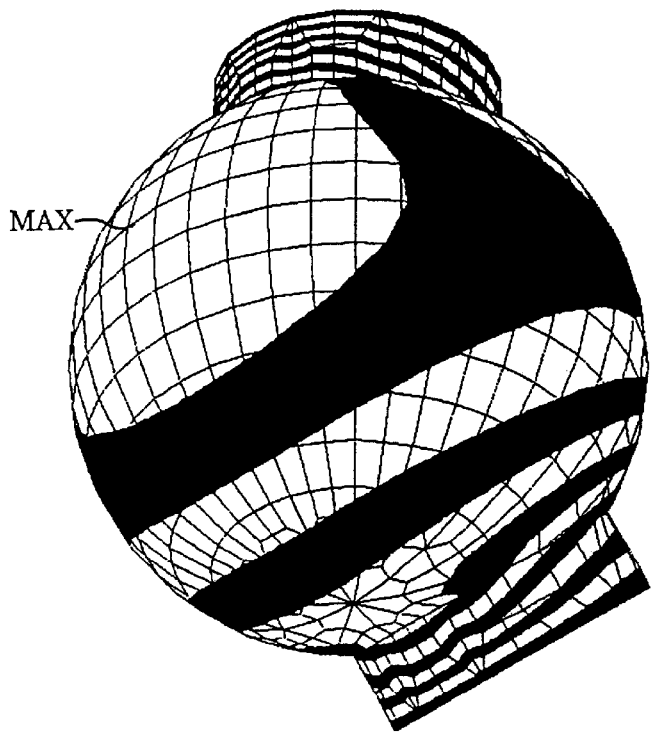

Fig. 97
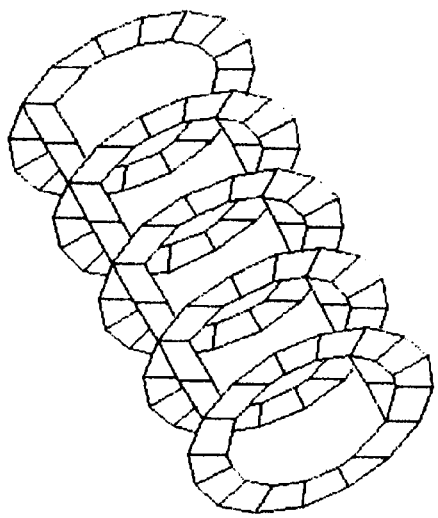
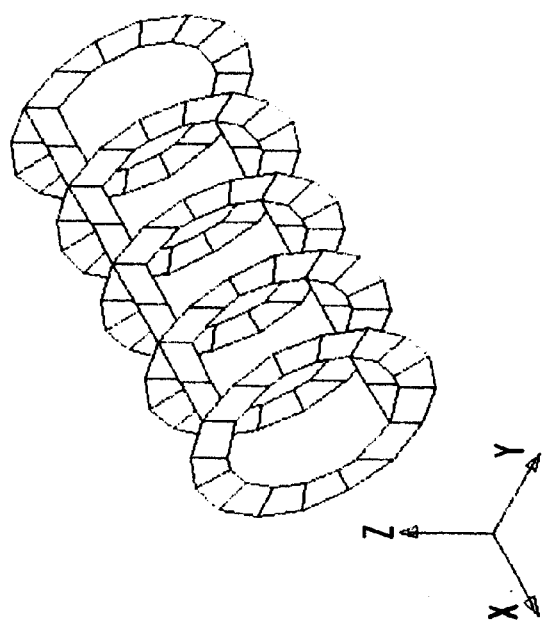

Fig. 101
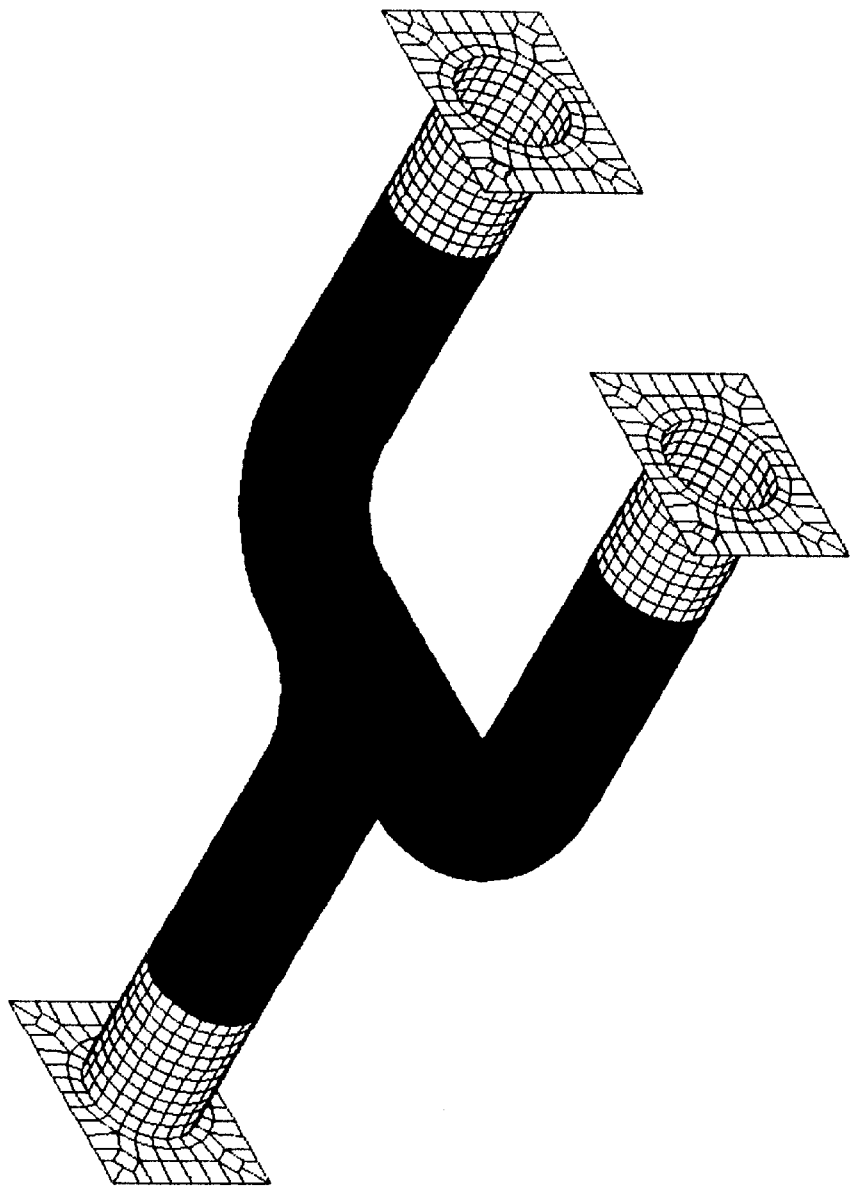
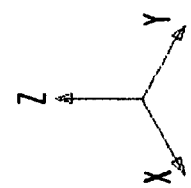

0.61472
1.15147
1.68822
2.22497
2.76172
3.29847
3.83522
4.37197
4.90872
5.44546
5.98221
6.51896
7.05571

*Fig. 114*
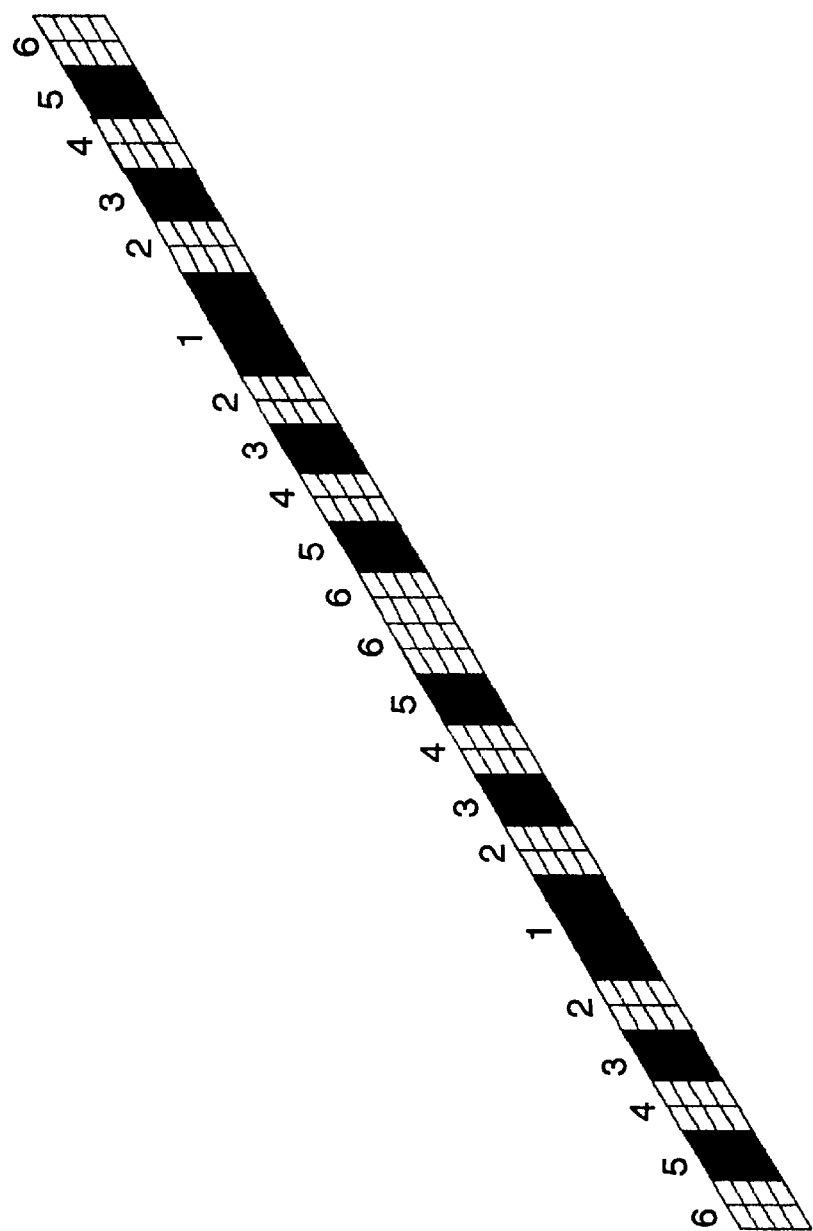
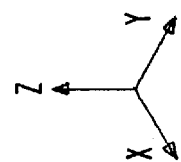

Fig. 131
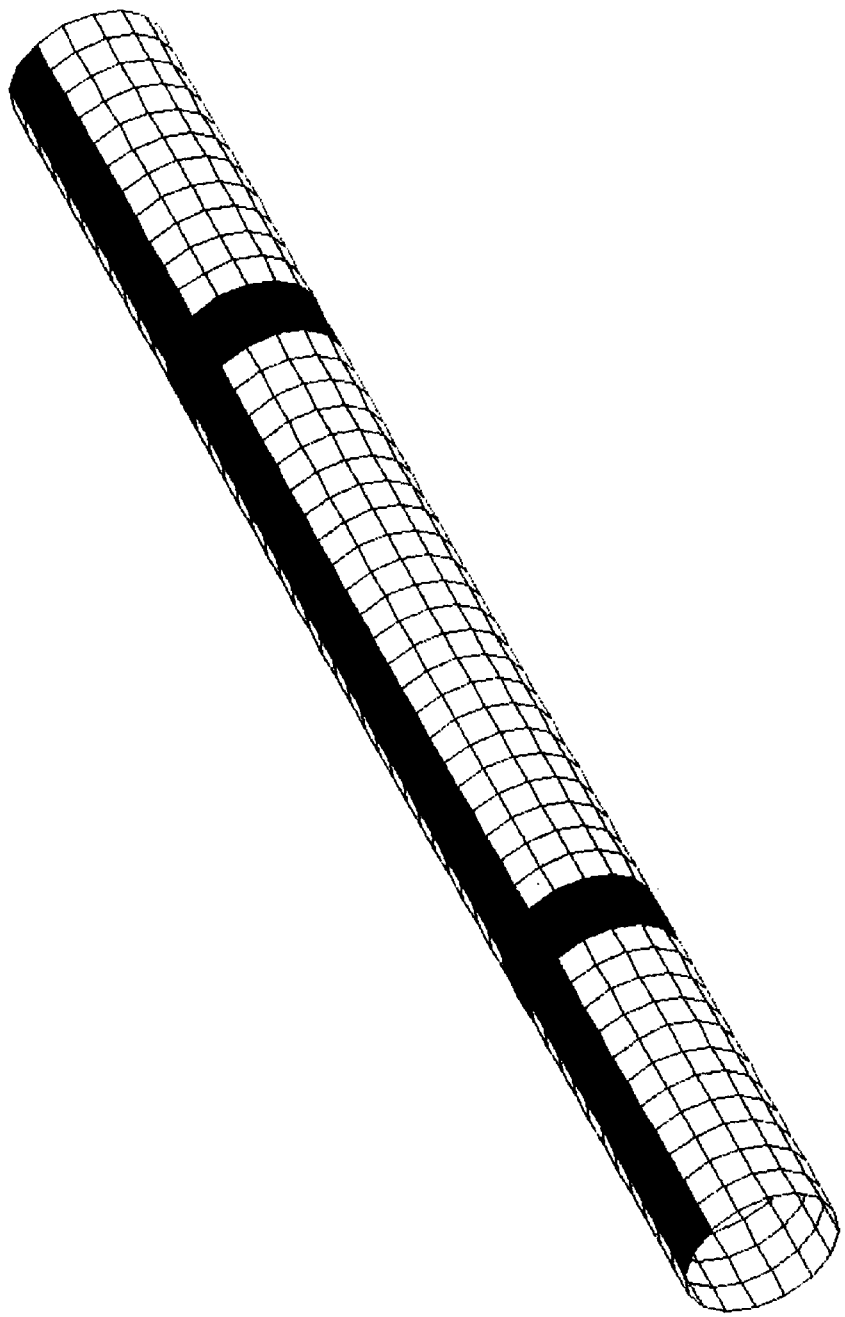
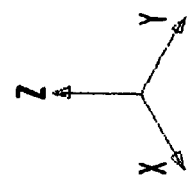

Fig. 134
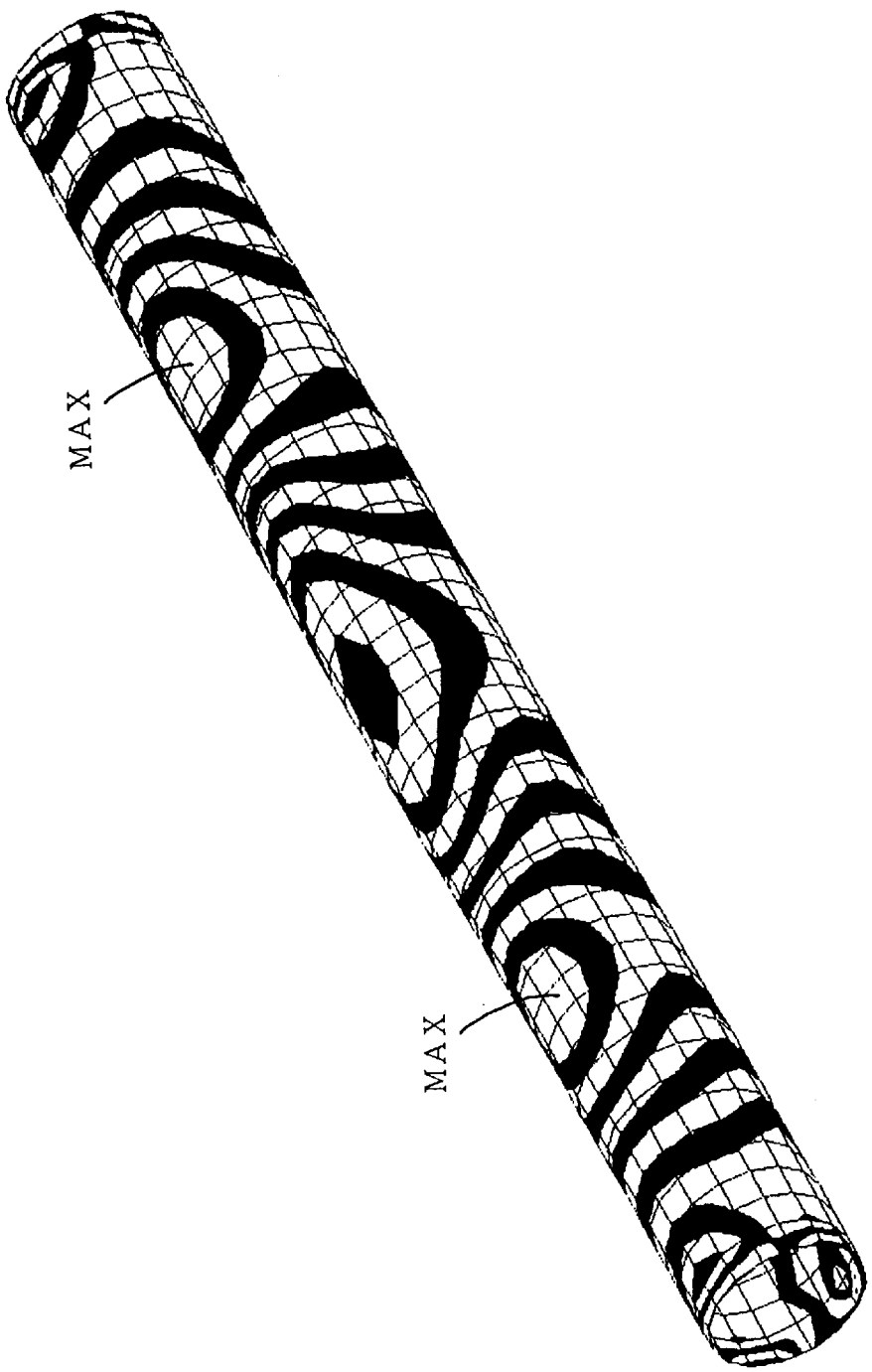
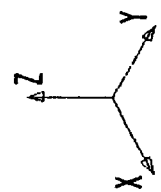

Fig. 139
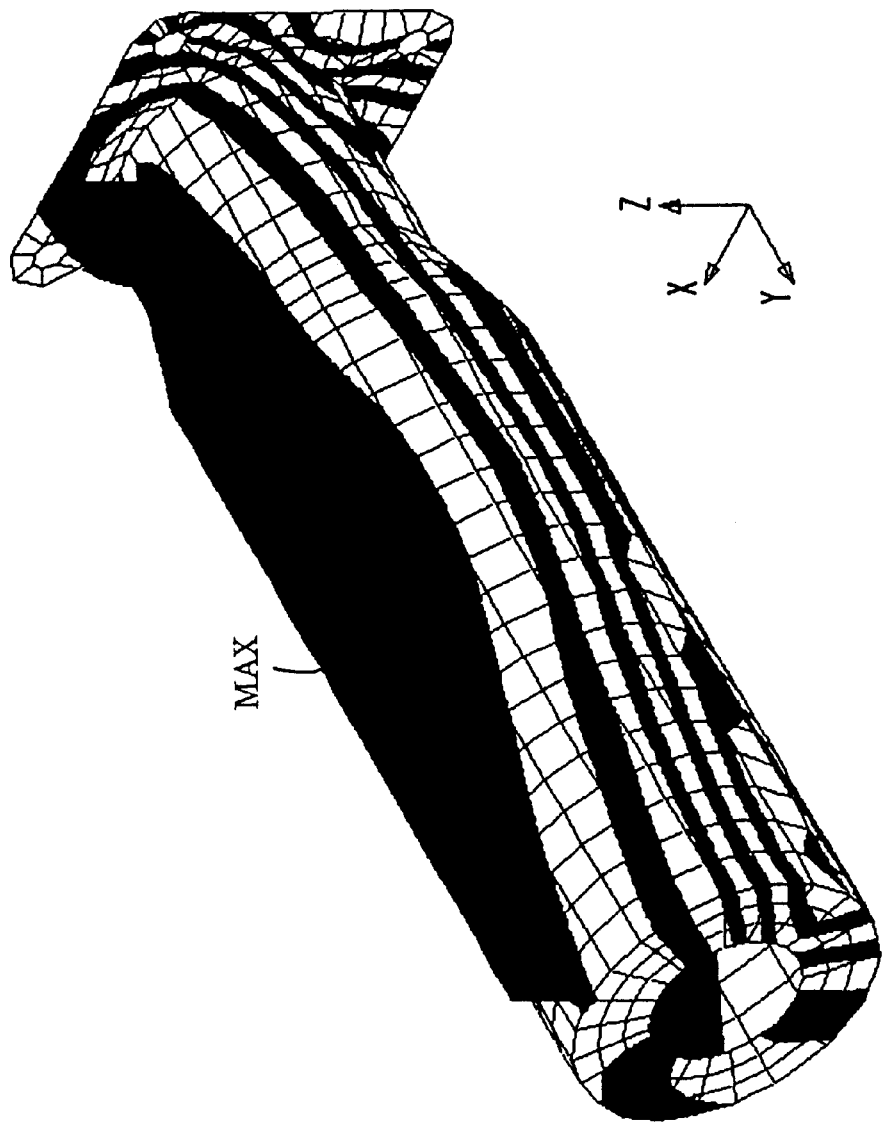
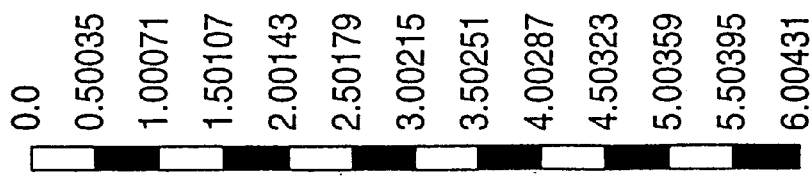

Fig. 140
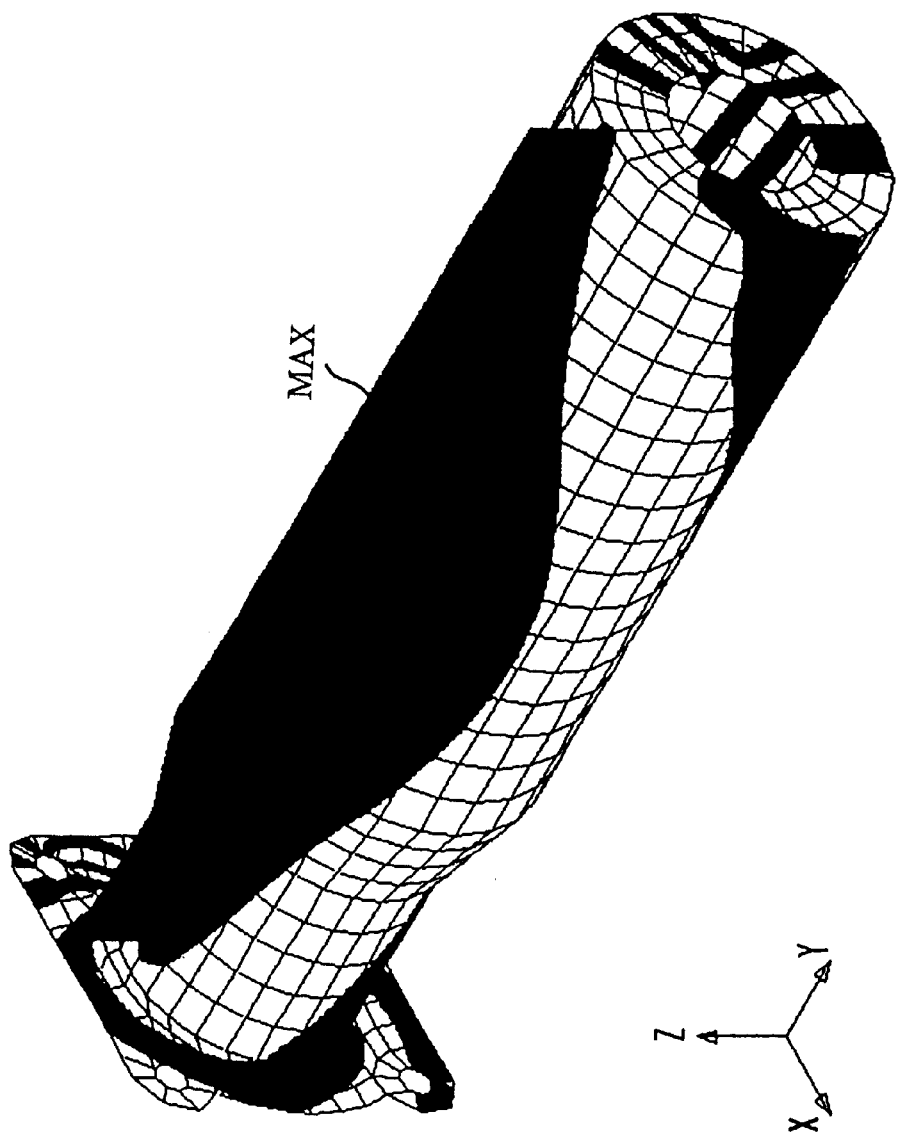
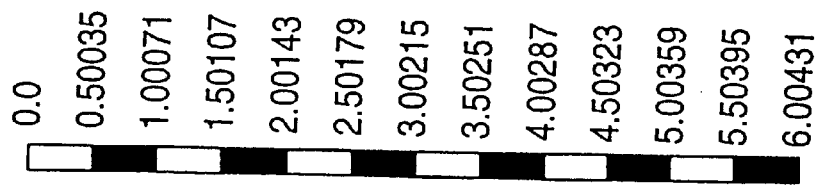

Fig. 141
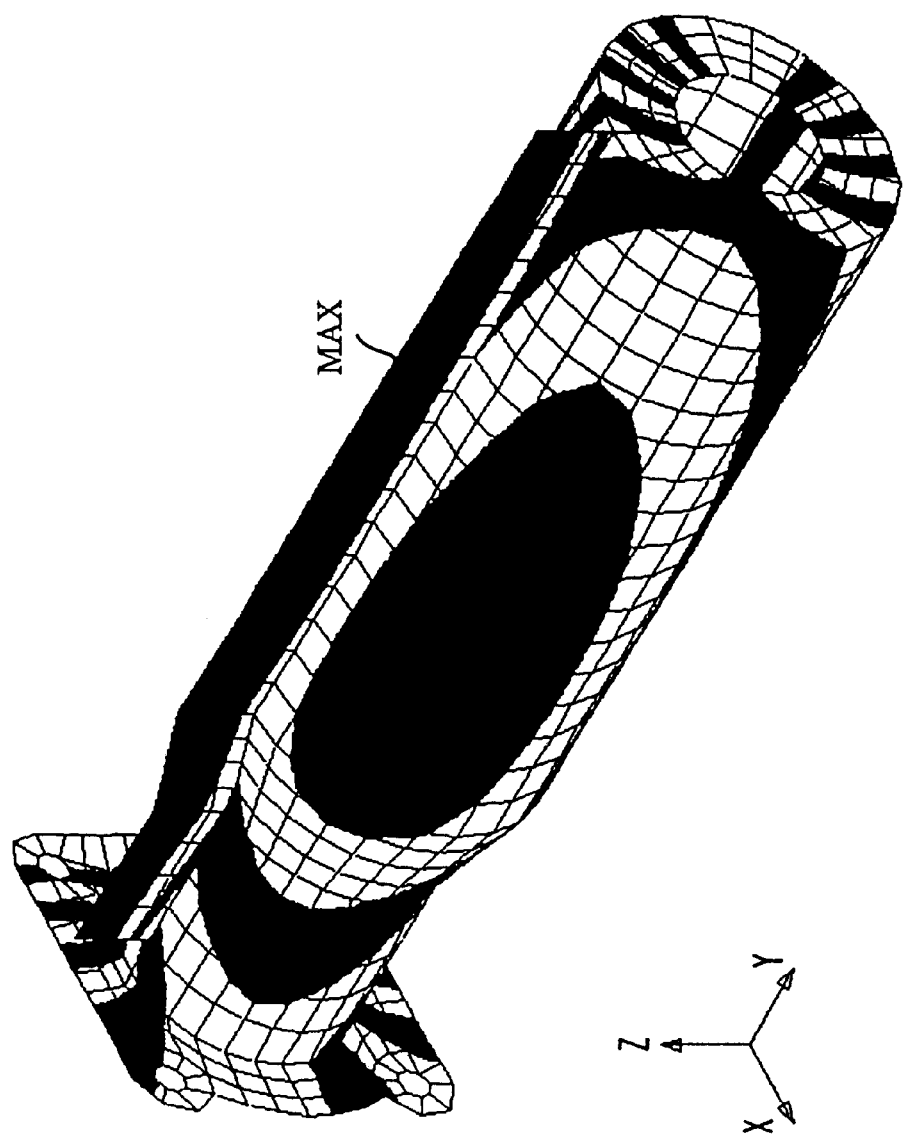
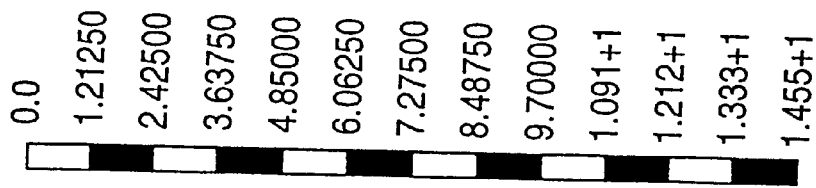

Fig. 142
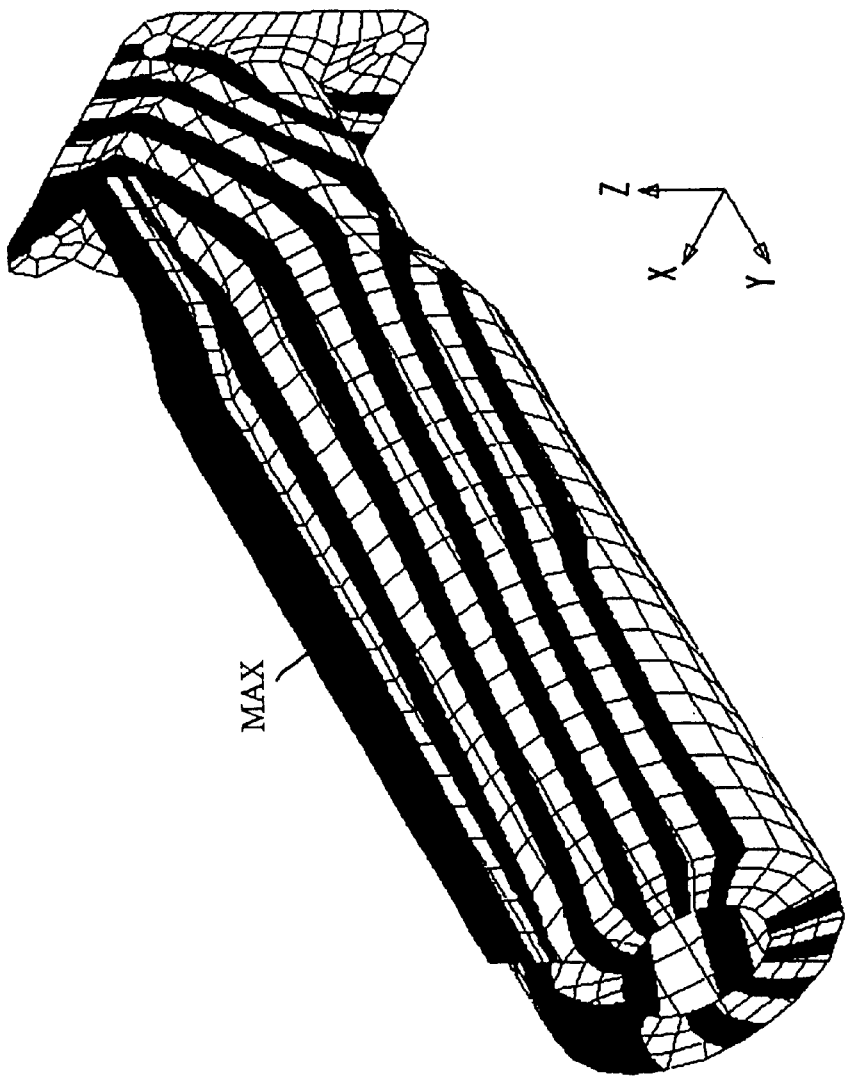
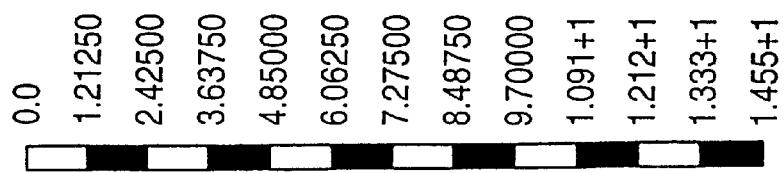

Fig. 143
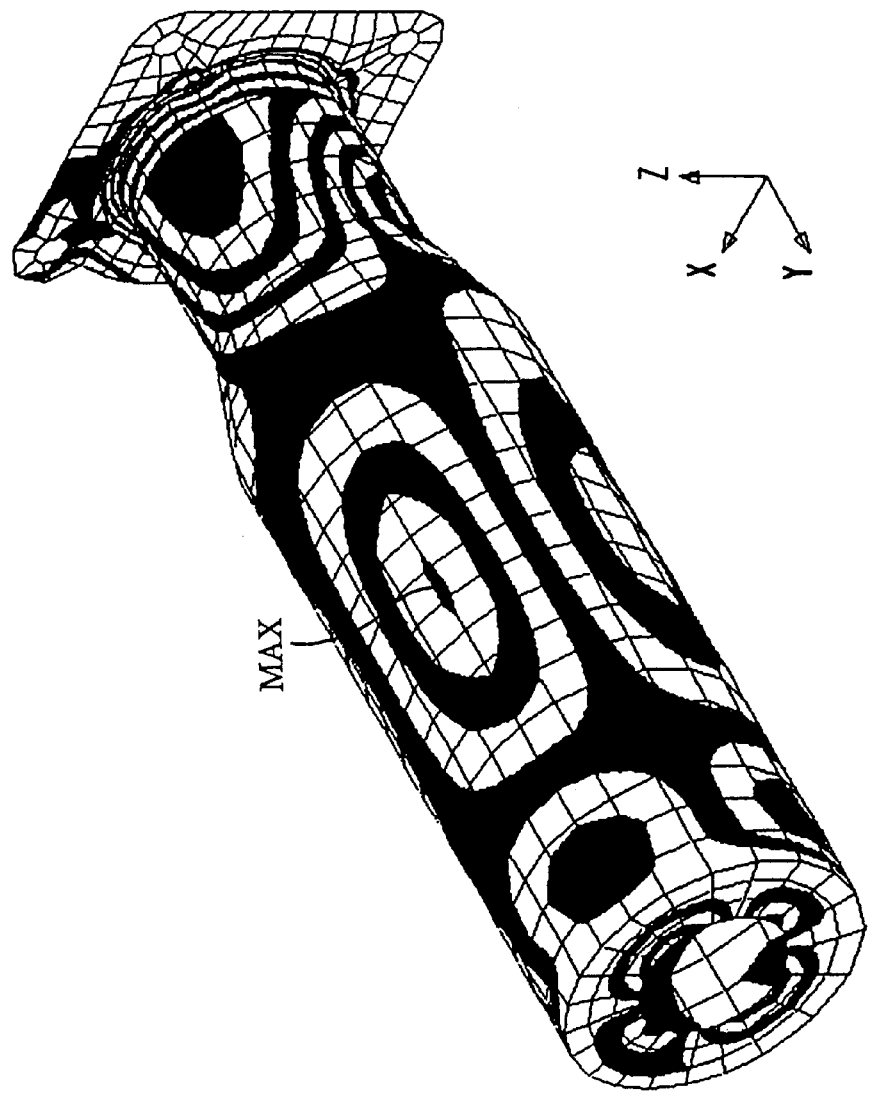
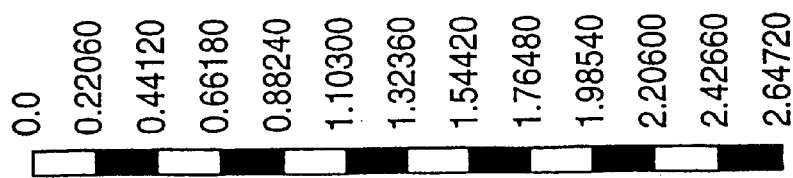

Fig. 144
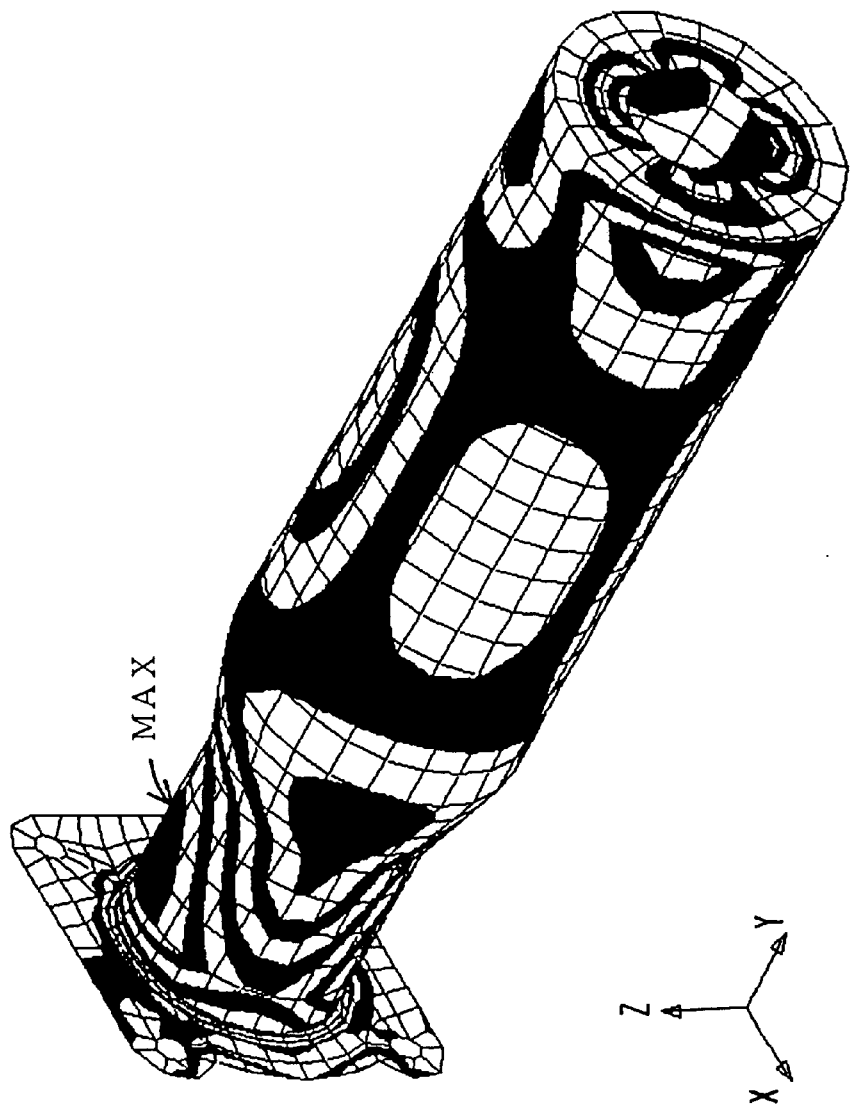
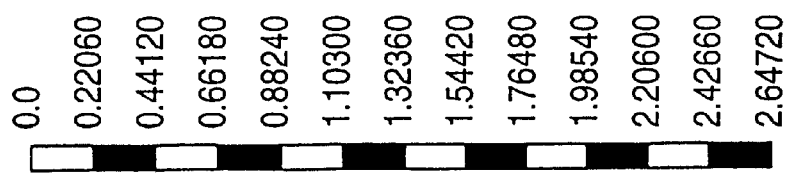

Fig. 145
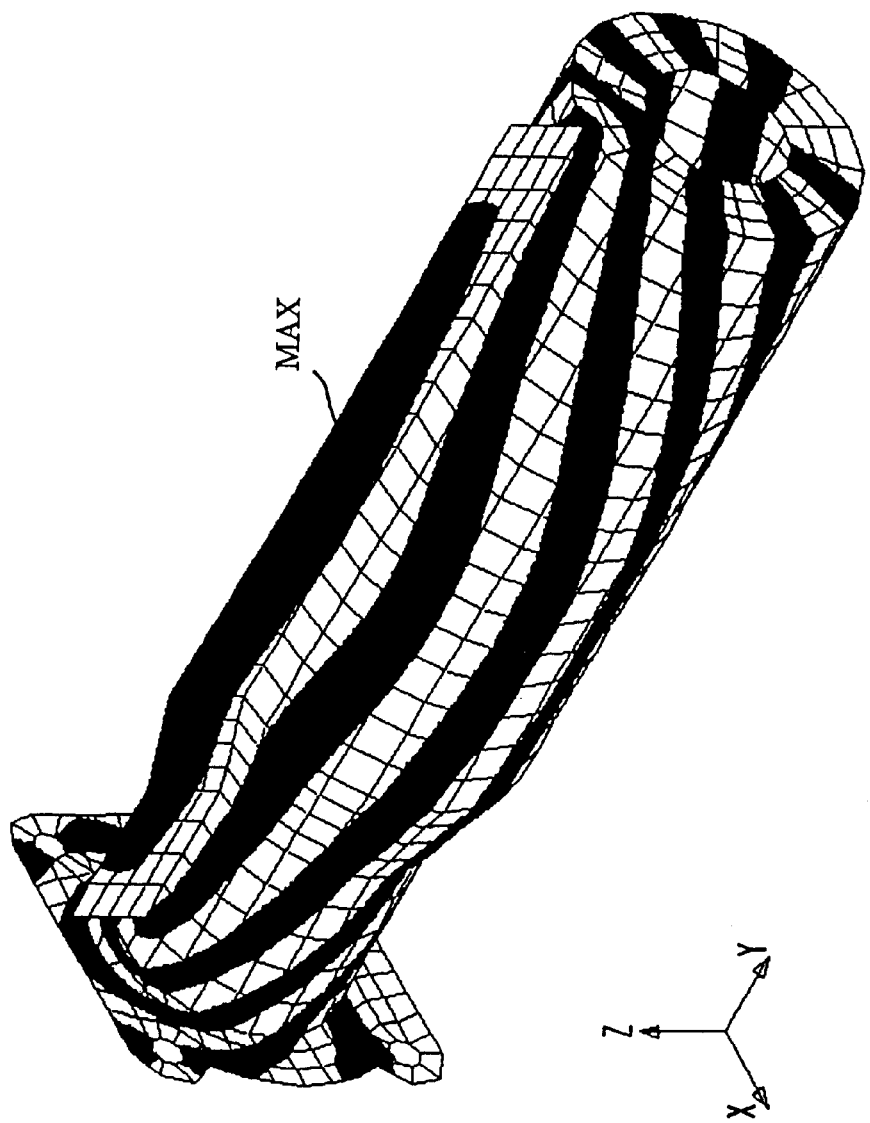
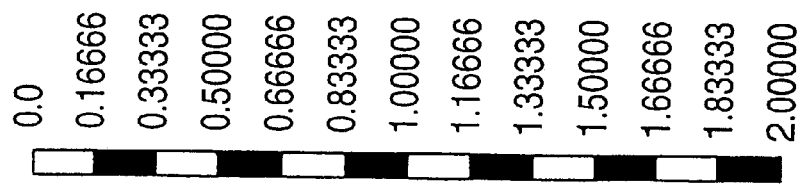

Fig. 146
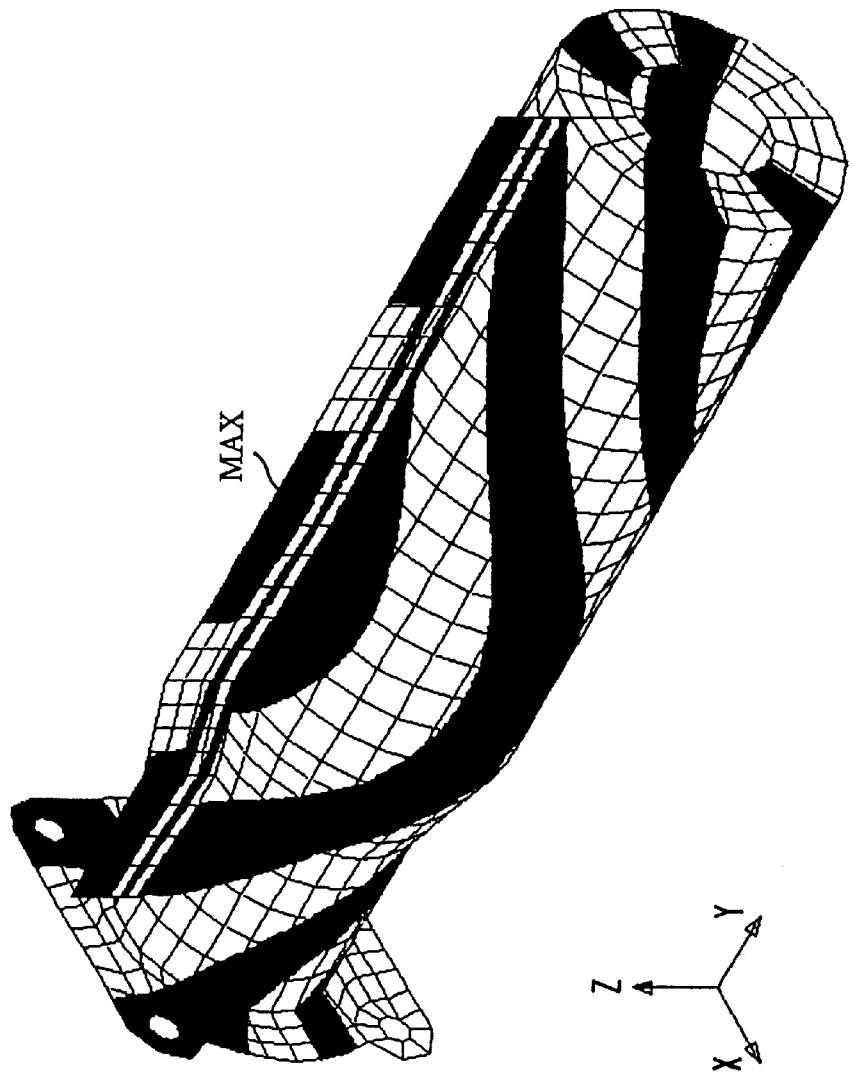
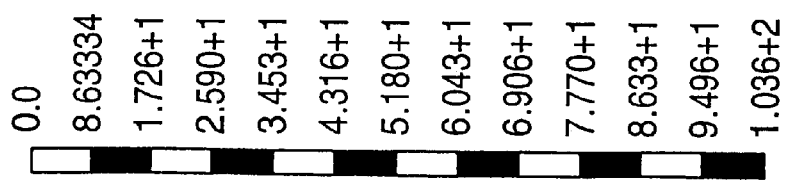

Fig. 147
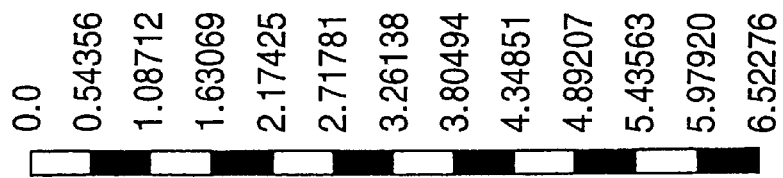

Fig. 149
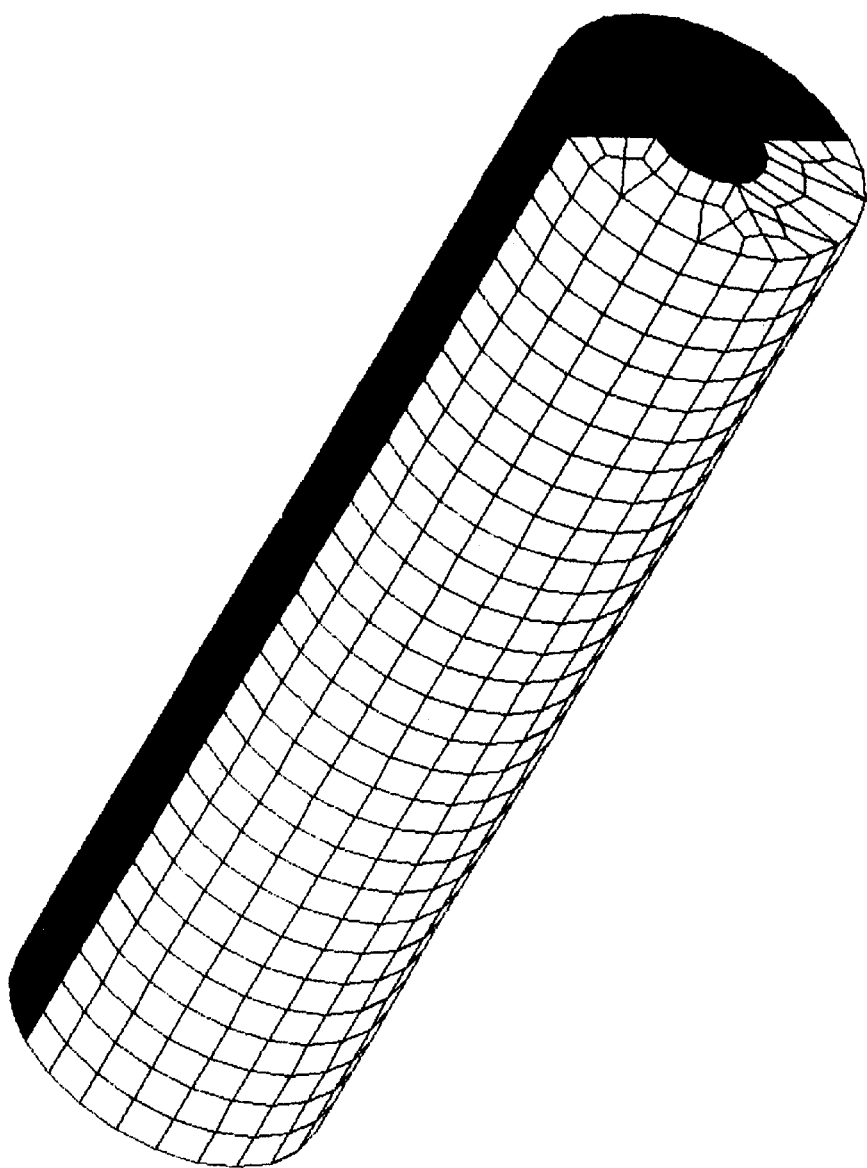
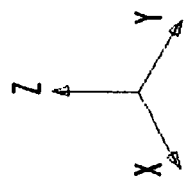

Fig. 150
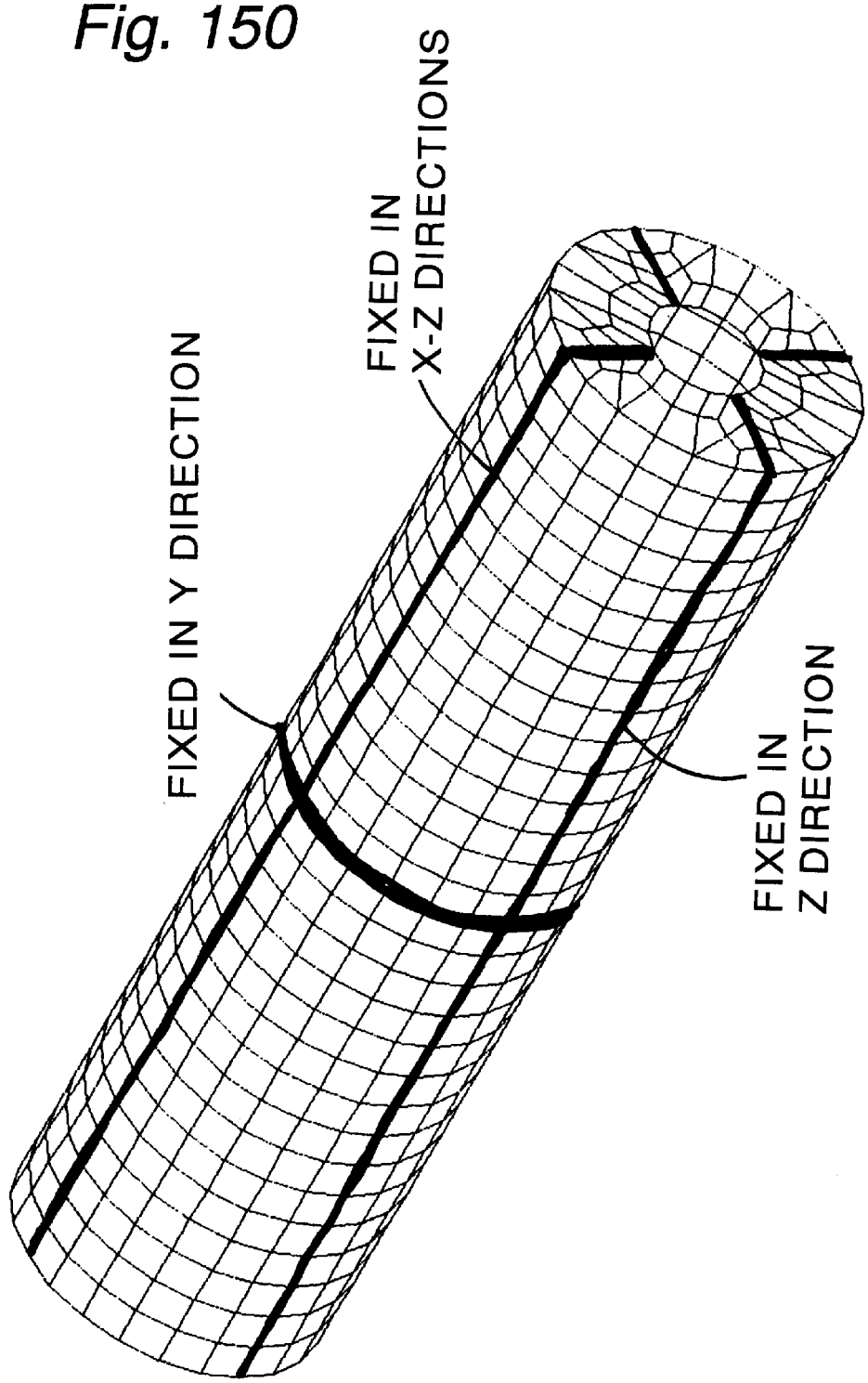
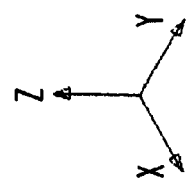

Fig. 154
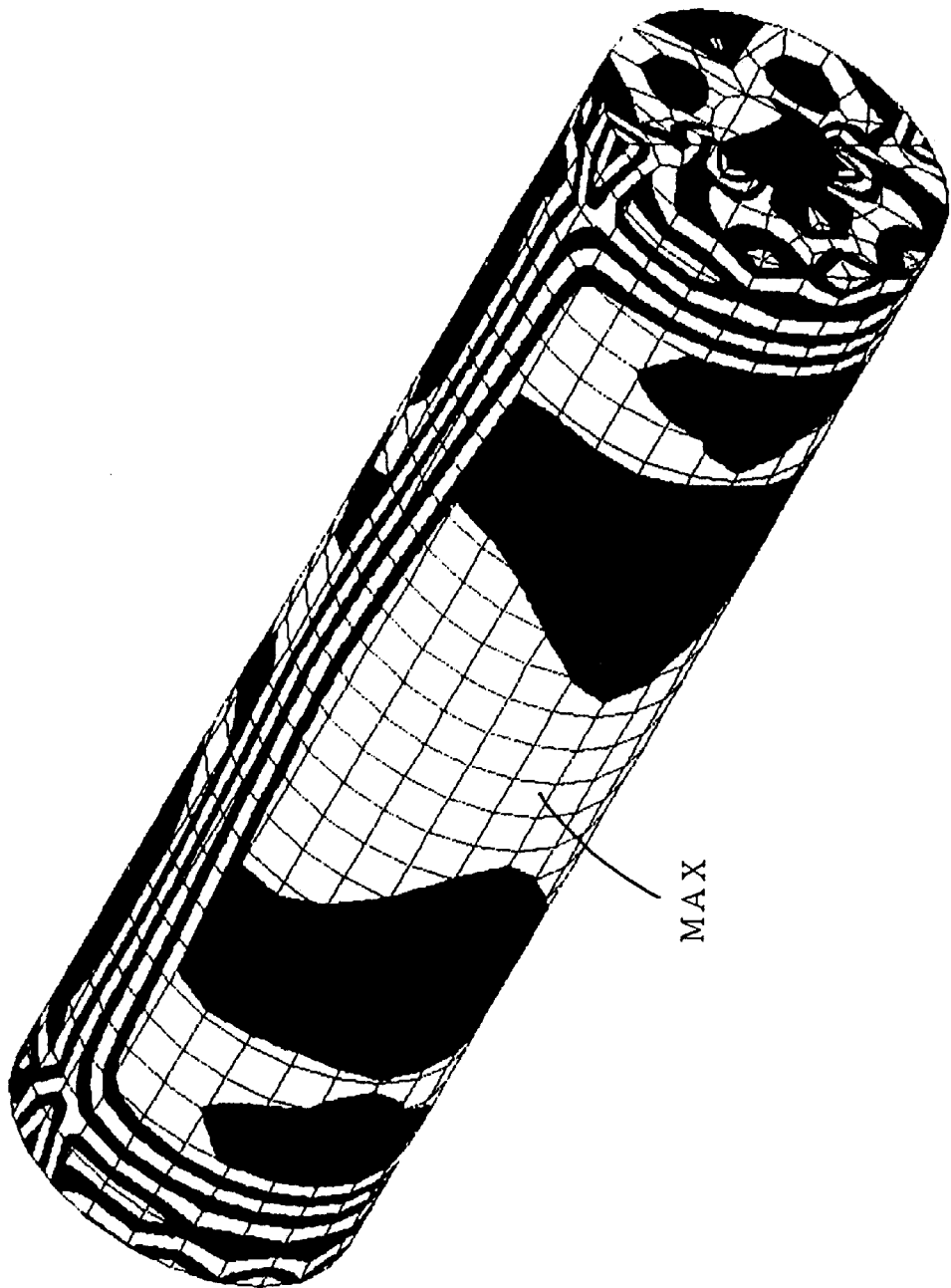
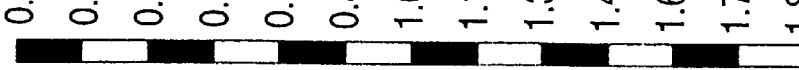
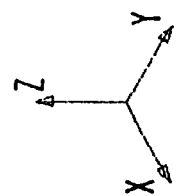

Fig. 155
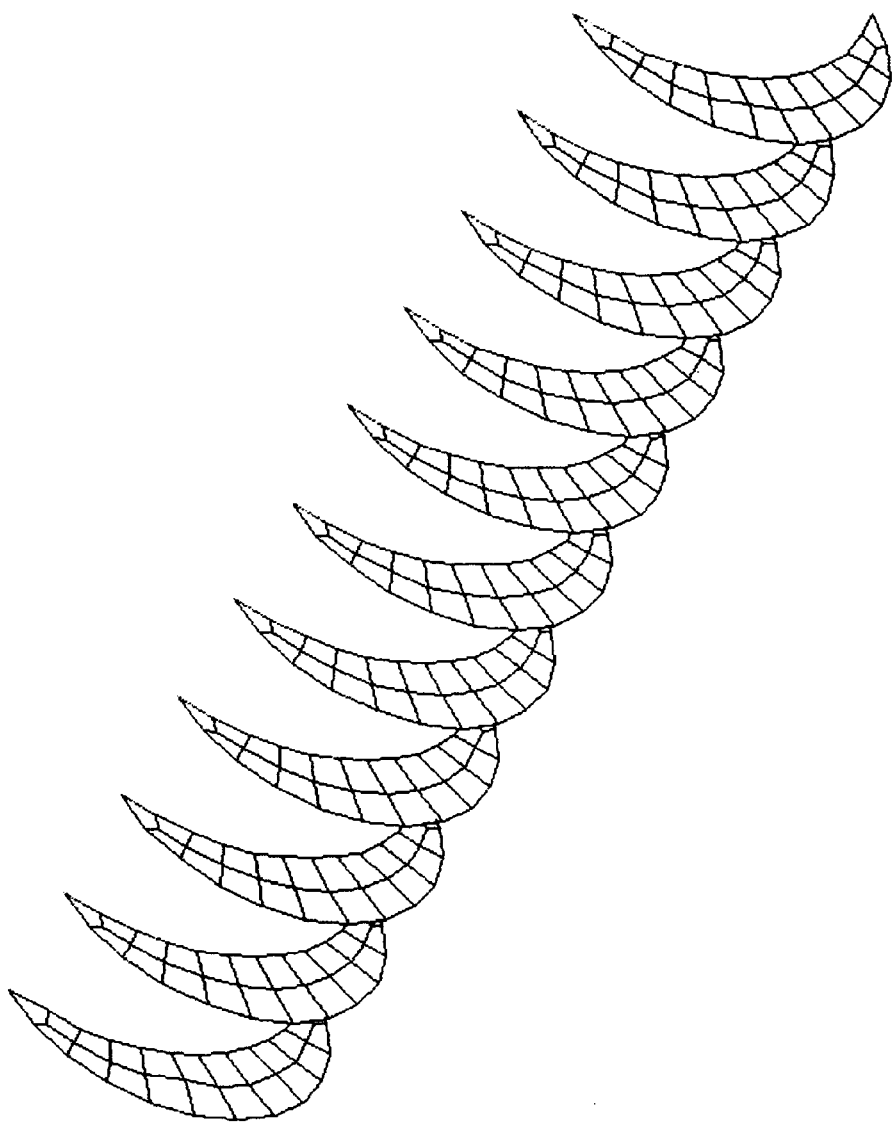
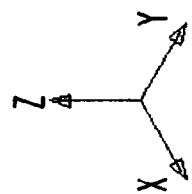

Fig. 156
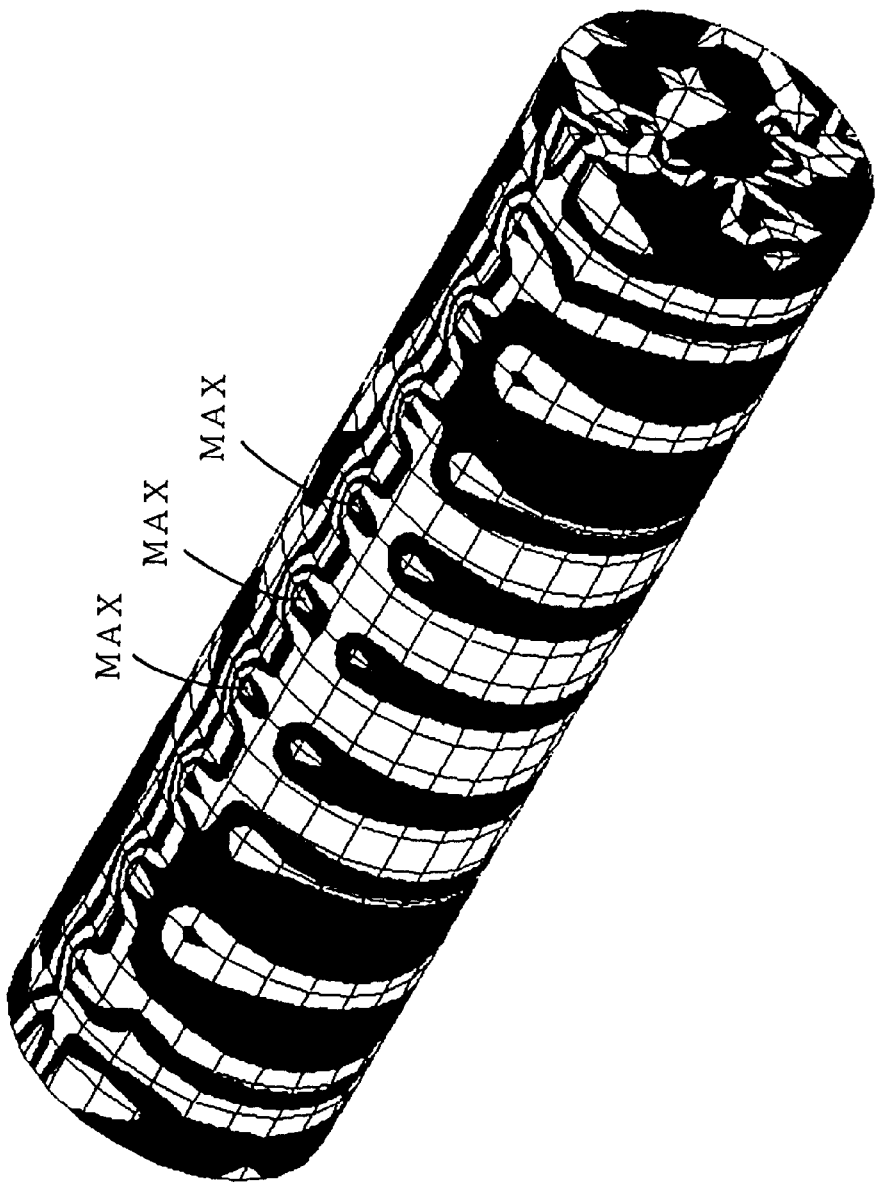
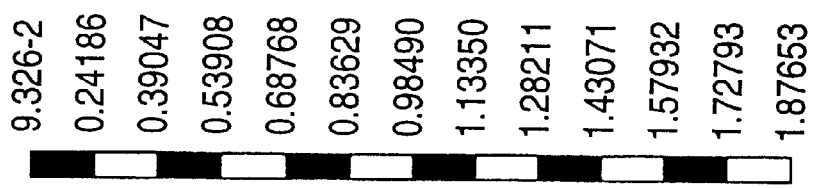
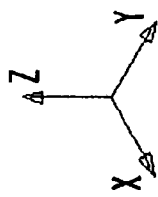

Fig. 157
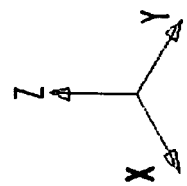

Fig. 158
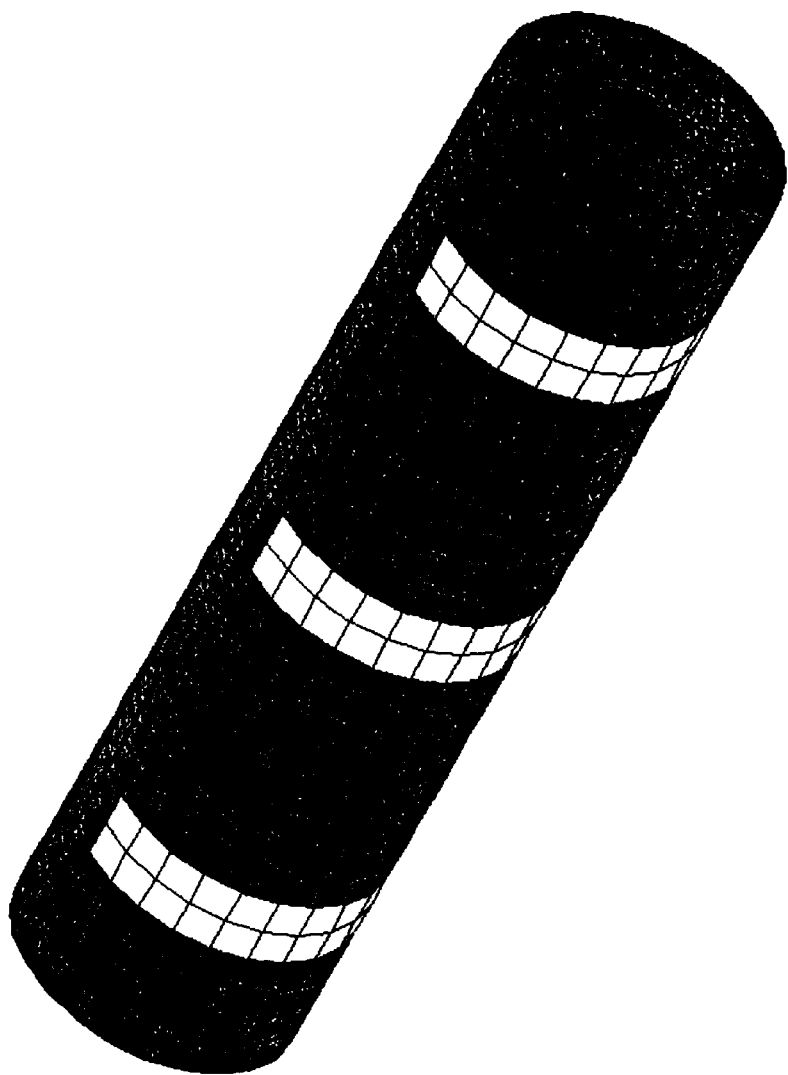
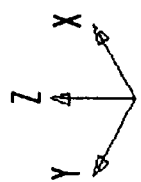

Fig. 160
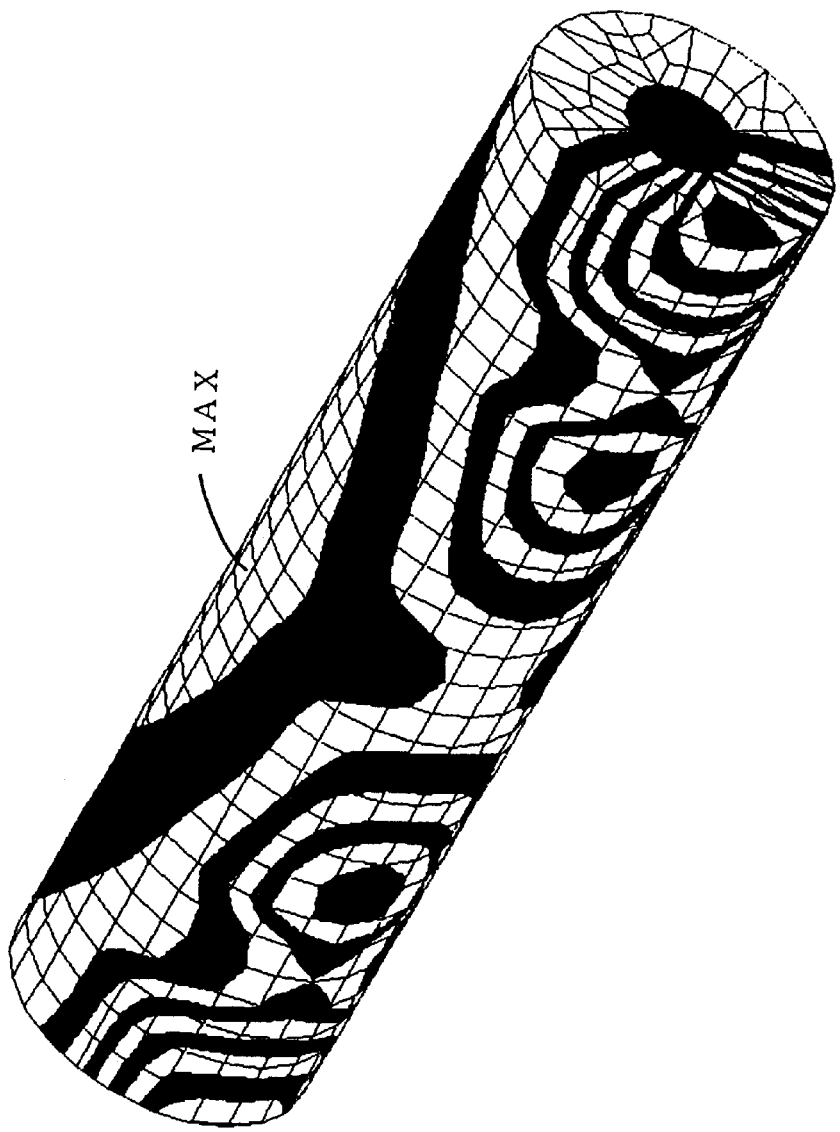
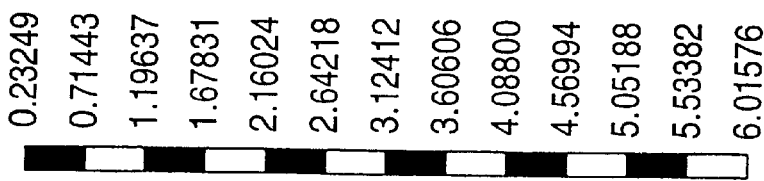
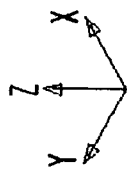

Fig. 167
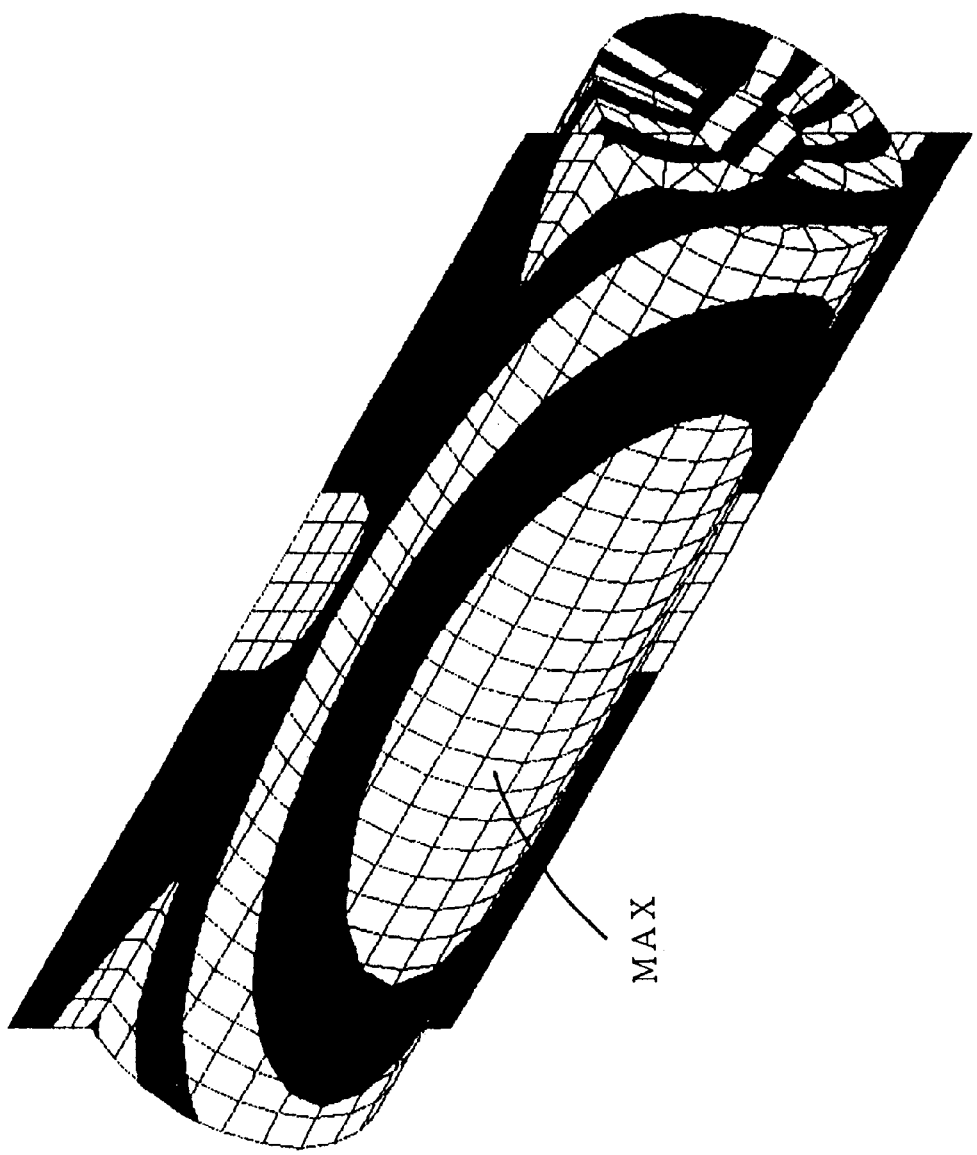
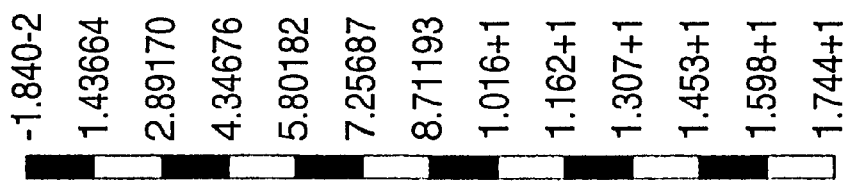
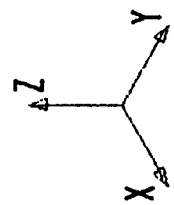

Fig. 168
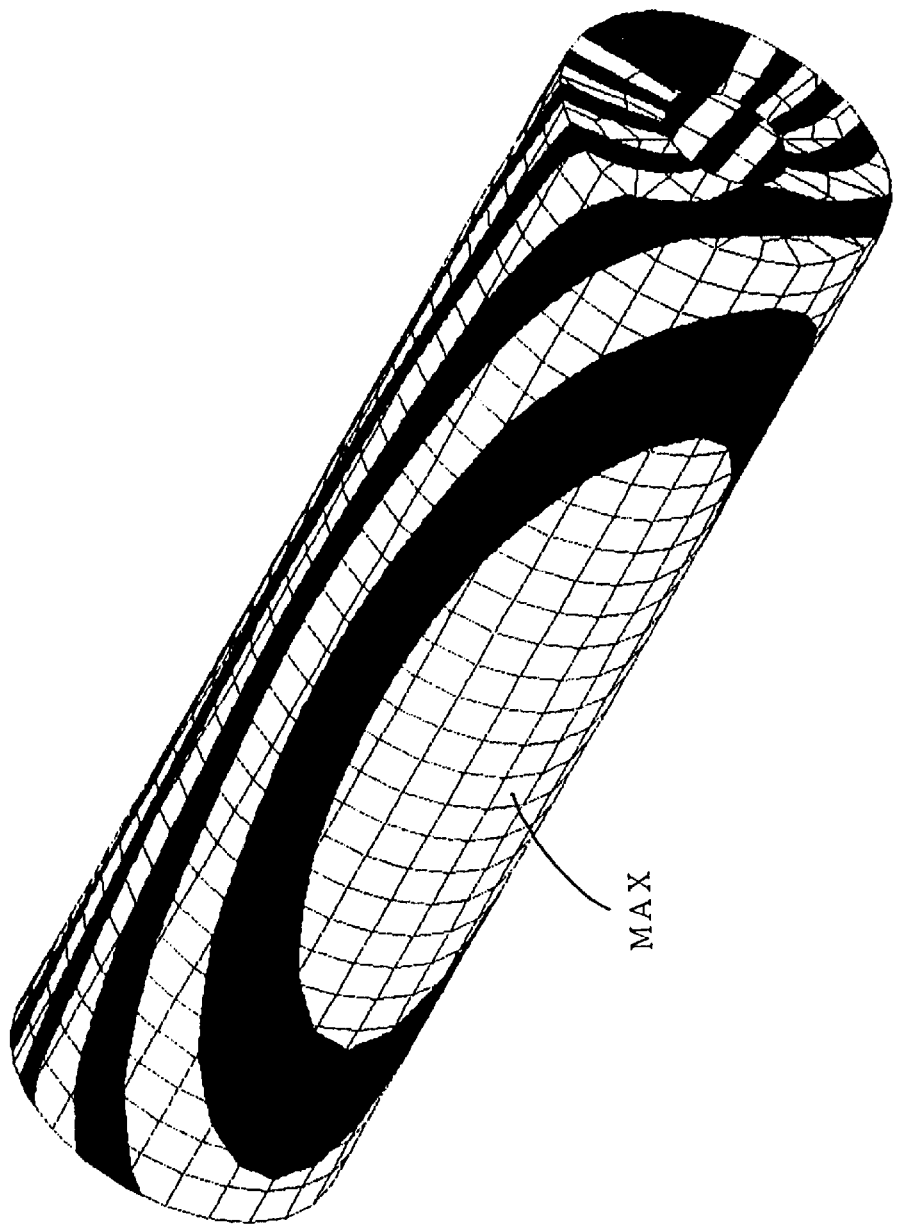
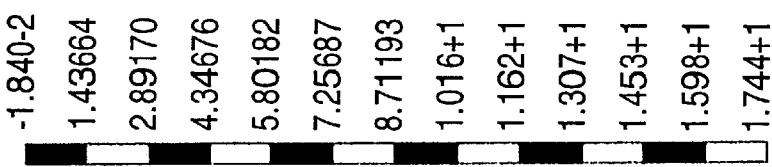
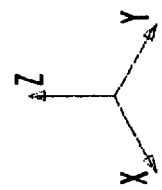

Fig. 171
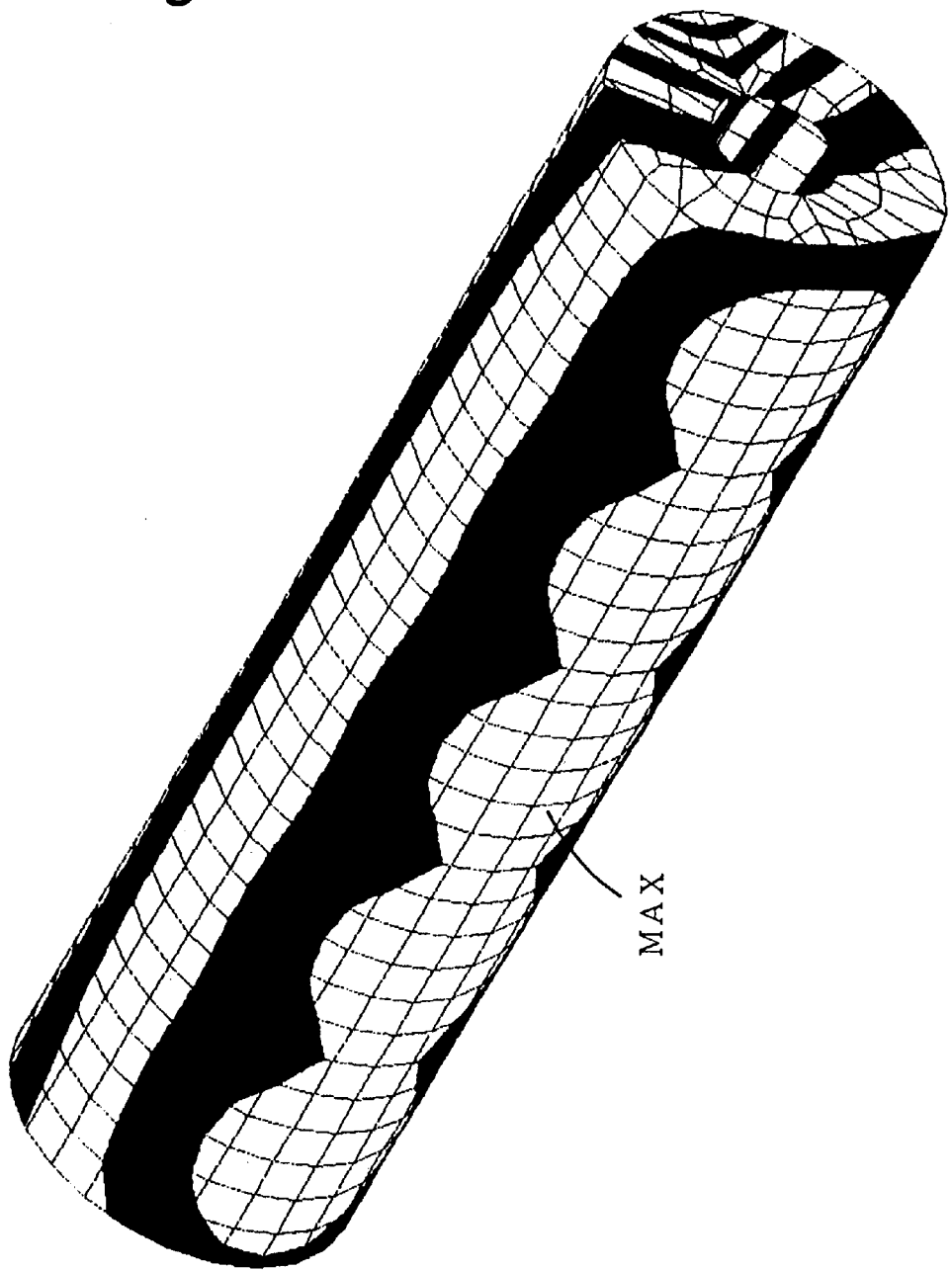
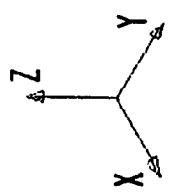

Fig. 173
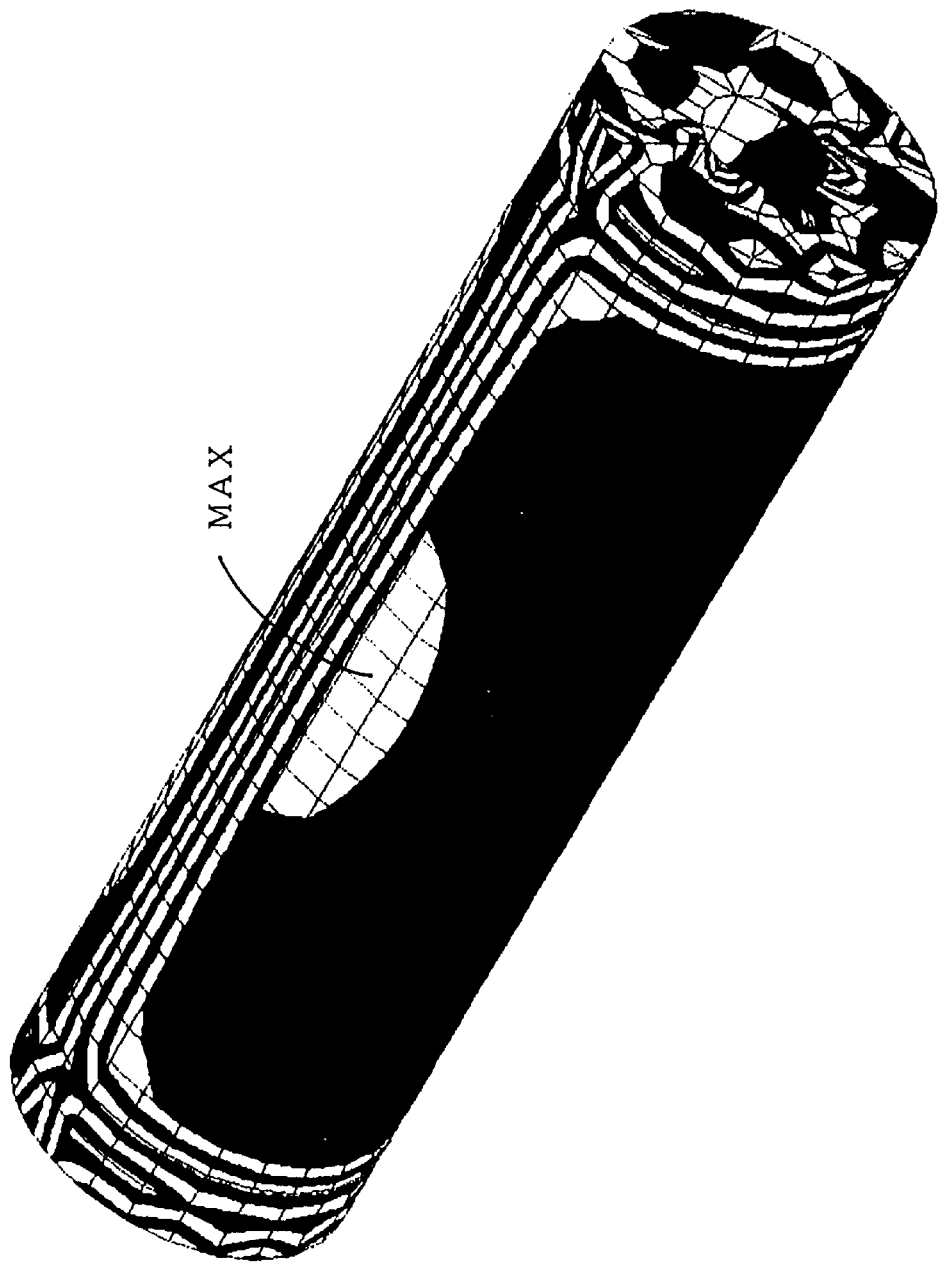
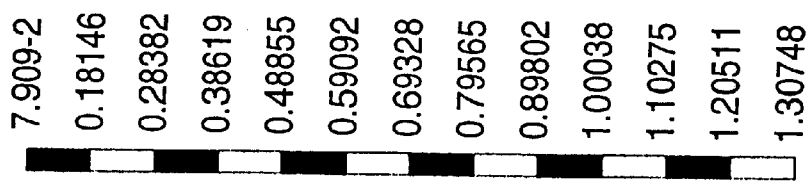 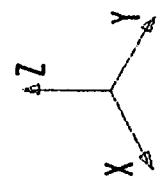

Fig. 174
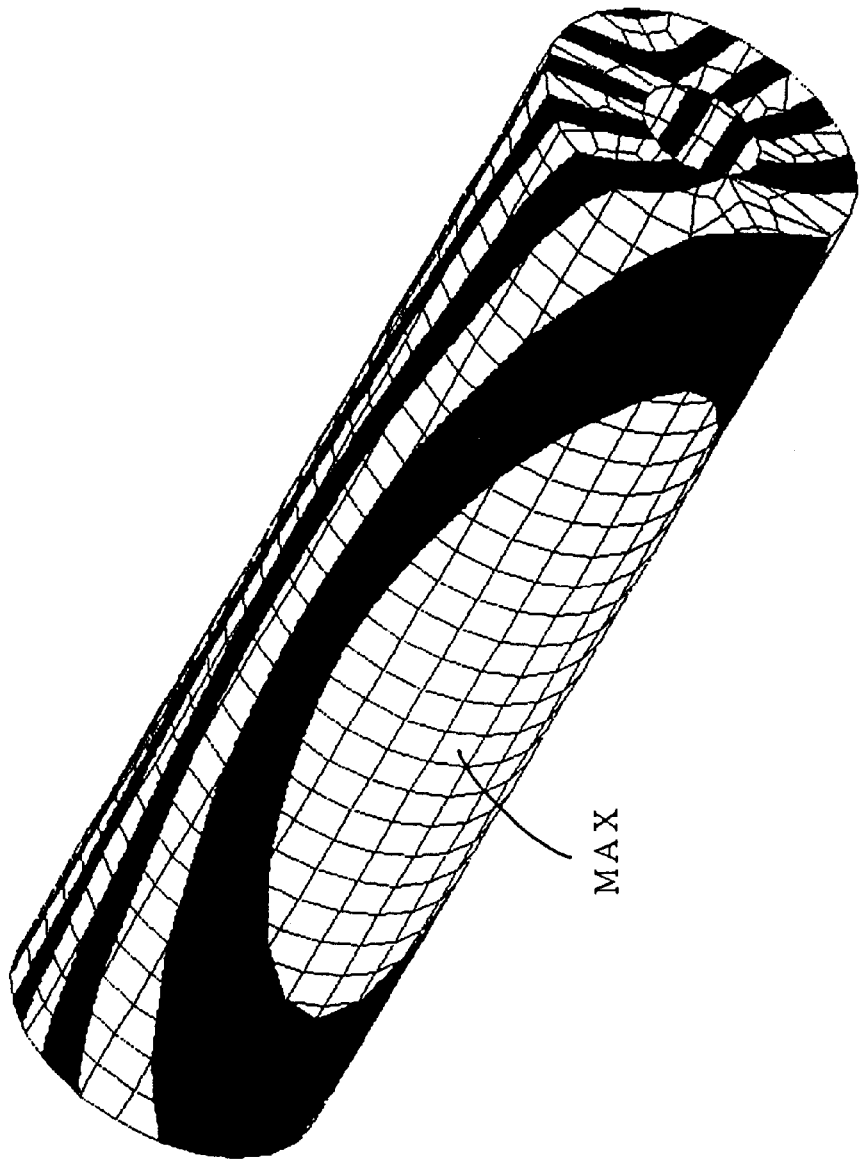
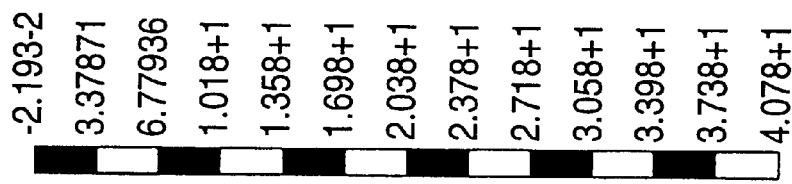 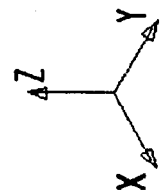

OPTIMIZATION OF OVERMOLDING METHOD FOR THREE-DIMENSIONAL HOLLOW MOLDED ARTICLE

BACKGROUND OF THE INVENTION AND RELATED ART

The present invention relates to a three-dimensional hollow molded article having a complicated form such as the form of a sphere, a box, a straight tube, a curved tube or a manifold, an over-molding method for producing the same by placing a core having a hollow portion inside a cavity of a mold and by injecting a molten resin into a space formed by the core and a cavity wall of the mold, and an optimizing method of an over-molding method for producing the above three-dimensional hollow molded article. More specifically, it relates to a three-dimensional hollow molded article which permits the prevention of deformation or breaking of a core caused by a pressure of a molten resin at the time of over-molding, an over-molding method for producing the three-dimensional hollow molded article, and an optimizing method of an over-molding method.

An over-molding method (also called "two-shells method" or "dual-molding method") is one method of producing a three-dimensional hollow molded article from a thermoplastic resin by an injection molding method. In the over-molding method, a core having a hollow portion is placed or set in a cavity of a mold, and a molten resin is injected into a space formed by the core and a cavity wall of the mold through a resin injection portion (resin gate portion) provided in the mold. In this manner, at least part of the outer surface of the core is covered with the resin to form a three-dimensional hollow molded article. A covering member formed of a resin covering at least part of the outer surface of the core is called a shell.

When the above over-molding method for a three-dimensional hollow molded article is used, there can be produced a three-dimensional hollow molded article having a complicated form and a hollow portion, which so far cannot be produced by a conventional injection molding method. Further, the over-molding method is advantageous in that the number of parts for an end product can be decreased by integrating other parts, that the inner surface of the hollow portion is flat and smooth, that the molded article has excellent dimensional accuracy and that the production facilities are inexpensive. The over-molding method is widely used as a molding method for producing three-dimensional hollow molded articles having complicated forms such as a sphere, a box, a straight tube, a curved tube or a manifold together with a hollow portion in the fields of automobile parts such as an air intake manifold and an air duct, tubings for liquid such as water and other various articles having a hollow portion.

The over-molding method is disclosed, for example, in JP-A-5-305679, JP-A-62-218117, JP-A-63-277851, JP-A-59-198116 and JP-A-3-239516.

In JP-A-5-305679, projections 4', 5', 14' and 15' are provided on the exterior of joining surfaces 4, 5 and 13. In JP-A-62-218117, thickened flanges 13 and 23 are provided near a joining surface of pre-molded articles 1 and 2. In JP-A-63-277851, projections 2a and 3a are provided in a joining portion of split articles 2 and 3. In other words, these publications disclose a core member formed of a resin in which the joining portion is increased in thickness or a core member having a thickness-increased portion which corresponds to the vicinity of an opening portion provided in a hollow portion of a core of a resin.

The biggest problem with the above over-molding method is that when a molten resin is injected into a space formed by a core and a cavity wall of a mold through a resin injection portion provided in the mold, the pressure caused by injecting the molten resin works on the core of resin to deform, break, damage or buckle the core (sometimes generically called "deforming" hereinafter), so that it is difficult to obtain the intended three-dimensional hollow molded article in some cases. That is, at the time of over-molding, the core is deformed in, or in the vicinity of, that portion of the core which faces or opposes the resin injection portion.

In a conventional over-molding method, the resin injection portion is formed of a one-point pin gate or a one-point direct gate. The term "pin gate" refers to an orifice provided in that portion of a mold through which a molten resin flows from a sprue portion into the cavity.

When a resin injection portion of the above one-point gate type is used, as schematically shown in FIG. 179A (cross section), a molten resin injected from the resin injection portion flows down a long distance in a space formed by a core and a cavity wall of a mold. In some cases where the resin injection portion is not provided in a proper position in the mold, the flow pattern of molten resin is non-uniform, so that a high injection pressure is required. However, when the injection pressure is increased in the over-molding, a high pressure derived from the flow of the molten resin is exerted on the core. The pressure on portions of the core depends upon the pressure distribution of the injected molten resin. When the resin injection portion is formed as a one-point gate type formed with one injection point as shown in FIG. 179A, the highest pressure works on that portion of the core which is near to the resin injection portion. As a result, the core placed in the cavity of the mold is deformed, so that no good three-dimensional hollow molded article is obtained. On the other hand, the deformation of the core caused by the pressure of the injected molten resin in the over-molding may be prevented by arranging the flow distance of the molten resin from the resin injection portion such that the distance is as small as possible, and by filling a molten resin uniformly in the space. In FIGS. 179A, 179B and 179C, numerals 60 and 62 indicate mold members, numerals 60A and 62A indicate cavity walls of the mold members 60 and 62 forming a cavity, numeral 63 indicates a main sprue portion, numeral 44 indicates a space, numeral 42 indicates a support rod, numeral 20 indicates a core, and numeral 21 indicates a hollow portion in the core 20. In FIG. 179A, the core has the form of a straight tube. FIG. 179B shows a schematic cross section taken along a line B—B in FIG. 179A, and FIG. 179C shows a schematic cross section taken along a line C—C in FIG. 179A.

None of the above five publications describe or suggest any deformation which occurs in or near that part of a core which faces or opposes the resin injection portion, nor do they describe or suggest any means to solve such deformation.

That is, in a conventional over-molding method, no core of a resin (or core member of a resin) has been designed or produced by taking into consideration structural strength or a distribution state of the pressure caused by the injected molten resin in the step of molding a resin on at least part of the outer surface of the core (sometimes to be referred to as "over-molding step" hereinafter). The (wall) thickness of that portion of a core which faces or opposes the resin injection portion is generally the same as that of other portions of the core. Further, no resin injection portion has been improved in view of the prevention of deformation of the core caused by the pressure of the injected molten resin. In the over-molding step, therefore, that portion of a core inserted and placed in the cavity of a mold, which faces or opposes the resin injection portion, is deformed by the pressure caused by injecting the molten resin, so that it is difficult to produce good molded articles.

Moreover, there is so far no means or method for quantitatively determining the occurrence of deformation of a core formed of a resin. In a conventional over-molding method, the form of a three-dimensional hollow molded article, the form of the core of a resin, the design of a mold typified by the position(s) and number of resin injection portion(s) and molding conditions (all of these will be sometimes generally referred to as "over-molding conditions" hereinafter) are determined depending upon the experiences and intuition of skilled workers. When the core of a resin is actually deformed, the over-molding conditions are optimized by trial and error. It therefore requires considerable amounts of time and labor and is largely ineffective to optimize the over-molding conditions.

For overcoming the deformation of a core of a resin, there is a method in which a non-compressed material is charged into the hollow portion of the core. The method of charging a non-compressed material (low-melting-point metal, sand, glass beads or water) into the hollow portion of a core has a problem in that the working efficiency and productivity are poor, so that the production cost of the three-dimensional hollow molded article increases.

OBJECT AND SUMMARY OF THE INVENTION

It is therefore a first object of the present invention to provide a three-dimensional hollow molded article which makes it possible to prevent the deformation of part of a core placed in a cavity of a mold caused by the pressure of an injected molten resin when the three-dimensional hollow molded article is produced by an over-molding method, and an over-molding method for producing the same.

Further, it is a second object of the present invention to provide an optimizing method of an over-molding method for producing a three-dimensional hollow molded article in which the deformation of a core formed of a resin can be exactly and accurately determined in advance and the form of the three-dimensional hollow molded article, the form of the core, the design of a mold and the molding conditions can be reliably optimized for a short period of time without skillfulness.

In the present specification, the term "deformation" of a core refers not only to mere deformation of a core but also to breaking, damage and buckling of the core. The term "cavity" refers to a space which is provided in a mold and defines the outer form (profile) of a three-dimensional hollow molded article. The term "space formed by a core and a cavity wall of a mold" refers to a space which is filled with a molten resin, and this space is also sometimes referred to as "resin flow layer".

For achieving the above first object of the present invention, the three-dimensional hollow molded article directed to the first aspect of the present invention comprises:

(A) a core formed of a resin and having a hollow portion, and (B) a covering member formed of a resin and covering at least part of an outer surface of the core, formed by injecting a molten resin into a space formed by the core placed in a cavity of a mold and a cavity wall of the mold through a resin injection portion provided in the mold, wherein that portion of the core which faces the resin injection portion is increased in thickness.

For achieving the above first object of the present invention, the over-molding method directed to the first aspect of the present invention is an over-molding method for producing a three-dimensional hollow molded article by the steps of placing a core formed of a resin and having a hollow portion in a cavity of a mold, then injecting a molten resin into a space formed by the core and a cavity wall of the mold through a resin injection portion provided in the mold and thereby covering at least part of an outer surface of the core with the resin. That portion of the core which faces the resin injection portion is increased in thickness.

In the three-dimensional hollow molded article or the over-molding method therefor, in the first aspect of the present invention, that portion of the core which is increased in thickness may have a thickness increment on an outer surface of the core or may have a thickness increment on an inner wall surface of the hollow portion.

The term "facing a resin injection portion" means "being on an axial line of the resin injection portion", or "being in the direction of injection of the molten resin". When that portion of a core which faces or opposes the resin injection portion has the form of a tube such as a cylinder or a polygon in cross section, the axial line of the resin injection portion may cross the axial line of the core at right angles or at an appropriate angle, or the axial line of the resin injection portion may pass near the axial line of the core. When that portion of a core which faces the resin injection portion has the form a body of revolution such as a sphere or an ellipsoid of revolution, the axial line of the resin injection portion may cross the center of the portion of the core, or may pass near the center of the portion of the core.

In the three-dimensional hollow molded article or the over-molding method therefor, directed to the first aspect of the present invention, preferably $1.1t_0 \leq t \leq 3t_0$, more preferably $1.1t_0 \leq t \leq 2.5t_0$, is satisfied in which t is a thickness of that thickness-increased portion of the core which faces the resin injection portion and $t_0$ is a thickness of another portion of the core. The "thickness" of a core or a core member to be described later refers to a thickness of a wall of the core or the core member. The "thickness" of a core or a core member is used in this sense hereinafter.

In the three-dimensional hollow molded article or the over-molding method directed to the first aspect of the present invention, it is preferred to define the size of an outer form (profile) of that portion of the core which faces the resin injection portion as follows. That is, when that portion of a core which faces the resin injection portion has the form of a cylinder (i.e., the form of a ring in cross section), the average radius of that portion of the core (the average of radius of the outer form and the radius of inner form) obtained by cutting that portion of the core in a plane perpendicular to the axial line of the cylinder, is $r_0$. When the outer form of the thickness-increased portion of a core is circular, the radius of the circle is r. When the outer form of the thickness-increased portion of a core is rectangular, the length of one side of the rectangle is 2r. In these cases, the size of the outer form preferably satisfies $(\pi/12)r_0 \leq r$. The upper limit of r is not specially limited, while it is preferably approximately $(\pi/3)r_0$. When that portion of a core which faces the resin injection portion has the cross-sectional form of a hollow polygon, it is sufficient that an average of an inscribed circle's radius of the polygon and a circumscribed circle's radius of the polygon should be an average radius $r_0$. This is also applicable to explanations of the definition of ro hereinafter.

When that portion of a core which faces the resin injection portion has the form of a cylinder (i.e., the form of the ring in cross section), that portion of the core which faces the resin injection portion may be thickness-increased by providing a continuous or discontinuous strip formed along the circumference of the core. In this case, the length L of the strip-like form along the circumference of the core is preferably at least $(\pi/12)r_0$. The upper limit of the length L of the strip-like form along the circumference of the core is not specially limited. For example, that portion of the core which faces the resin injection portion may be thickness-increased by forming a strip-like form along the entire circumference of that portion. The width W of the strip-like form (length of the strip-like form in the axial line direction of the core) is, for example, preferably at least $(\pi/12)r_0$.

In the three-dimensional hollow molded article or the over-molding method directed to the first aspect of the present invention, the thickness-increased portion of the core which faces the resin injection portion may have the form of a rib.

When a molten resin is injected into the space formed by the core and the cavity wall of the mold, the pressure caused by the injected molten resin is exerted on the core. Generally, the highest pressure is exerted on that portion of the core which faces or opposes the resin injection portion. Therefore, that portion of the core which faces the resin injection portion is liable to be deformed.

In the three-dimensional hollow molded article or the over-molding method directed to the first aspect of the present invention, that portion of the core which faces the resin injection portion can be imparted with high rigidity by thickness-increasing that portion of the core which faces the resin injection portion, including the formation of a rib. As a result, the deformation of that portion of the core which faces the resin injection portion caused by the pressure of the injected molten resin can be prevented at the time of over-molding.

For achieving the above first object of the present invention, the three-dimensional hollow molded article directed to a second aspect of the present invention comprises:

(A) a core formed of a resin and having a hollow portion, and (B) a covering member formed of a resin and covering at least part of an outer surface of the core, formed by injecting a molten resin into a space formed by the core placed in a cavity of a mold and a cavity wall of the mold through a resin injection portion provided in the mold. That portion of the molded article which faces the resin injection portion is formed of the covering member alone.

For achieving the above first object of the present invention, the over-molding method directed to the second aspect of the present invention is an over-molding method for producing a three-dimensional hollow molded article by the steps of placing a core formed of a resin and having a hollow portion in a cavity of a mold, then injecting a molten resin into a space formed by the core and a cavity wall of the mold through a resin injection portion provided in the mold and thereby covering at least part of an outer surface of the core with the resin. The core is placed in the cavity and the resin injection portion is provided in the mold, such that the core is not present in that region of the cavity which faces the resin injection portion.

In the over-molding method for producing a three-dimensional hollow molded article directed to the second aspect of the present invention, preferably at least two resin injection portions are provided. Preferably, further, a gate balance and a runner balance are well adjusted to uniformly fill a molten resin in the space formed by the core and the cavity wall of the mold.

In the three-dimensional hollow molded article or the over-molding method therefor directed to the second aspect of the present invention, the term "facing a resin injection portion" means "being on an axial line of the resin injection portion", or "being in the direction of the injection of the molten resin".

In the three-dimensional hollow molded article directed to the second aspect of the present invention, that portion of the mold article which faces the resin injection portion is formed of the covering member alone. Further, in the over-molding method for producing a three-dimensional hollow molded articled directed to the second aspect of the present invention, the core and the resin injection portion(s) are arranged such that the core is not present in that region of the cavity which faces the resin injection portion(s). As a result, at the time of over-molding, the pressure caused by the injected molten resin and exerted on the core placed in the cavity can be decreased, which effectively prevents the deformation of the core. When at least two resin injection portions are provided, the pressure caused by the injected molten resin and exerted on the core placed in the cavity at the time of over-molding can be further decreased.

For achieving the above first object of the present invention, the over-molding method directed to a third aspect of the present invention is an over-molding method for producing a three-dimensional hollow molded article having a core formed of a resin and having a hollow portion by the steps of fitting an opening portion of the core to a supporting member provided in a mold, then injecting a molten resin into a space formed by the core and a cavity wall of the mold through a resin injection portion provided in the mold and thereby covering at least part of an outer surface of the core with the resin. The supporting member is arranged within that portion of the hollow portion of the core which faces the resin injection portion.

In the over-molding method for producing a three-dimensional hollow molded article directed to the third aspect of the present invention, preferably at least two resin injection portion are provided. Preferably, further, the supporting member is engaged within that portion of the hollow portion of the core which faces the resin injection portion. The supporting member can be produced from a heat-resistant non-compressive material such as a metal or a plastic.

In the over-molding method directed to the third aspect of the present invention, that portion of the core which faces the resin injection portion may be increased in thickness. A thickness-increment may be provided to the outer surface of the core, while it may be provided on an inner surface of the core in some cases. Preferably, $1.1t_0 \leq t \leq 3t_0$, more preferably $1.1t_0 \leq t \leq 2.5t_0$, is satisfied, in which t is a thickness of that thickness-increased portion of the core which faces the resin injection portion and $t_0$ is a thickness of another portion of the core. That thickness-increased portion of the core which faces the resin injection portion may have an outer form of which the size is as explained concerning the three-dimensional hollow molded article or the over-molding method directed to the first aspect of the present invention. Otherwise, in the over-molding method directed to the third aspect of the present invention, that thickness-increased portion of the core which faces the resin injection portion may have the form of a rib.

The over-molding method directed to the second aspect of the present invention may not be employed due to some design of a three-dimensional hollow molded article. That is, the resin injection portion cannot be provided away from the core placed in the cavity of the mold. In this case, the over-molding method directed to the third aspect of the present invention can be employed. In the over-molding method for producing a three-dimensional hollow molded article directed to the third aspect off the present invention, the supporting member can effectively prevent the deformation of that portion of the core placed in the cavity which faces the resin injection portion, caused by the pressure of the injected molten resin at the time of over-molding. When at least two resin injection portions are provided, the pressure caused by the injected molten resin and exerted on the core placed in the cavity at the time of over-molding can be further decreased.

For achieving the above first object of the present invention, the over-molding method directed to a fourth aspect of the present invention is an over-molding method for producing a three-dimensional hollow molded article by the steps of placing a core formed of a resin and having a hollow portion in a cavity of a mold, then injecting a molten resin into a space formed by the core and a cavity wall of the mold through a resin injection portion provided in the mold and thereby covering at least part of an outer surface of the core with the resin. The resin injection portion comprises film gate having an opening portion whose axial line in the direction of width of the opening portion is nearly in parallel with an axial line of the core.

That the axial line of the opening portion of the film gate in its width direction is nearly in parallel with the axial line of the core means the following. When that portion of the core which faces the opening portion of the film gate has the form of a tube such as a cylinder or a polygon in cross section, the axial line of that portion of the core and the axial line of the opening portion of the film gate in its width direction are nearly in parallel with each other. When that portion of the core which faces the opening portion of the film gate has the form of a body of revolution such as a sphere or an ellipsoid of revolution, the center of that portion of the core is positioned in, or in the vicinity of, a plane including the axial line of the opening portion of the film gate in its width direction.

The over-molding method for producing a three-dimensional hollow molded article, directed to the fourth aspect of the present invention, will be explained with reference to FIGS. 15 to 19, while the above over-molding method shall not be limited thereto. A core 20 having a hollow portion 21 has the form of a straight tube, while the core shall not be limited thereto in form and structure.

In the over-molding method for producing a three-dimensional hollow molded article directed to the fourth aspect of the present invention, as shown in FIG. 15A, a core 20 formed of a resin and having a hollow portion 21 is placed in a cavity of a mold formed of mold members 60 and 62. Then, a molten resin is injected into a space 44 formed by the core 20 and the cavity walls 60A and 62A of the mold members 60 and 62 through a resin injection portion provided in the mold, whereby at least part of the outer surface of the core 20 is covered with the resin. The characteristic feature of the over-molding method directed to the fourth aspect of the present invention is that the resin injection portion comprises a film gate 70 (sometimes called "flush gate") and that the axial line of an opening portion 71 of the film gate 70 in the width direction of the opening portion 71 is nearly in parallel with the axial line $L_{ax}$ of the core 20. The term "being nearly in parallel with the axial line $L_{ax}$ of the core" means that the above axial line of the opening portion 71 is not necessarily required to be precisely in parallel with the axial line $L_{ax}$ of the core. This term will be used in this sense hereinafter. In FIG. 15A, numeral 63 indicates a main sprue portion, numeral 42 indicates a supporting member (a support rod), and numeral 72 indicates a guide sprue portion. FIG. 15B shows a schematic cross section taken along a line B—B in FIG. 15A, and FIG. 15C shows a schematic cross section taken alone a line C—C in FIG. 15A. FIG. 16A shows a schematic perspective view (viewed obliquely from a side) of a molten resin 46 flowing through the main sprue portion 63, the guide sprue portion 72 and the film gate 70 and along the outer surface of the core 20. FIG. 16B shows a schematic perspective view (viewed obliquely from a side) of the film gate 70, the guide sprue portion 72 and the main sprue portion 63. FIG. 15A corresponds to a schematic cross-sectional view obtained by cutting the structure shown in FIG. 16A with a plane including the film gate 70 and the axial line $L_{ax}$ of the core.

As shown in FIGS. 15C and 16B, the thickness of the opening portion 71 of the film gate 70 along the circumferential direction of the core 20, i.e., the length of the opening portion 71 of the film gate 70 at right angles with the width direction ($W_{FG}$) of the opening portion 71, will be referred to as "thickness ($H_{FG}$) of the opening portion of the film gate" hereinafter. The length of the film gate 70 in the direction at right angles with the width direction and the thickness direction of the opening portion 71 of the film gate 70 will be referred to as "film gate length ($L_{FG}$)" hereinafter. That is, the film gate length ($L_{FG}$) is a length of the film gate 70 from the opening portion 71 to the guide sprue portion 72. The circumferential direction of the core 20 refers to a direction of a locus of a point away from the axial line of the core when the point is revolved about the axial line $L_{ax}$ of the core 20 as a center.

In the over-molding method directed to the fourth aspect of the present invention, the thickness ($H_{FG}$) of the opening portion 71 of the film gate 70 is preferably changed along the axial line $L_{ax}$ of the core as shown in a cross section of the mold members 60 and 62 in FIGS. 17A and 17B. The film gate 70 shown in FIGS. 15 and 16 has the form of the opening portion shown in FIG. 17A. A film gate 70 shown in FIGS. 26A and 26B to be described later has a form of an opening portion shown in FIG. 17B.

The width ($W_{FG}$) of the opening portion 71 of the film gate 70 may be nearly the same as the length ($L_c$) of the core 20 along the axial direction $L_{ax}$ of the core (to be simply referred to as "length ($L_c$) of the core" hereinafter) (see FIG. 15A). The above "nearly the same" means the width ($W_{FG}$) of the opening portion 71 is not required to be precisely the same as the length ($L_c$) of the core. In this case, preferably, for adjusting the pressure caused on the core by the injected molten resin to be uniform, the film gate is arranged such that the flow of the molten resin to flow in the film gate 70 and to be injected through the opening portion 71 is directed perpendicularly to the axial line $L_{ax}$ of the core 20. When the width ($W_{FG}$) of the opening portion 71 of the film gate 70 is 100 mm or more, the film gate length ($L_{FG}$) is preferably at least 5 mm, preferably 10 mm, for forming a uniform flow of the injected molten resin.

Otherwise, as shown in a cross section in FIG. 18A, the width ($W_{FG}$) of the opening portion 71 of the film gate 70 may be smaller than the length $L_c$ of the core 20 and a plurality of opening portions 71 may be provided. The opening portions 71 communicate with the guide sprue portion 72. FIG. 18B shows a cross section taken along a line B—B in FIG. 18A. FIG. 18C shows a cross section taken along a line C—C in FIG. 18A. FIG. 19 is a schematic perspective view (viewed obliquely from above) of the molten resin 46 flowing through the main sprue portion 63, the guide sprue 72 and the film gate 70 and along on the outer surface of the core 20. FIG. 18A corresponds to a schematic cross section obtained by cutting the structure shown in FIG. 19 with a plane including the film gate 70 and the axial line $L_{ax}$ of the core. In this case, preferably, the flow of the molten resin to flow in the film gate 70 and to be injected through the opening portions 71 is directed perpendicularly to the axial line $L_{ax}$ of the core 20 as well. The width ($W_{FG}$) of each of the opening portions 71 of the film gates greatly differs depending upon the length $L_c$ and form of the core 20. When the cross section of the core 20 obtained by cutting the core 20 with a plane perpendicular to the axial line $L_{ax}$ of the core 20 has a ring form and when the radius of an inner circle of the ring is $r_c$ (to be also referred to as "inner radius $r_c$ of the hollow portion" hereinafter), $\pi r_c/L_c < W_{FG} < L_c$ is preferably satisfied, and $(L_c - 2r_c) < W_{FG} < L_c$ is more preferably satisfied. When the cross section of the core 20 has the form of a hollow polygon, the radius of an inscribed circle of the hollow polygon can be taken as $r_c$.

For achieving the above first object of the present invention, the over-molding method directed to a fifth aspect of the present invention is an over-molding method for producing a three-dimensional hollow molded article by the steps of placing a core formed of a resin and having a hollow portion in a cavity of a mold, then injecting a molten resin into a space formed by the core and a cavity wall of the mold through a resin injection portion provided in the mold and thereby covering at least part of an outer surface of the core with the resin. The resin injection portion comprises a multi-point pin gate or a multi-point side gate, and the openings of the multi-point pin gate or multi-point side gate are arranged nearly in parallel with an axial line of the core.

That the openings of the multi-point pin gate or multi-point side gate are arranged nearly in parallel with the axial line of the core means the following. When that portion of the core which faces the openings of the multi-point pin gate or multi-point side gate has the form of a tube such as a cylinder or a polygon in cross section, the axial lines of the openings of the multi-point pin gate or multi-point side gate intersect, or pass the vicinity of, the axial line of that portion of the core. When that portion of the core which faces the openings of the multi-point pin gate or multi-point side gate has the form of a body of revolution such as a sphere or an ellipsoid of revolution, the axial lines of the openings of the multi-point pin gate or multi-point side gate pass the center, or the vicinity of the center, of that portion of the core.

The over-molding method for producing a three-dimensional hollow molded article, directed to the fifth aspect of the present invention, will be explained further in detail with reference to FIGS. 20A, 20B and 21, while the over-molding method directed to the fifth aspect of the present invention shall not be limited thereto. A core 20 having a hollow portion 21 has the form of a straight tube, while the form and structure of the core 20 shall not be limited thereto.

In the over-molding directed to the fifth aspect of the present invention, as shown in FIG. 20A, a core 20 formed of a resin and having a hollow portion 21 is placed in a cavity of mold members 61 and 62. Then, a molten resin is injected into a space 44 formed by the core 20 and cavity walls 61A and 62A of the mold members 61 and 62 through a resin injection portion, whereby at least part of the outer surface of the core 20 is covered with the resin. The characteristic feature of the over-molding method directed to the fifth aspect of the present invention is that the resin injection portion comprises a multi-point pin gate 80 or multi-point side gate, and the openings 81 of the multi-point pin gate 80 or multi-point side gate are arranged nearly in parallel with the axial line $L_{ax}$ of the core 20. In these Figures, numeral 60 indicates a mold member, numeral 63 indicates a main sprue portion, and numeral 82 indicates a guide sprue portion. FIG. 20B shows a schematic cross section taken along a line B—B in FIG. 20A. FIG. 20C shows a schematic cross section taken along a line C—C in FIG. 20A. Further, FIG. 21 shows a schematic perspective view (viewed obliquely from a side) of a molten resin 46 flowing through the main sprue portion 63, the guide sprue portion 82 and a multi-point pin gate 80 and along the outer surface of the core 20. FIG. 20A corresponds to a schematic cross-section obtained by cutting the structure shown in FIG. 21 with a plane including the multi-point pin gate 80 and the axial line $L_{ax}$ of the core.

The number (N) of openings of the multi-point pin gate or multi-point side gate differs depending upon the form and size of the core 20. When the length of the core is $L_c$ and the inner radius of the hollow portion is $r_c$, preferably, $N > (L_c / \pi r_c)$ is satisfied.

In the over-molding method directed to the fifth aspect of the present invention, the openings of the multi-point pin gate or multi-point side gate may have different diameters.

In the over-molding method directed to the fourth or fifth aspect of the present invention, a plurality of the resin injection portions may be provided symmetrically with regard to the axial line $L_{ax}$ of the core 20. Although differing depending upon the form and size of the core 20, at least two resin injection portions are preferably provided symmetrically with regard to the axial line $L_{ax}$ of the core 20 when the ratio $t_c/r_c$ of the thickness (wall thickness) $t_c$ of the core 20 to the inner radius $r_c$ of the hollow portion is ¼ or less.

The cross section of the mold, etc., shown in FIG. 22A is concerned with the over-molding method directed to the fourth aspect of the present invention. FIG. 22B shows a schematic perspective view (viewed obliquely from a side) of a molten resin 46 flowing through the main sprue portion 63, runner portions 64A and 64B, the guide sprue portion 72 and a film gate 70A and along the outer surface of the core 20. FIG. 22A shows a schematic cross-sectional view (mainly the mold member 60 side) obtained by cutting the structure shown in FIG. 22B with a plane including the film gates 70A and 70B and the axial line $L_{ax}$ of the core. FIG. 23A shows a cross section taken along a line A—A in FIG. 22A. FIG. 23B shows a cross section taken along a line B—B in FIG. 22A. Numeral 61 indicates a slidable mold member, and numeral 61A indicates a cavity wall of the slidable mold member 61. For taking a three-dimensional hollow molded article out of the mold in FIGS. 23A or 23B, the mold member 62 is moved downward, the mold member 60 is moved upward, and the slidable mold member 61 is moved perpendicularly to the sheet surface of FIGS. 23A and 23B.

The schematic cross section of a mold, etc., shown in FIG. 24A is concerned with the over-molding method directed to the fifth aspect of the present invention. In FIGS. 24A, 24B and 25, numerals 90A and 90B indicate multi-point side gates, and numerals 91A and 91B indicate openings of the multi-point side gates. FIG. 24B shows a schematic perspective view (viewed obliquely from a side) of a molten resin flowing through a main sprue portion 63, runner portions 64A and 64B, a guide sprue portion 82A and the multi-point side gate (positioned behind the guide sprue portion 82A and not seen) and along the outer surface of the core 20. FIG. 24A shows a schematic cross section (mainly the mold member 60 side) obtained by cutting the structure shown in FIG. 24B with a plane including the multi-point side gates 90A and 90B and the axial line $L_{ax}$ of the core. FIG. 25A shows a schematic cross section taken along a line A—A in FIG. 24A, and FIG. 25B shows a schematic cross section taken along a line B—B in FIG. 24A. In FIGS. 22 to 25, pairs of elements such as resin injection portions are indicated by numerals to which "A" and "B" are added. The runner portions 64A and 64B are connected to each other in their central portion. Further, when it is necessary to decrease the pressure caused by the injected molten resin in the space 44 formed by the core 20 and the cavity walls 60A and 62A, preferably, four resin injection portions can be provided symmetrically with regard to the axial line $L_{ax}$ of the core 20.

The resin injection portions (70, 80 and 90) may be connected to a branched subsprue portion 65 through the guide sprue portions 72 and 82 (see FIGS. 26 to 30). The branched subsprue portion 65 communicates with a main sprue portion 63. As a result, the pressure caused by the injected molten resin can be further decreased, and the molten resin can be further uniformly filled in the space 44 formed by the core 20 and the cavity walls 60A and 62A. The schematic cross section of a mold, etc., shown in FIG. 26A is concerned with the over-molding method directed to the fourth aspect of the present invention. FIG. 26B shows a schematic perspective view (viewed obliquely from above) of a molten resin 46 flowing through the main sprue portion 63, the branched subsprue portion 65, the guide sprue portion 72 and the film gate 70 and along the outer surface of the core 20. FIG. 27A shows a schematic cross section take along a line A—A in FIG. 26A, and FIG. 27B shows a schematic cross section taken along a line B—B in FIG. 26A. FIG. 26A corresponds to a schematic cross-sectional view obtained by cutting the structure shown in FIG. 26B with a plane including the film gate 70 and the axial line $L_{ax}$ of the core. The schematic cross section shown in FIG. 29A is concerned with the over-molding method directed to the fifth aspect of the present invention. FIG. 29B shows a schematic perspective view (viewed obliquely from a side) of a molten resin 46 flowing through a main sprue portion 63, a branched sprue portion 65, a guide sprue portion 82 and a multi-point pin gate 80 and along the outer surface of the core 20. FIG. 30A shows a schematic cross section taken along a line A—A in FIG. 29A, and FIG. 30B shows a schematic cross section taken along a line B—B in FIG. 29A. FIG. 29A corresponds to a schematic cross section obtained by cutting the structure shown in FIG. 29B with a plane including the multi-point pin gate 80 and the axial line $L_{ax}$ of the core.

In the over-molding method directed to the fourth or fifth aspect the present invention, as shown in FIGS. 31, 32 and 33, a resin flow channel 66 communicating with resin injection portions (70, 80 and 90) may be provided on the cavity walls 60A and 62A, and in this case, the resin flow channel 66 is first filled with a molten resin injected from the resin injection portions (70, 80 and 90) and then the space 44 formed by the core 20 and the cavity walls 60A and 62A is filled with the molten resin. In these Figures, the resin flow channel 66 in the form of a ring is provided along a circumferential direction of the core 20, while the direction of the resin flow channel 66 shall not be so limited, and the resin flow channel 66 may be provided in any direction. For example, when the core has the form of a sphere, the resin flow channel may be provided in that portion of the cavity wall where a plane passing the center of the sphere and the cavity wall of the mold cross each other or where a plane in parallel with the plane passing the center of the sphere and the cavity wall cross each other. Generally, the filling of space 44 with the molten resin injected from the resin injection portions (70, 80 and 90) starts before the resin flow channel 66 is completely filled with the molten resin. Schematic cross-sectional views shown in FIGS. 31A, 31B, 31C and 32 are concerned with the over-molding method directed to the fourth aspect of the present invention. FIG. 31B shows a schematic cross-sectional view taken along a line B—B in FIG. 31A, FIG. 31C shows a schematic cross-sectional view taken along a line C—C in FIG. 31A, and FIG. 32 shows a schematic cross-sectional view taken along a line A—A in FIG. 31A. FIG. 31A corresponds to a schematic cross-sectional view obtained by cutting a mold, etc., with a plane including a film gate 70 and the axial line $L_{ax}$ of the core. FIG. 33 is concerned with the over-molding method directed to the fifth aspect of the present invention, and it shows a schematic perspective view of a molten resin 46 flowing through a main sprue portion 63, a guide sprue portion 82, a multi-point pin gate 80, a resin flow channel 66 and along the outer surface of the core 20.

Further, as shown in the perspective view in FIG. 34, a resin flow channel 67 which communicates with resin injection portions (70, 80 and 90) and is nearly in parallel with axial line $L_{ax}$ of the core 20 may be provided on a cavity wall of a mold, and in this case, the resin flow channel 67 is first filled with a molten resin injected from the resin injection portions (70, 80 and 90) and then a space 44 formed by the core 20 and the cavity walls 60A and 62A is filled with the molten resin. Generally, the filling of the space 44 with the molten resin injected from the resin injection portions (70, 80 and 90) starts before the resin flow channel 67 is completely filled with the molten resin. FIG. 34 shows a schematic perspective view of a molten resin 46 flowing through a main sprue portion 63, a guide sprue portion 82, a multi-point pin gate 80 and the resin flow channels 66 and 67 and along the outer surface of the core 20. In FIG. 34, the resin flow channel 67 communicates with the resin flow channel 66 having the form of rings, while the resin flow channel 67 may be communicated with the resin injection portion. Naturally, the resin flow channel 67 provided on the cavity wall nearly in parallel with the axial line $L_{ax}$ of the core 20 may be applied to the over-molding method directed to the fourth aspect of the present invention. Moreover, the resin flow channel 66 and/or the resin flow channel 67 may be applied to the method directed to each of the first to third aspects of the present invention.

It greatly depends upon the form and size of the core whether or not the resin flow channels are provided. For example, when the ratio of $t_c/r_c$ is ¼ or less and when the length $L_c$ of the core exceeds 200 mm, it is desirable to provide the resin flow channel 66 and/or the resin flow channel 67.

In over-molding, the component of the molten resin in the flow direction can be divided into component in the axial direction of the core and component in the circumferential direction of the core. Generally, the flow distance of the molten resin in the axial direction of the core is greatly larger than that of the molten resin in the circumferential direction of the core. When the inner radius $r_c$ of the hollow portion is small, therefore, a very high pressure caused by the flow of the molten resin in the axial direction of the core is exerted on the core. Further, when the circumferential length of the core is relatively greater than the core length, it is required to consider a pressure caused by the flow of the molten resin in the circumferential direction of the core in addition to the pressure caused by the flow of the molten resin in the axial direction of the core. In particular, the deformation of the core greatly depends upon a non-uniformity (difference) between the pressures caused on the core in its circumferential direction. It is therefore more important to consider the pressure caused by the flow of the molten resin in the circumferential direction of the core.

In the over-molding method directed to the fourth aspect of the present invention, the resin injection portion comprises a film gate, and the axial line of the opening portion of the film gate in its width direction is nearly in parallel with the axial line of the core. In the over-molding method directed to the fifth aspect of the present invention, the resin injection portion comprises a multi-point pin gate or multi-point side gate, and the openings of the multi-point pin gate or multi-point side gate are arranged nearly in parallel with the axial line of the core. By constituting the resin injection portion as described above, the flow distance of the molten resin in the space formed by the core and the cavity wall can be decreased, and the molten resin can be uniformly filled in the space. As a result, the pressure caused on the core by the flow of the molten resin in the axial direction of the core can be decreased, and the deformation of the core can be effectively prevented.

The opening portions of the film gate are varied in thickness along the axial line of the core, or the openings of the multi-point pin gate or multi-point side gate are varied in diameter, whereby the molten resin can be more uniformly filled in the space formed by the core and the cavity wall when injected. As a result, the exertion of a high pressure on the core by the injected molten resin can be prevented, and the deformation of the core can be effectively prevented.

Further, the flow distance of the molten resin in the circumferential direction of the core can be decreased by providing a plurality of the resin injection portions symmetrically with regard to the axial line of the core, so that the pressure caused by the injected molten resin can be decreased. As a result, the pressure caused on the core by the flow of the molten resin can be further decreased, and the deformation of the core can be further effectively prevented.

When the resin flow channel is provided on the cavity wall, for example, the pressure caused on the core by the flow of the molten resin in the circumferential direction of the core can be adjusted to a uniform one, so that the deformation of the core can be further effectively prevented. That is, the flow direction of the injected molten resin can be changed from the circumferential direction of the core to the axial direction of the core by providing the resin flow channel to the cavity wall, for example, along the circumferential direction of the core. As a result, the pressure difference in the circumferential direction of the core can be overcome, so that the deformation of the core can be remarkably effectively prevented. The flow direction of the molten resin can be changed from the direction in parallel with the axial direction of the core to the circumferential direction of the core by providing the resin flow channel on the cavity wall, for example, along the direction nearly in parallel with the axial line of the core. As a result, the pressure difference in the axial direction of the core can be overcome, so that the deformation of the core can be remarkably effectively prevented.

In the over-molding method directed to each of the first to fifth aspects of the present invention, the mold can be constituted of a movable mold member and a fixed mold member, and the movable mold member can be moved a predetermined distance in the mold closing direction after or while a molten resin is injected into a space formed by a core and the cavity wall through resin injection portion(s) provided in the mold.

For achieving the above second object of the present invention, provided is an optimizing method, directed to a first aspect of the present invention, of an over-molding method for producing a three-dimensional hollow molded article by the steps of placing a core formed of a resin and having a hollow portion in a cavity of a mold, then injecting a molten resin into a space formed by the core and a cavity wall of the mold through a resin injection portion provided in the mold and thereby covering at least part of the outer surface of the core with the resin. The optimizing method of the over-molding method comprises the steps of:

(a) calculating a temperature distribution and a pressure distribution of the molten resin in the step of injecting the molten resin into the space, by numerical analysis, (b) calculating a displacement distribution and/or a stress distribution of the core, caused by a pressure applied to the core by a flow of the molten resin in the step of injecting the molten resin into the space, by numerical analysis, on the basis of the calculated temperature distribution and the calculated pressure distribution, and (c) optimizing a form of the three-dimensional hollow molded article, a form of the core, the mold or molding conditions on the basis of the calculated displacement distribution and/or the calculated stress distribution, so as to minimize the deformation of the core.

The optimizing method of an over-molding method directed to the first aspect of the present invention may include the following embodiments.

(1) A first embodiment has the thickness (wall thickness) of that portion of the core which faces the resin injection portion optimized so as to minimize the deformation of the core.

(2) A second embodiment has the thickness of the resin covering the outer surface of the core optimized so as to minimize the deformation of the core.

(3) A third embodiment has the core provided with a rib, and the form and position of the rib are optimized so as to minimize the deformation of the core.

(4) A fourth embodiment has, so as to minimize the deformation of the core, the form of the three-dimensional hollow molded article, and the form of the core or the mold are optimized such that the core is absent in that region of the cavity which faces the resin injection portion.

(5) A fifth embodiment has at least two resin injection portions provided in the mold, and the positions of the resin injection portions are optimized so as to minimize the deformation of the core.

(6) A sixth embodiment has the resin injection portion comprising a film gate having an opening portion whose axial line in the direction of width of the opening portion is nearly in parallel with an axial line of the core, and the width, the thickness and the length of the film gate are optimized so as to minimize the deformation of the core.

(7) A seventh embodiment has the resin injection portion comprising a multi-point pin gate or a multi-point side gate. The openings of the multi-point pin gate or multi-point side gate are arranged nearly in parallel with an axial line of the core, and the positions of the openings and the diameters of the openings are optimized so as to minimize the deformation of the core.

(8) An eighth embodiment has a resin flow channel provided on the cavity wall of the mold, and the form and the position of the resin flow channel are optimized so as to minimize the deformation of the core.

For achieving the above second object of the present invention, there is provided an optimizing method, directed to a second aspect of the present invention, of an over-molding method for producing a three-dimensional hollow molded article by the steps of:

(A) an injection step of placing a core formed of a resin and having a hollow portion in a cavity of a mold formed of a fixed mold member and a movable mold member and provided with a resin injection portion, then injecting a predetermined amount of a molten resin into a space formed by the core and a cavity wall of the mold, and (B) a compression step of moving the movable mold member a predetermined amount of distance in a mold-closing direction after the resin is injected, and thereby covering at least part of the outer surface of the core with the resin.

The above optimizing method of an over-molding method comprises the steps of:

(a) calculating a temperature distribution and a pressure distribution of the molten resin in the injection step by numerical analysis, (b) calculating a temperature distribution and a pressure distribution of the molten resin in the compression step by numerical analysis on the basis of the calculated temperature distribution and the calculated pressure distribution in step (a), (c) calculating a displacement distribution and/or a stress distribution of the core, caused by a pressure applied to the core by flow of the molten resin in the compression step by numerical analysis, on the basis of the calculated temperature distribution and the calculated pressure distribution in step (b), and (d) optimizing a form of the three-dimensional hollow molded article, a form of the core, the mold or molding conditions on the basis of the calculated displacement distribution and/or the calculated stress distribution of the core so as to minimize the deformation of the core.

In the optimizing method of an over-molding method directed to the second aspect of the present invention, there are some cases where the compression step may be initiated immediately before the injection step is completed.

The optimizing method of an over-molding method directed to the second aspect of the present invention may include the following embodiments.

(1) A first embodiment has the thickness (wall thickness) of the core optimized so as to minimize the deformation of the core.

(2) A second embodiment has the thickness (wall thickness) of the resin covering the outer surface of the core optimized so as to minimize the deformation of the core.

(3) A third embodiment has the core provided with a rib, and the form and position of the rib are optimized so as to minimize the deformation of the core.

(4) A fourth embodiment has, so as to minimize the deformation of the core, the form of the three-dimensional hollow molded article, and the form of the core or the mold are optimized such that the core is absent in that region of the cavity which faces the resin injection portion.

(5) A fifth embodiment has at least two resin injection portions provided in the mold. The positions of the resin injection portions are optimized so as to minimize the deformation of the core.

(6) A sixth embodiment has the resin injection portion comprising a film gate having an opening portion whose axial line in the direction of the width of the opening portion is nearly in parallel with an axial line of the core. The width, the thickness and the length of the film gate are optimized so as to minimize the deformation of the core.

(7) A seventh embodiment has the resin injection portion comprising a multi-point pin gate or a multi-point side gate. The openings of the multi-point pin gate or multi-point side gate are arranged nearly in parallel with an axial line of the core, and the positions of the openings and the diameters of the openings are optimized so as to minimize the deformation of the core.

(8) An eighth embodiment has a resin flow channel provided on the cavity wall of the mold. The form and the position of the resin flow channel are optimized so as to minimize the deformation of the core.

In the optimizing method of an over-molding method directed to the first or second aspect of the present invention, on the basis of the calculated temperature distribution and the pressure distribution obtained by the numerical analysis in the injection step (according to the first aspect) or the compression step (according to the first aspect), the displacement distribution and/or the stress distribution of the core in the injection step or the compression step are/is calculated by the numerical analysis. As a result, the displacement distribution and/or the stress distribution of the core in the injection step or the compression step can be accurately estimated, so that various over-molding conditions can be determined reliably for a short period of time without requiring skill. Therefore, the production of a three-dimensional hollow molded article by an over-molding method, which is so far difficult to practically use due to great difficulties in grasping and estimating the deformation of a core, can be easily accomplished.

The resin material for forming the core (sometimes referred to as "first resin material" hereinafter) can be properly selected as required depending upon required chemical resistance, heat resistance, impact resistance and transparency and the like. Examples of the first resin material include nylon 6, nylon 66, polycarbonate, polyacetal, modified polyphenylene ether and polybutylene terephthalate. The first resin material may contain additives such as a dye and a pigment and a filler or a reinforcement. Examples of the filler or the reinforcement include silica, diatomaceous earth, alumina, titanium oxide, magnesium oxide, powdered pumice, pumice balloon, aluminum hydroxide, magnesium hydroxide, basic magnesium carbonate, dolomite, calcium sulfate, potassium titanate, barium sulfate, calcium sulfite, talc, clay, mica, glass fiber, carbon fiber, glass flakes, glass beads, calcium silicate, montmorillonite, bentonite, aluminum powder, molybdenum sulfide, boron fibers, silicon carbide fiber, polyester fiber and polyamide fiber.

The resin material for the for the resin covering at least part surface of the core (sometimes "second resin material" hereinafter) selected from resin materials having point than the first resin material. The second resin material can be properly selected from various resin materials as required depending upon the first resin material. The second resin material and the first resin material may be of the same kinds or may be of different kinds. When the second resin material and the first resin material are of different kinds, it is necessary to consider compatibility and fusibility of these two resin materials. For example, when nylon 6 is used as a first resin material, nylon 66, nylon 46 or a polyamide obtained by the polycondensation of m-xylylenediamade and adipic acid can be used as a second resin material. When nylon 66 is used as a first resin material, nylon 46 can be used as a second resin material. Further, when polybutylene terephthalate is used as a first resin material, polyethylene terephthalate can be used as a second resin material. Further, like the first resin material, the second material may contain additives such as a dye and a pigment and a filler or a reinforcement.

In the optimizing method of an over-molding method, directed to the first or second aspect of the present invention, when the numerical analysis is carried out using the above resin, it is required to input values of physical properties of the resin necessary for the numerical analysis. The values of the physical properties of the resin for calculating the temperature distribution and the pressure distribution of a molten resin include thermal conductivity, specific heat, density, melt viscosity and PVT state amount (pressure-volume-temperature). The values of the physical properties of the resin for calculating the displacement distribution and/or the stress distribution of the core include elastic modules and Poisson's ratio. The numerical analysis can be accurately carried out by considering temperature dependency and anisotropy with regard to these values of physical properties.

The three-dimensional hollow molded article of the present invention has a complicated form, for example, of a sphere, a box, a straight tube, a curved tube or a branched tube, and has a hollow portion. Specific examples of the three-dimensional hollow molded article of the present invention include various boxes, various containers, parts in the field of automobiles such as an intake manifold which works as a flow path for feeding a mixed gas into an engine of an automobile or the like and an air duct, tubing for liquids such as water, and parts for feeding or discharging sheets used in a copying machine in the field of office automation equipment and machines.

The core of a resin may be produced by any known method, while an injection molding method, an extrusion molding method, a blow molding method and a compression molding method are preferred. The core may be produced not only as a one-piece article but also as one obtained by bonding two or more pre-shaped or pre-molded core members. In the latter case, the core members may be bonded by any one of a method in which the core members are bonded with an adhesive, a method in which the core members are fused by hot plate fusing, vibration fusing or ultrasonic fusing, a method in which the core members are provided with a snap fit on their outer surfaces, a method in which the core members are bonded to each other with a connecting member, and a method in which melt-spun fibers are externally wound around the core members.

BRIEF DESCRIPTION OF THE DRAWINGS

The present invention will be explained in detail with reference to drawings hereinafter.

FIG. 13 is a schematic perspective view of a three-dimensional hollow molded article, showing resin injection portions in the over-molding directed to the third aspect of the present invention.

in FIG. 26A.

FIG. 43 schematically shows a melt front history under conditions where a one-point gate is used, the time for injecting a molten resin is 0.5 seconds and the observation direction is (1,1,1).

FIG. 44 schematically shows a melt front history under conditions where a one-point gate is used, the time for injecting a molten resin is 0.5 seconds and the observation direction is (1,1,1).

FIG. 45 schematically shows a pressure distribution under conditions where a one-point gate is used, the time for injecting a molten resin is 0.5 seconds and the observation direction is (1,1,1).

FIG. 46 schematically shows a pressure distribution under conditions where a one-point gate is used, the time for injecting a molten resin is 0.5 seconds and the observation direction is (1,-1,1).

FIG. 47 schematically shows a melt front history under conditions where a one-point gate is used, the time for injecting a molten resin is 1.0 second and the observation direction is (1,1,1).

FIG. 48 schematically shows a melt front history under conditions where a one-point gate is used, the time for injecting a molten resin is 1.0 seconds and the observation direction is (1,-1,1).

FIG. 49 schematically shows a pressure distribution under conditions where a one-point gate is used, the time for injecting a molten resin is 1.0 seconds and the observation direction is (1,1,1).

FIG. 50 schematically shows a pressure distribution under conditions where a one-point gate is used, the time for injecting a molten resin is 1.0 seconds and the observation direction is (1,-1,1).

FIG. 51 schematically shows a melt front history under conditions where a one-point gate is used, the time for injecting a molten resin is 1.5 seconds and the observation direction is (1,1,1).

FIG. 52 schematically shows a melt front history under conditions where a one-point gate is used, the time for injecting a molten resin is 1.5 seconds and the observation direction is (1,-1,1).

FIG. 53 schematically shows a pressure distribution under conditions where a used, the time for injecting a molten 1.5 seconds and the observation direction is (1,1,1).

FIG. 54 schematically shows a pressure distribution under conditions where a used, the time for injecting a molten resin 1.5 seconds and the observation direction is (1,-1,1).

FIG. 55 schematically shows a temperature distribution under conditions where a used, the time for injecting a molten one-point gate is resin is 1.5 seconds and the observation direction is (1,1,1).

FIG. 56 schematically shows a temperature distribution under conditions where a one-point gate is used, the time for injecting a molten resin is 1.5 seconds and the observation direction is (1,-1,1).

FIG. 57 schematically shows a melt front history under conditions where a two-point gate is used, the time for injecting a molten resin is 0.5 second and the observation direction is (1,1,1).

FIG. 58 schematically shows a melt front history under conditions where a two-point gate is used, the time for injecting a molten resin is 0.5 seconds and the observation direction is (1,-1,1).

FIG. 59 schematically shows a melt front history under conditions where a two-point gate is used, the time for injecting a molten resin is 0.5 seconds and the observation direction is (1,-1,1).

FIG. 60 schematically shows a pressure distribution under conditions where a two-point gate is used, the time for injecting a molten resin is 0.5 seconds and the observation direction is (1,1,1).

FIG. 61 schematically shows a pressure distribution under conditions where a two-point gate is used, the time for injecting a molten resin is 0.5 seconds and the observation direction is (1,-1,1).

FIG. 62 schematically shows a pressure distribution under conditions where a two-point gate is used, the time for injecting a molten resin is 0.5 seconds and the observation direction is (1,-1,1).

FIG. 63 schematically shows a melt front history under conditions where a two-point gate is used, the time for injecting a molten resin is 1.0 second and the observation direction is (1,1,1).

FIG. 64 schematically shows a melt front history under conditions where a two-point gate is used, the time for injecting a molten resin is 1.0 second and the observation direction is (1,-1,1).

FIG. 65 schematically shows a melt front history under conditions where a two-point gate is used, the time for injecting a molten resin is 1.0 second and the observation direction is (1,-1,-1).

FIG. 66 schematically shows a pressure distribution under conditions where a two-point gate is used, the time for injecting a molten resin is 1.0 second and the observation direction is (1,1,1).

FIG. 67 schematically shows a pressure distribution under conditions where a two-point gate is used, the time for injecting a molten resin is 1.0 second and the observation direction is (1,-1,1).

FIG. 68 schematically shows a pressure distribution under conditions where a two-point gate is used, the time for injecting a molten resin is 1.0 second and the observation direction is (1,-1,-1).

FIG. 69 schematically shows a melt front history under conditions where a two-point gate is used, the time for injecting a molten resin is 1.5 seconds and the observation direction is (1,1,1).

FIG. 70 schematically shows a melt front history under conditions where a two-point gate is used, the time for injecting a molten resin is 1.5 seconds and the observation direction is (1,-1,-1).

FIG. 71 schematically shows a pressure distribution under conditions where a used, the time for injecting a molten resin is 1.5 seconds and the observation direction is (1,1,1).

FIG. 72 schematically shows distribution under conditions where a two-point gate is used, the time for injecting a molten resin is 1.5 seconds and the observation direction is (1,-1,-1).

FIG. 73 schematically shows distribution under conditions where a two-point gate is used, the time for injecting a molten resin is 1.5 seconds and the observation direction is (1,1,1).

FIG. 74 schematically shows a temperature distribution under conditions where a two-point gate is used, the time for injecting a molten resin is 1.5 seconds and the observation direction is (1,-1,-1).

FIG. 75 schematically shows a stress distribution under conditions where a one-point gate is used, the time for injecting a molten resin is 0.5 second and the observation direction is (1,1,1).

FIG. 76 schematically shows a stress distribution under conditions where a one-point gate is used, the time for injecting a molten resin is 0.5 second and the observation direction is (1,-1,1)

FIG. 77 schematically shows a stress distribution under conditions where a one-point gate is used, the time for injecting a molten resin is 1.0 second and the observation direction is (1,1,1).

FIG. 78 schematically shows a stress distribution under conditions where a one-point gate is used, the time for injecting a molten resin is 1.0 second and the observation direction is (1,-1,1).

FIG. 81 schematically shows distribution under conditions where a two-point gate is used, the time for injecting a molten resin is 0.5 seconds and the observation direction is (1,1,1).

FIG. 82 schematically shows a stress distribution under conditions where a two-point gate is used, the time for injecting a molten resin is 0.5 seconds and the observation direction is (1,-1,1).

FIG. 83 schematically shows a stress distribution under conditions where a two-point gate is used the time for injecting a molten resin is 1.0 second and the observation direction is (1,1,1).

FIG. 84 schematically shows a stress distribution under conditions where a two-point gate is used, the time for injecting a molten resin is 1.0 second and the observation direction is (1,-1,1).

FIG. 85 schematically shows a stress distribution under conditions where a two-point gate is used, the time for injecting a molten resin is 1.5 seconds and the observation direction is (1,1,1).

FIG. 86 schematically shows distribution under conditions where a two-point gate is used, the time for injecting a molten resin is 1.5 seconds and the observation direction is (1,-1,1).

FIG. 87 schematically shows distribution in the Y-direction under conditions where a one-point gate is used, the time for injecting a molten resin is 1.5 seconds and the observation direction is (1,1,1).

FIG. 88 schematically shows a displacement distribution in the Y-direction under conditions where a one-point gate is used, the time for injecting a molten resin is 1.5 seconds and the observation direction is (1,-1,-1).

FIG. 89 schematically shows a displacement distribution in the Y-direction under conditions where a two-point gate is used, the time for injecting a molten resin is 1.5 seconds and the observation direction is (1,1,1).

FIG. 90 schematically shows a displacement distribution in the Y-direction under conditions where a two-point gate is used, the time for injecting a molten resin is 1.5 seconds and the observation direction is (1,-1,-1).

FIG. 97 shows form data of rib portions out of form data of a core used for carrying out resin flow simulation in the optimizing method of an over-molding method in Example 12.

FIG. 101 shows a relationship of the arrangement between the shell form of a three-dimensional hollow molded article and the core in Example 13.

FIG. 114 schematically shows a change in the thickness of a film gate in Example 14.

FIG. 119 shows a pressure distribution in a resin flow layer among resin flow simulation results in Example 14.

FIG. 120 shows a pressure distribution among resin flow simulation results in Comparative Example 6.

FIG. 121 shows a simulation result of a stress distribution in a core in Example 14.

FIG. 122 shows a simulation result of a stress distribution in a core in Example 14, the result being viewed from an angle different from that in FIG. 121.

FIG. 123 shows a simulation result of a stress distribution in a core in Comparative Example 6.

FIG. 124 shows a simulation result of a stress distribution in a core in Comparative Example 6, the result being viewed from an angle different from that in FIG. 123.

Figure 125:
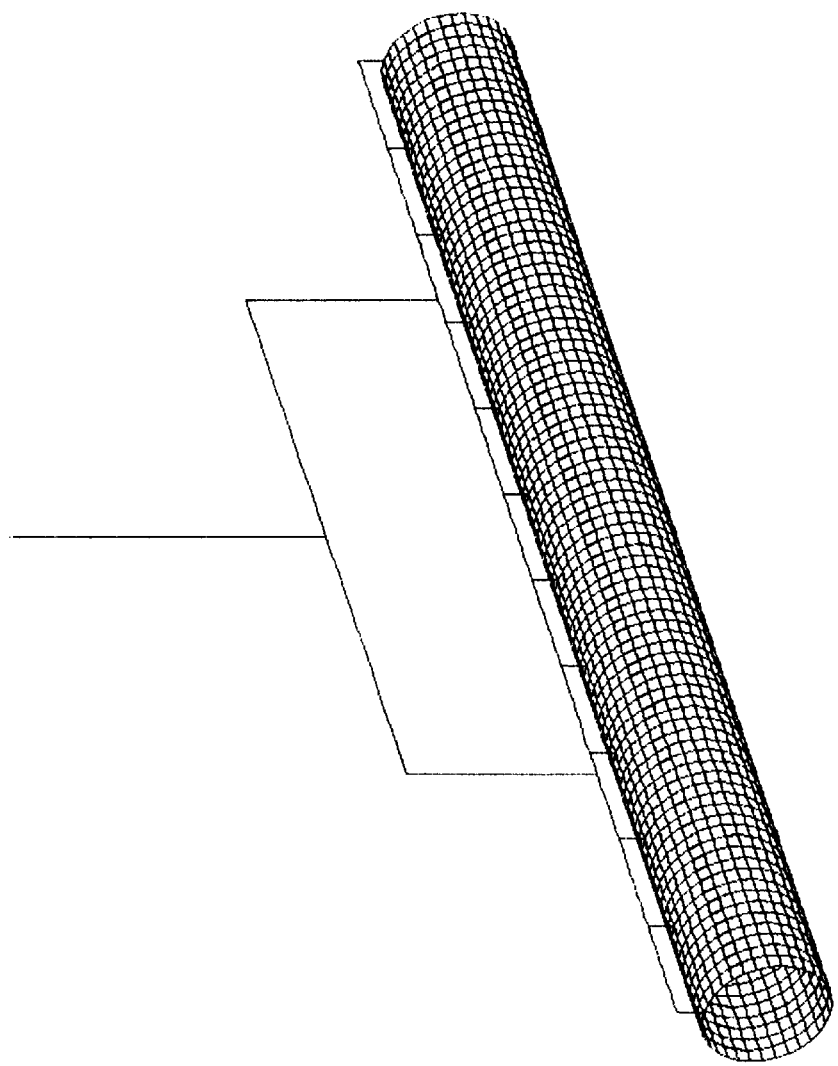

FIG. 125 schematically shows relationships of the arrangement among a main sprue portion, a branched sub-sprue portion, a guide sprue portion and a 12-points multi-point pin gate in Example 15.

Figure 126:
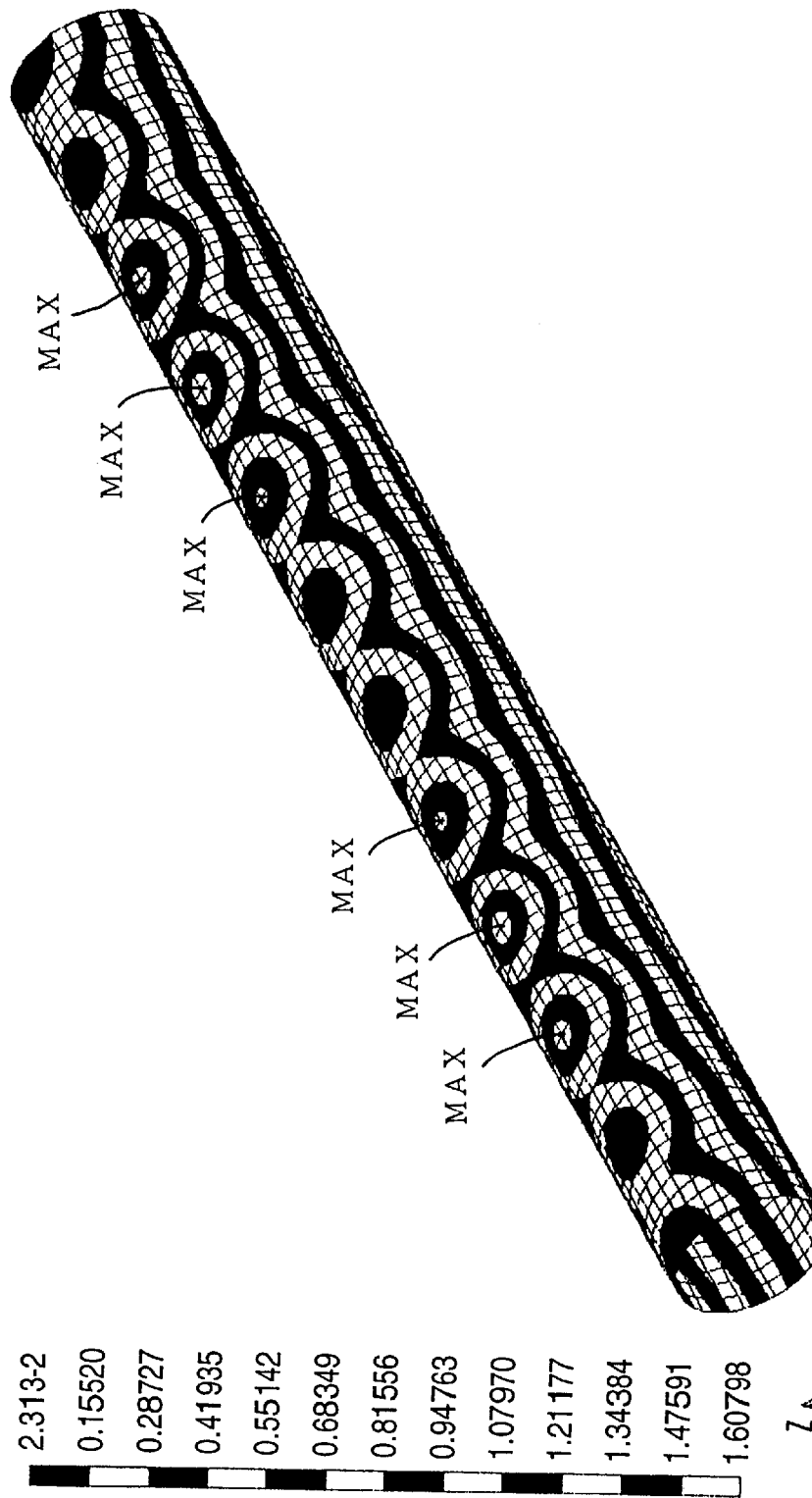

FIG. 126 shows a melt front history among resin flow simulation results in Example 15.

Figure 127:
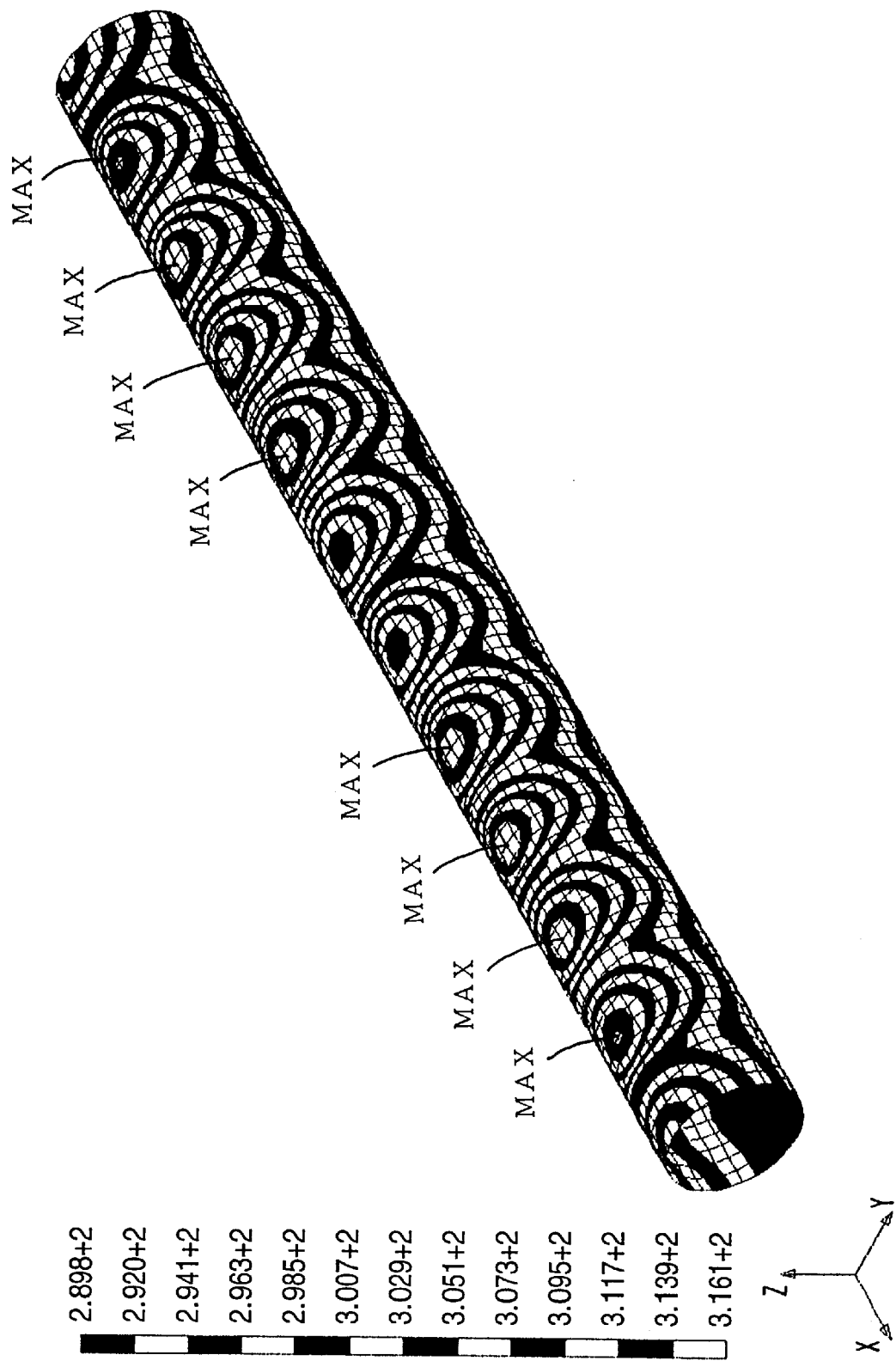

FIG. 127 shows a temperature distribution among resin flow simulation results in Example 15.

Figure 128:
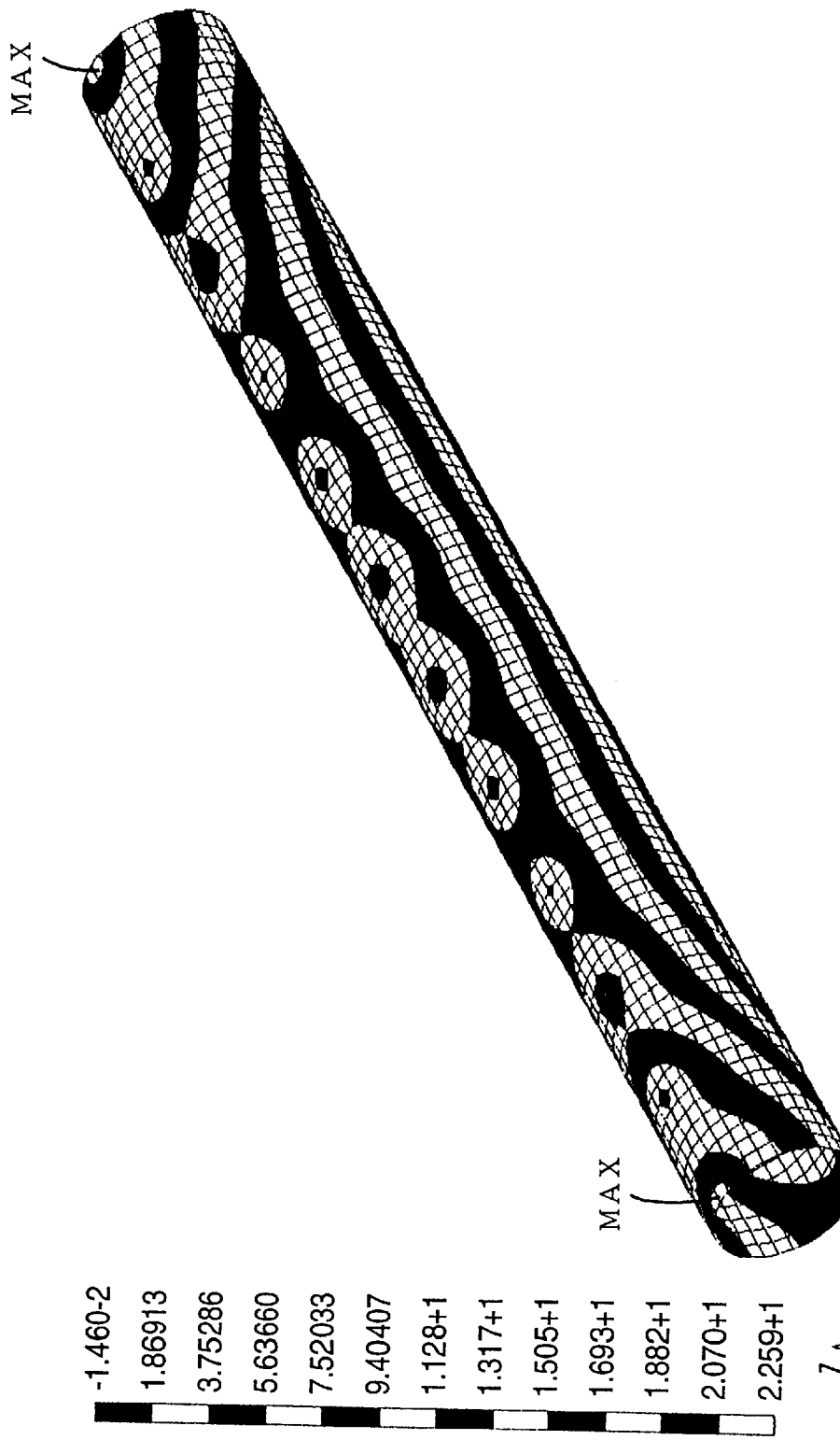

FIG. 128 shows a pressure distribution among resin flow simulation results in Example 15.

Figure 129:
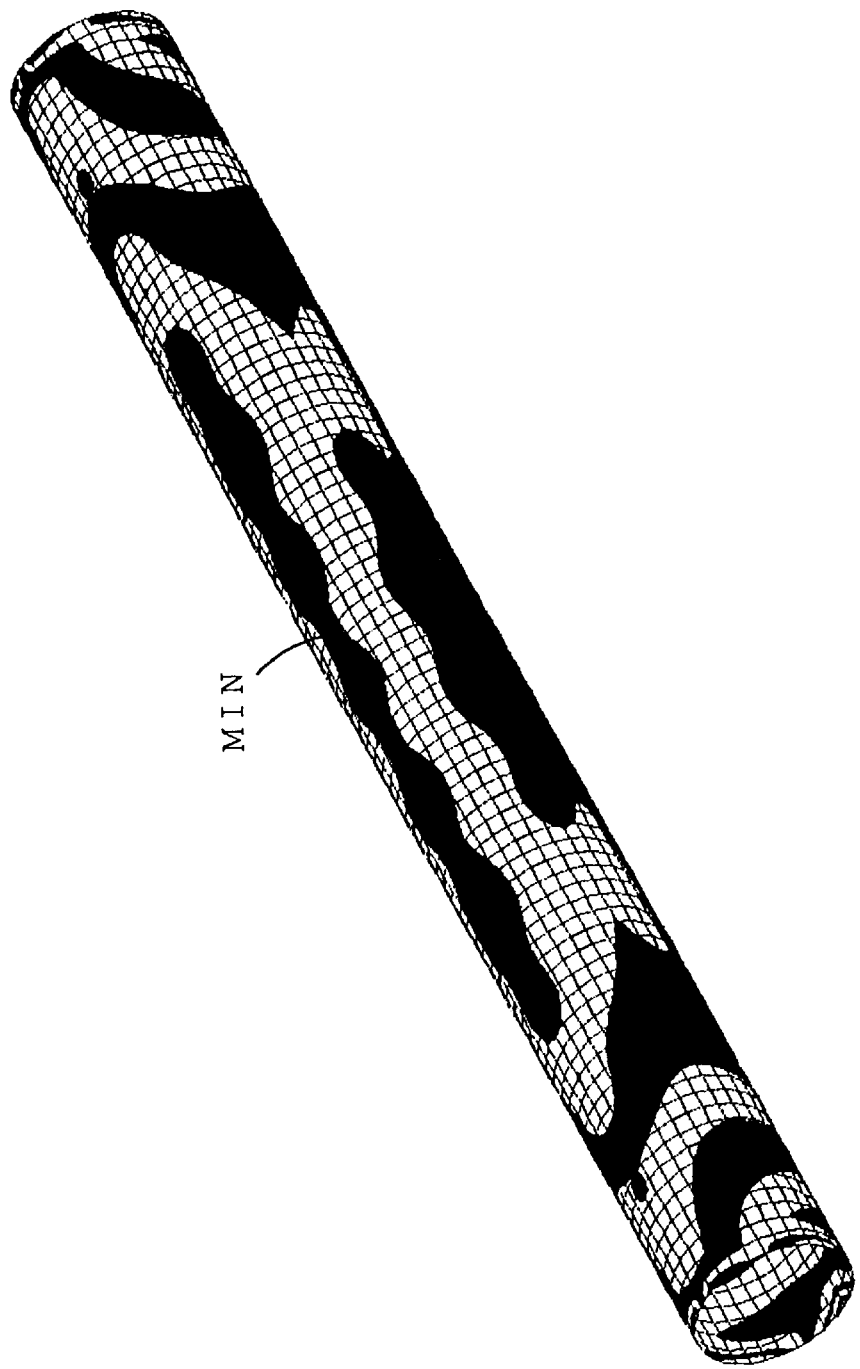

FIG. 129 shows a simulation result of a stress distribution in a core among results of a stress-strain analysis in Example 15.

Figure 130:
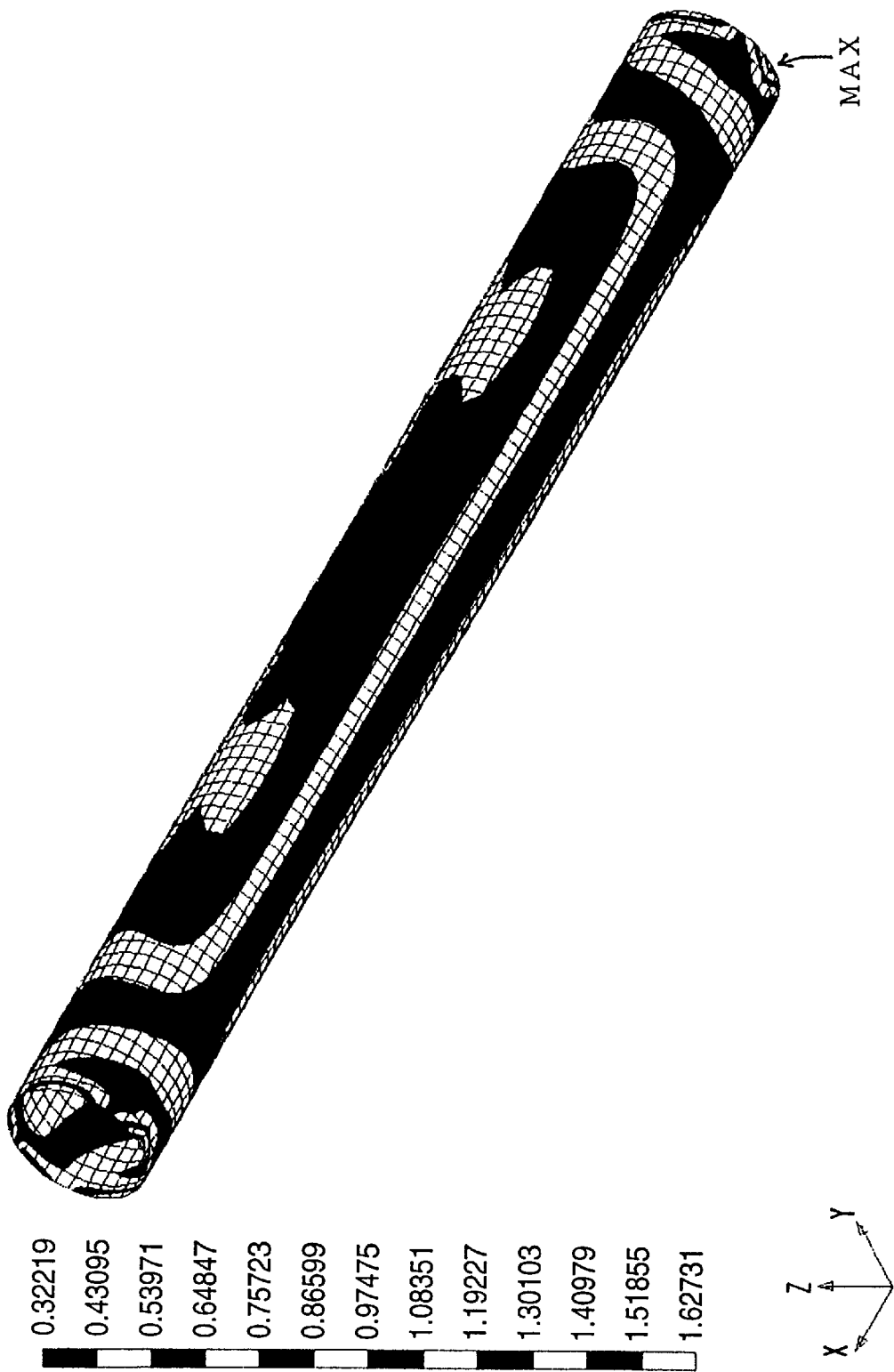

FIG. 130 shows a simulation result of a stress distribution in a core among results of a stress-strain analysis in Example 15, the result being viewed from an angle different from that in FIG. 129.

FIG. 131 schematically shows, as black regions, ring-shaped resin flow channels provided on a cavity wall along the circumferential direction of a core and a resin flow channel provided on the cavity wall along the axial direction of the core.

Figure 132:
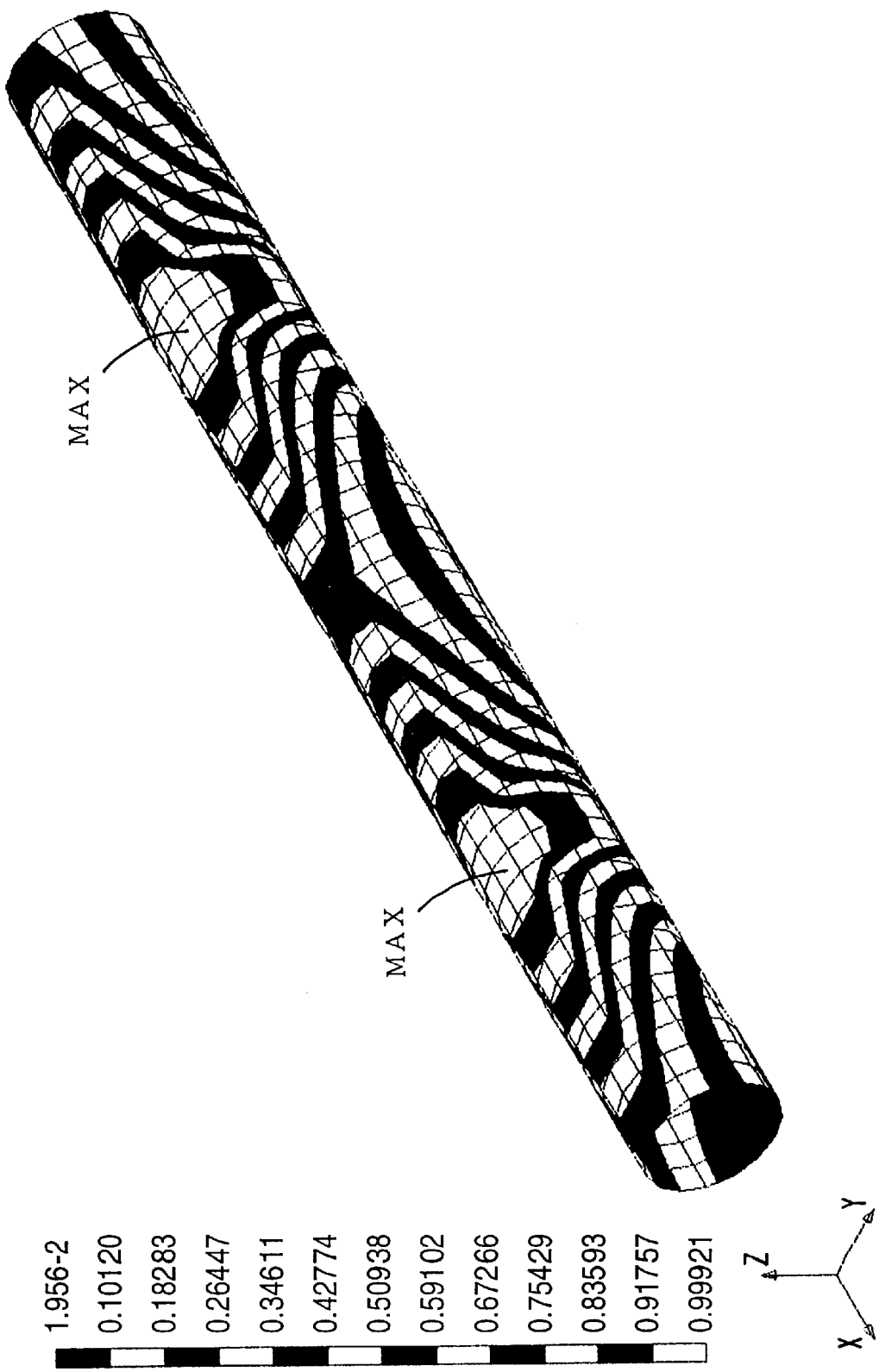

FIG. 132 shows a melt front history among resin flow simulation results in Example 16.

Figure 133:
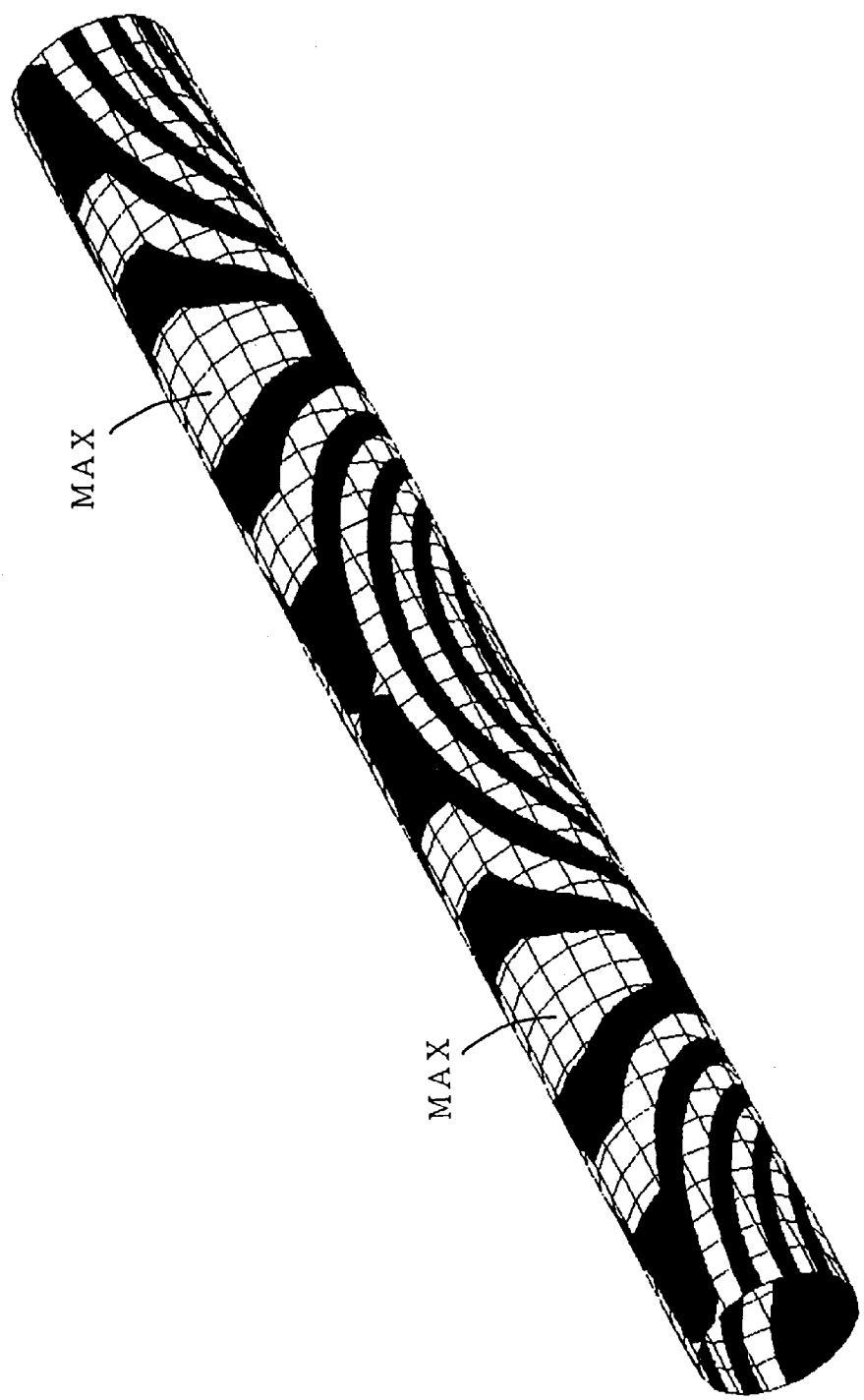

FIG. 133 shows a pressure distribution among resin flow simulation results in Example 16.

FIG. 134 shows a stress distribution in a core in Example 16.

Figure 135:
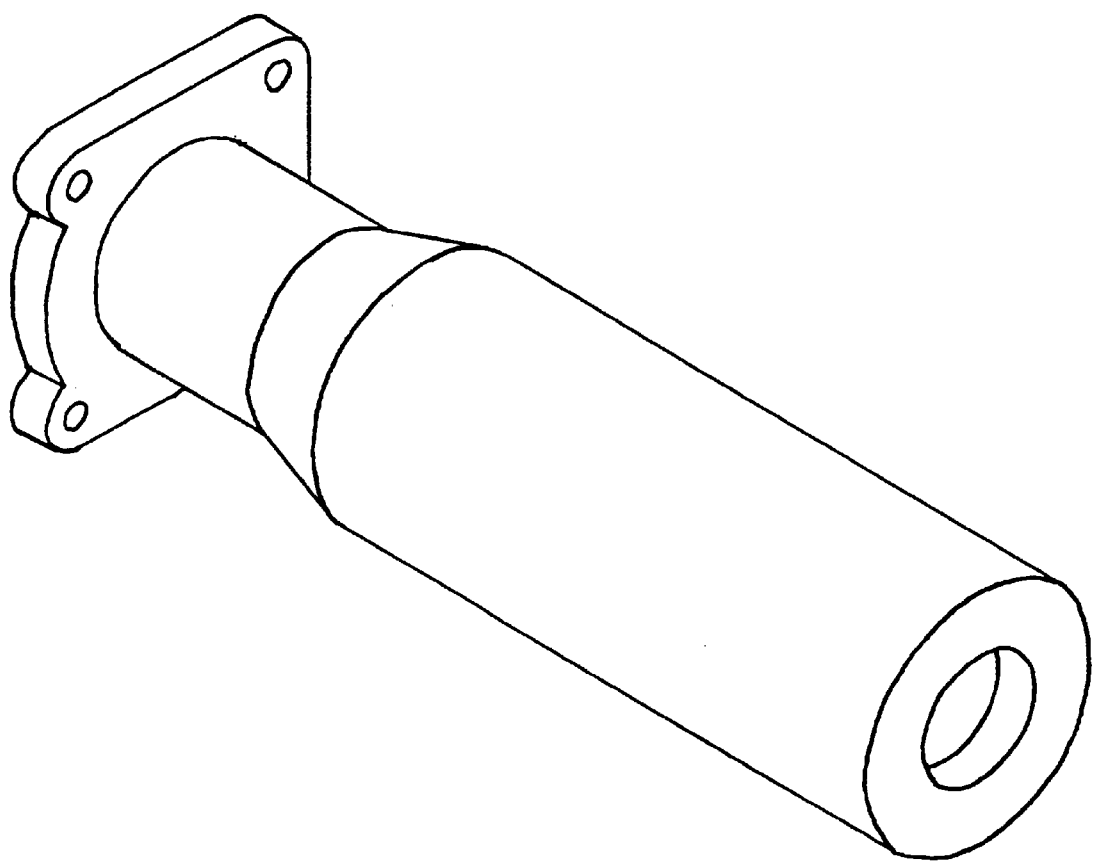

FIG. 135 schematically shows a three-dimensional hollow molded article in Example 17.

Figure 136:
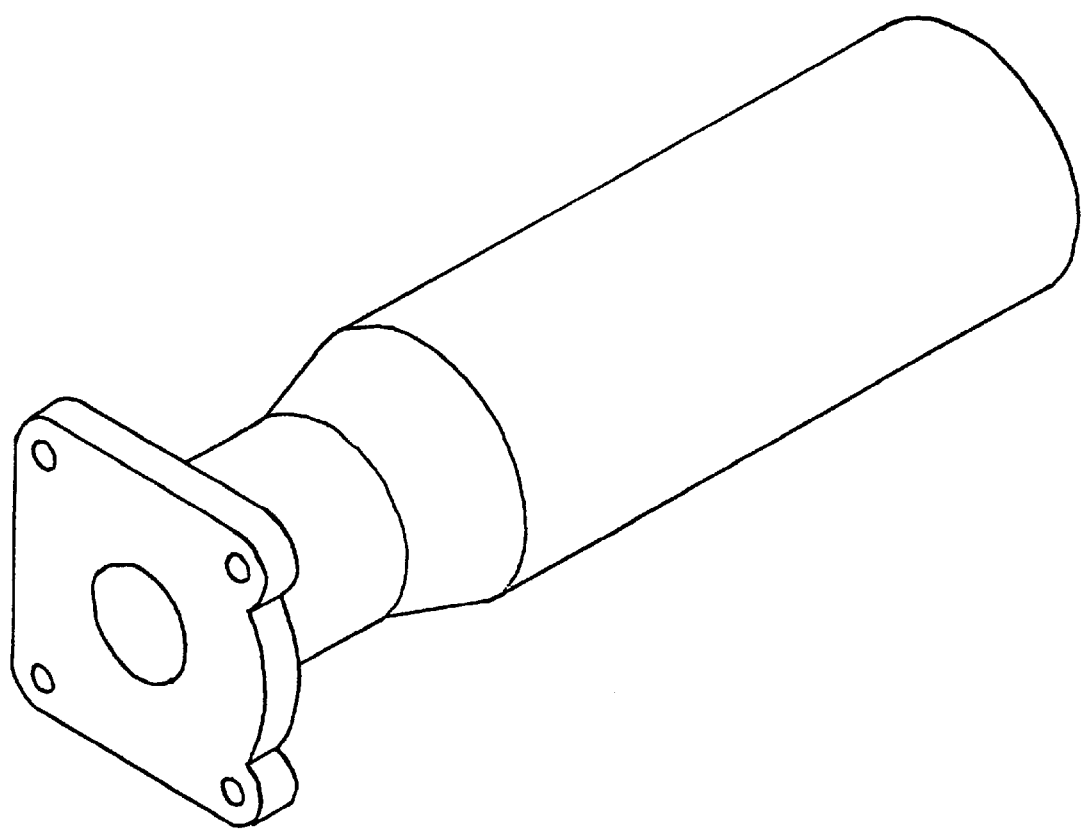

FIG. 136 schematically shows the threedimensional hollow molded article in Example 17, viewed from an angle different from that in FIG. 135.

Figure 137:
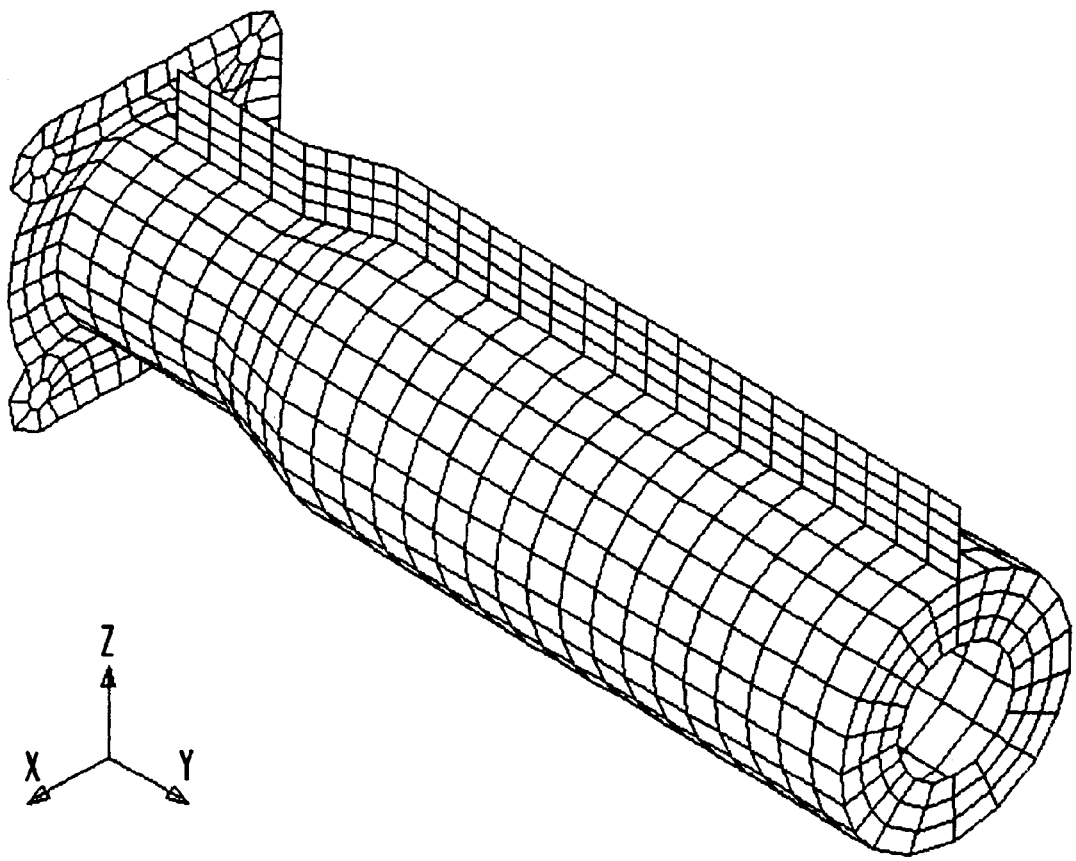

FIG. 137 shows form data for analysis, used for carrying out injection/compression over-molding resin flow simulation in Example 17.

Figure 138:
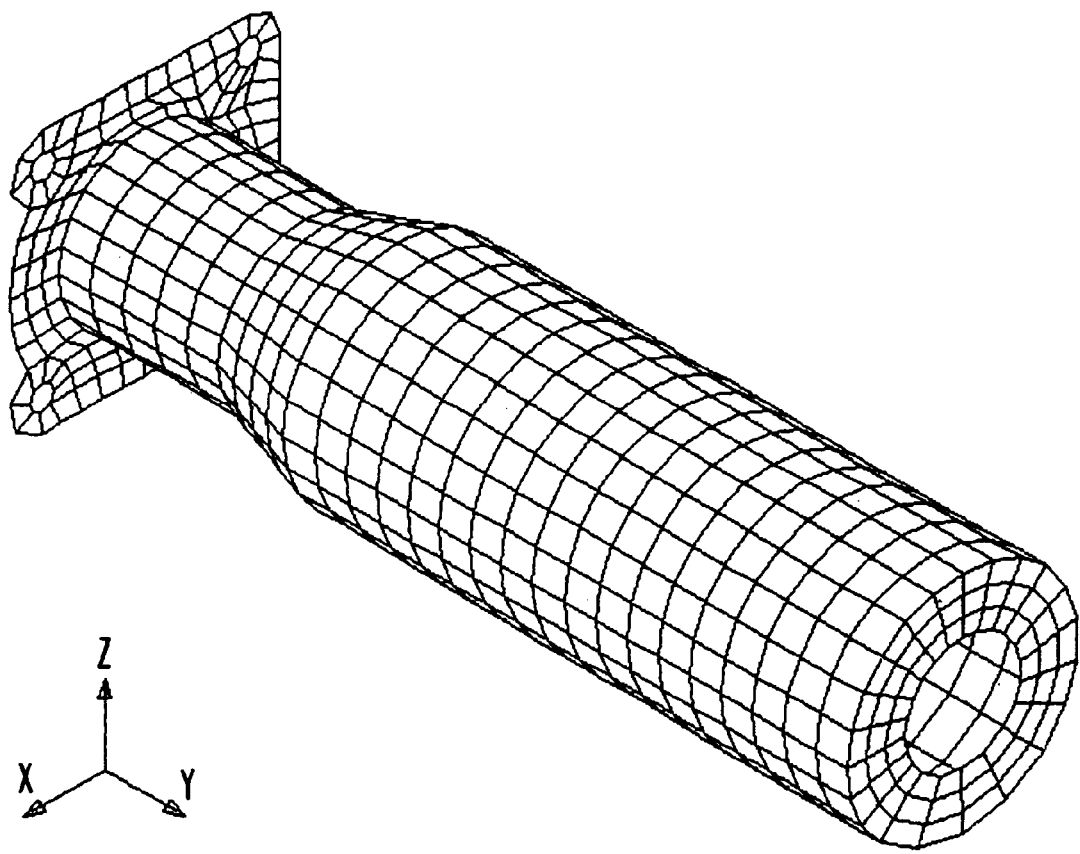

FIG. 138 schematically shows form data for analysis, used for carrying out a stress-strain analysis in Example 17.

FIG. 139 schematically shows a melt front history among results of injection/compression over-molding resin flow simulation in Example 17.

FIG. 140 schematically shows a melt front history among results of injection/compression over-molding resin flow simulation in Example 17, the result being viewed from an angle different from that in Example 17.

FIG. 141 schematically shows a pressure distribution among results of injection/compression over-molding resin flow simulation in Example 17.

FIG. 142 schematically shows a pressure distribution among results of injection/compression over-molding resin flow simulation in Example 17, viewed from an angle different from that in FIG. 141.

FIG. 143 schematically shows a result of a stress distribution in a core, obtained by a stress-strain analysis in Example 17.

FIG. 144 schematically shows a result of a stress distribution in a core, obtained by a stress-strain analysis in Example 17, the result being viewed from an angle-different from that in FIG. 143.

FIG. 145 schematically shows a melt front history among results of resin flow simulation in Comparative Example 7.

FIG. 146 schematically shows a pressure distribution among results of resin flow simulation in Comparative Example 7.

FIG. 147 schematically shows a stress distribution among results of structural analysis simulation in Comparative Example 7.

Figure 148:
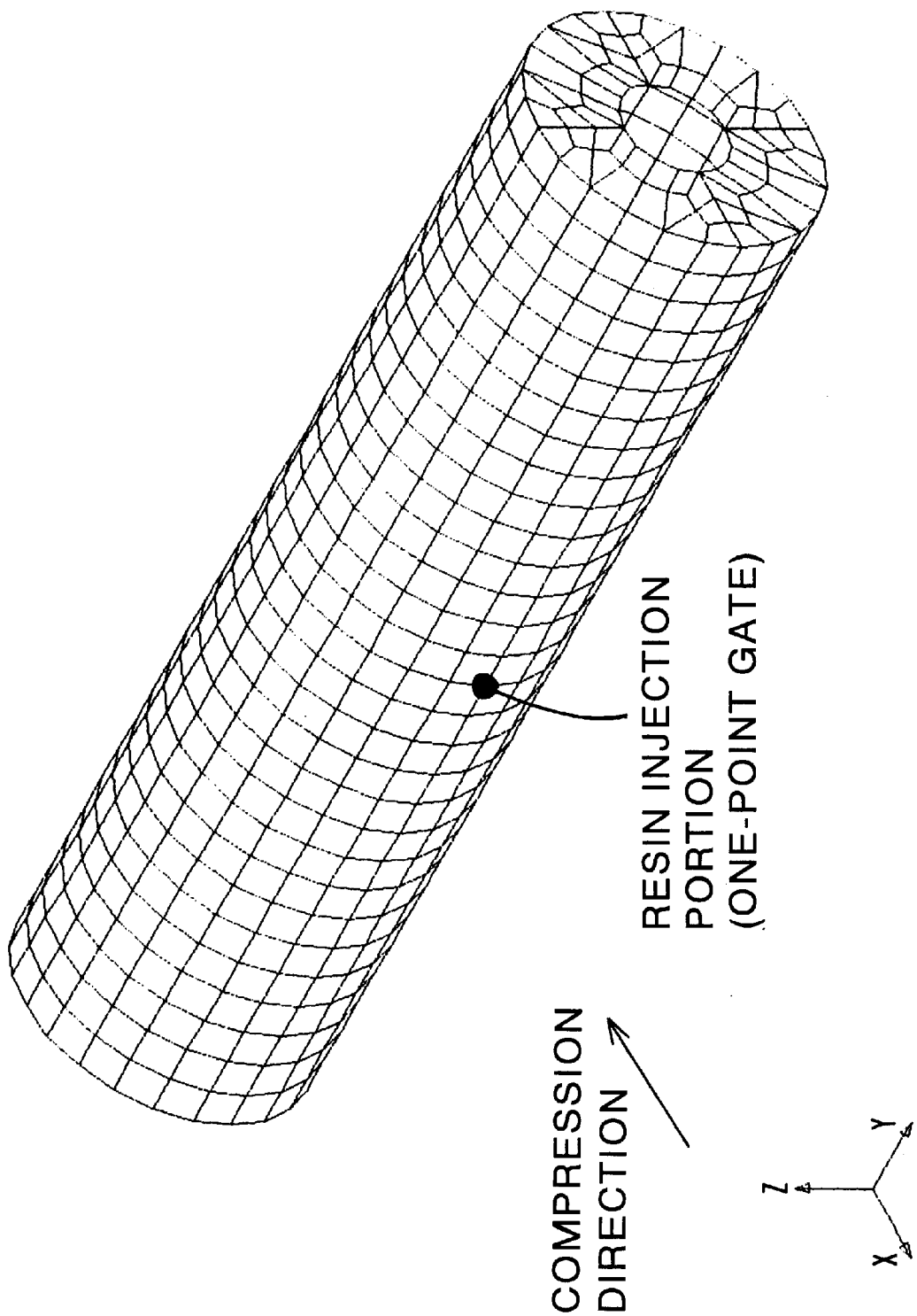

FIG. 148 shows form data for analysis, used for carrying out an injection/compression over-molding resin flow simulation in Example 18 and Comparative Example 8.

FIG. 149 shows form data of a core for simulation in Example 18.

FIG. 150 shows a boundary condition for carrying out a stress-strain analysis in Example 18 and Comparative Example 8.

Figure 151:
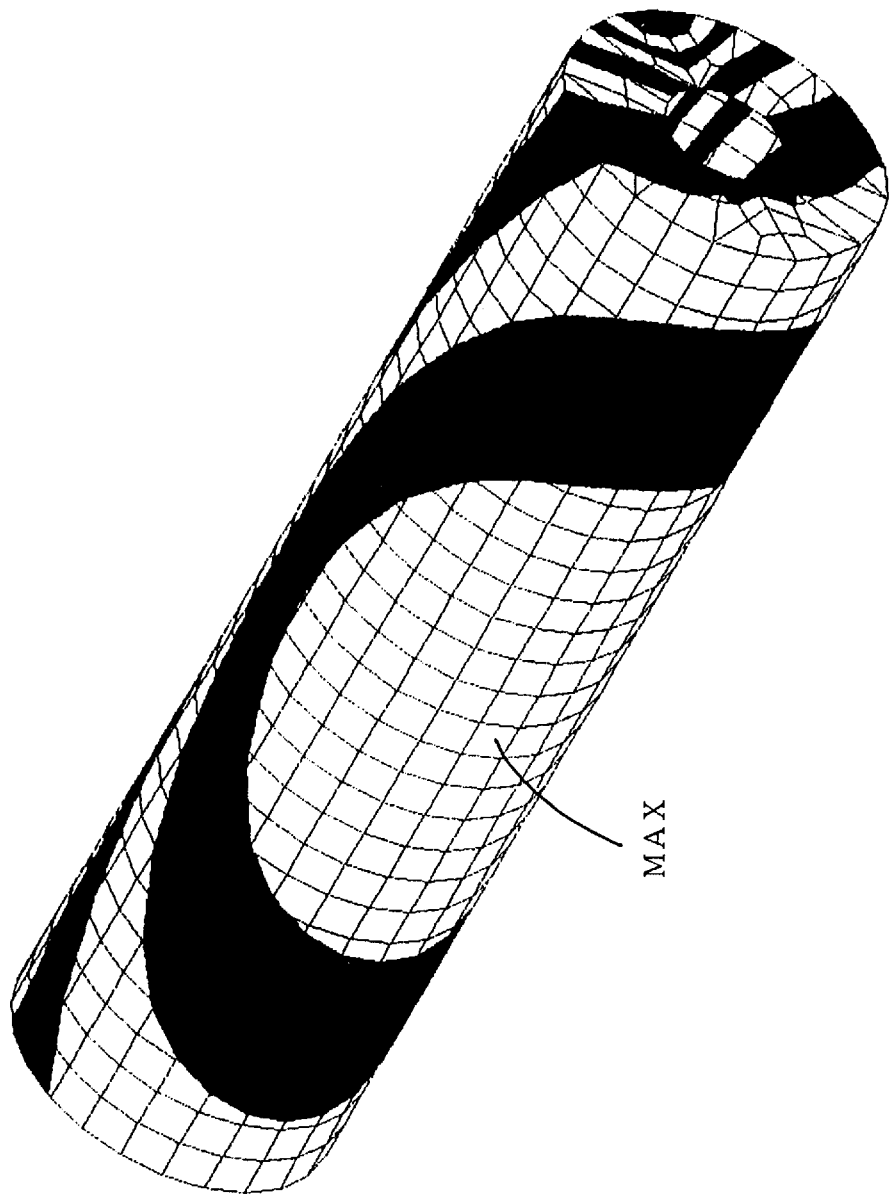

FIG. 151 shows a melt front history among the results of the injection/compression over-molding resin flow simulation in Example 18 and Comparative Example 8.

Figure 152:
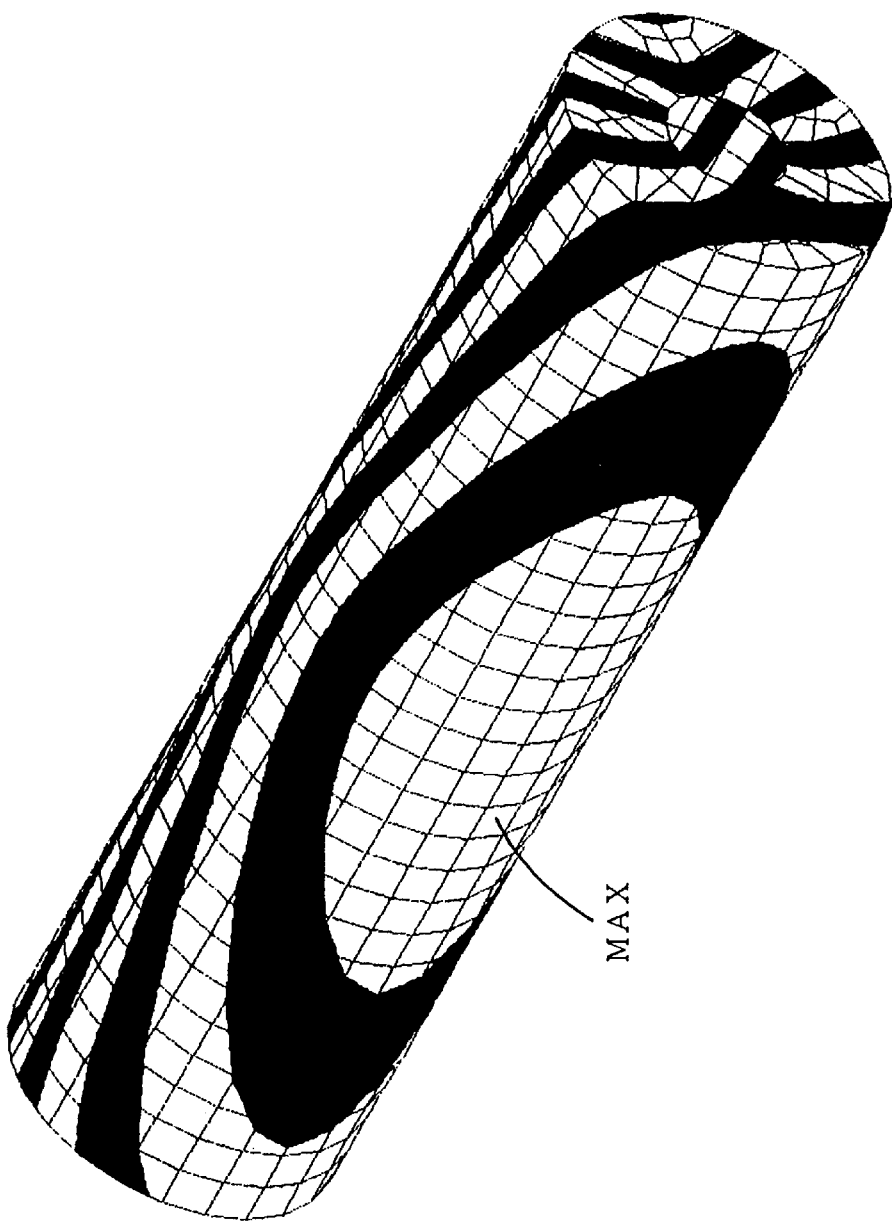

FIG. 152 shows a pressure distribution among the results of the injection/compression over-molding resin flow simulation in Example 18 and Comparative Example 8.

Figure 153:
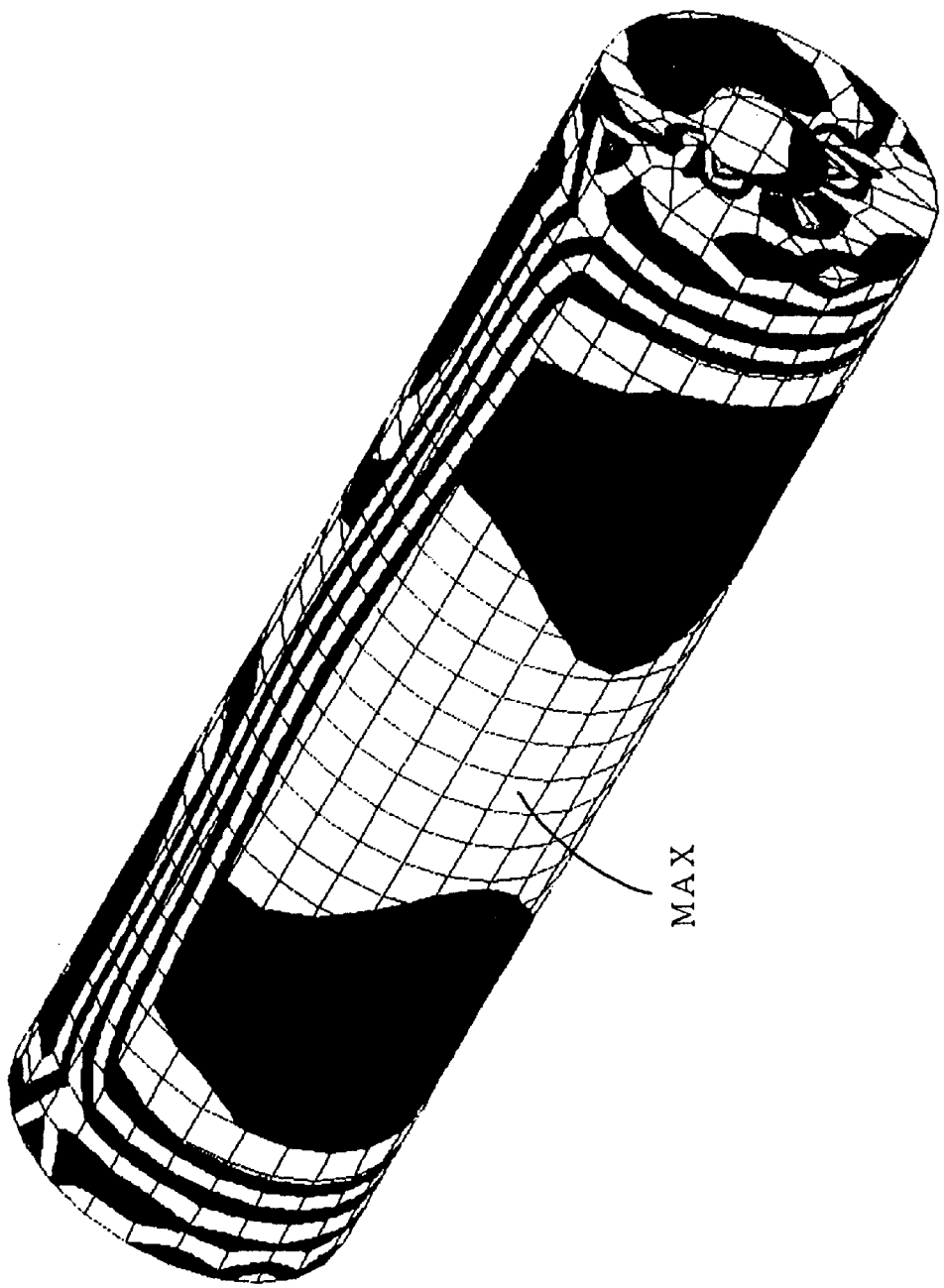

FIG. 153 shows a stress distribution in a core, caused by the pressure exerted on the core by the flow of a molten resin in a compression step in Example 18.

FIG. 154 shows a stress distribution in a core, caused by the pressure exerted on the core by the flow 30 of a molten resin in a compression step in Comparative Example 8.

FIG. 155 shows form data of rib portions out of form data of a core for simulation in Example 19.

FIG. 156 shows a numerical analysis result of stress distribution in a core, caused by the pressure exerted on the core by the flow of a molten resin in Example 19.

FIG. 157 shows form data for analysis, used for carrying out injection/compression over-molding resin flow simulation in Example 20.

FIG. 158 shows form data for analysis, used for carrying out an injection/compression over-molding resin flow simulation in Example 20, the data being viewed from an angle different from that in FIG. 157.

Figure 159:
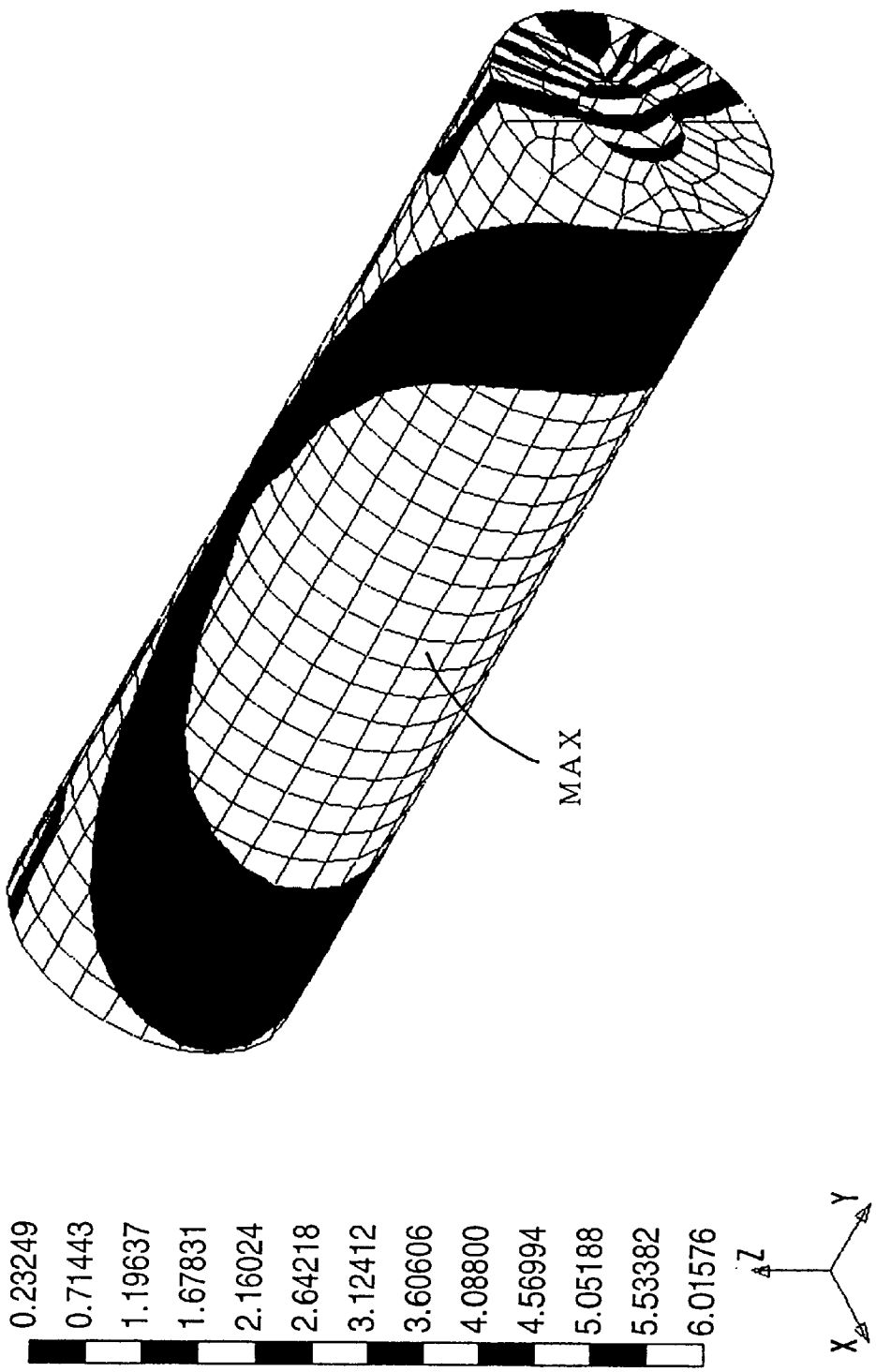

FIG. 159 shows a melt front history among results of the injection/compression over-molding resin flow simulation in Example 20.

FIG. 160 shows a melt front history among the results of the injection/compression over-molding resin flow simulation in Example 20, viewed from an angle different from that in FIG. 159.

Figure 161:
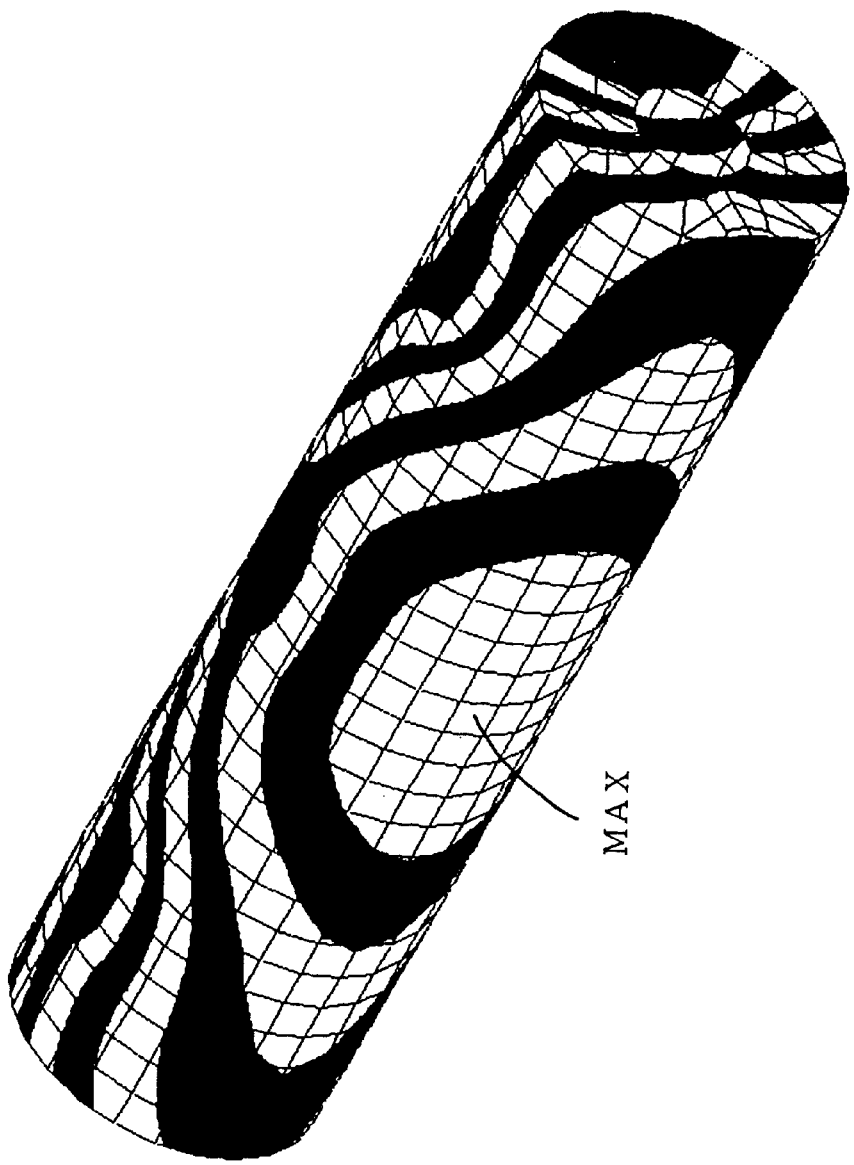

FIG. 161 shows a pressure distribution among the results of the injection/compression over-molding resin flow simulation in Example 20.

Figure 162:

FIG. 162 shows a pressure distribution among the results of the injection/compression over-molding resin flow simulation in Example 20, viewed from an angle different from that in FIG. 161.

Figure 163:
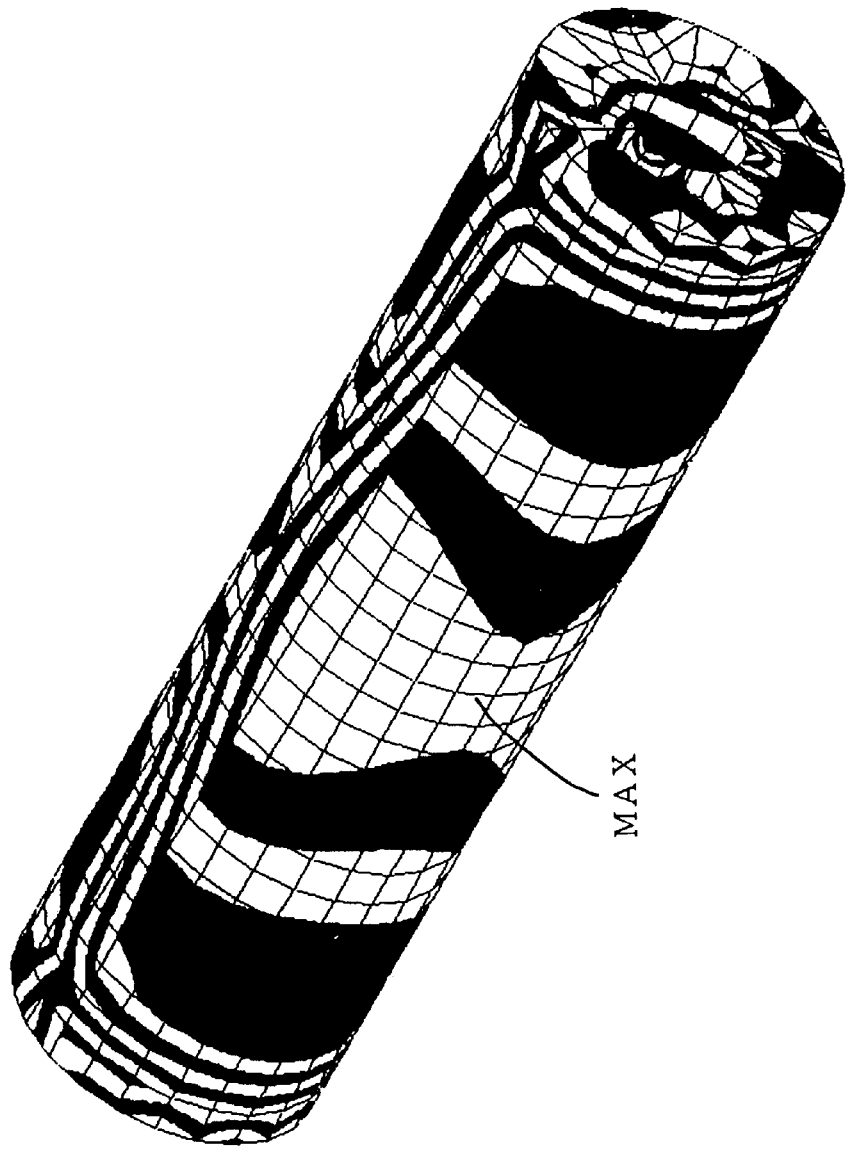

FIG. 163 shows a numerical analysis result of a stress distribution in a core, caused by the pressure exerted on the core by the flow of a molten resin in Example 20.

Figure 164:
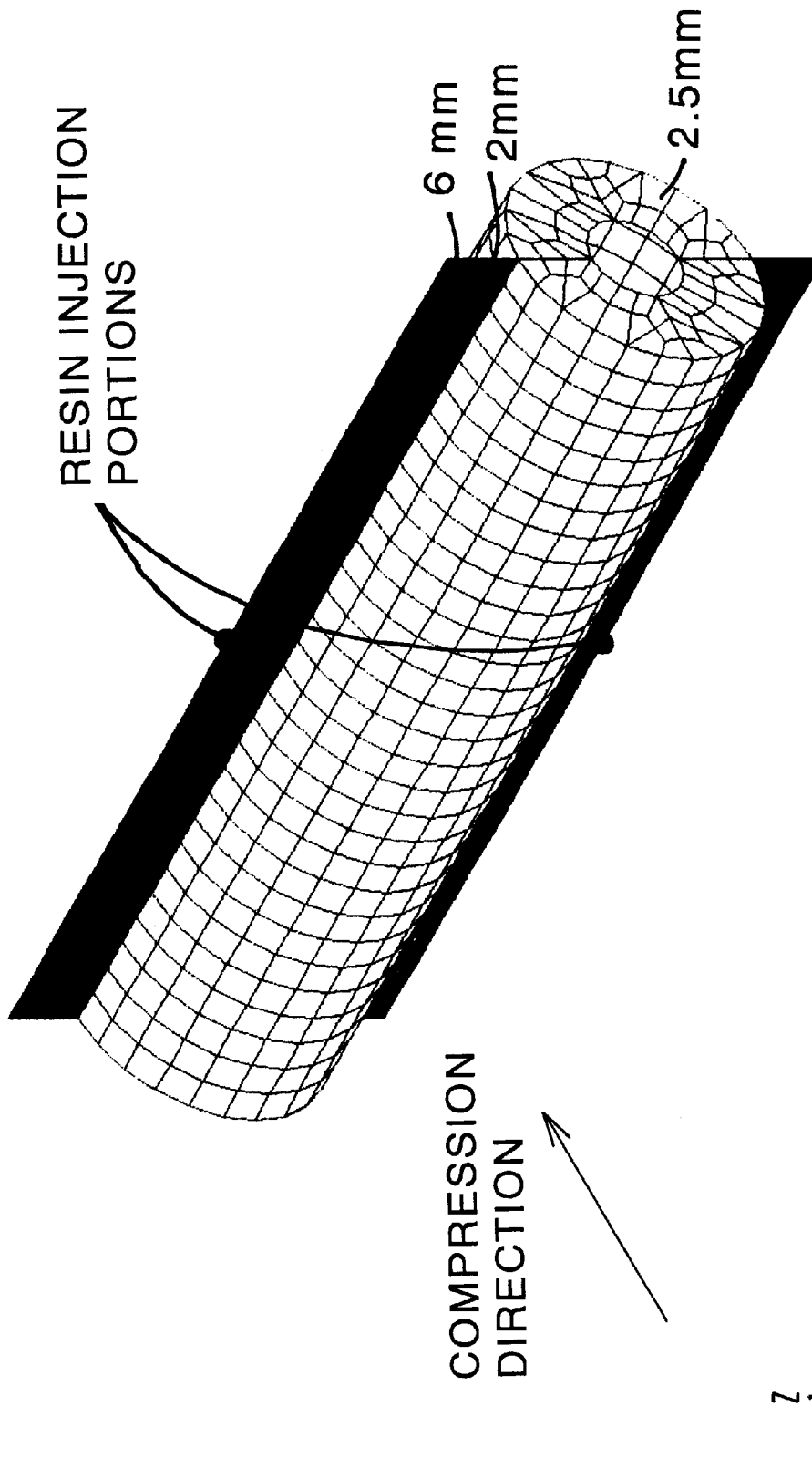

FIG. 164 shows form data for analysis, used for carrying out an injection/compression over-molding resin flow simulation in Example 21.

Figure 165:
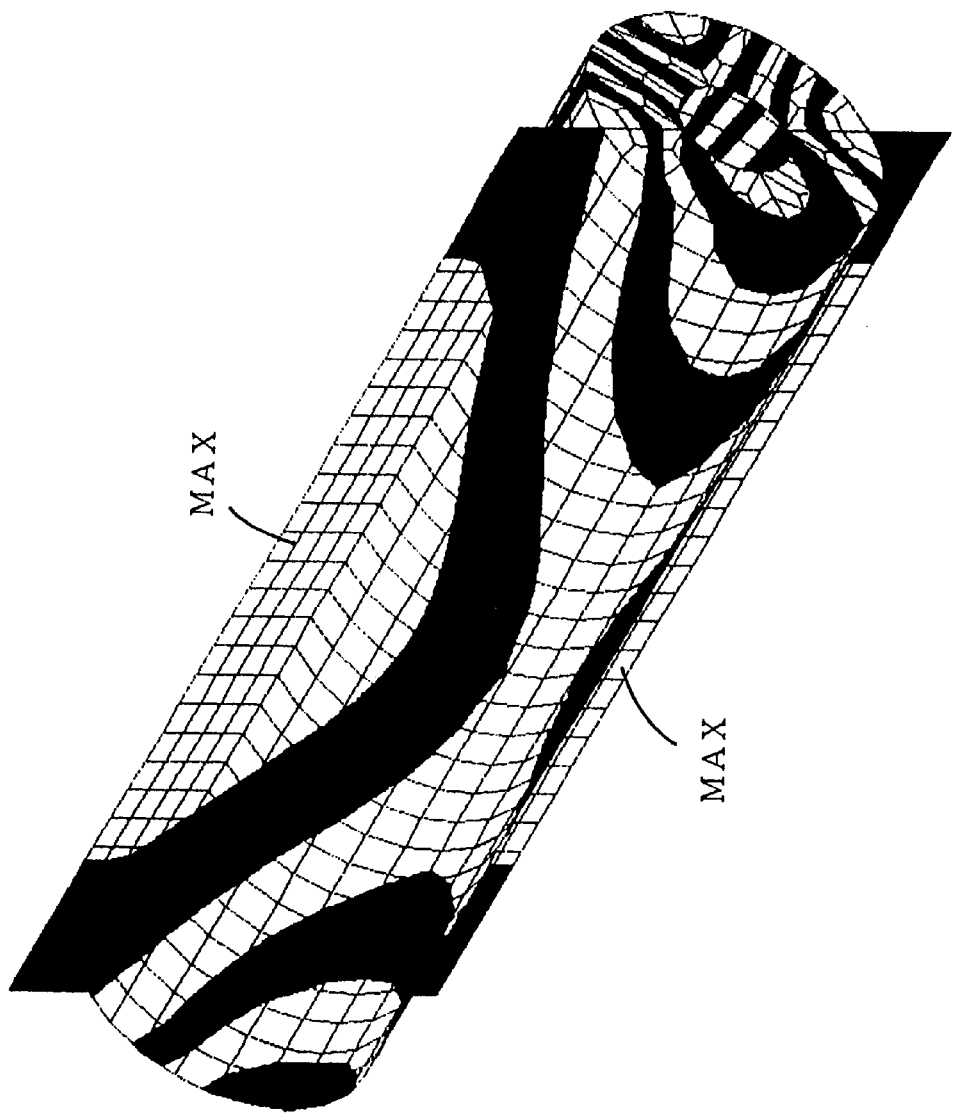

FIG. 165 shows a melt front history among the results of the injection/compression over-molding resin flow simulation in Example 21.

Figure 166:
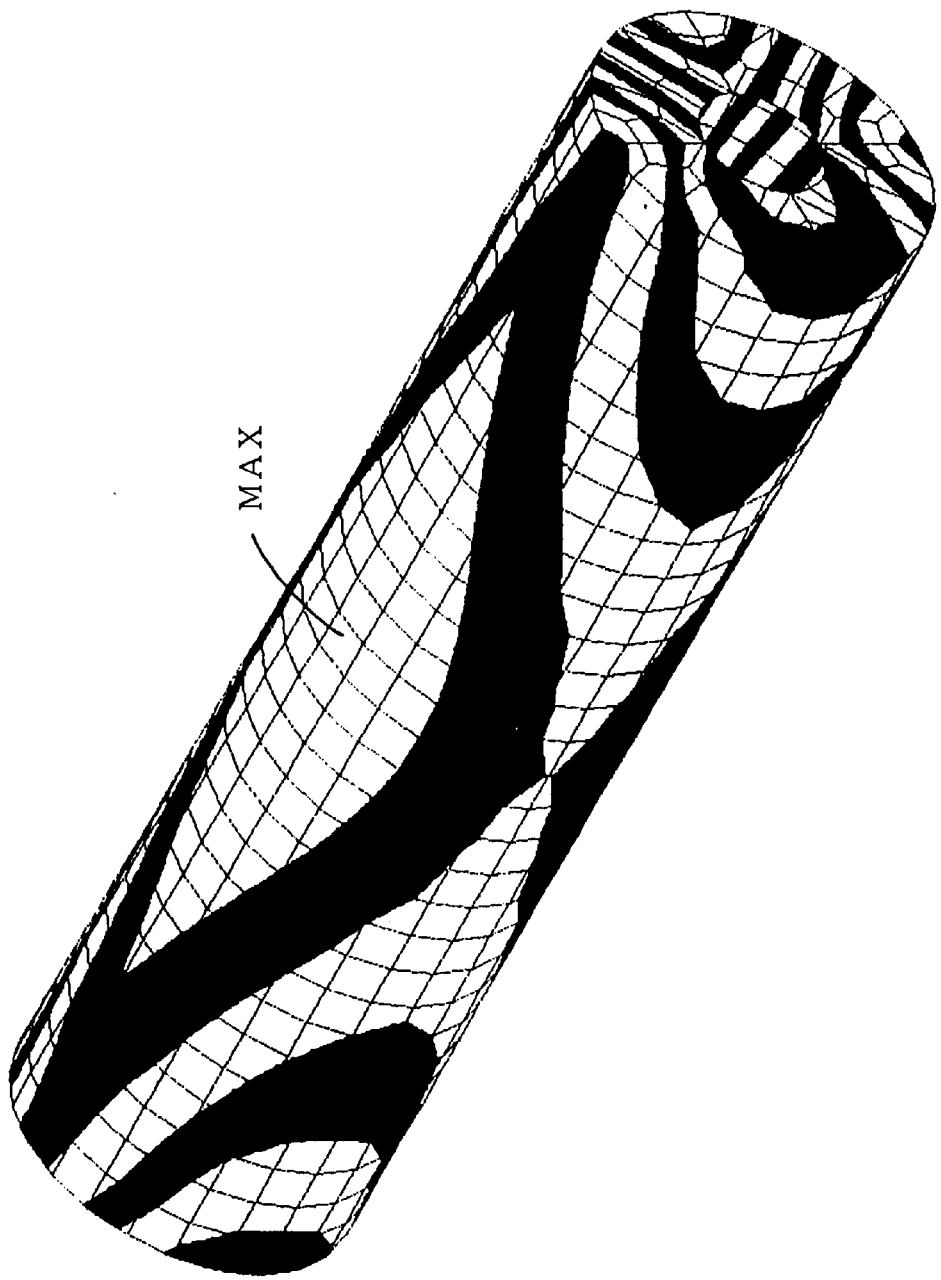

FIG. 166 shows a melt front history among the results of the injection/compression over-molding resin flow simulation in Example 21, viewed from an angle different from that in FIG. 165.

FIG. 167 shows a pressure distribution among the results of the injection/compression over-molding resin flow simulation in Example 21.

FIG. 168 shows a pressure distribution among the results of the injection/compression over-molding resin flow simulation in Example 21, viewed from an angle different from that in FIG. 167.

Figure 169:
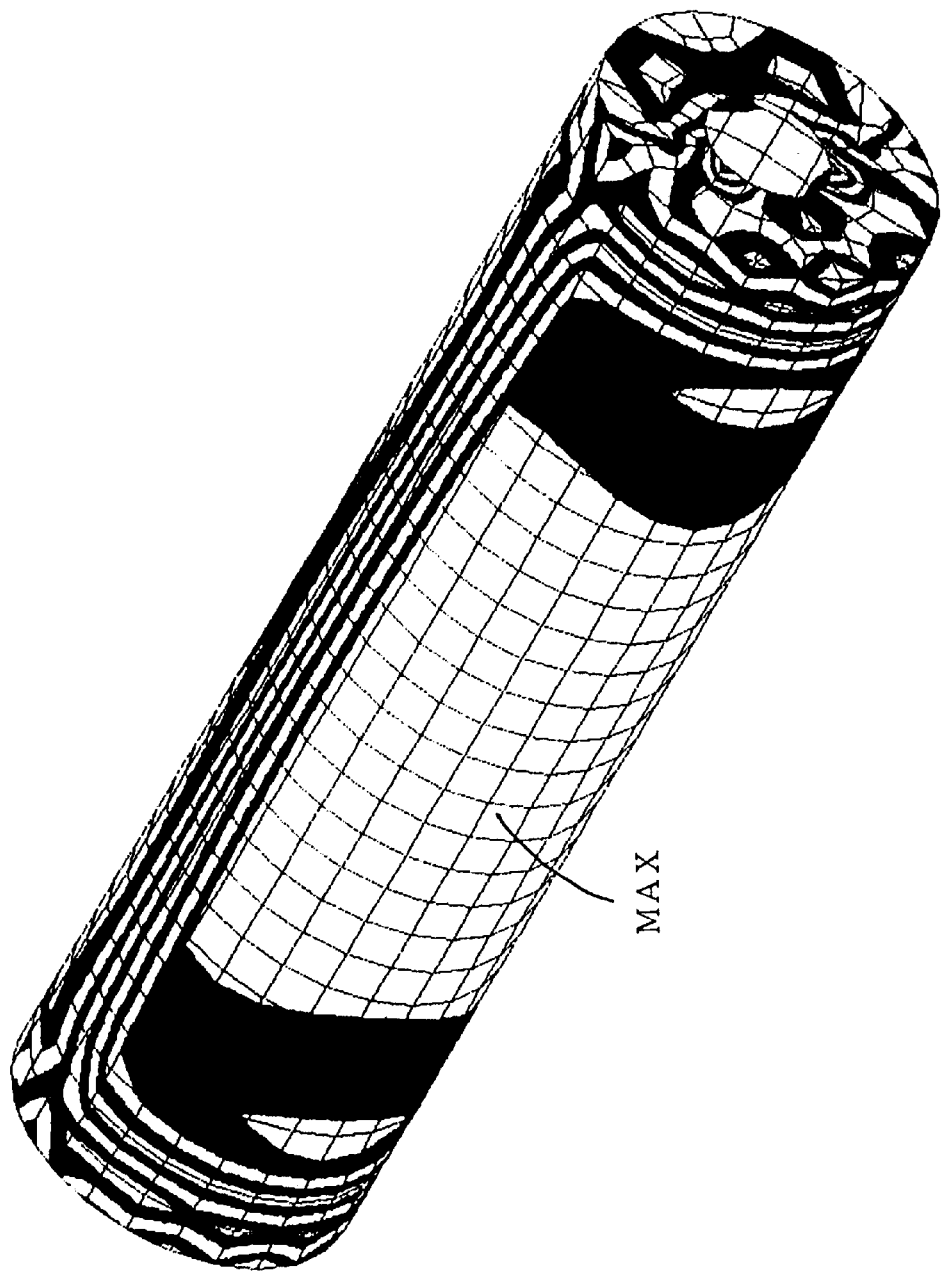

FIG. 169 shows a numerical analysis result of stress distribution in a core, caused by the pressure exerted on the core by the flow of a molten resin in Example 21.

Figure 170:
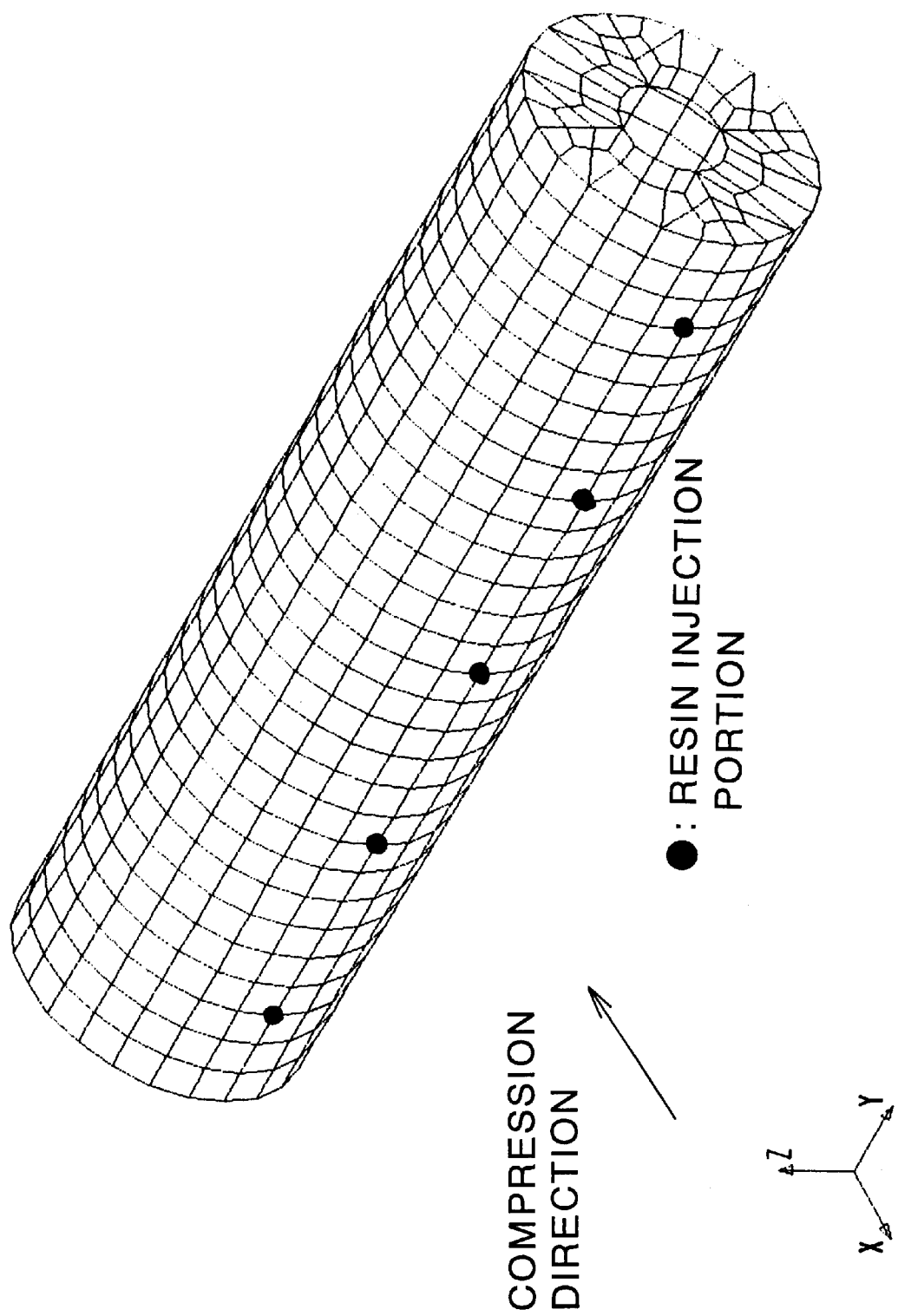

FIG. 170 shows form data for analysis, used for carrying out an injection/compression over-molding resin flow simulation in Example 22.

FIG. 171 shows a melt front history among the results of the injection/compression over-molding resin flow simulation in Example 22.

Figure 172:
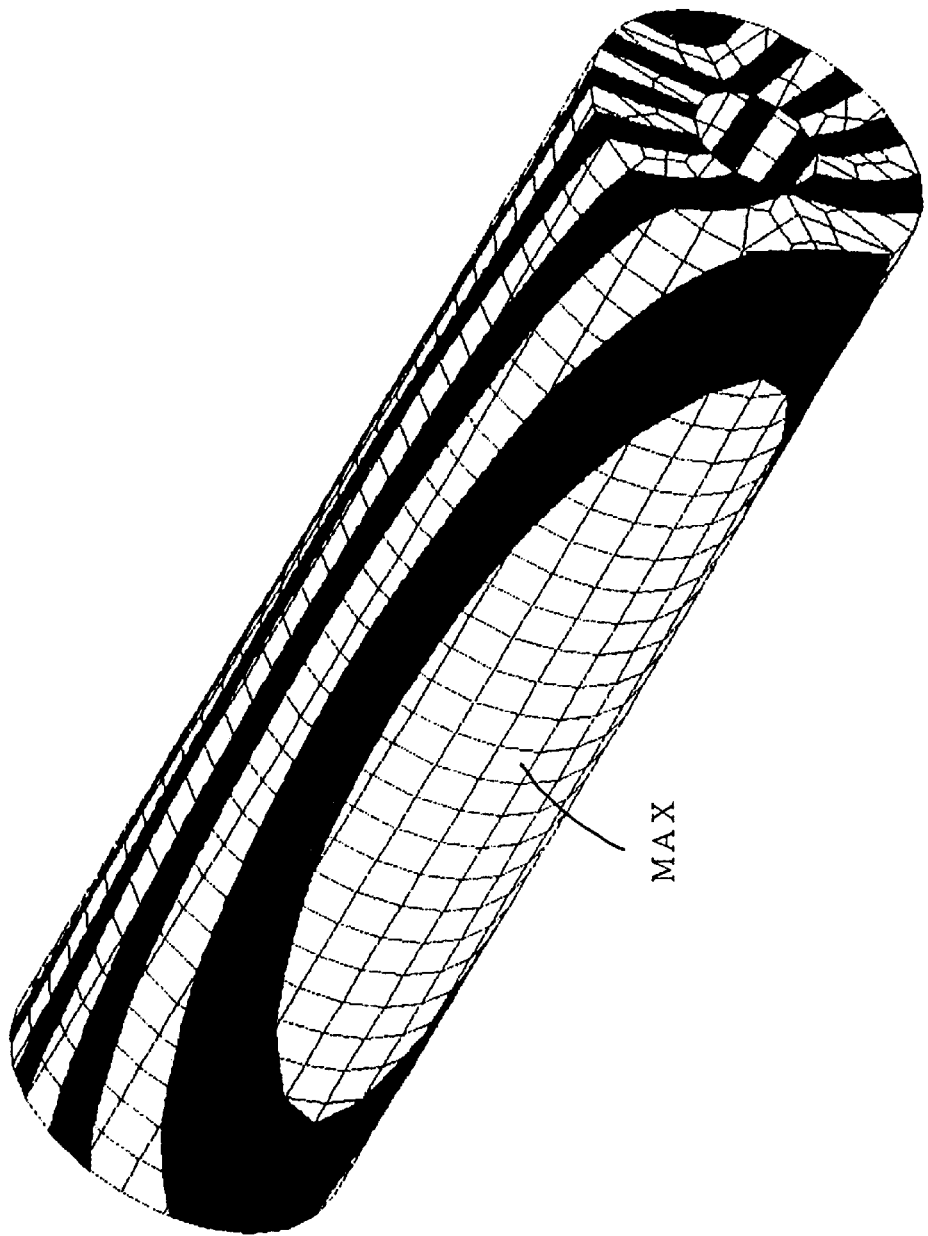

FIG. 172 shows a pressure distribution among the results of the injection/compression over-molding resin flow simulation in Example 22.

FIG. 173 shows a numerical analysis result of a stress distribution in a core, caused by the pressure exerted on the core by the flow of a molten resin in Example 22.

FIG. 174 shows a pressure distribution when a three-dimensional hollow molded article has a shell having a thickness of 2.0 mm, among the results of the injection/compression over-molding resin flow simulation in Example 22.

Figure 175:
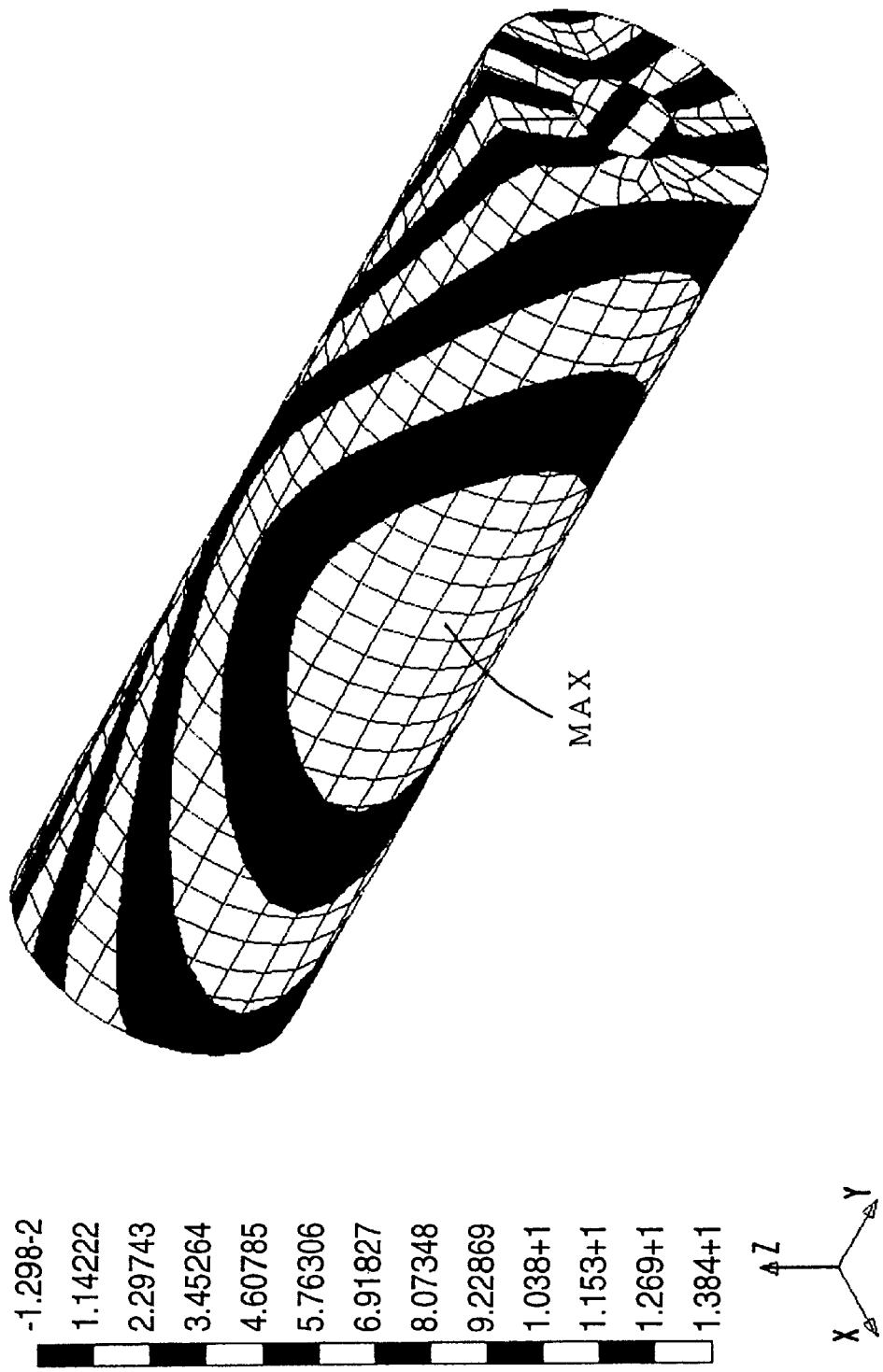

FIG. 175 shows a pressure distribution when a three-dimensional hollow molded article has a shell having a thickness of 3.0 mm, among the results of the injection/compression over-molding resin flow simulation in Example 22.

Figure 176:
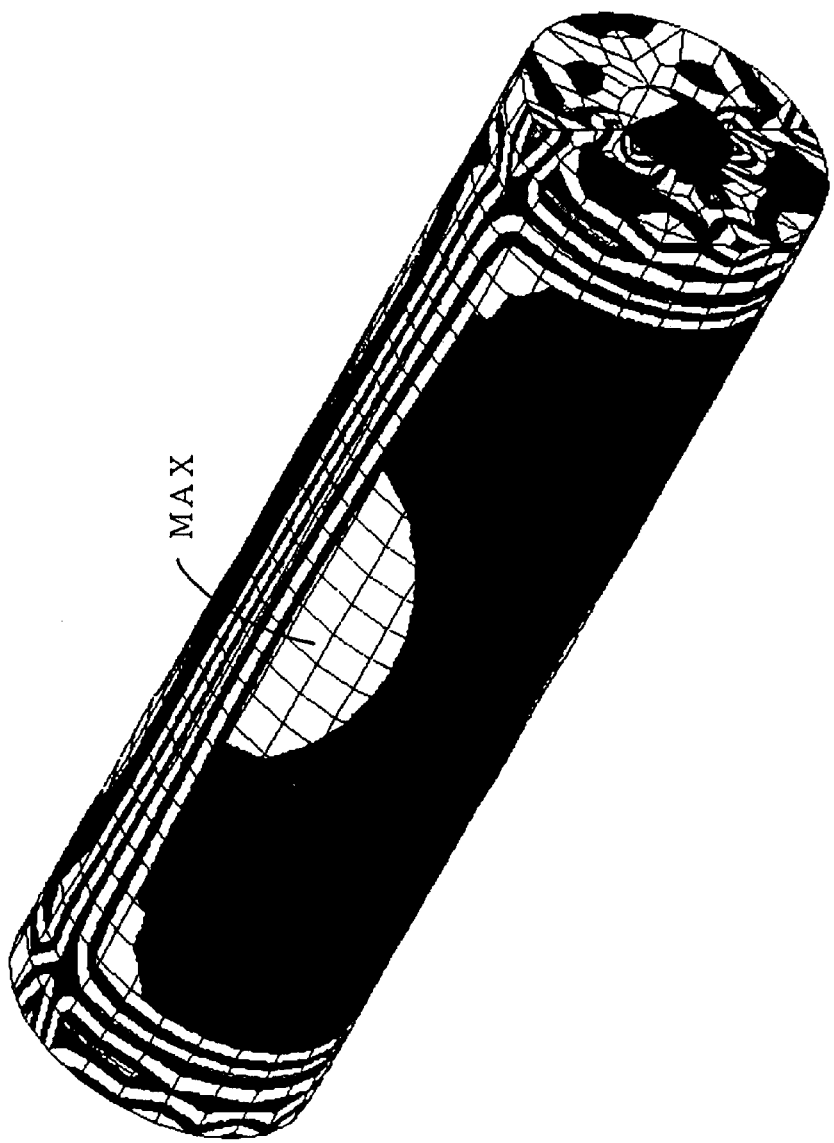

FIG. 176 shows a stress distribution when a three-dimensional hollow molded article has a shell having a thickness of 2.0 mm, among stress distributions caused by the pressure exerted on the cores by the flow of a molten resin, in Example 22.

Figure 177:
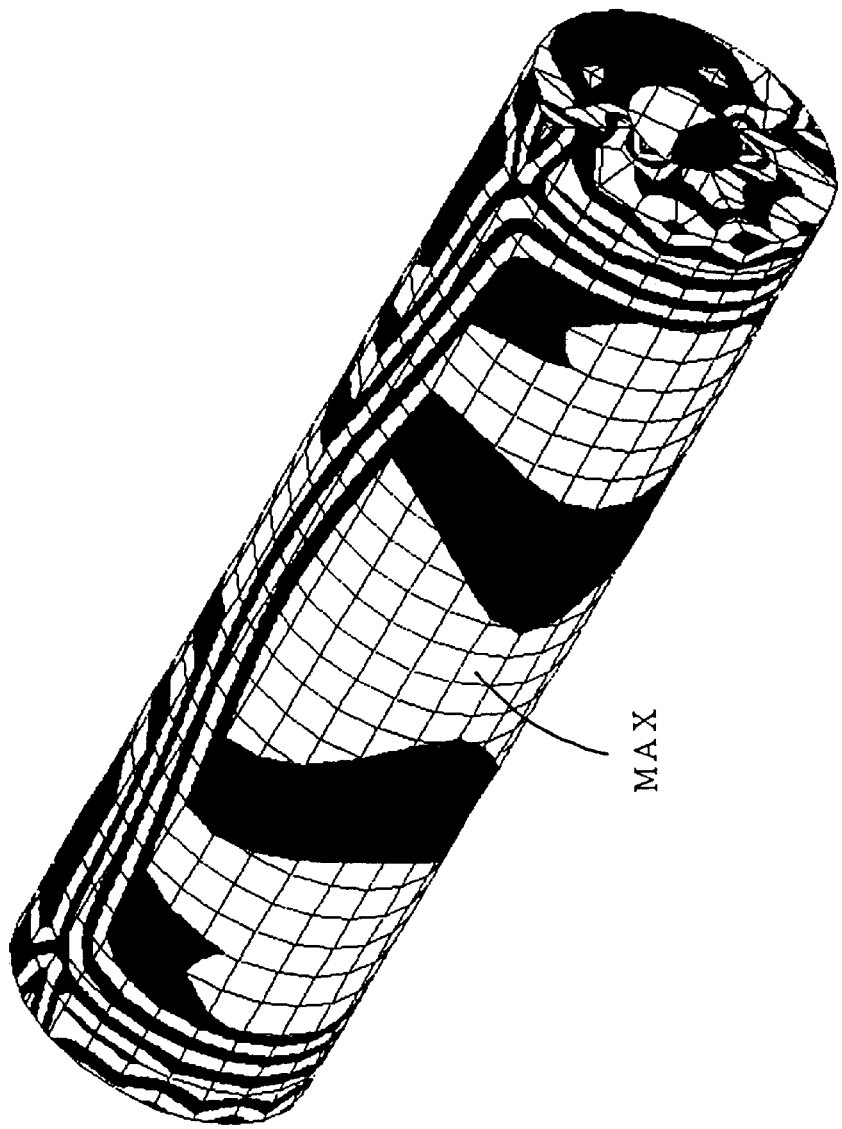

FIG. 177 shows a stress distribution when a three-dimensional hollow molded article has a shell having a thickness of 3.0 mm, among stress distributions caused by the pressure exerted on the cores by the flow of a molten resin, in Example 22.

Figure 178:
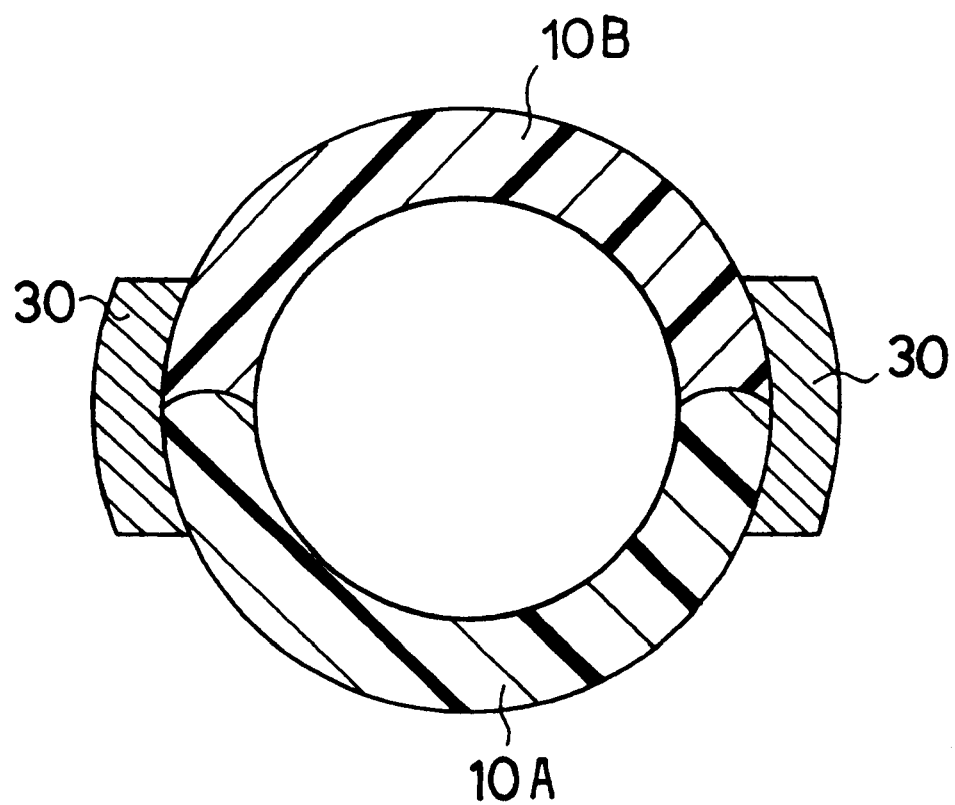

FIG. 178 is a schematic cross section of a three-dimensional hollow molded article.

Figure 179A:
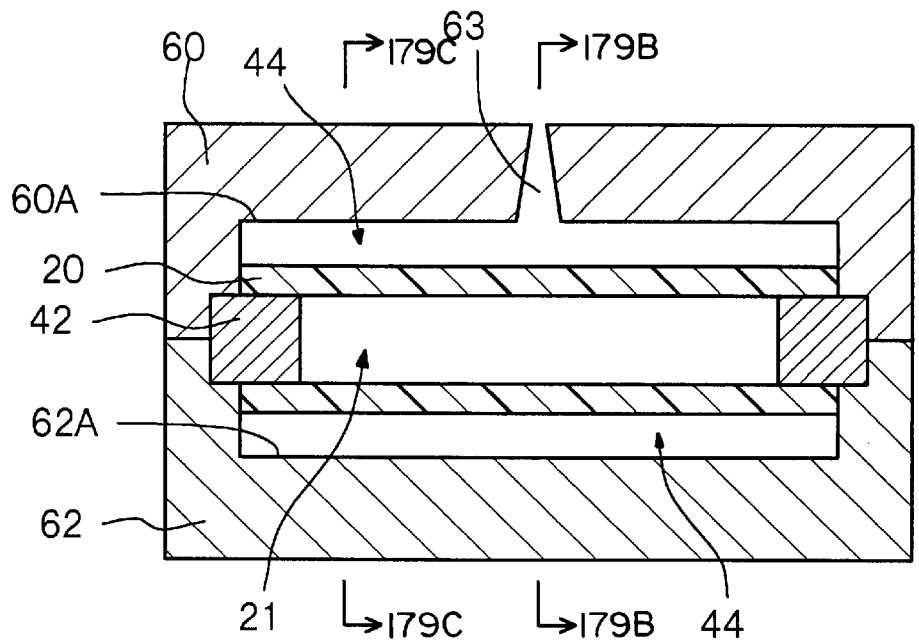
Figure 179B:
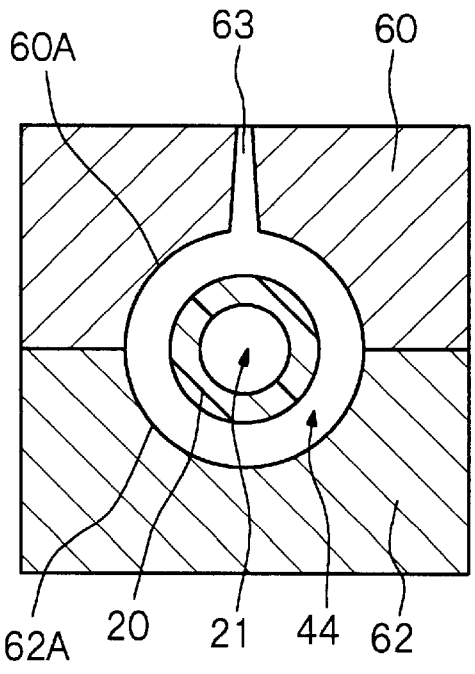
Figure 179C:
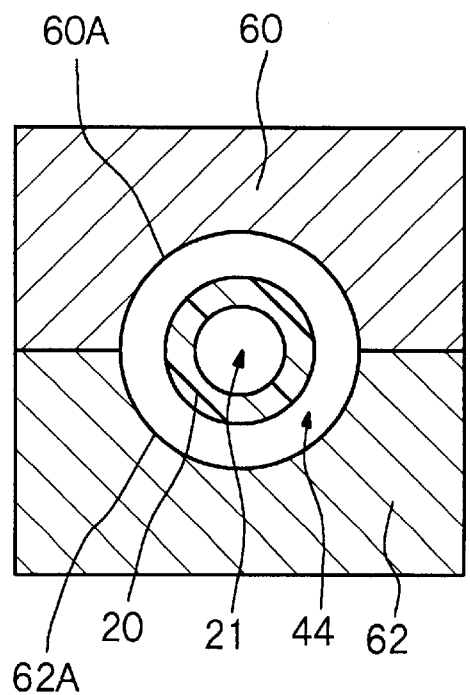

FIGS. 179A, 179B and 179C are schematic cross sections showing positions of resin injection portions, etc., in a conventional over-molding method.

DESCRIPTION OF THE PREFERRED EMBODIMENTS

EXAMPLE 1

Example 1 is concerned with the three-dimensional hollow molded article directed to a first aspect of the present invention, and an over-molding method therefor. In the three-dimensional hollow molded article in Example 1, that portion of a core which faces a resin injection portion provided in a mold is increased in thickness.

Figure 1A:
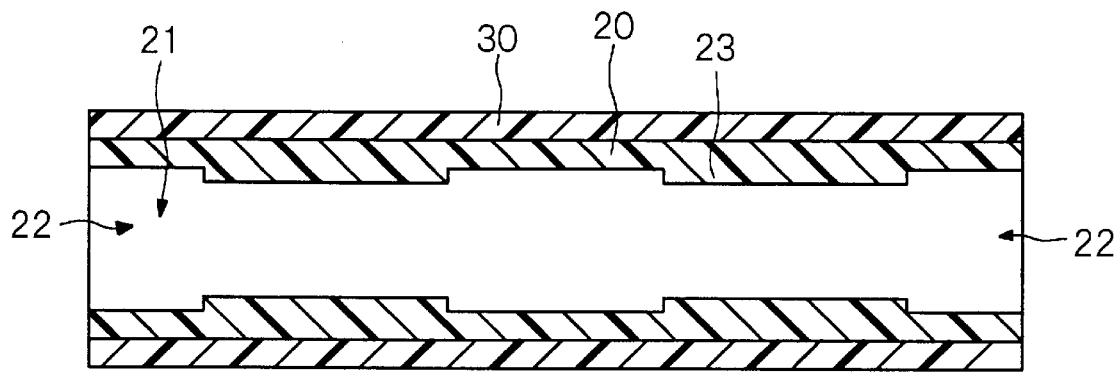
FIGS. 1A, 1B, 1C and 1D are schematic cross-sectional views of a three-dimensional hollow molded article and a core directed to the first aspect of the present invention.
Figure 1B:
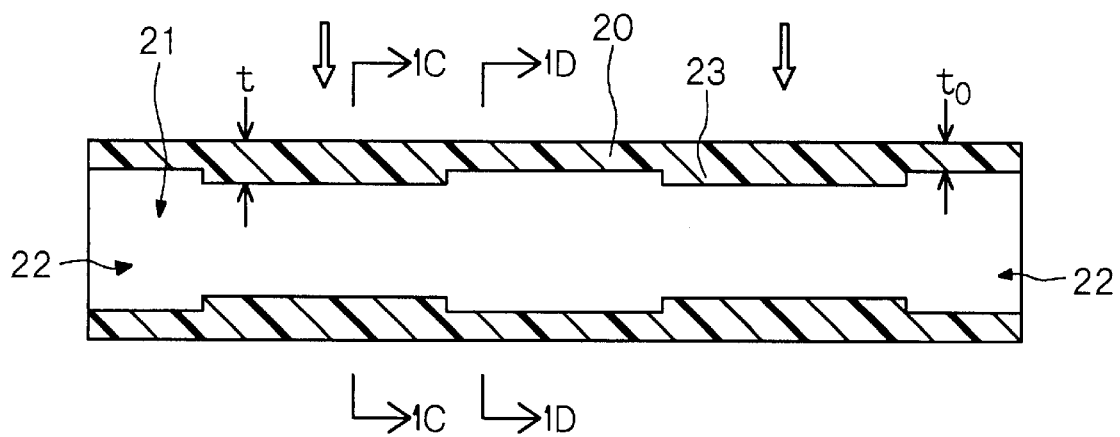
Figure 1C:
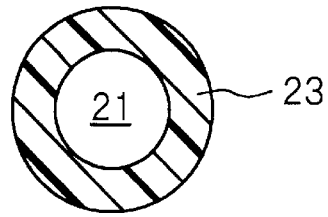
Figure 1D:
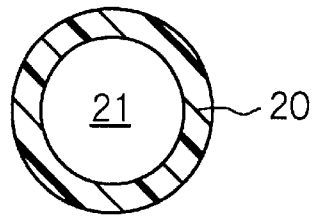

As shown in the schematic cross-sectional view of FIG. 1A, the three-dimensional hollow molded article in Example 1 has the form of a straight tube and comprises a core 20 and a covering member 30. The core 2D is formed of a resin and has a hollow portion 21. The covering member 30 is of a resin and covers at least part of the outer surface of the core 20 (the entire outer surface of the core 20 in Example 1). As shown in the schematic cross-sectional view of FIG. 1B, the hollow core 20 has the form of a straight tube having a length of 200 mm and an outer diameter of 22 mm (radius 11 mm). The core 20 has an inner diameter of 18 mm (radius of 9 mm) in a portion from one end to a position 25 mm distant from the end, an inner diameter of 16 mm (radius of 8 mm) in a portion from 25 to 75 mm, a diameter of 18 mm (radius of 9 mm) in a portion from 75 to 125 mm, an inner diameter of 16 mm (radius of 8 mm) in a portion from 125 to 175 mm and an inner diameter of 18 mm (radius 9 mm) in a portion from 175 to 200 mm (the other end). The covering member 30 has a constant thickness of 2.0 mm. Those portions of the core 20 which face resin injection portions are located in a position 50 mm distant from one end and a position 150 mm distant from the one end. FIG. 1C shows a cross-sectional view taken along a line 1C—1C in FIG. 1B, and FIG. 1D shows a cross section taken along a line 1D—1D in FIG. 1B. Numeral 22 indicates an opening portion provided in ends of the hollow portion 21.

When the thickness of each thickness-increased portion 23 of the core 20 which faces the resin injection portion is t, and when the thickness of other portion of the core 20 is $t_0$, $t=3$ mm, and $t_0=2$ mm. Each thickness-increased portion 23 is provided such that they go around the core 20 entirely. Those portions 23 of the core 20 which face the resin injection portions have the form of a cylinder. Each thickness-increased portion 23 is provided as part of an inner wall of the hollow portion 21, while they may be provided on an outer surface of the core 20. The core 20 is formed as an integrally molded single member prepared by an extrusion molding method. As a first resin material for the core 20, glass fiber-containing nylon 6 (polyamide resin, trade name "NOVAMID 1015G30" (glass fiber content 30% by weight) supplied by Mitsubishi Engineering-Plastics Corp.) was used. When nylon 6 is used as a resin material, NOVAMID 1015G30 is used.

The over-molding method for producing the three-dimensional hollow molded article in Example 1, directed to the first aspect of the present invention, will be explained with reference to FIGS. 2A, 2B, 3A and 3B hereinafter.

Figure 2A:
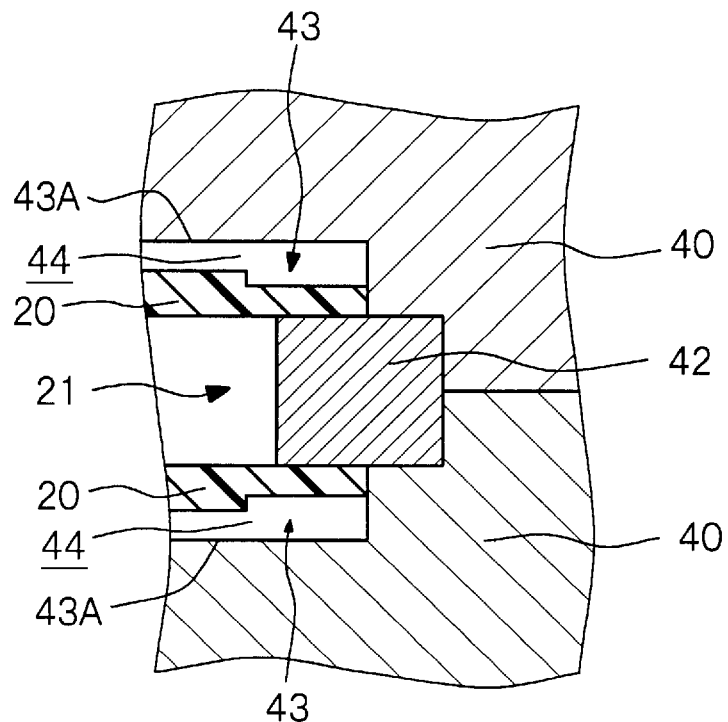
FIGS. 2A and 2B are partial cross-sectional views of a mold, a core, etc., showing a state of a core placed in a cavity of a mold in an over-molding method directed to the first aspect of the present invention.
Figure 2B:
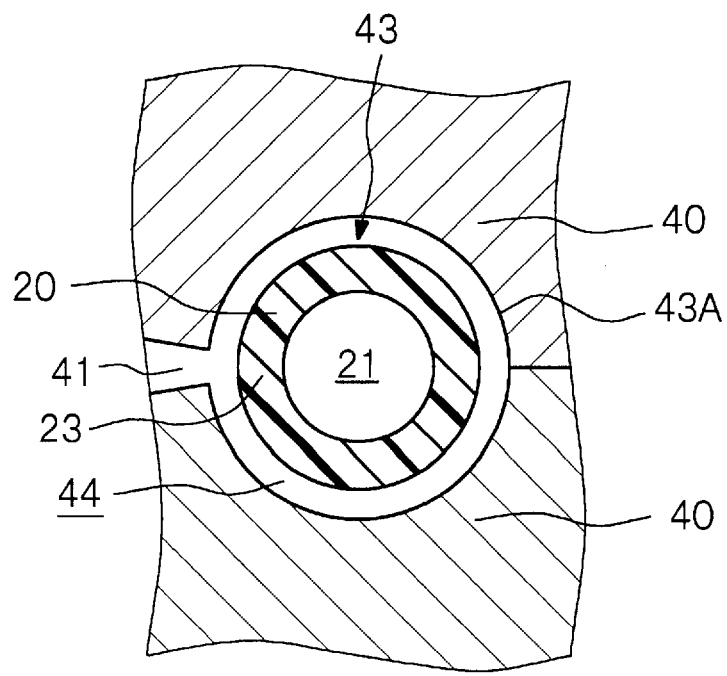

As shown in a partial schematic cross-sectional view of FIG. 2A, a support rod (supporting member) 42 formed e.g. of a metal was inserted in the opening portion 22 of the core 20 (end portion of the hollow portion 21), and the support rod 42 was attached to a predetermined position in a mold 40, so that the core 20 was placed in a cavity 43 of the mold 40. FIG. 2B is a partial schematic cross section showing the arrangement state of the cavity 43 and the core 20 near a resin injection portion 41 formed as a side gate and provided in the mold. In Example 1, a space 44 was formed such that it surrounded all the outer surface of the core 20. As shown in FIG. 2B, that portion 23 of the core 20 which faced the resin injection portion 41, and those portions near the portion 23 were increased in thickness. In Example 1, two resin injection portions were provided in the mold.

Figure 3A:
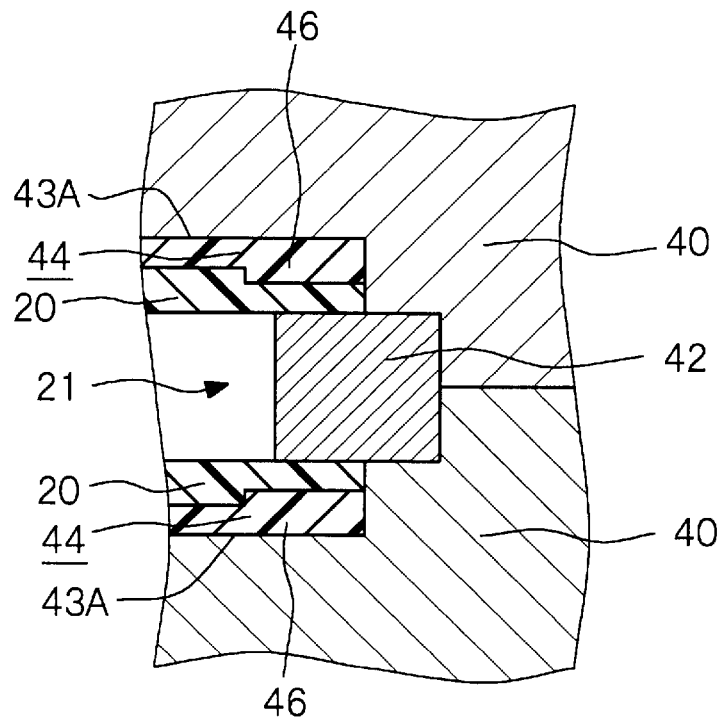
FIGS. 3A and 3B are partial cross-sectional views of a mold, a core, etc., showing a state of molten resin injected into the cavity of the mold in the over-molding method directed to the first aspect of the present invention.
Figure 3B:
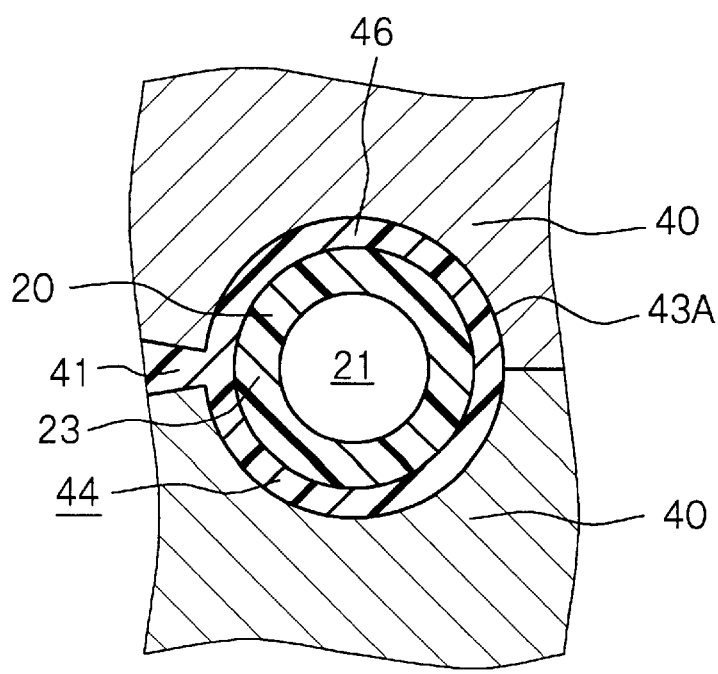

Then, as shown in schematic partial cross-sectional views of FIGS. 3A and 3B, a molten resin 46 was injected into the space 44 formed by the core 20 and a cavity wall 43A of the mold 40 through the two resin injection portions 41. The molten resin was injected in such a sufficient amount that the space 44 was fully filled with the molten resin at the time of completion of the injection of the molten resin. The injection conditions were as follows.

Resin: Nylon 66 (polyamide resin, trade name 25 NOVAMID 3021G30 (glass fiber content 30% by weight, supplied by Mitsubishi Engineering-Plastics Corp.)

Resin temperature: 295° C.

Resin injection pressure: 450 kgf/cm²-G

When nylon 66 is used as a resin material in Examples to be described later, NOVAMID 3021G30 is used.

Figure 4A:
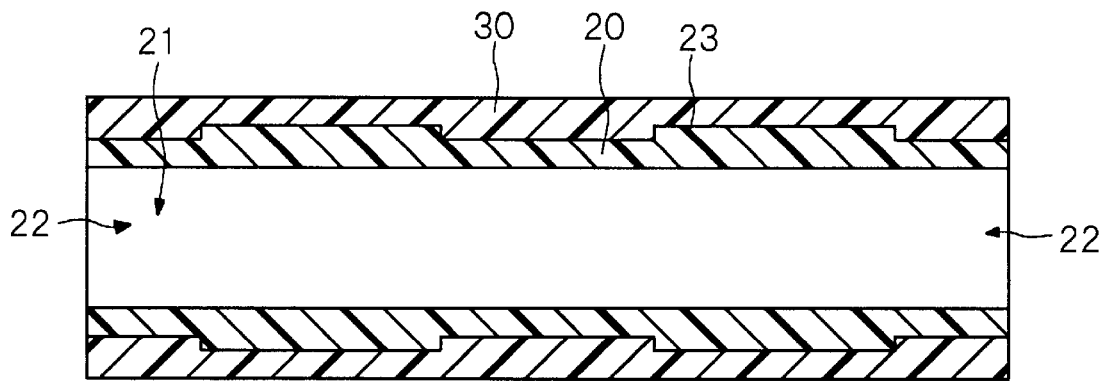
FIGS. 4A, 4B, 4C and 4D are schematic cross-sectional views and a schematic cross section of a core in one preferred embodiment of the three-dimensional hollow molded article directed to the first aspect of the present invention.
Figure 4B:
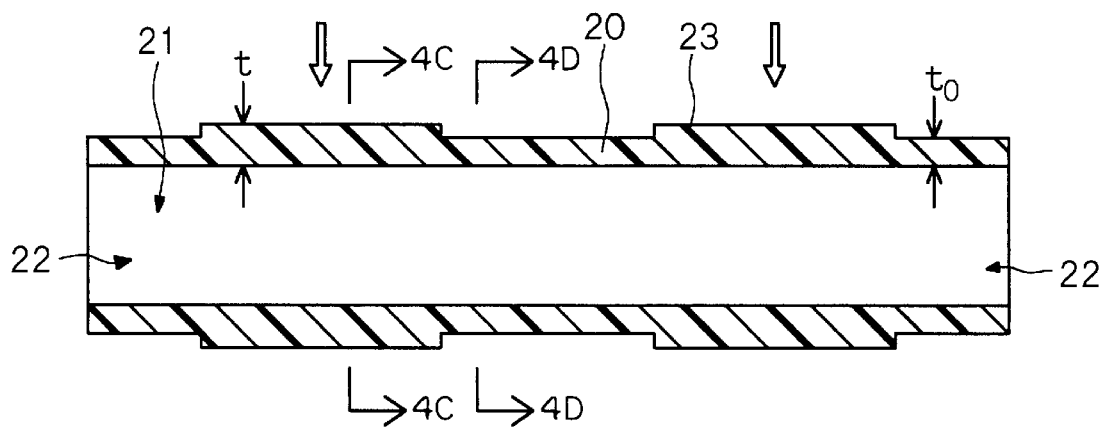
Figure 4C:
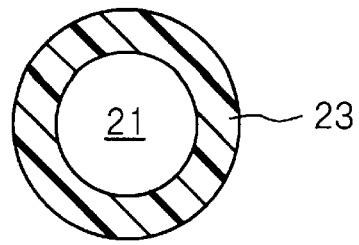
Figure 4D:
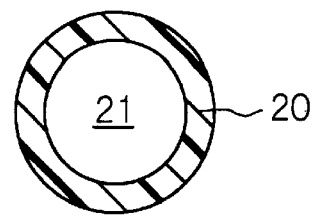

After the completion of injection of the molten resin 46 into the space 44 through the resin injection portions 41, the resin in the space 44 was cooled to solidness. Then, the injection molded article was taken out of the mold. The injection molded article was a three-dimensional hollow molded article in which all of the surface of the core 20 was covered with the covering member 30 (see FIG. 1A). The covering member 30 had a constant thickness of 2.0 mm. The thickness of a covering member, or the thickness of a resin covering the outer surface of a core (to be described later), refers to a thickness of a covering formed on the outer surface of the core. In some cases, the thickness of the covering member 30 which covers the thickness-increased portion 23 of the core may be different from the thickness of the covering member 30 which covers a portion other than the thickness-increased portion 23. This case is shown in schematic cross-sectional views in FIGS. 4A, 4B, 4C and a schematic cross section in FIG. 4D.

Since that portion 23 of the core 20 which faced the resin injection portion 41 was increased in thickness, the portion 23 had high rigidity. As a result, when a pressure caused by the injection of the molten resin is exerted on the core, the deformation of that portion 23 of the core 20 which faces the resin injection portion (and the three-dimensional hollow molded article) can be prevented, and the resultant three-dimensional hollow molded article is excellent.

COMPARATIVE EXAMPLE 1

A core was prepared in the same manner as in Example 1 except that those portions of the core which faced to the resin injection portions had a thickness of 2 mm, the same thickness as that of the other portion, and a three-dimensional hollow molded article was produced in the same manner as in Example 1. As a result, those portions of the core which faced the resin injection portions were deformed, and no good three-dimensional hollow molded article was obtained.

EXAMPLE 2

Figure 5A:
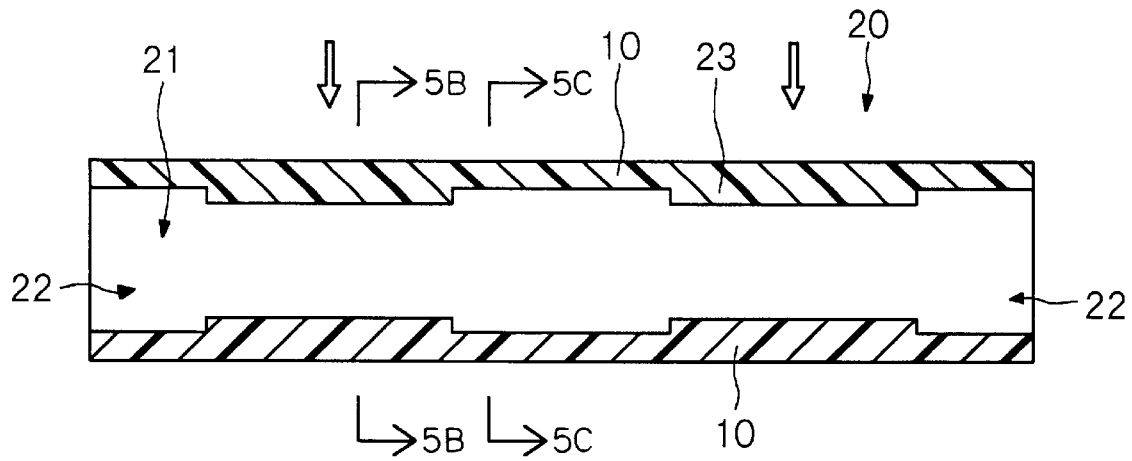
FIGS. 5A, 5B, 5C and 5D are a schematic cross-sectional view and schematic cross sections of a core and a core member in another preferred embodiment of the three-dimensional hollow molded article directed to the first aspect of the present invention.
Figure 5B:
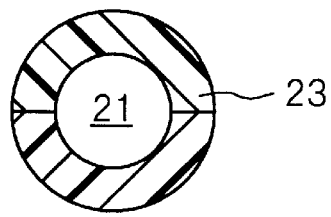
Figure 5C:
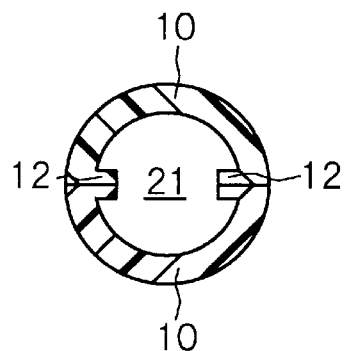
Figure 5D:
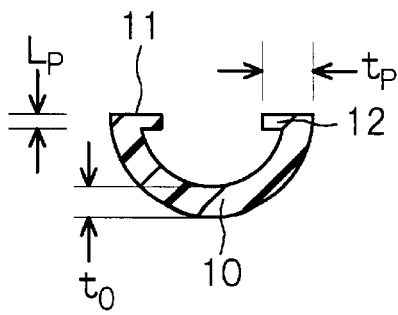

Example 2 is a variant of Example 1. In Example 1, the core 20 was formed of an integrally molded single member, while a core 20 in Example 2 was prepared by forming two split core members 10 of a resin and bonding them together. The two core members 10 had symmetrical forms and structures, and had forms obtained by dividing the core 20 along the axial line of the core 20. FIG. 5A shows a schematic cross-sectional view of the core 20 in Example 2. FIGS. 5B and 5C show a schematic cross-sectional view and a schematic cross section taken along lines 5B—5B and 5C—5C in FIG. 5A. FIG. 5D shows a schematic cross section of one core member 10 taken along the line 5C—5C in FIG. 5A. Numeral 11 indicates a bonding surface of the core member 10 which was to be attached to the counterpart of the other core member 10. The two core members 10 were attached to each other, one bonding surface 11 to the other bonding surface 11, with an adhesive.

In Example 1, those portions 23 of the core 20 which faced the resin injection portions 41 were thickness-increased, while in Example 2, the bonding portions of the two core members and those portions near to the bonding portions (to be generally referred to as "bonding portion 12" hereinafter) were thickness-increased in addition to portions 23. The core 20 formed of the two core members 10 had a tube form. The core in Example 2 had the same size as that in Example 1. The thickness-increased bonding portion 12 of the core member 10 had a thickness $t_p$ of 3.0 mm. The length $L_p$ of the bonding portion 12 in the circumferential direction was $L_p=(\pi/12)r_0$. The $r_0$ was 9.5 mm. The thickness $t_0$ of that portion of the core 20 other than the bonding portion 12 and the above portions 23 was 2.0 mm. Except for these points, the three-dimensional hollow molded article and the over-molding method in Example 2 were the same as those in Example 1, and the detailed description thereof is therefore omitted.

EXAMPLE 3

Figure 6A:
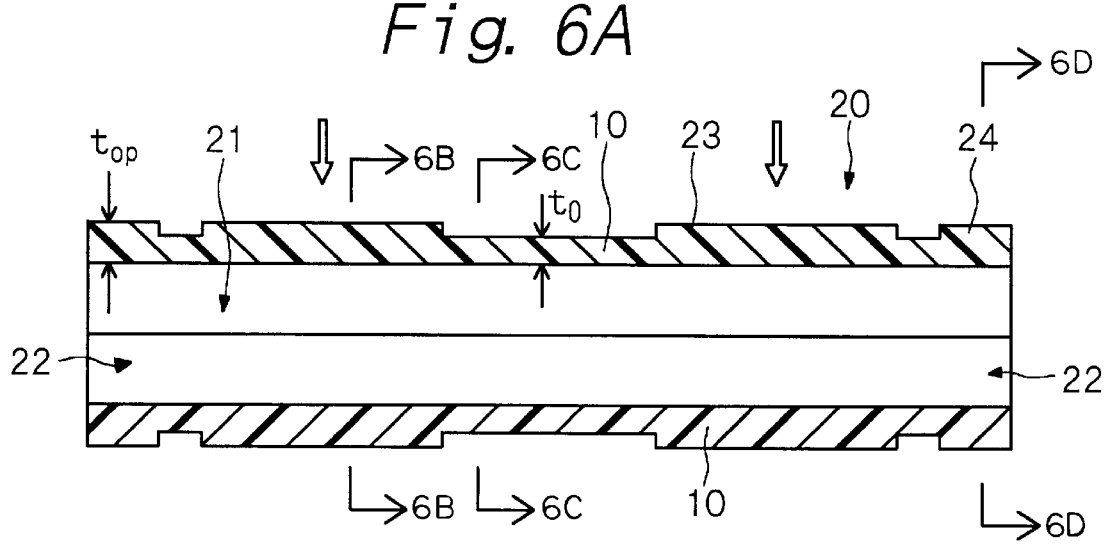
FIGS. 6A, 6B, 6C and 6D are a schematic cross-sectional view and schematic cross sections of a core and a core member in another preferred embodiment of the three-dimensional hollow molded article directed to the first aspect of the present invention.
Figure 6B:
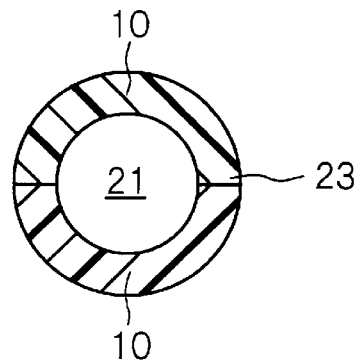
Figure 6C:
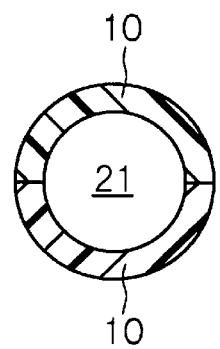
Figure 6D:
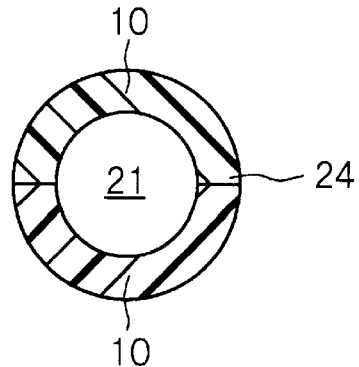

Example 3 is also a variant of Example 1. Example 3 used a core 20 having an opening portion 22, and the portion 24 of the core 20 in the vicinity of the opening portion 22 was thickness-increased. The portion 24 had a thickness $t_{op}$ of 3 mm. The portion 24 had a width (length in the axial direction of the core) of 5 mm. In Example 3, the core 20 was also prepared by preparing two split core members 10 of a resin and bonding them. FIG. 6A shows a schematic cross-sectional view of the core 20. FIGS. 6B, 6C and 6D show schematic cross-sectional views and a schematic cross section taken along lines 6B—6B, 6C—6C and 6D—6D in FIG. 6A. Except for these points, the three-dimensional hollow molded article and the over-molding method in Example 3 were the same as those in Example 1, and the detailed description thereof is therefore omitted. In Example 3, those thickness-increased portions 23 of the core 20 which faced the resin injection portions 41 were provided at the outer surface of the core 20.

EXAMPLE 4

Figure 7A:
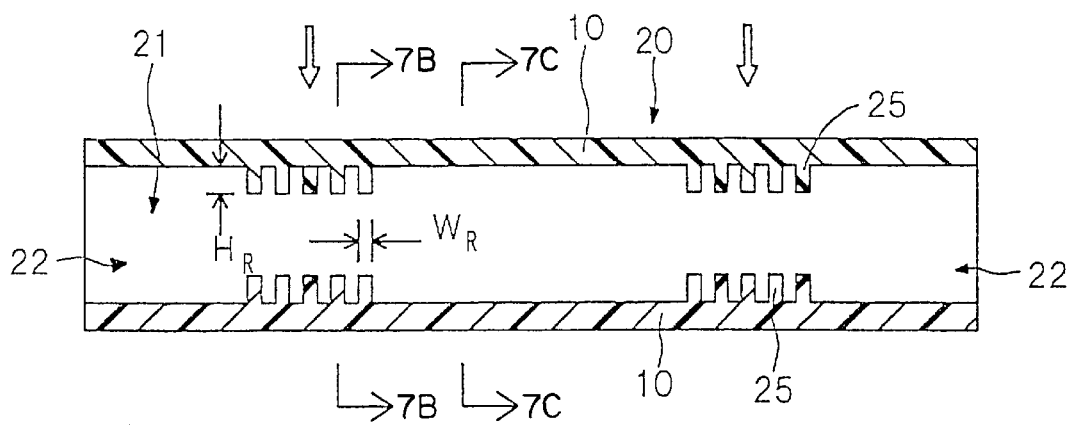
FIGS. 7A, 7B, and 7C are a schematic cross-sectional view and schematic cross sections of a core and a core member in another preferred embodiment of the three-dimensional hollow molded article directed to the first aspect of the present invention.
Figure 7B:
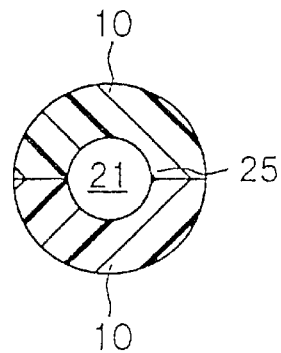
Figure 7C:
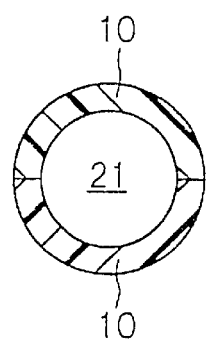

In the three-dimensional hollow molded article in Example 4, the thickness-increased portion of a core which faces the resin injection portion has the form of a rib. FIG. 7A shows a schematic cross-sectional view of the core 20. FIGS. 7B and 7C show a schematic cross-sectional view and a schematic cross section taken along lines 7B—7B and 7C—7C in FIG. 7A. In Example 4, the core 20 was also prepared by forming two split core members 10 of a resin and bonding them. Each rib 25 had a height $H_R$ of 1 mm and a width $W_R$ of 2 mm. Each rib 25 was provided along the entire circumference of a hollow portion 21 of the core 20. The number of the ribs 25 shall not be limited to five, but the ribs 25 may be provided as required. Except for these points, the three-dimensional hollow molded article and the over-molding method in Example 4 were the same as those in Example 1, and the detailed description thereof is omitted. The ribs 25 were provided in the hollow portion of the core 20, while they may be provided on the outer surface of the core.

EXAMPLE 5

Example 5 is concerned with a three-dimensional hollow molded article directed to a second aspect of the present invention and an over-molding method directed to the second aspect of the present invention. In the three-dimensional hollow molded article in Example 5, that portion of the three-dimensional hollow molded article which faces the resin injection portion is formed of a covering member alone. Further, in the over-molding method in Example 5, the core and the resin injection portion are arranged in a mold such that the core is absent or is not present in that region of the cavity of the mold which faces the resin injection portion.

Figure 8A:
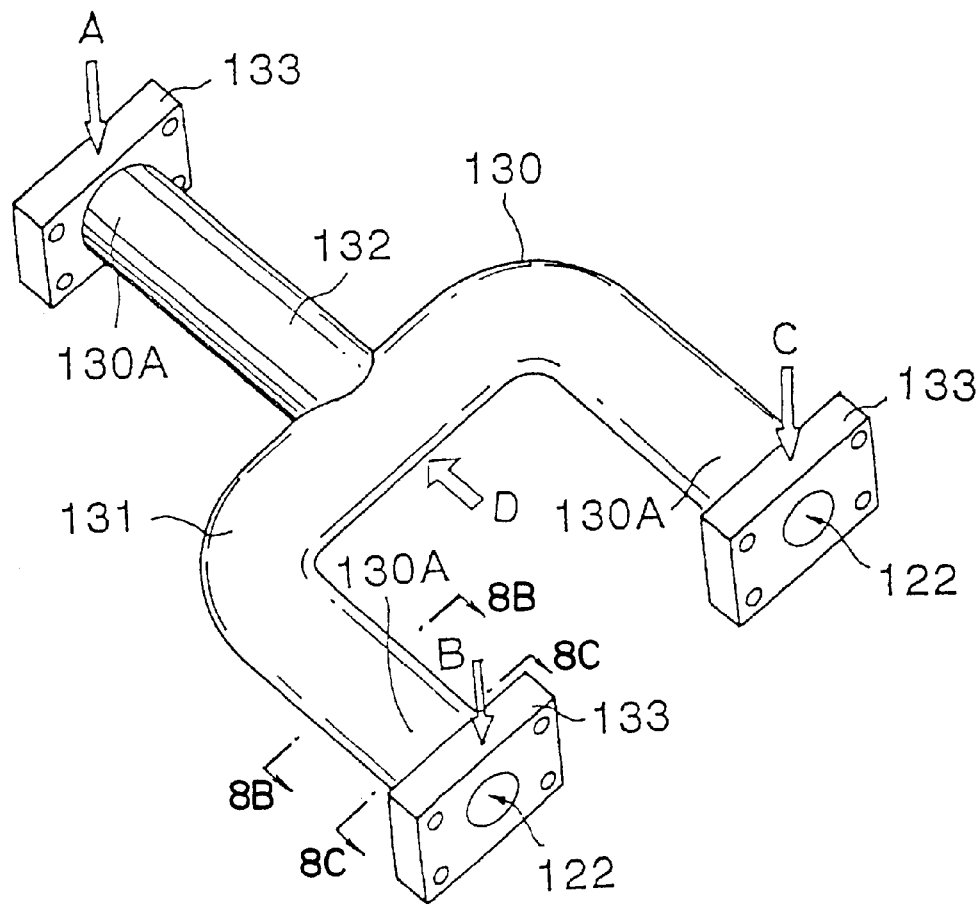
FIGS. 8A, 8B and 8C are a schematic perspective view and schematic cross sections of a three-dimensional hollow molded article directed to a second aspect of the present invention.
Figure 8B:
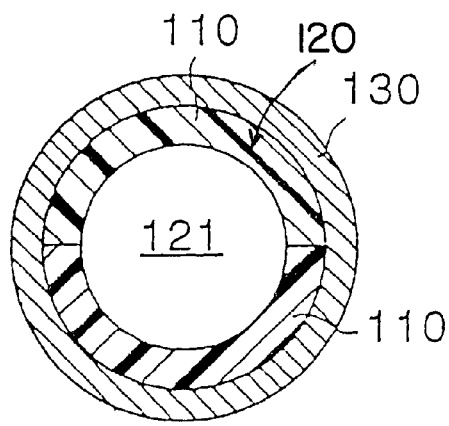
Figure 8C:
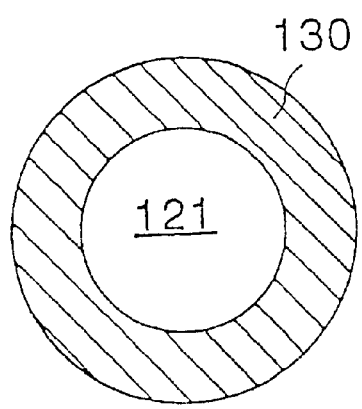

The three-dimensional hollow molded article in Example 5 is an air duct. FIG. 8A shows a schematic perspective view of the three-dimensional hollow molded article in Example 5. FIG. 8B shows a schematic cross section taken along a line 8B—8B in FIG. 8A. FIG. 8C shows a schematic cross section taken along a line 8C—8C in FIG. 8A. The three-dimensional hollow molded article comprises a core 120 and a covering member 130. The core 120 is formed of a resin and has a hollow portion 121. The covering member 130 is formed of a resin and covers at least part of the outer surface of the core 120 (in Example 5, the outer surface of the core 120 was entirely covered with the covering member 130). Further, that portion of the three-dimensional hollow molded article which faces the resin injection portion (flange portions 133 in Example 5) is formed of the covering member alone.

Figure 9A:
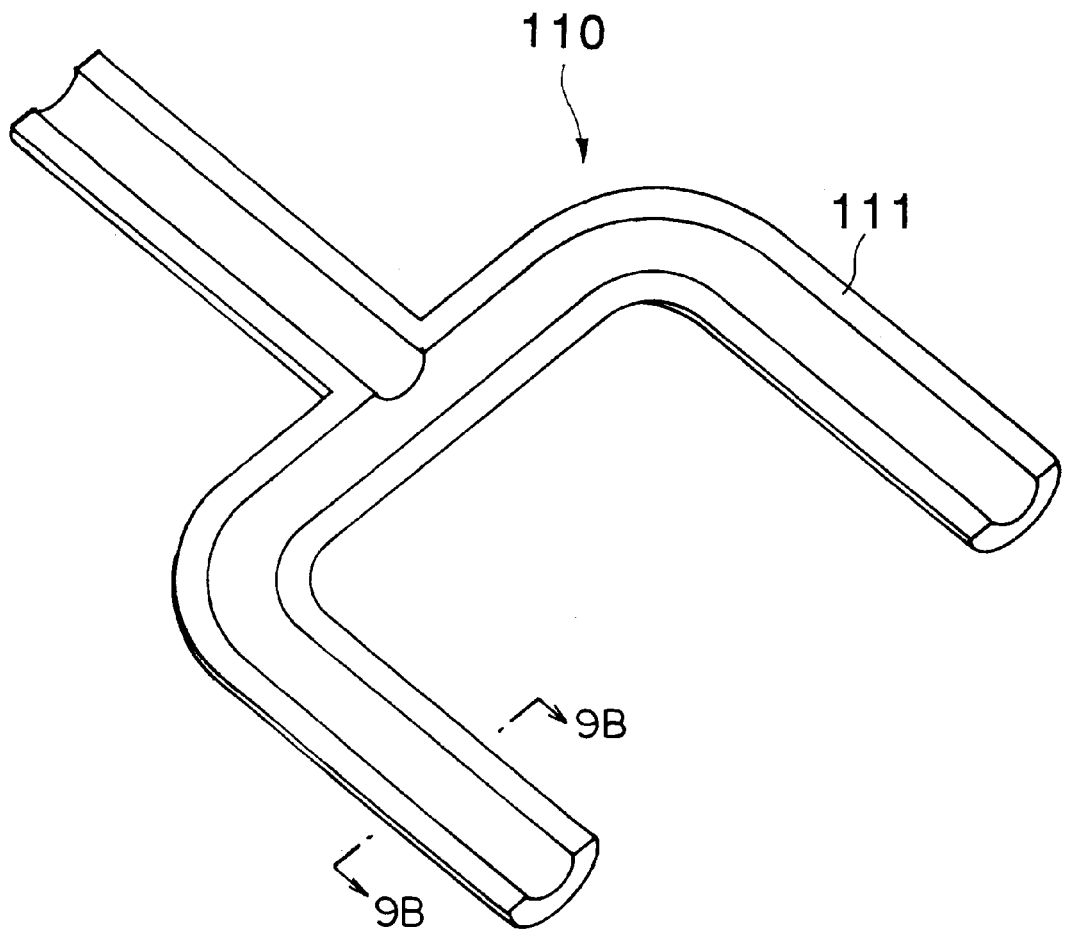
FIGS. 9A and 9B are a schematic perspective view and a schematic cross section of a core for a three-dimensional hollow molded article directed to the second aspect of the present invention.
Figure 9B:
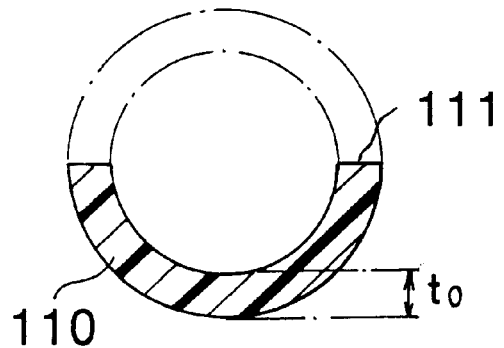
Figure 10A:
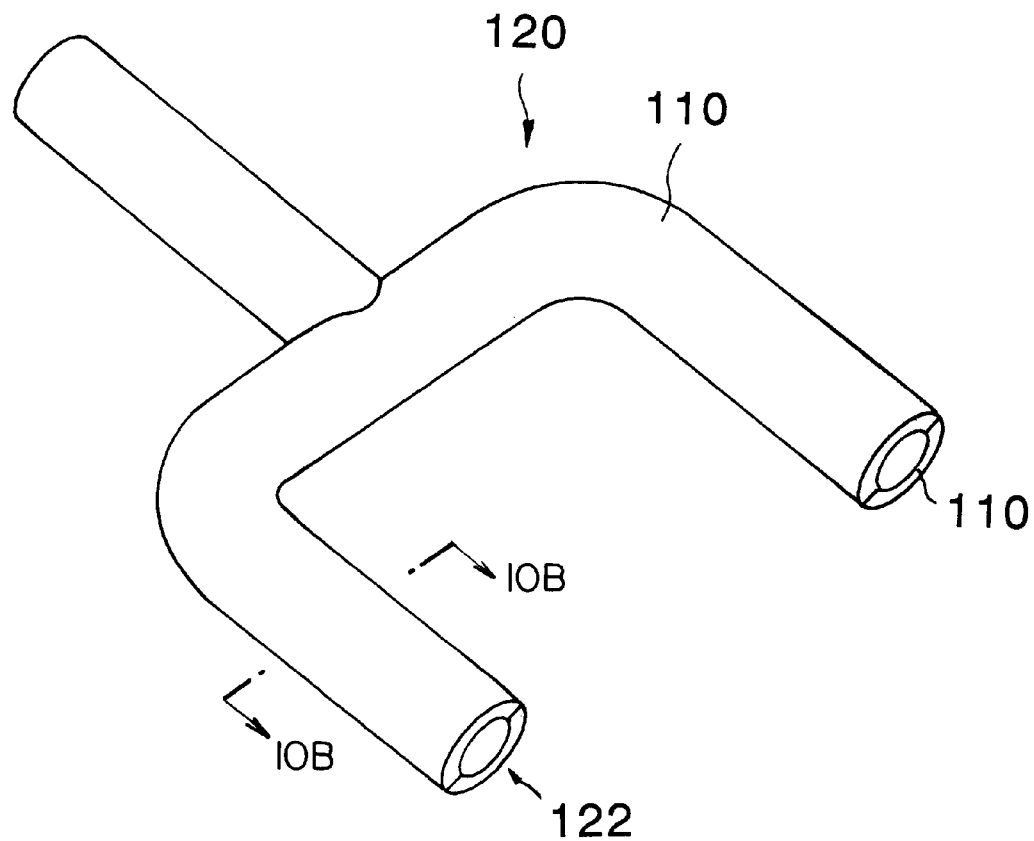
FIGS. 10A and 10B are a schematic perspective view and a schematic cross section of a core for a three-dimensional hollow molded article directed to the second aspect of the present invention.
Figure 10B:
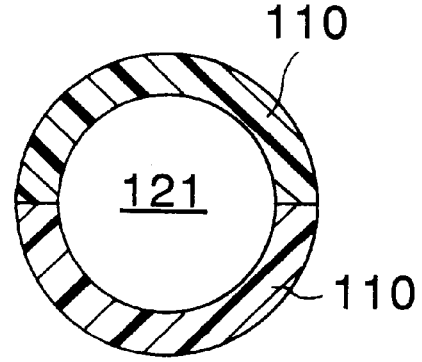

FIG. 9A shows a schematic perspective view of a core member 110 which is preformed in a split state. FIG. 9B shows a schematic cross section taken along a line 9B—9B in FIG. 9A. In Example 5, the two core members 110 had symmetrical forms and structures Numeral 111 indicates a bonding surface. Each core member 110 had a thickness $t_0$ of 2.0 mm. The core 120 was prepared by bonding the two core members 110 shown in FIG. 9A (see FIG. 10A). The core members 110 were bonded to each other with an adhesive. FIG. 10B shows a schematic cross section taken along a line 10B—10B in FIG. 10A.

As shown in FIG. 8A, the three-dimensional hollow molded article in Example 5 is constituted of a "U" letter-shaped portion 131 and a straight portion 132 extending from the bottom portion of the U letter-shaped portion 131. The U letter-shaped portion 131 and the straight portion 132 are provided with a communicating hollow portion 121, through which a fluid can flow. The hollow portion 121 formed in the core 120 is provided with opening portions 122. The opening portions 122 are positioned in both ends of the U letter-shaped portion 131 and one end of the straight portion 132. The portion of the covering member 130 outside each opening portion 122 is integrally formed with a flange portion 133.

Each of portions indicated by arrows A, B and C in FIG. 8A is that portion of the three-dimensional hollow molded article which faces the resin injection portion formed of a pin gate provided in a mold. That is, those portions (corresponding to flange portions 133) of the three-dimensional hollow molded article which exactly face the resin injection portions, and nearby portions 130A (corresponding to the vicinities of both ends of the U letter-shaped portion 131 and one end of the straight portion 132, see FIG. 8C) are formed of the covering member 130 alone. In Example 5, three resin injection portions are provided, and the axial line of each resin injection portion crosses at right angles with the extension lines of the axial lines of the core.

The over-molding method for producing the three-dimensional hollow molded article in Example 5 will be explained with reference to FIGS. 11A and 11B hereinafter.

The core members 110 were formed by injection molding nylon 6 containing a glass fiber. The two core members 110 were bonded to each other, bonding surface 111 to bonding surface 111, with an adhesive.

Figure 11A:
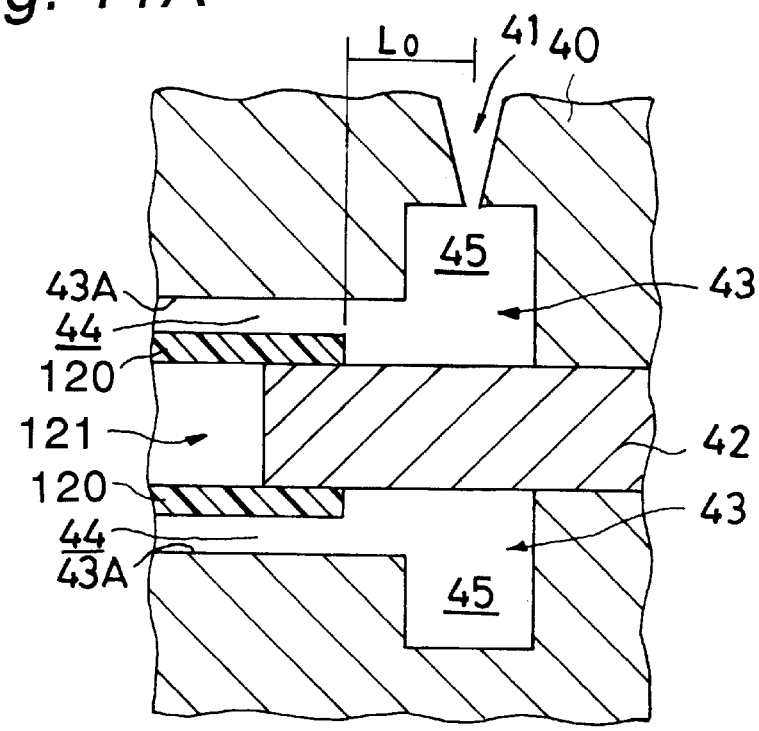
FIGS. 11A and 11B are partial cross-sectional views of a mold, a core, etc., showing a state of a core placed in a cavity of a mold and a state of molten resin injected into the cavity in the over-molding method directed to the second aspect of the present invention.

Each support rod was inserted in the corresponding opening portion 122 of the core 120, and three support rods (supporting members) 42 formed of a metal were attached in the mold 40 as shown in the schematic partial cross-sectional view of FIG. 11A. The core 120 was placed in a cavity 43 of a mold 40, for example, in the same manner as in Example 1. One of these support rods 42 is shown in FIGS. 11A and 11B. A space 44 was formed such that it entirely surrounded the outer surface of the core 120. Further, a space 45 was also formed for forming each flange portion 133.

The core 120 and the resin injection portion 41 were arranged such that the core 120 was absent or was not present in that region of the cavity 43 which faced the resin injection portion 41. That is, the core 120 and the resin injection portion 41 were arranged in the mold 40 such that those portions 130A and 130 of the three-dimensional hollow molded article which faced the resin injection portion 41 were formed of the covering member 130 alone. Specifically, the core 120 was absent, but the support rod 42 alone was present on a line extending from the axial line of the resin injection portion 41. The resin injection portion 41 communicates with the space 45 in which the flange portion 133 was to be formed.

The distance $L_0$ from the resin injection portion to the nearest end of the core 120 was 25 mm.

Figure 11B:
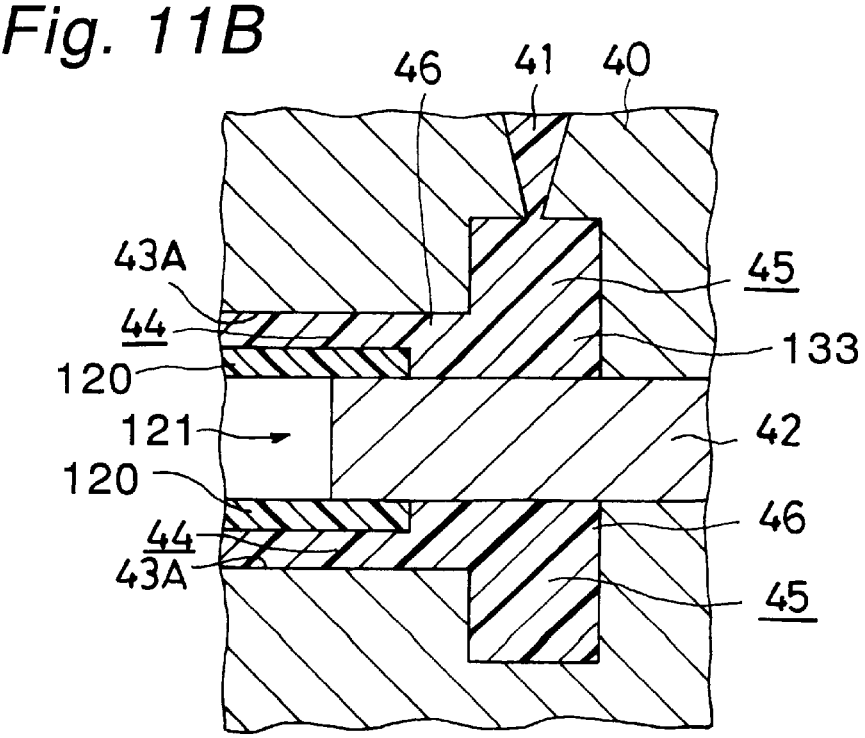

Then, as shown in the schematic partial cross-sectional view of FIG. 11B, a molten resin 46 was simultaneously injected into the space 44 and the space 45 formed by the core 120 and a cavity wall 43A of the mold through the three resin injection portions 41. The—molten resin was injected in such an amount that the space 44 and the space 45 were completely filled at the time of completion of the injection. The injection conditions were as follows.

Resin: Nylon 66
Resin temperature: 305° C.
Injection pressure: 360 kgf/cm$^2$-G

After the injection of the molten resin 46 into the space 44 and the space 45 was completed, the resin in the space 44 and the space 45 was cooled to solidness. Then, the injection molded article was taken out of the mold to obtain a three-dimensional hollow molded article in which the outer surface of the core 120 (see FIGS. 10A and 10B) was entirely covered with a covering member 130 of the resin (see FIGS. 8A to 8C). The covering member 130 had a thickness of 3.0 mm. Those portions of the three-dimensional hollow molded article which were formed of the covering member alone and faced the resin injection portions retained marks of the resin injection portions. The distance from the center of the mark to the nearest end of the core was 25 mm.

Those portions of the three-dimensional hollow molded article which faced the resin injection portions were formed of the covering member alone. As a result, the pressure caused on the core 120 by the injection of the molten resin in the over-molding was decreased, and the deformation of the core (and the three-dimensional hollow molded article) was prevented, so that the mold article was excellent.

COMPARATIVE EXAMPLE 2

For producing the three-dimensional hollow molded article in Example 5, the resin injection portions were disposed in those portions of the mold which corresponded to the portions indicated by arrows A, B and C in FIG. 8A. On the other hand, in Comparative Example 2, one resin injection portion formed of a side gate was arranged in that portion of a mold which corresponded to the portion indicated by an arrow D in FIG. 8A. The injection pressure in Comparative Example 2 was 450 kgf/cm$^2$-G. Except for these points, a core was prepared, and a three-dimensional hollow molded article was produced in the same manner as in Example 5. As a result, that portion of the three-dimensional hollow molded article which faced the resin injection portion was deformed, and resin leakage into the hollow portion of the core occurred in a portion where the core members were bonded. No good product was obtained.

EXAMPLE 6

Example 6 is concerned with the over-molding method directed to a third aspect of the present invention. A supporting member is arranged within a hollow portion which is located in that portion of a core which faces a resin injection portion. The over-molding method in Example 6 will be explained with reference to FIGS. 12A, 12B and 12C hereinafter.

A core 120 formed of a resin and having a hollow portion 121 is prepared in the same manner as in Example 5, to which the form of the core 120 shall not be limited. The hollow portion 121 has opening portions 122.

Figure 12A:
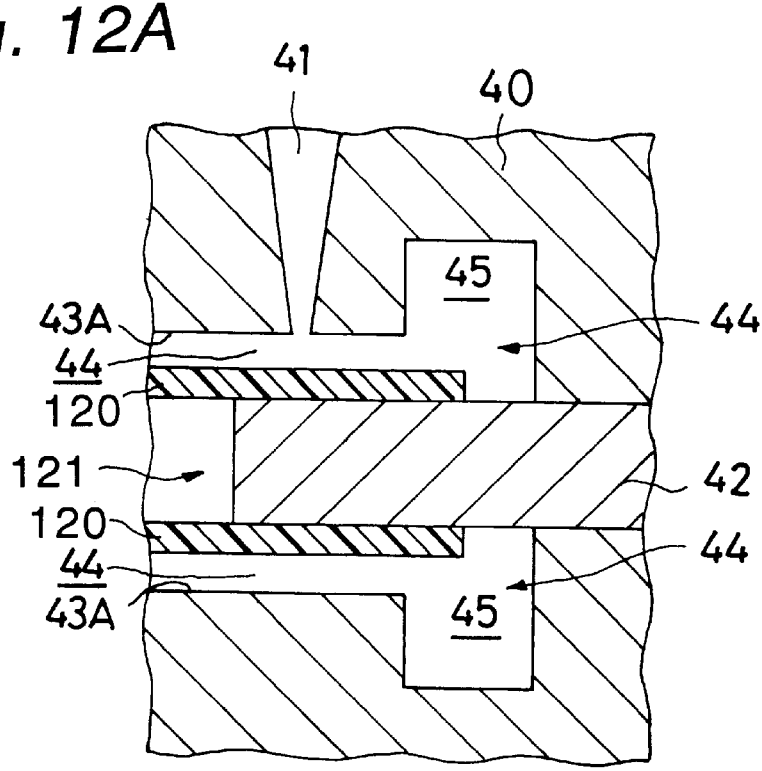
FIGS. 12A and 12B are partial cross-sectional views of a mold, a core, etc. showing a state of a core placed in a cavity of a mold and a state of molten resin injected into the cavity in the over-molding method directed to a third aspect of the present invention.
Figure 12B:
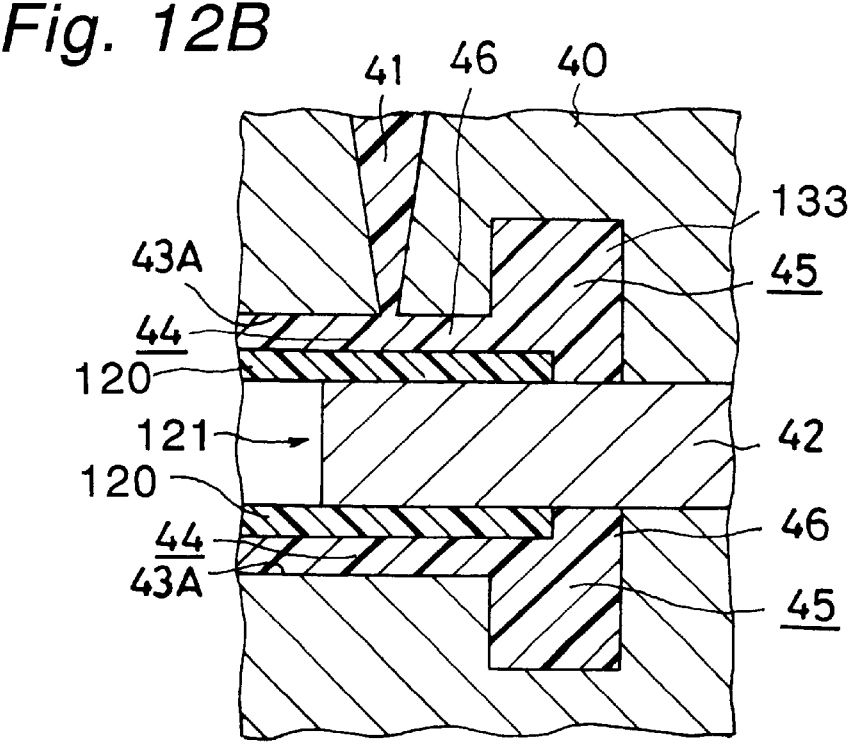

As shown in a schematic partial cross-sectional view of FIG. 12A, the opening portion 122 of the core 120 was fit to a supporting member 42 provided to a mold. That is, for example, a support rod (supporting member) 42 formed of metal was inserted into the opening portion 122 of the core 120 (end portion of the hollow portion 121), and the support rod 42 was attached to a predetermined position of the mold, whereby the core 120 was fit in a cavity 43 of the mold 40. Actually, three support rods 42 were provided to the mold 40 and inserted into the corresponding opening portions 122, and FIGS. 12A and 12B show one support rod 42 inserted into the corresponding opening portion 122. A space 44 was formed such that it entirely surrounded the outer surface of the core 120. Further, a space 45 was also formed for forming flange portions 133.

In Example 6, as shown in FIG. 12A, the support rod 42 was arranged within that portion of the hollow portion 121 of the core 120 which faced the resin injection portion 41 formed of a pin gate. That is, the core 121 was present on a line extending from the axial line of the resin injection portion 41, and the support rod was engaged in that portion of the hollow portion 121 which was on the line extending from the axial line of the resin injection portion 41. The mold 40 was provided with three resin injection portions 41, one of which is shown in FIGS. 12A and 12B. For positional relationships of the three resin injection portions, see arrows A, B and C in FIG. 13.

As shown in the schematic partial cross-sectional view of FIG. 12B, a molten resin 46 was injected into the space 44 and the space 45 formed by the core 120 and a cavity wall 43A of the mold through the three resin injection portions 41. The resin injection conditions were the same as those in Example 5. After the completion of injection of the molten resin 46 into the space 44 and the space 45, the resin in the space 44 and the space 45 was cooled to solidness. Then, the injection molded article was taken out of the mold to obtain a three-dimensional hollow molded article in which the outer surface of the core 120 (see FIG. 10A) was entirely covered with the covering member 130 of the resin (see FIG. 13).

The support rods 42 as supporting members are arranged within those portions of the hollow portion 121 which face the resin injection portions 41. The supporting member prevents the deformation of the core 120 (and the three-dimensional hollow molded article) caused by pressure exerted on the core 120 by the injection of the molten resin in the over-molding, and the three-dimensional hollow molded article is excellent.

VARIATION OF EXAMPLE 6

Figure 14A:
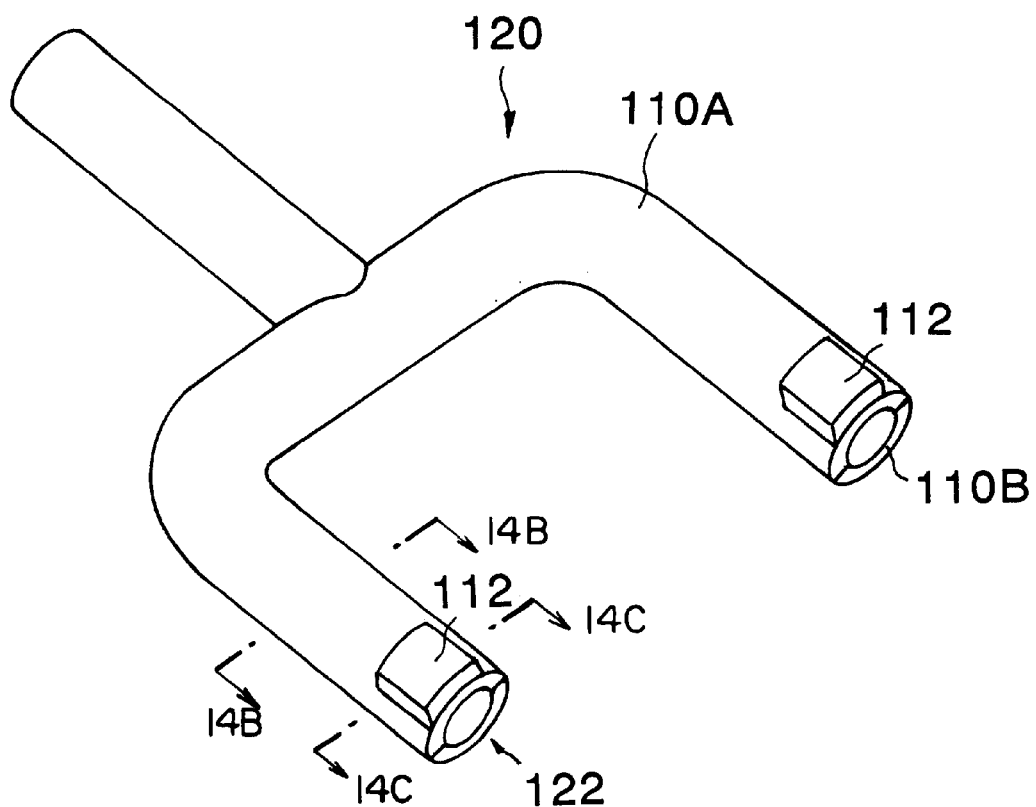
FIGS. 14A, 14B and 14C are a schematic perspective view and schematic cross sections of a core used in the over-molding method directed to the third aspect of the present invention.

In one core member 110A shown in FIG. 14A, that portion of the core member 110A which faces a resin injection portion 41 provided in a mold 40 and a nearby portion are thickness-increased. Numeral 112 indicates the thickness-increasing portion which is to face the resin injection portion 41. The other core member 110B has the same structure as that of the core member 110 in Example 5.

Figure 14B:
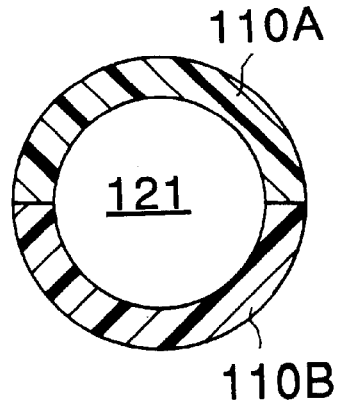
Figure 14C:
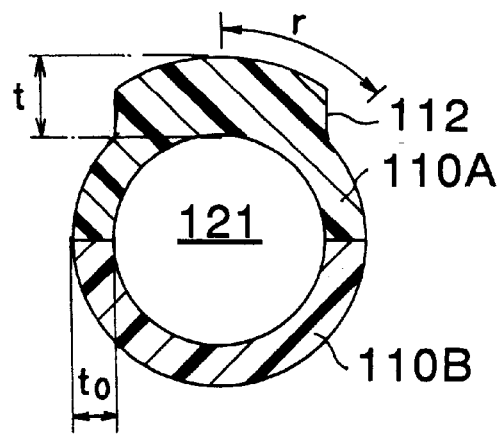
Figure 15A:
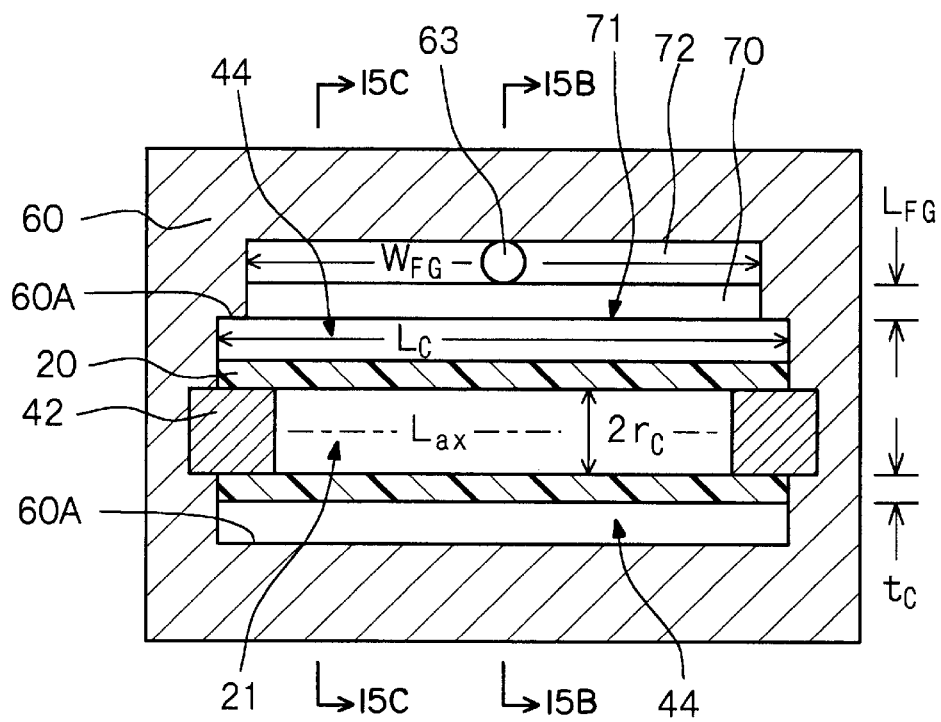
FIGS. 15A, 15B and 15C are a schematic cross-sectional view and schematic cross sections of a mold, a core, etc., showing the position of a resin injection portion in the over-molding method directed to a fourth aspect of the present invention.
Figure 15B:
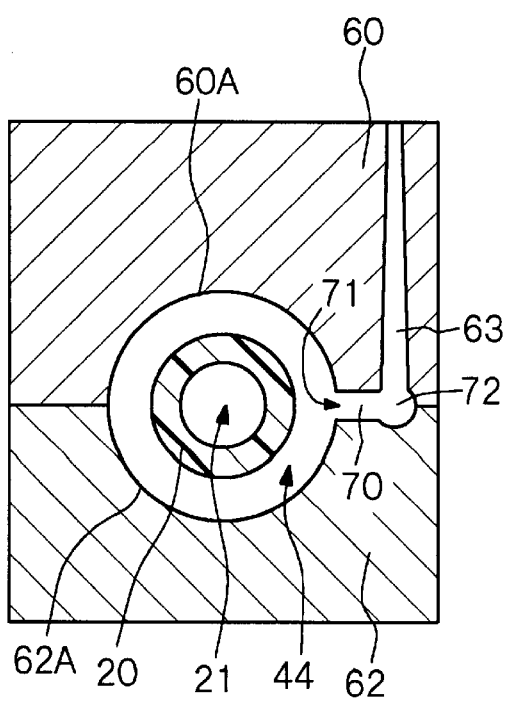
Figure 15C:
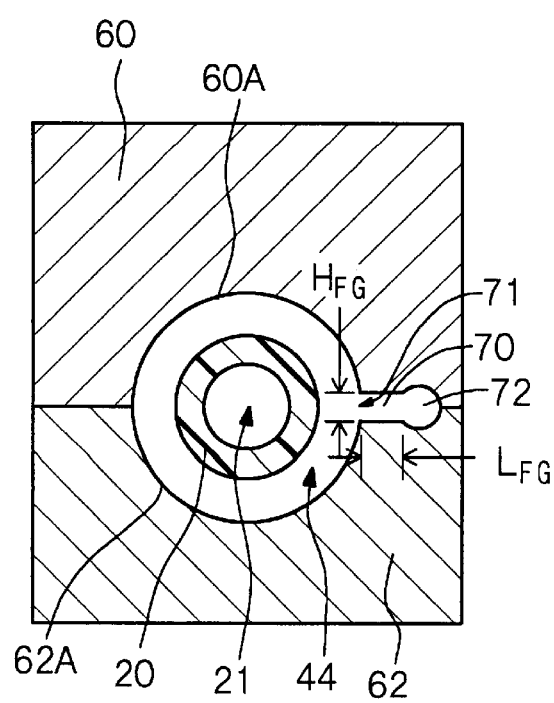
Figure 16A:
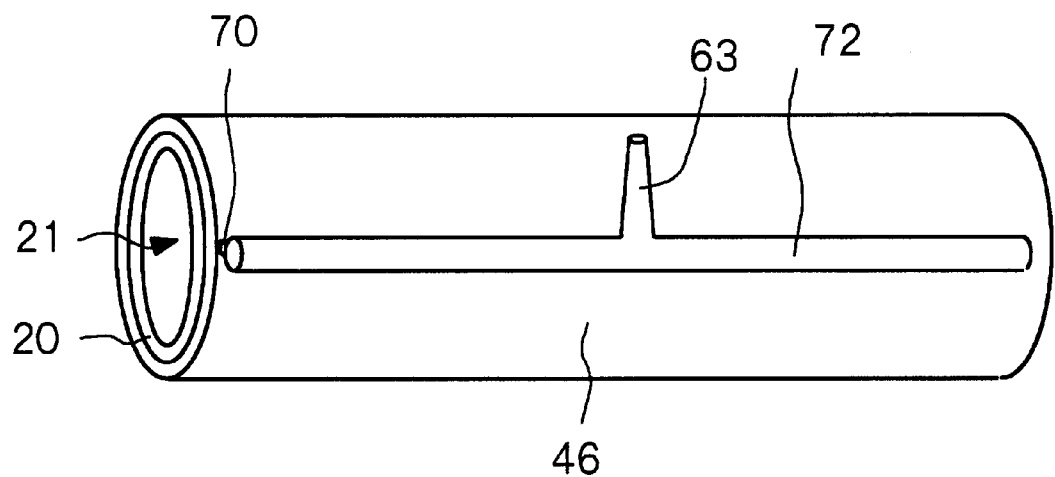
FIGS. 16A and 16B are schematic perspective views showing a molten resin flowing along the outer surface of a core and a resin injection portion in the over-molding method directed to the fourth aspect of the present invention.
Figure 16B:
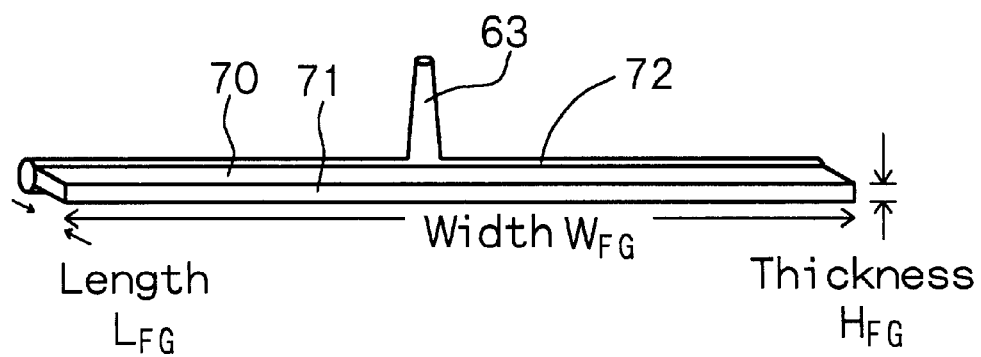

FIGS. 14B and 14C show schematic cross sections taken along lines 14B—14B and 14C—14C in FIG. 14A. The thickness-increased portion 112 of the core member 110A had a thickness t of 3.0 mm. Other portion of the core member 110A and the core member 110B had a thickness $t_0$ of 2.0 mm. In a core 120 formed of the above two core members 110A and 110B, that portion of the core which face the resin injection portion had a cylindrical form, and its ring-shaped cross section had an average radius $r_0$ of 10 mm. The thickness-increasing portion 112 has a nearly rectangular form, and the length r (see FIG. 14C) of the thickness-increasing portion 112 was $(\pi/4)r_0$. The same over-molding method as that in Example 6 was carried out using the core 120 formed of these core members 110A and 110B, to give a three-dimensional hollow molded article. In this embodiment, those portions 112 of the core member 110A which face the resin injection portions can be imparted with high rigidity, and the deformation of those portions of the core 120 inserted and fit in the cavity which face the resin injection portions, caused by the pressure exerted by the injection of the molten resin, can be further effectively prevented.

EXAMPLE 7

Figure 17A:
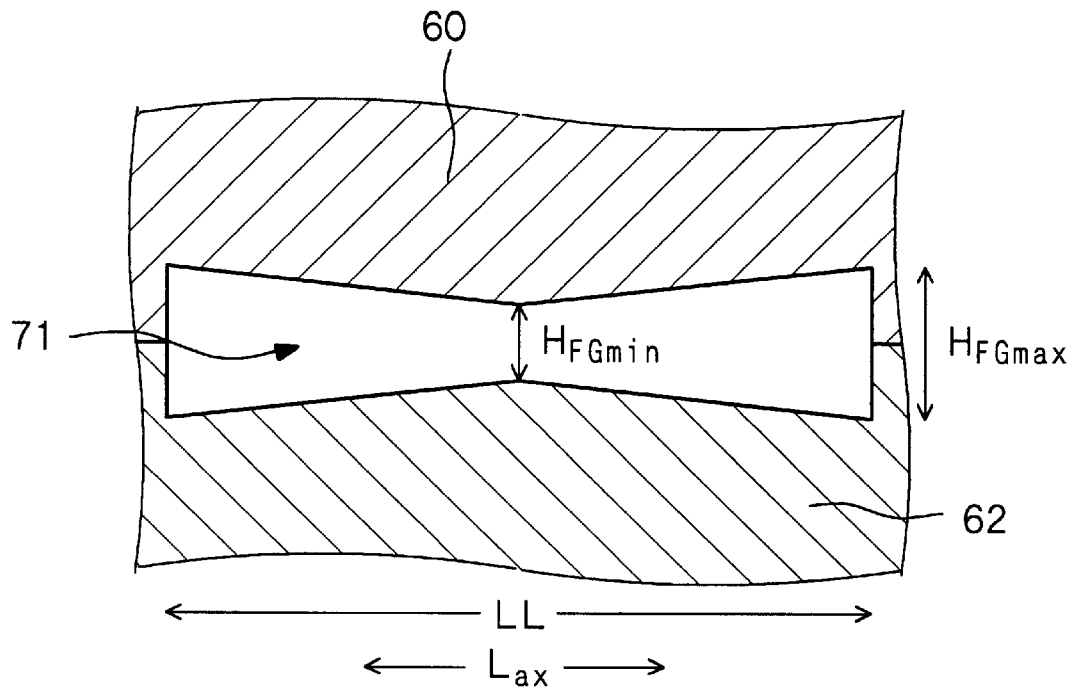
FIGS. 17A and 17B are schematic cross-sectional views of molds showing a change in the thickness of the opening portion of a film gate used in the over-molding method directed to the fourth aspect of the present invention.
Figure 17B:
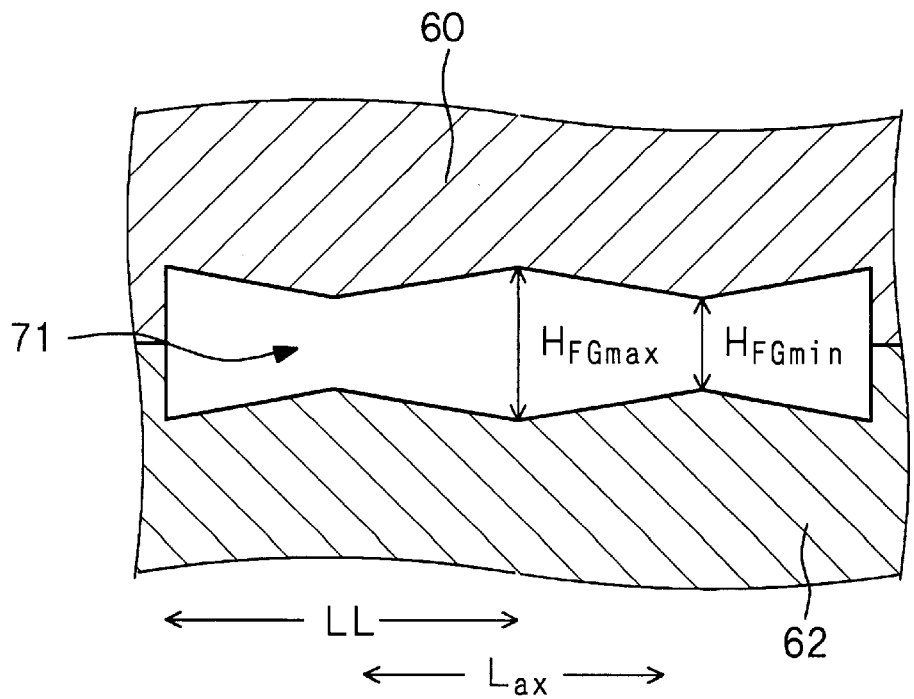
Figure 18A:
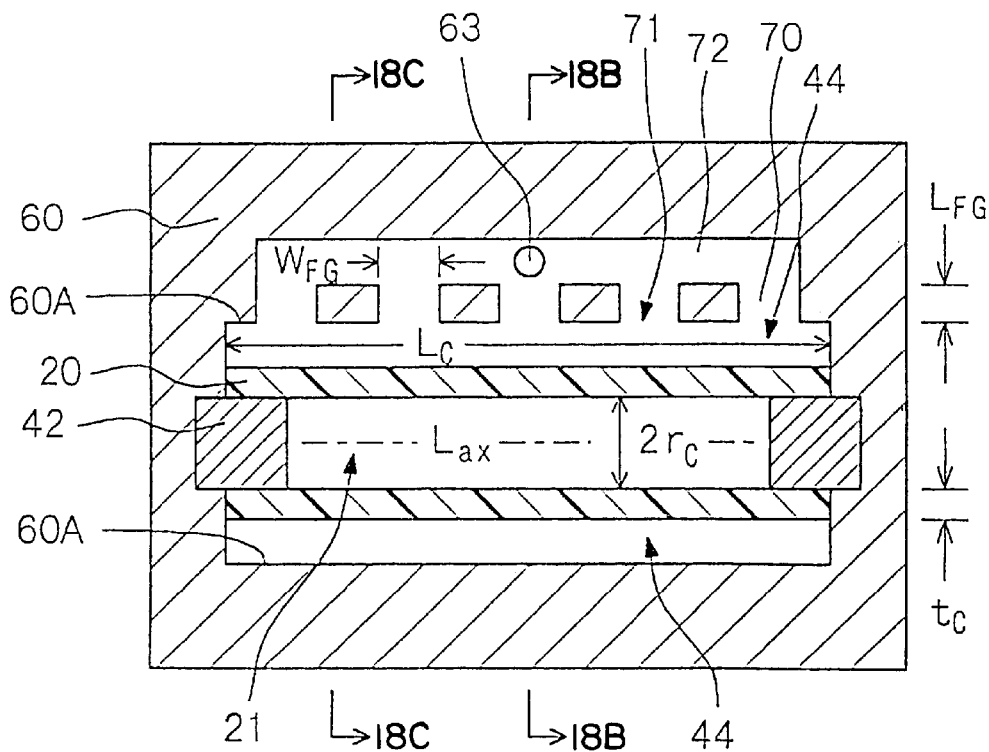
FIGS. 18A, 18B and 18C are schematic cross sections of a mold, a core, etc., showing the position of another resin injection portion in the over-molding method directed to the fourth aspect of the present invention.
Figure 18B:
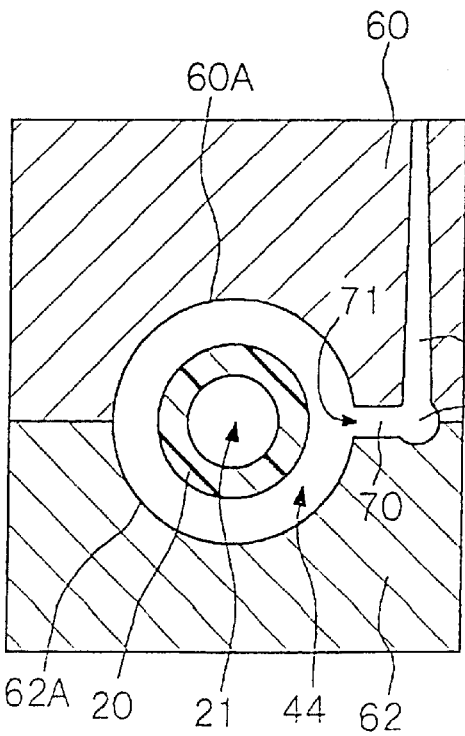
Figure 18C:
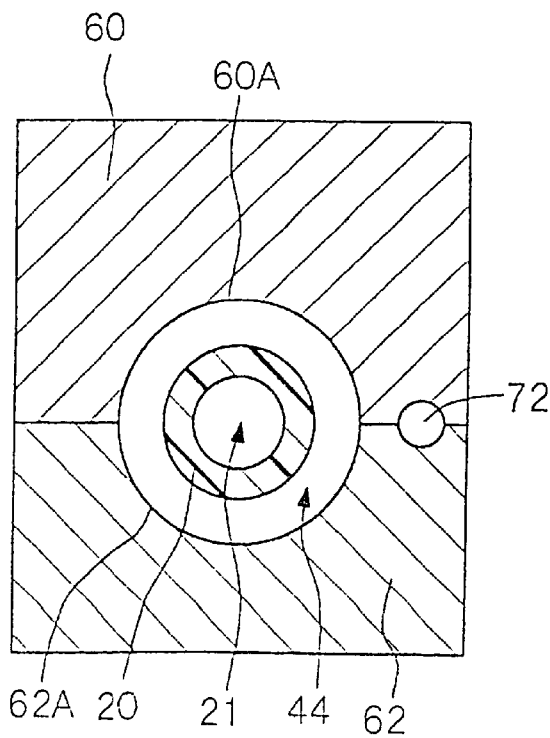
Figure 19:
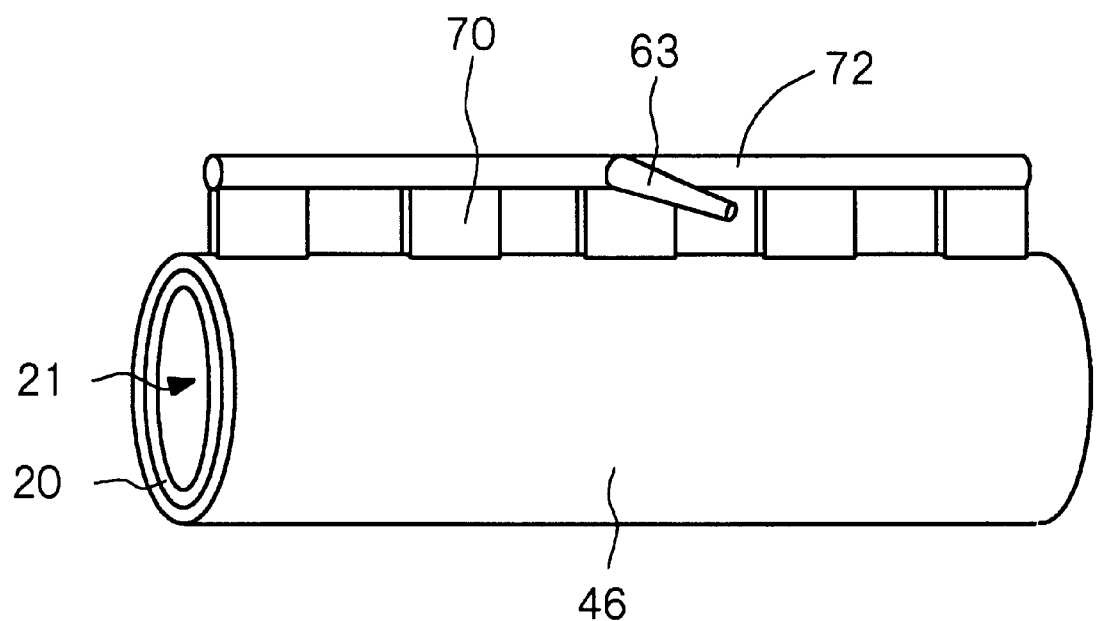
FIG. 19 is a schematic perspective view showing molten resin flowing along the outer surface of a core and through the resin injection portion, etc., when the resin injection portion is positioned as shown in FIGS. 18A to 18C.
Figure 20A:
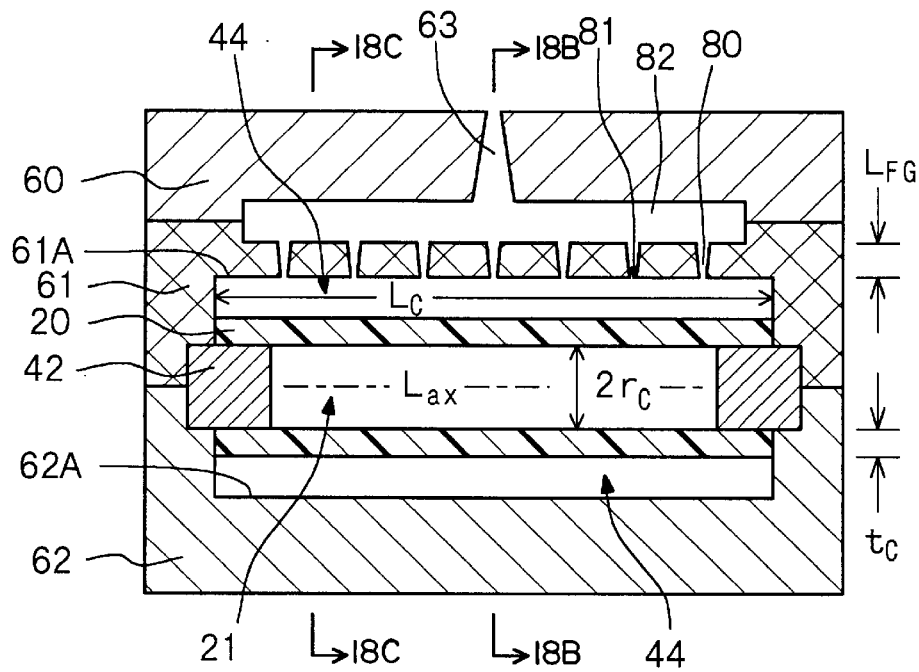
FIGS. 20A, 20B and 20C are schematic cross sections of a mold, a core, etc., showing positions of a resin injection portion, etc., in an over-molding method directed to a fifth aspect of the present invention.
Figure 20B:
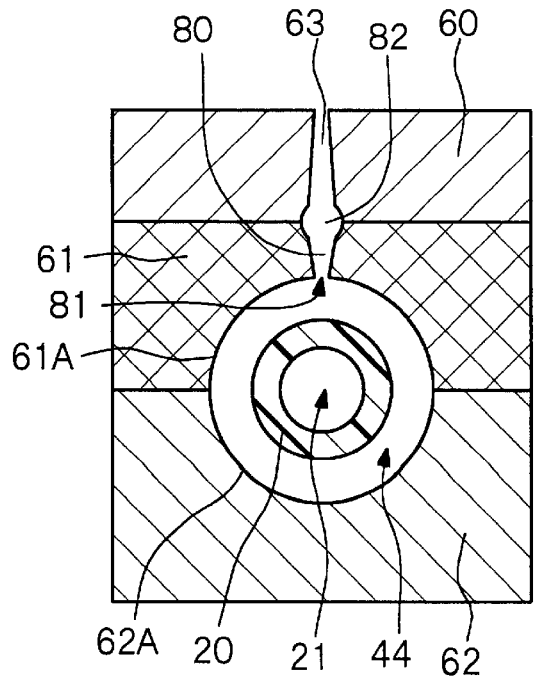
Figure 20C:
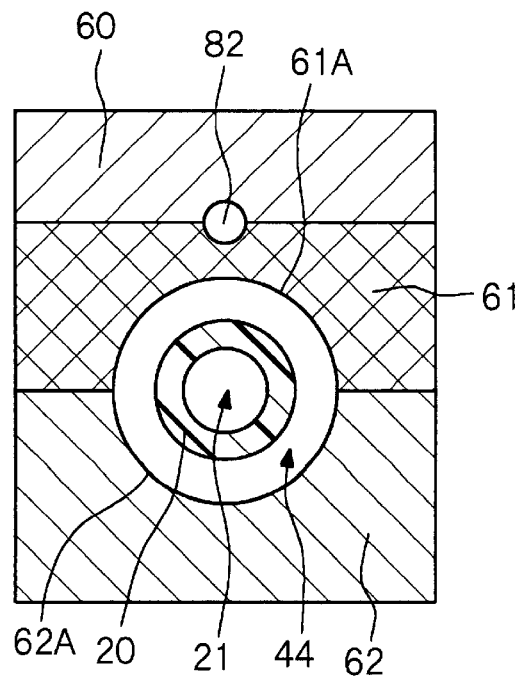
Figure 21:
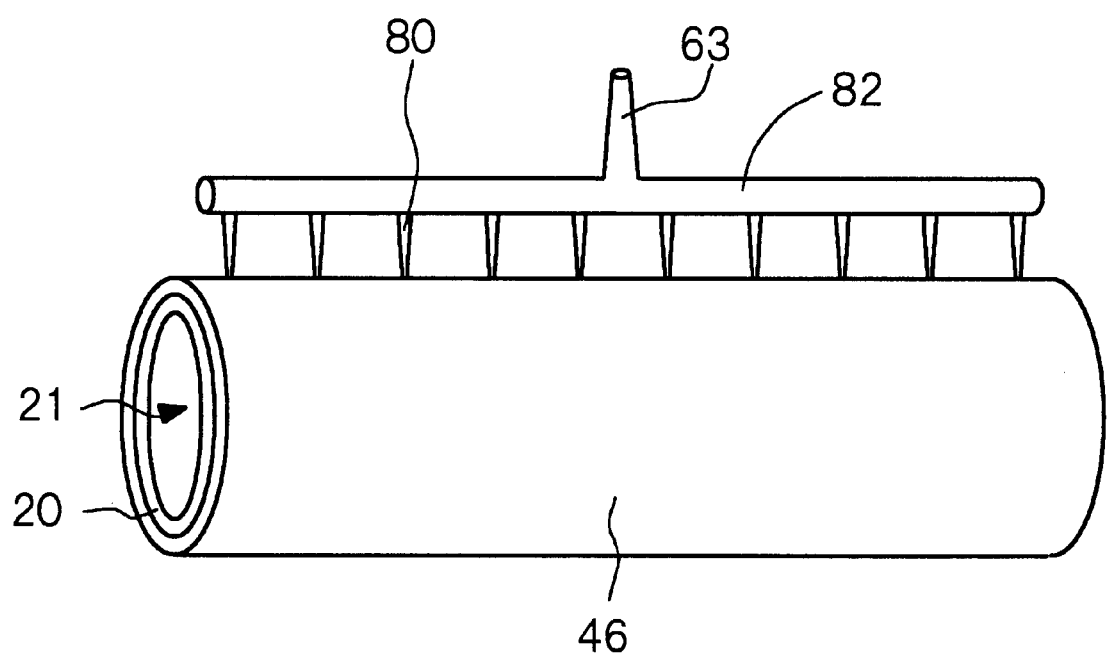
FIG. 21 is a schematic perspective view of a mold, a core, etc., showing a molten resin flowing along the outer surface of a core and through the resin injection portion, etc., when the resin injection portion is positioned as shown in FIGS. 20A to 20C.
Figure 22A:
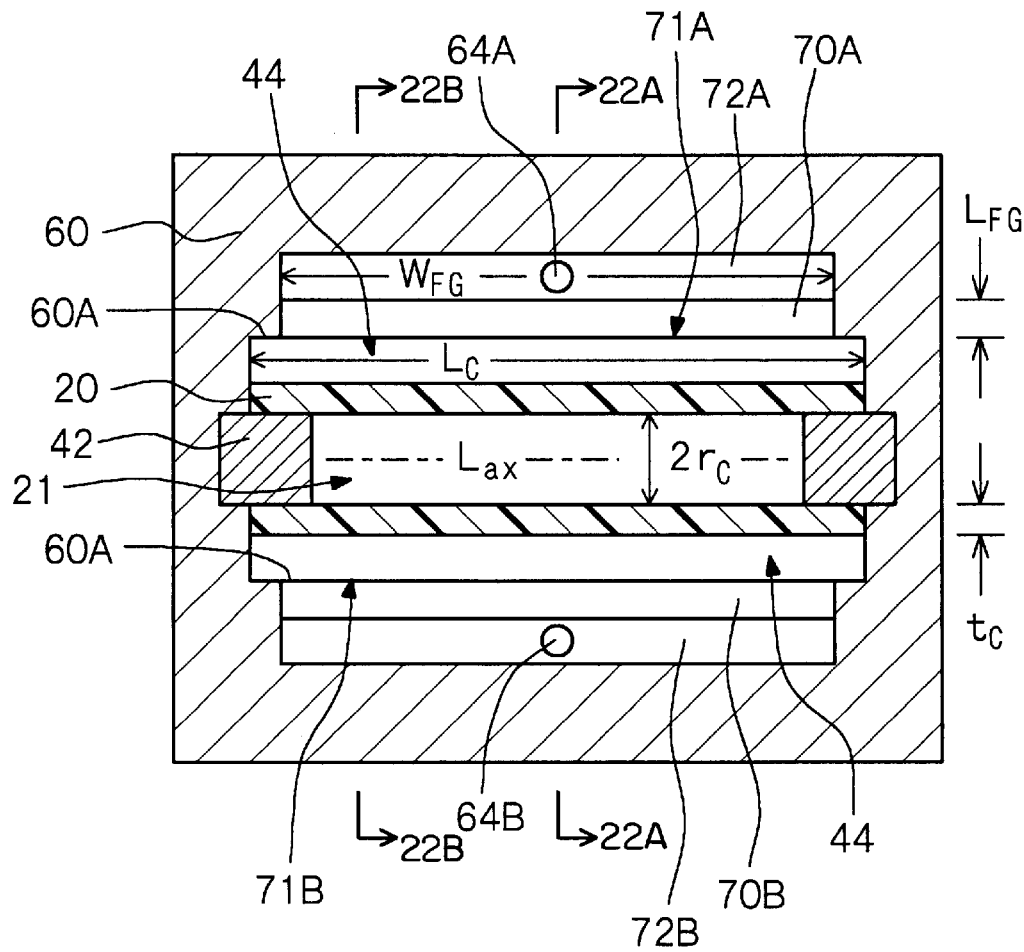
FIGS. 22A and 22B are a schematic cross-sectional view showing an embodiment in which two resin injection portions are provided symmetrically with regard to the axial line of a core and a schematic perspective view showing molten resin flowing along the outer surface of the core and through the resin injection portions, etc., in the over-molding method directed to the fourth aspect of the present invention.
Figure 22B:
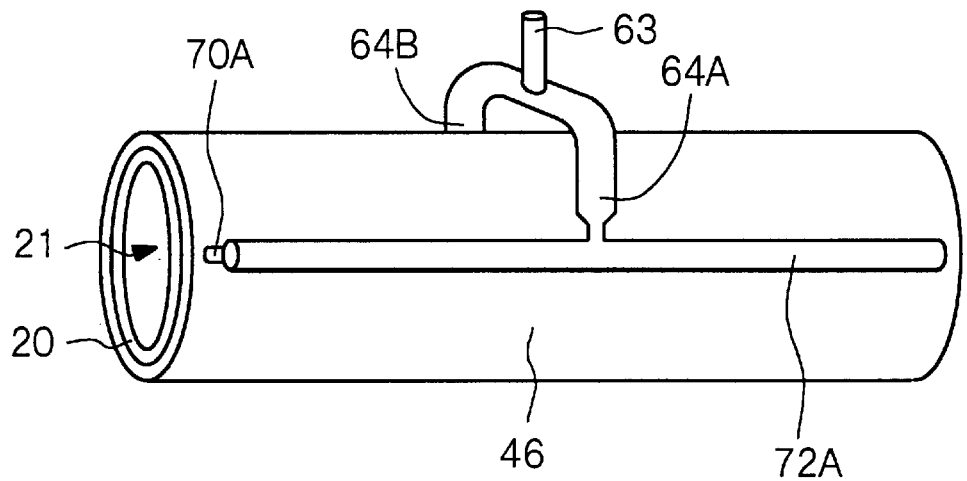
Figure 23A:
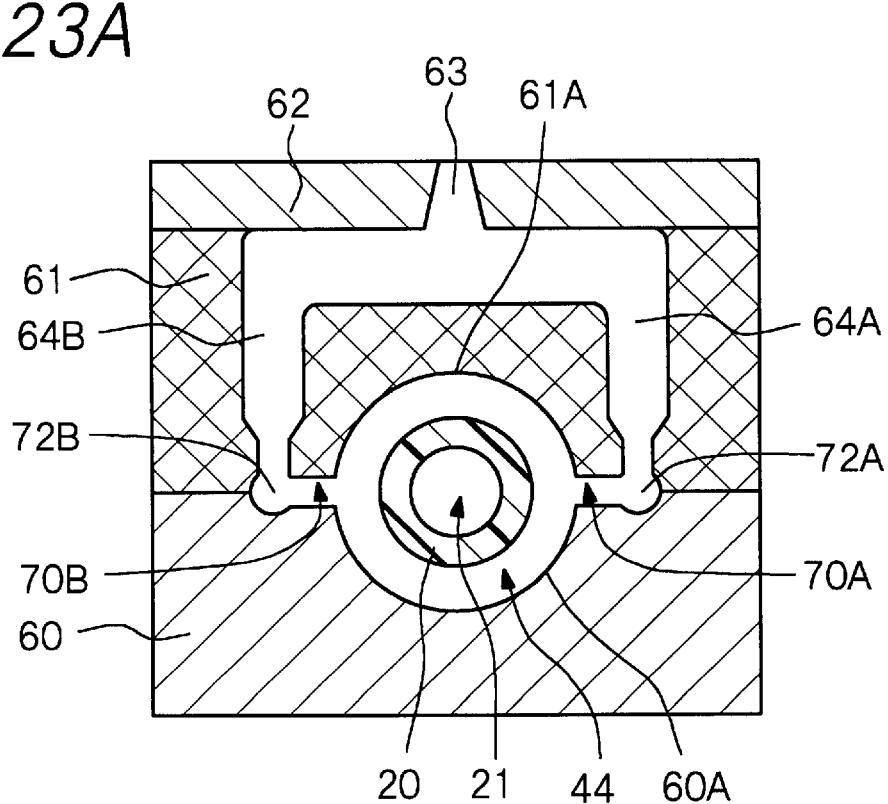
FIGS. 23A and 23B are schematic cross sections taken along lines 23A—23A and 23B—23B in FIG. 22A.
Figure 23B:
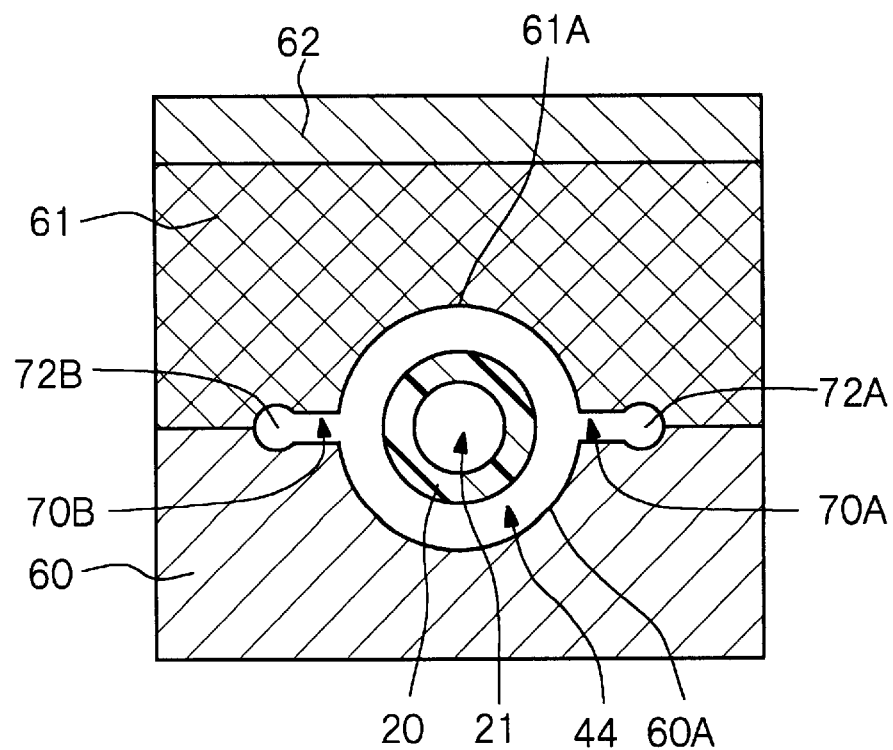
Figure 24A:
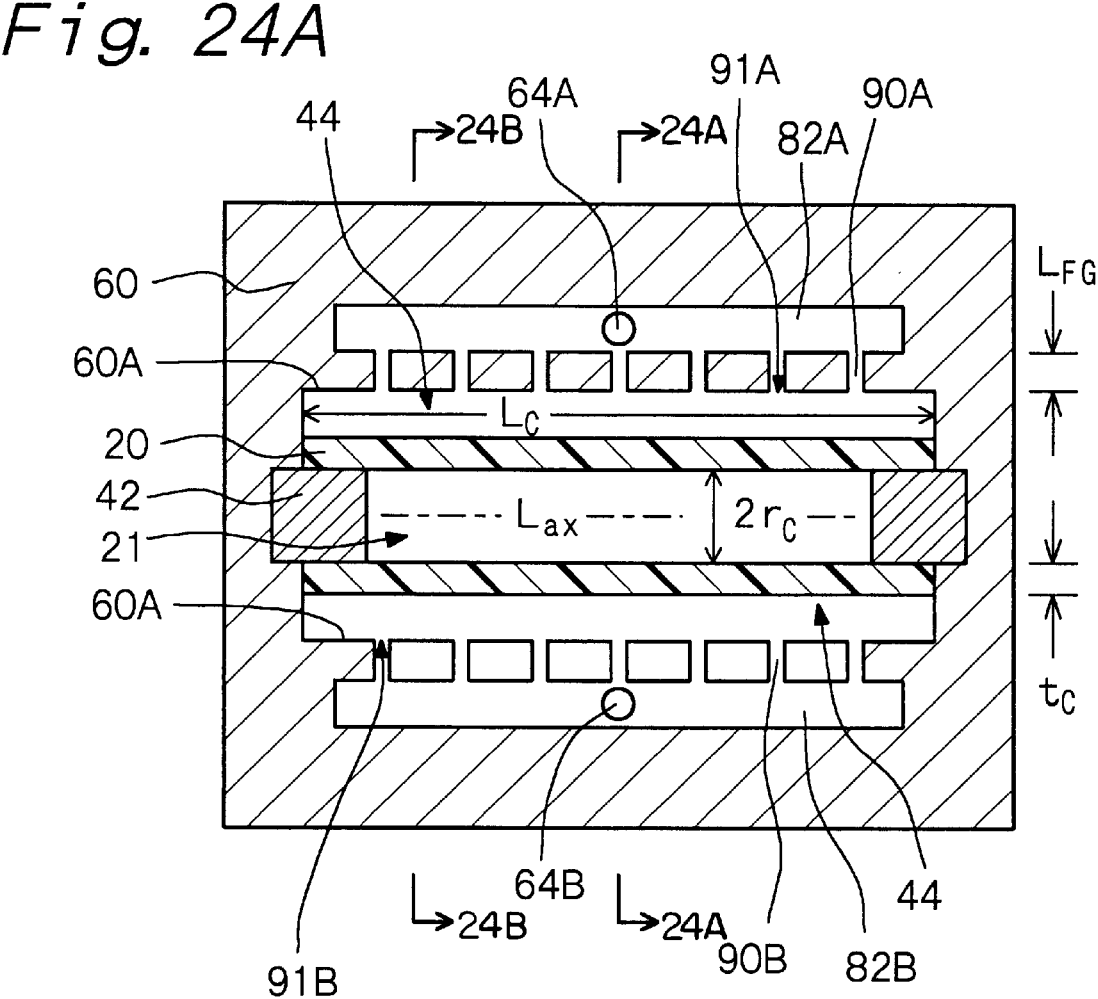
FIGS. 24A and 24B are a schematic cross section showing an embodiment in which two resin injection portions are provided symmetrically with regard to the axial line of a core and a schematic perspective view showing a molten resin flowing along the otter surface of the core and through the resin injection portions, etc., in the over-molding method directed to the fifth aspect of the present invention.
Figure 24B:
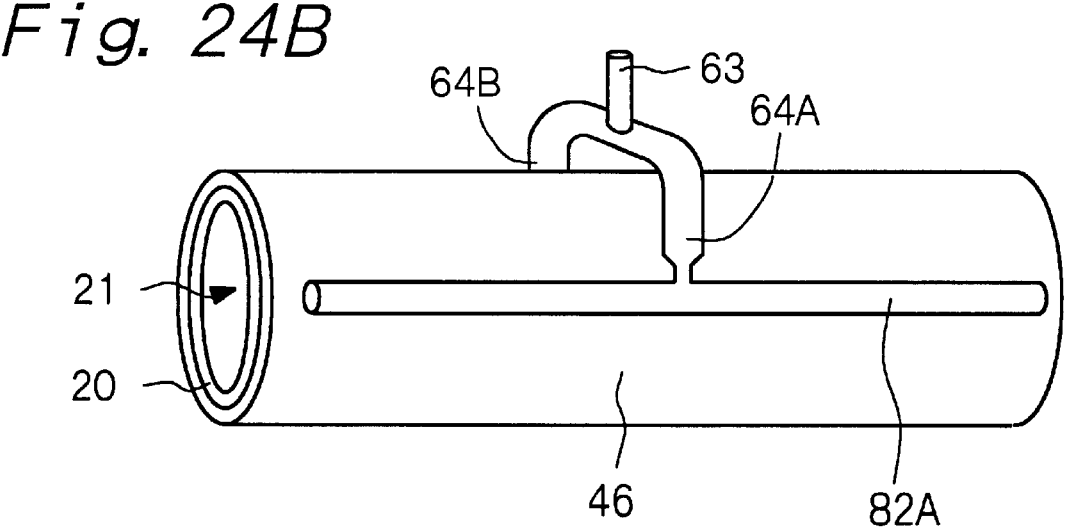
Figure 25A:
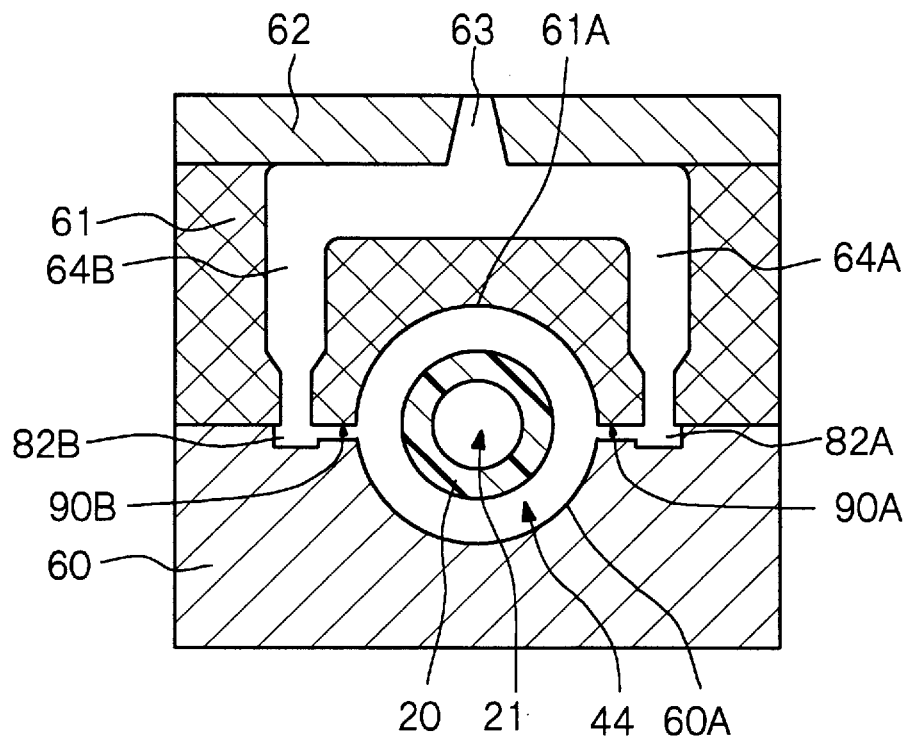
FIGS. 25A and 25B are schematic cross sections taken along lines 25A—25A and 25B—25B in FIG. 24A.
Figure 25B:
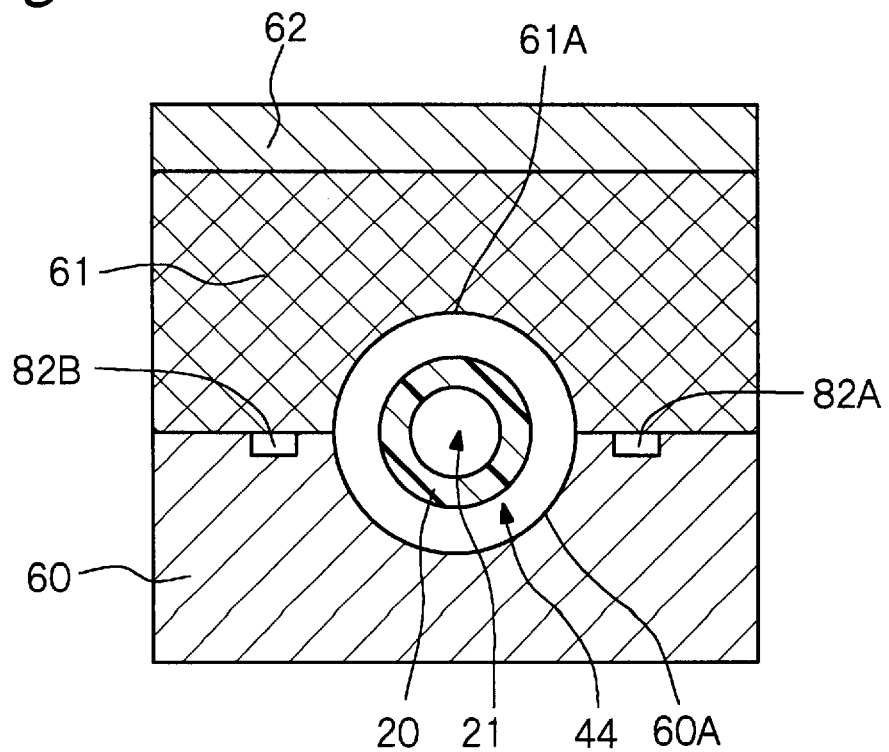

A mold having a structure shown in FIGS. 26A, 26B, 27A and 27B was used to produce a three-dimensional hollow molded-article on the basis of the over-molding method directed to a fourth aspect of the present invention. The mold had a resin injection portion formed of a film gate 70, and the axial line of an opening portion 71 of the film gate 70 in the width direction was nearly in parallel with an axial line $L_{ax}$ of a core 20. FIG. 17B shows the cross-sectional form of the opening portion 71. The minimum thickness of the opening portion 71 was 0.8 mm. The opening portion 71 was gradually increased in thickness, and the maximum thickness of the opening portion 71 was 1.0 mm. The distance (LL) from the portion having the maximum thickness to another portion having the maximum thickness was 100 mm. The film gate length $L_{FG}$ was 10 mm. A guide sprue portion 72 had a diameter of 6.0 mm. The film gate 70 was communicated with a branched (manifold) subsprue portion 65 through the guide sprue portion 72. The thickness of that portion of the film gate 70 which faces that portion where the guide sprue portion 72 and the branched subsprue portion 65 are connected is preferably a minimum thickness $H_{FGmin}$.

In Example 7, as well as Example 8 to be described later, there was used a core having a hollow portion 21, having a constant thickness and having the form of a straight tube. Specifically, the nylon 6 was used as a first resin material to prepare the core 20 by an extrusion molding method. The core had a thickness ($t_c$) of 2.0 mm, an inner radius $r_c$ of 10 mm and a length $L_c$ of 200 mm. The core 20 was placed in a cavity of the mold, and a molten resin was injected into a space 44 formed by the core 20 and cavity walls 60A and 62A of the mold through the resin injection portion 70, to cover at least part of the outer surface (entire surface in Example 7) of the core 20 with the resin.

Figure 26A:
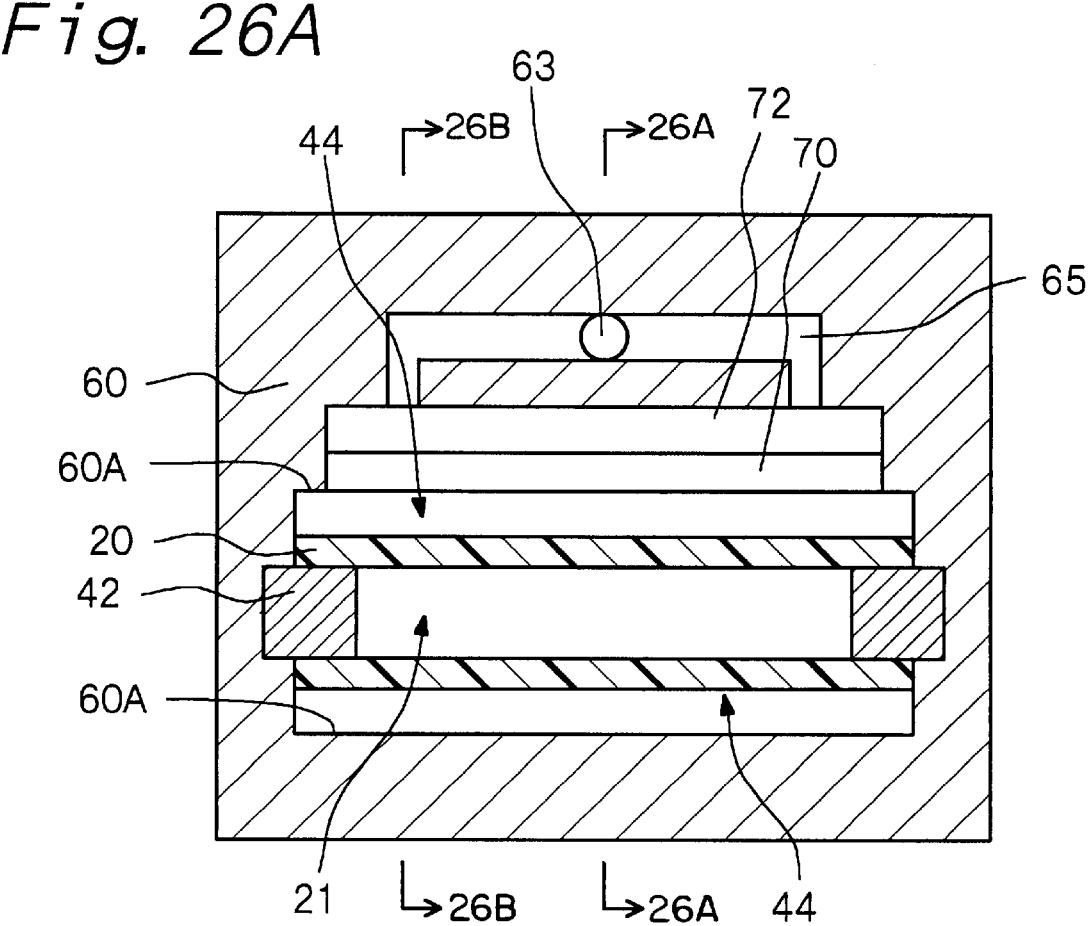
FIGS. 26A and 26B are a schematic cross-sectional view showing an embodiment in which a film gate is connected to a branched (manifold) subsprue portion and a schematic perspective view showing a molten resin flowing along the outer surface of a core and through a resin injection portion, etc., in the over-molding method directed to the fourth aspect of the present invention.
Figure 26B:
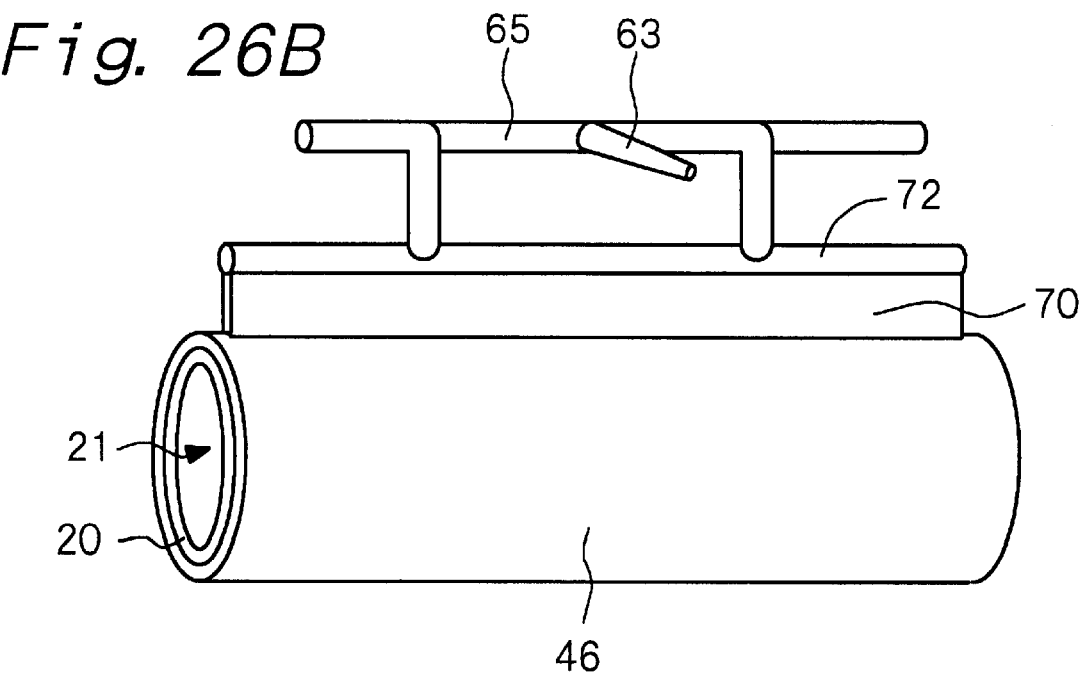
Figure 27A:
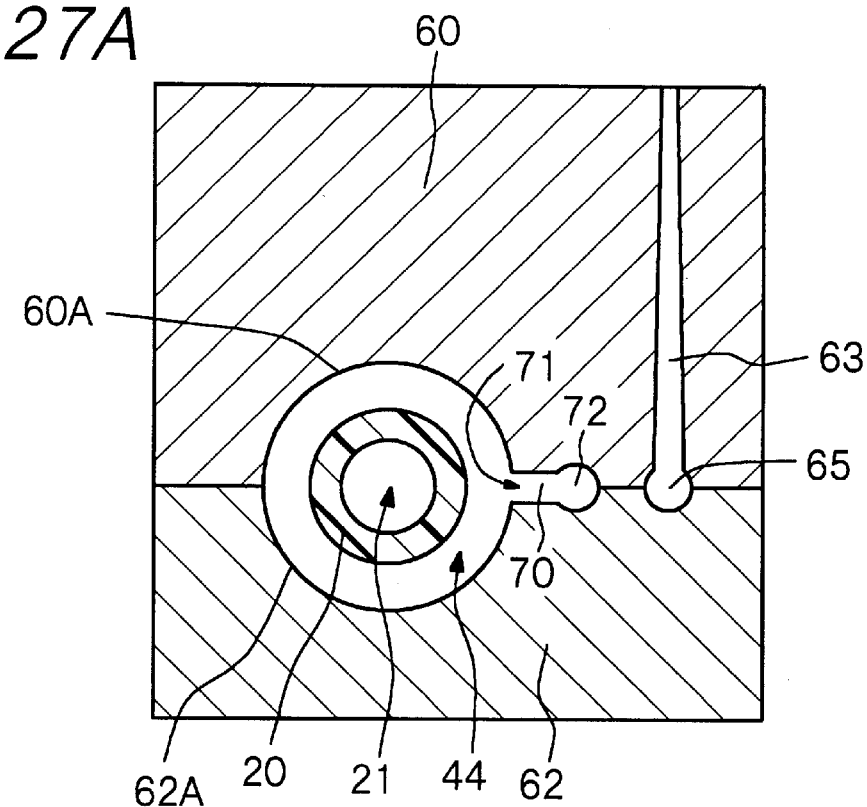
FIGS. 27A and 27B are schematic cross sections taken along lines 27A—27A and 27B—27B in FIG. 26A.
Figure 27B:
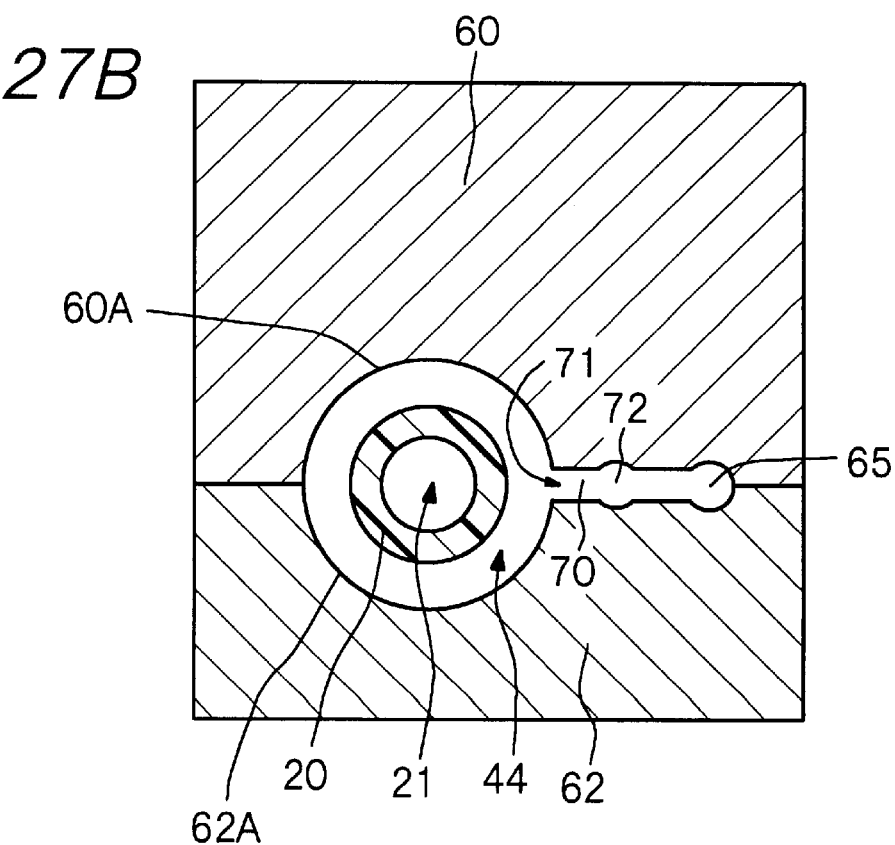
Figure 28A:
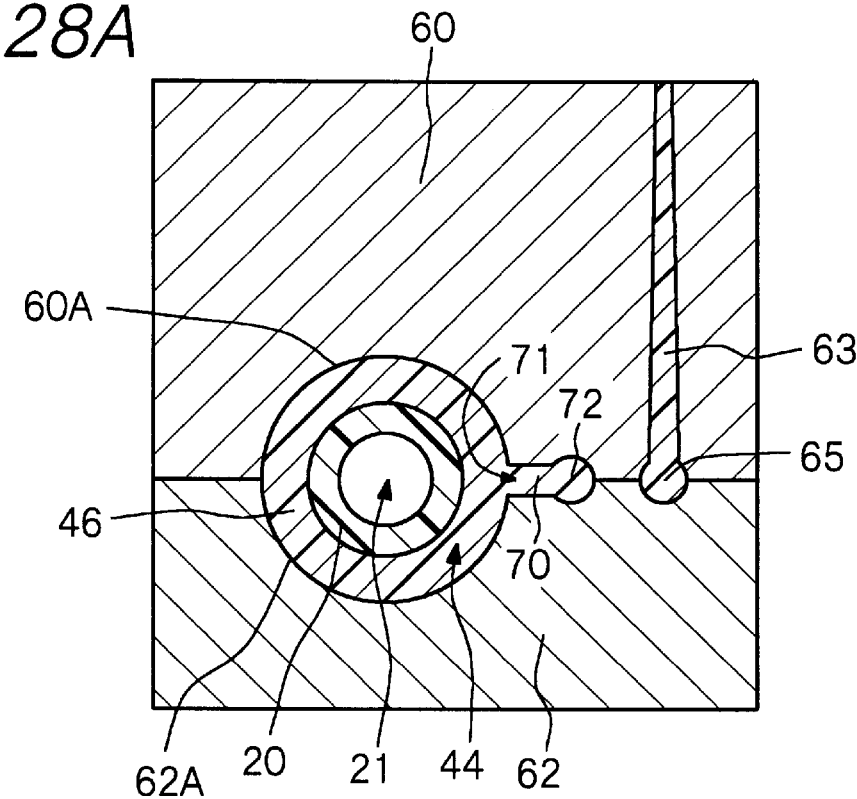
FIGS. 28A and 28B are schematic cross sections similar to FIGS. 27A and 27B showing the state of molten resin injected into the cavity of the mold, etc.
Figure 28B:
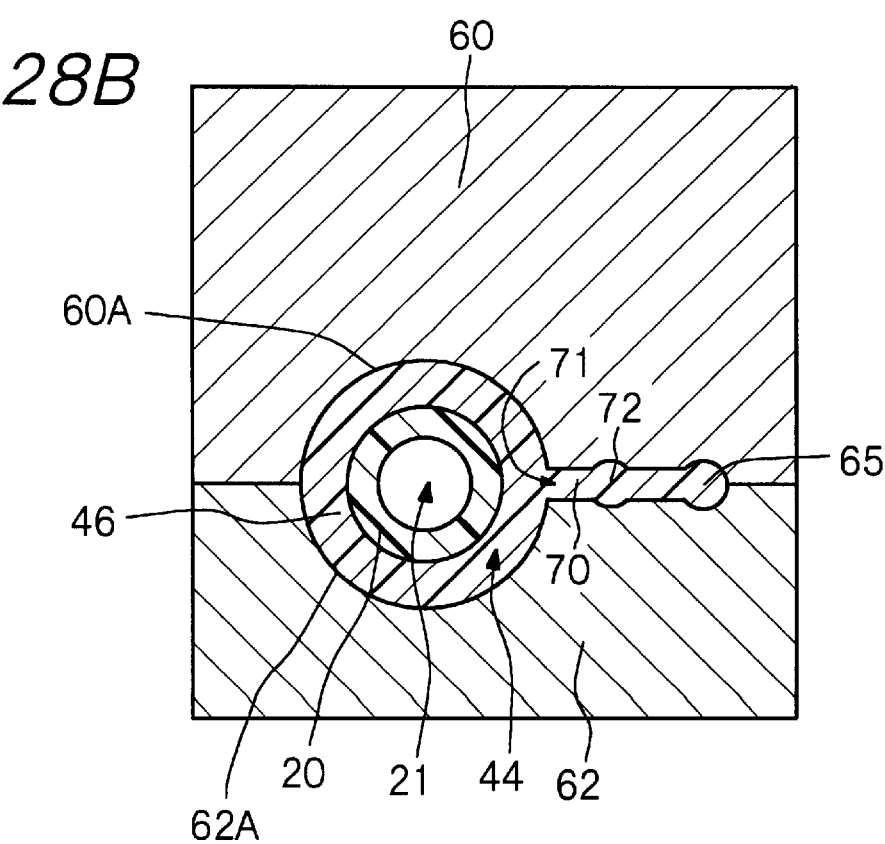

That is, a support rod 42 formed of a metal was inserted into the opening portion of the core 20 (end portion of the hollow portion 21) and then attached to the mold to place the core 20 in the cavity of the mold (see FIG. 26A). Then, a molten resin 46 was injected into the space 44 formed by the cavity 20 and the cavity walls 60A and 62A through the resin injection portion (more specifically, through a main sprue portion 63, the branched sprue portion 65, the guide sprue portion 72 and the opening portion 71 of the film gate 70). This state is shown in FIGS. 28A and 28B. FIGS. 28A and 28B correspond to FIGS. 27A and 27B, respectively. Nylon 66 was used as a second resin material. The molten resin was injected in an amount sufficient for completely filling the space 44 formed by the core 20 and the cavity walls 60A and 62A. The covering member had a thickness of 2.0 mm. The molding conditions were as follows.

Resin temperature: 305° C.

Injection pressure: 350 kgf/cm²-G

The so-obtained three-dimensional hollow molded article showed no deformation, and an excellent product was easily produced.

EXAMPLE 8

Figure 29A:
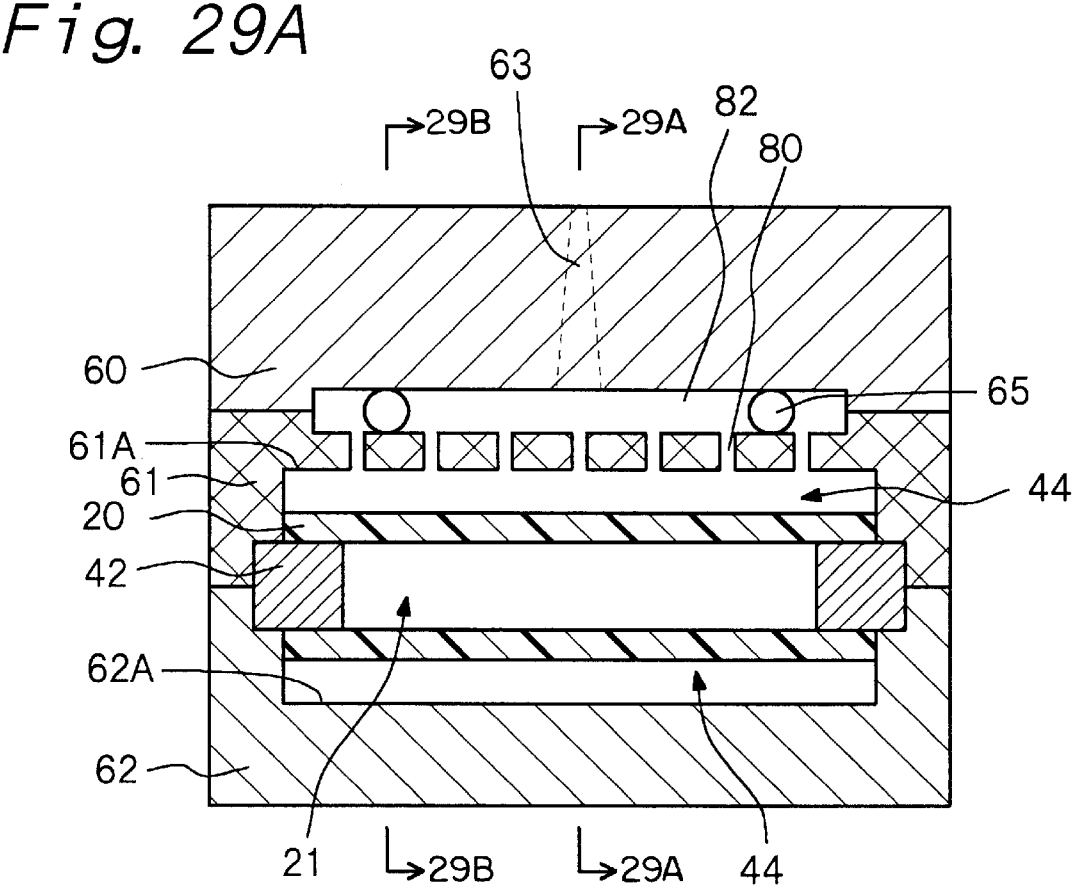
FIGS. 29A and 29B are a schematic cross section showing an embodiment in which a multi-point pin gate is connected to a branched (manifold) subsprue portion and a schematic perspective view showing a molten resin flowing to form the outer surface of a core and through a resin injection portion in the over-molding the fifth aspect of the present invention.
Figure 29B:
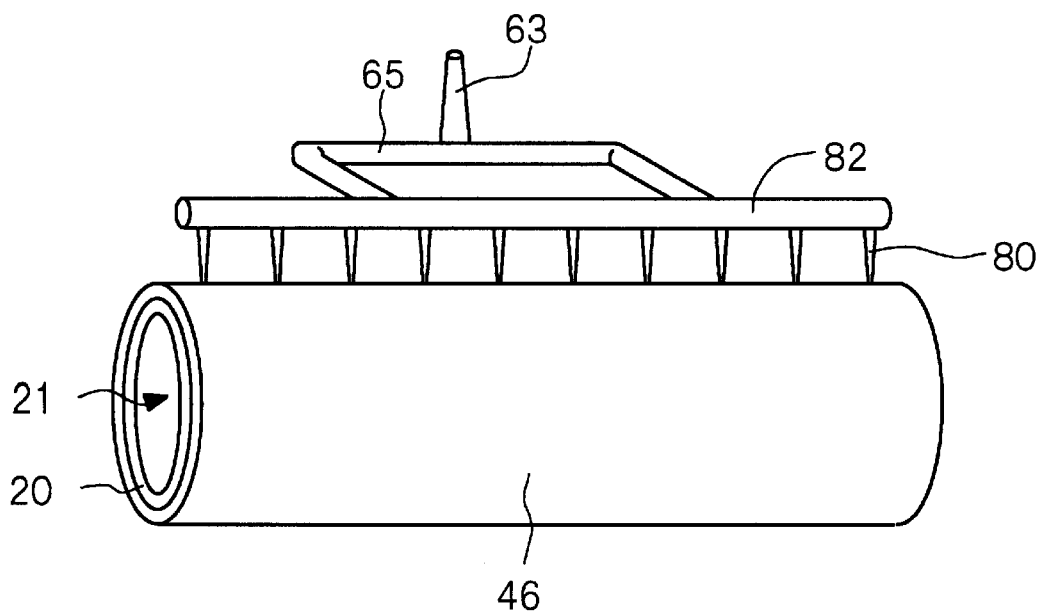
Figure 30A:
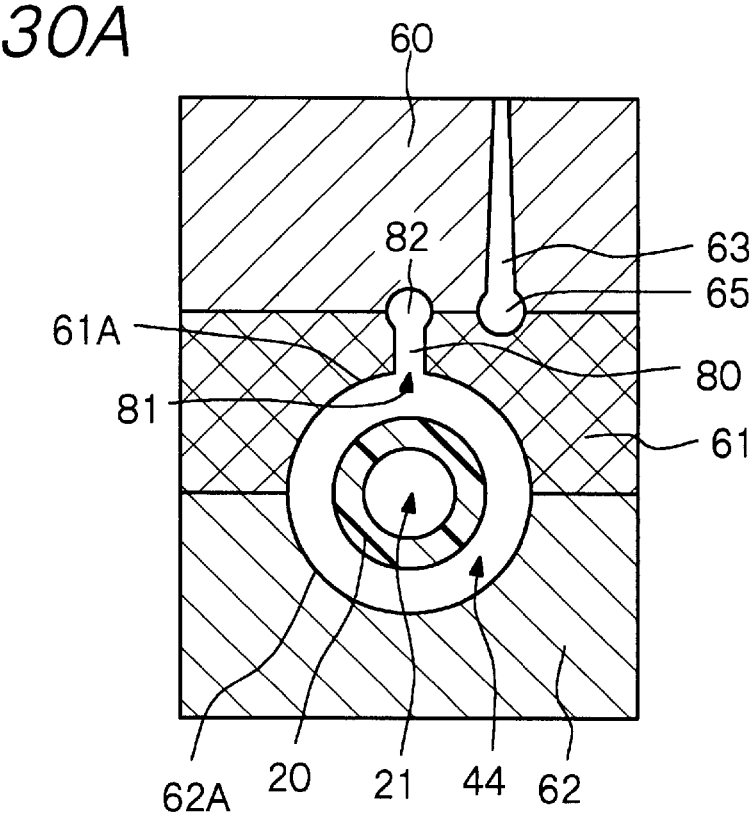
FIGS. 30A and 30B are schematic cross sections taken along lines 30A—30A and 30B—30B in FIG. 29A.
Figure 30B:
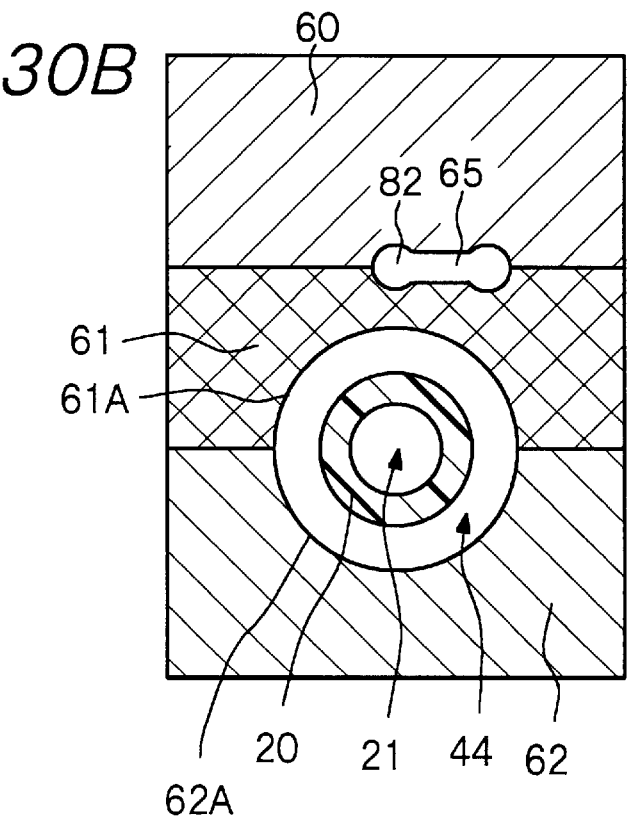
Figure 31A:
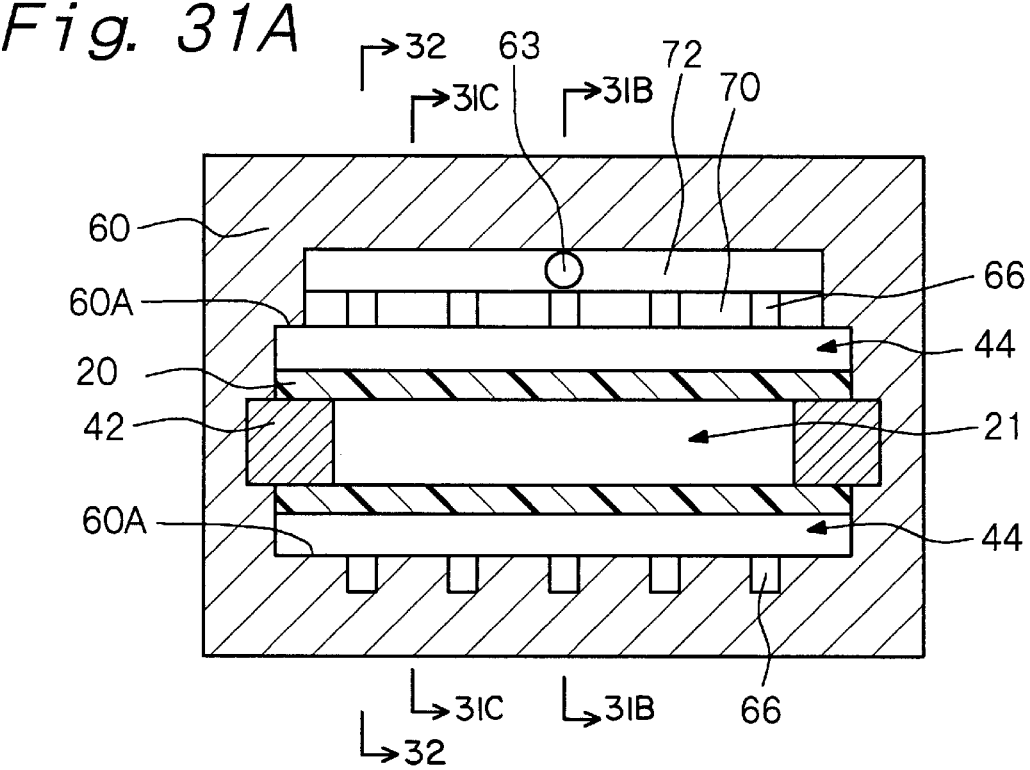
FIGS. 31A, 31B and 31C are schematic cross-sectional views showing one embodiment of the over-molding method directed to the fourth aspect of the present invention. This method uses a mold provided with a ring-shaped resin flow channel on the cavity wall of the mold.
Figure 31B:
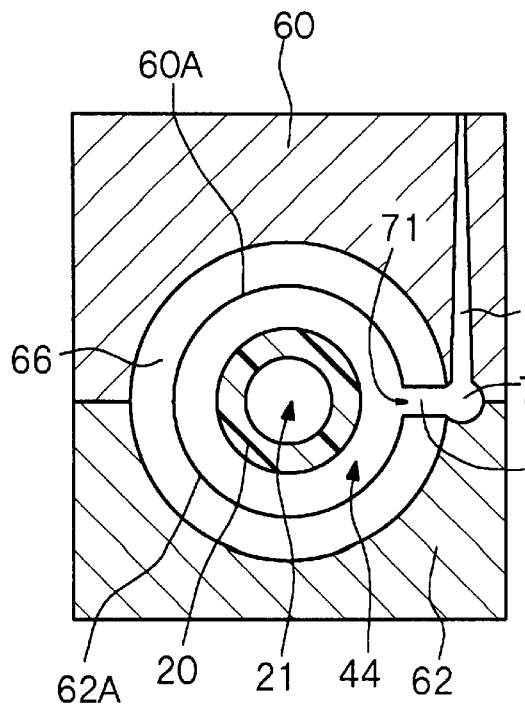
Figure 31C:
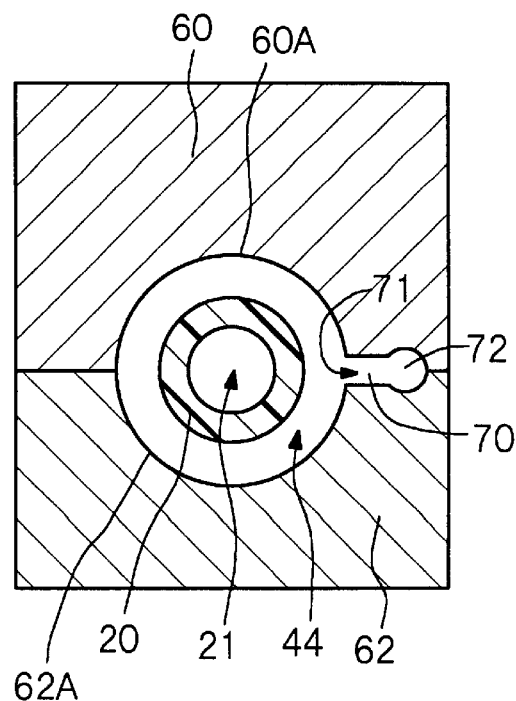
Figure 32:
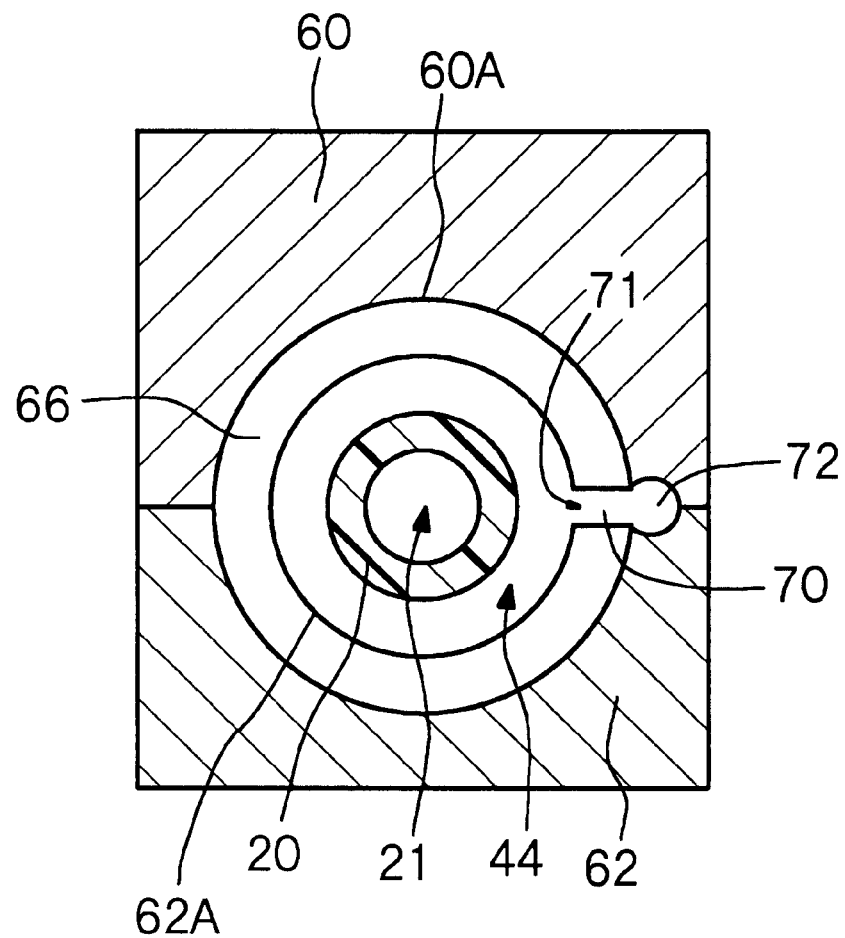
FIG. 32 is a schematic cross-sectional view of mold, a core, etc. taken along a line 32—32 in FIG. 31A.
Figure 33:
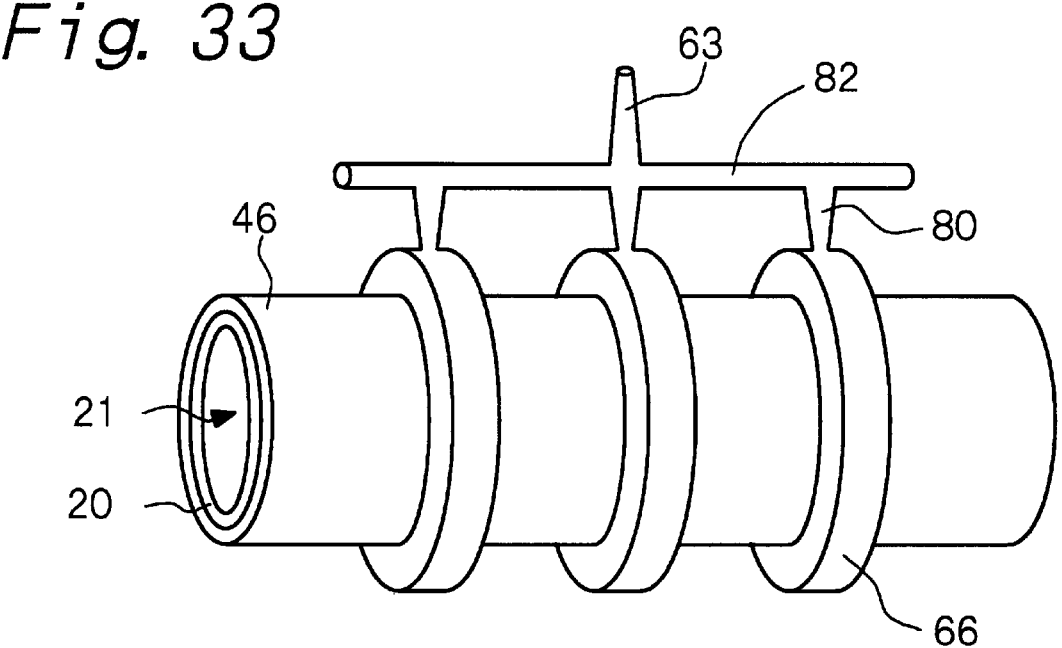
FIG. 33 is a schematic perspective view showing a molten resin flowing along the outer surface of a core and through a resin injection portion in one embodiment of the over-molding directed to the fifth aspect of the present invention, using a mold provided with a ring-shaped resin flow channel on the cavity wall of the mold.
Figure 34:
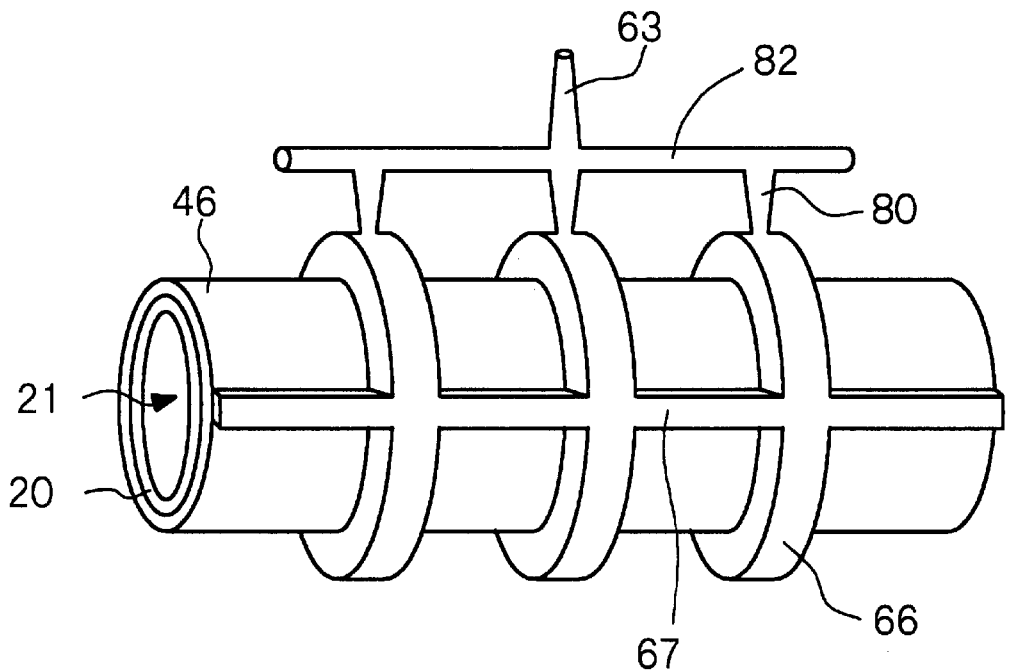
FIG. 34 is a schematic perspective view showing a molten resin flowing along the outer surface of a core and through a resin injection portion in another embodiment of the over-molding directed to the fifth aspect of the present invention, using a mold provided with a ring-shaped resin flow channel on the cavity wall of the mold.

A three-dimensional hollow molded article was produced on the basis of the over-molding method directed to a fifth aspect of the present invention. A mold having a structure shown in FIGS. 29A, 29B, 30A and 30B was used. That is, the resin injection portion was formed of a multi-point pin gate 80 (12-points pin gate, N=12), and the openings 81 of the multi-point pin gate 80 were arranged nearly in parallel with the axial line $L_{ax}$ of the core 20. The openings 81 had different diameters. That is, the openings had diameters of 2.00 mm, 1.71 mm, 1.42 mm, 1.27 mm, 1.56 mm, 1.86 mm, 1.56 mm, 1.27 mm, 1.42 mm, 1.71 mm and 2.00 mm in this order. A guide sprue portion 82 had a diameter of 6.0 mm. The multi-point pin gate was communicated with a branched (manifold) subsprue portion 65 through the guide sprue portion 82. In FIGS. 29A and 29B, the number of openings of the multi-point pin gate is decreased for simplification.

A core 20 was formed from the same first resin material as that used in Example 7 by an extrusion method. The core 20 had the same dimensions as those of the core in Example 7.

A support rod 42 formed of a metal was inserted into the opening portion of the core 20 (end of hollow portion 21), and the support rod 42 was attached to a mold so that the core 20 was placed in the cavity of the mold. Then, a molten resin 46 was injected into a space 44 formed by the core 20 and cavity walls 60A and 62A of the mold through the resin injection portion 70 (more specifically through a main sprue portion 63, the branched sub sprue portion 65, the guide sprue portion 82 and the openings 81 of the multi-point pin gate 809). The molten resin was injected in an amount sufficient for completely filling the space 44 formed by the core 20 and the cavity walls 60A and 62A. The covering member had a thickness of 2.0 mm. The so-obtained three-dimensional hollow molded article showed no deformation, and an excellent product was easily produced.

COMPARATIVE EXAMPLE 3

The same core as the core 20 in Example 7 was prepared from the same first resin as that used in Example 7 in the same manner as in Example 7. Then, a three-dimensional hollow molded article was produced using the same second resin material as that used in Example 7, under the same conditions as those in Example 7 except that the multi-point pin gate was replaced with a one-point direct gate of which the resin injection portion had a structure as shown in FIG. 179. The core 20 of the so-obtained three-dimensional hollow molded article showed deformation, and no good product was obtained.

EXAMPLE 9

Problems which are to be overcome for producing a three-dimensional hollow molded article by an over-molding method are largely classified into a problem of strength of a three-dimensional hollow molded article and a problem as to whether or not a three-dimensional hollow molded article can be produced by molding. When a three-dimensional hollow molded article is designed concerning its strength, not only the strength of the three-dimensional hollow molded article against an external force in an actual use environment is important for the design, but also the strength of a core formed of a resin against a pressure caused on the core by the flow pressure of a molten resin in an injection step or a compression step is greatly important for the design. For producing a three-dimensional hollow molded article by molding, the determination of optimum molding conditions concerning a molding temperature and a molding time is essential, and more importantly, the designing of a mold, concerning the position of the resin injection portion (resin gate portion) in a mold, the number of the resin injection portions and the form type of the resin injection portion(s), for preventing the deformation of a core, are essential as well.

When a three-dimensional hollow molded article is produced by an over-molding method, it is important to decrease the pressure caused by a molten resin injected into the space formed by the core and the cavity wall of the mold for preventing the deformation of the core. As one measure therefor, it is required to optimize the position and number of the resin injection portion(s) (resin gate portion) to be provided to a mold. When the resin injection portion is formed as a multi-point one (e.g., multi-point pin gate) and when the amounts of molten resin to be injected through each of the resin injection portions are balanced, the flow distance of the molten resin in the space is decreased, and further, the flow of the molten resin is well balanced, so that the molding can be carried out at a low pressure. However, it is very difficult to determine the optimum number of resin injection portions and the optimum positions) of the resin injection portion(s). Therefore, the optimizing method of an over-molding method of the present invention is carried out.

In the injection step, the core externally suffers a pressure caused by the flow of the molten resin, while the pressure is not such an equally distributed pressure as hydrostatic pressure, but depends upon the pressure distribution during flow of the molten resin. In other words, the distribution of the pressure which the core suffers in the injection step is nothing but the distribution of the pressure of the injected molten resin.

Figure 35:
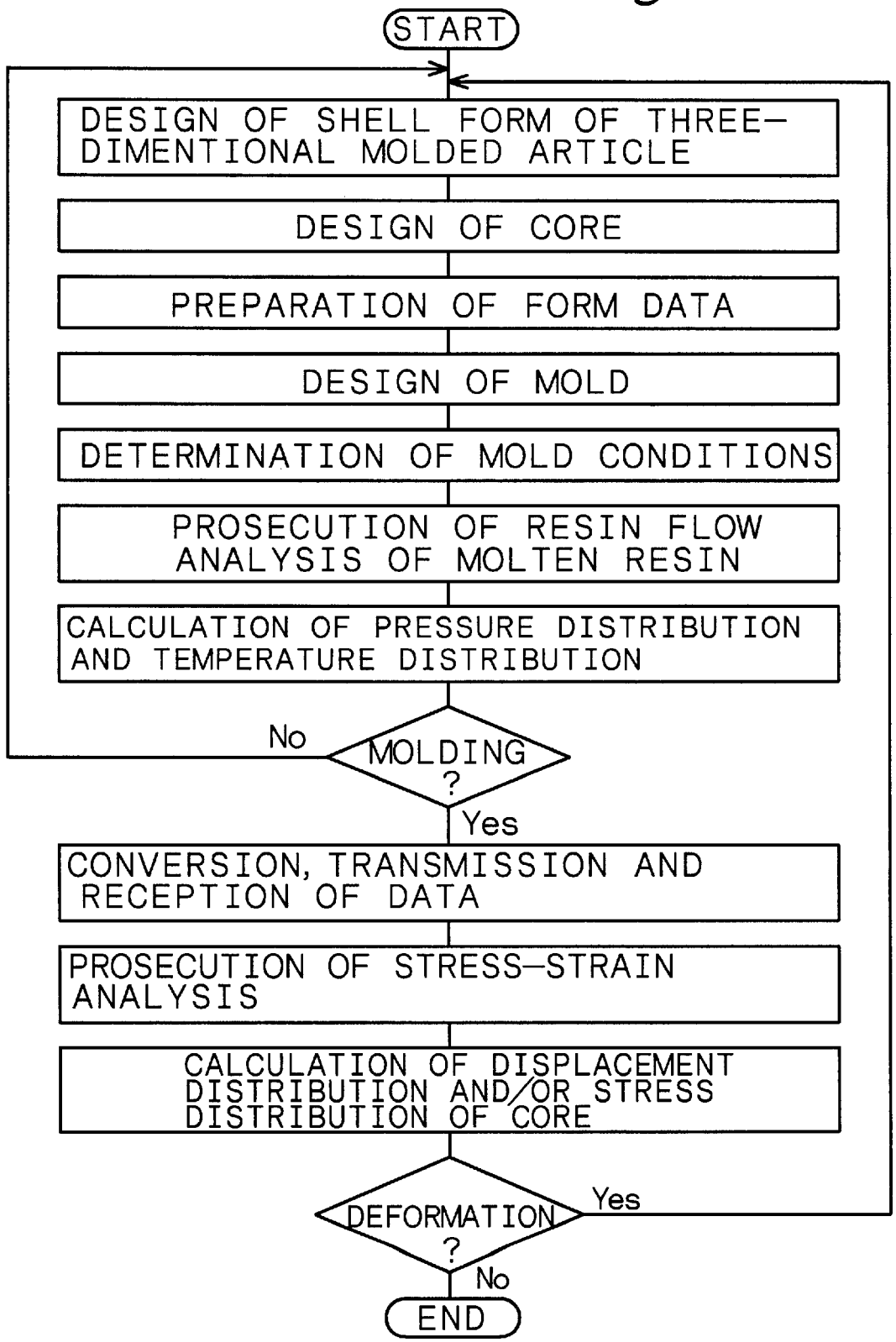
FIG. 35 is a flow chart of an optimizing method of an over-molding method, directed to a first aspect of the present invention.

FIG. 35 shows a flow chart of the optimizing method of the first aspect of the present invention.

In the optimizing method of an over-molding method, directed to the first aspect of the present invention, form data for simulation is prepared on the basis of a design drawing of the form of a covering member formed of a resin which covers the outer surface of a core (i.e., corresponding to an external form of a three-dimensional hollow molded article) and a design drawing of the core formed of a resin. The form of the covering member which covers the outer surface of the core is sometimes called "shell form" for convenience's sake hereinafter. A mold for producing the above three-dimensional hollow molded article is also designed. A temperature distribution and a pressure distribution in the step (injection step) of injecting a molten resin into the space formed by the core placed in the cavity of the mold and the cavity wall of the mold are first calculated by numerical analysis.

The numerical analysis of the temperature distribution and the pressure distribution of the molten resin on the basis of the numerical analysis of flow behavior of the molten resin in the injection step can be carried out by resin flow simulation. As this resin flow simulation, a resin flow simulator of a molten resin based on presently and generally used Hele-Shaw flow can be used. Developments of resin flow simulators in an injection molding method are vigorously under way, and most of analysis methods therefor are based on an assumption that the flow of a molten resin as a viscous fluid is a Hele-Shaw flow. This flow is analyzed with discretization by a method such as a finite element method. The following equation of motion, equation of continuity and equation of energy are used.
[equation of motion]
Equation 1

$$-\frac{\partial P}{\partial X} + \frac{\partial}{\partial Z}\left(\eta\frac{\partial u}{\partial Z}\right) = 0 \tag{1-1}$$

$$-\frac{\partial P}{\partial Y} + \frac{\partial}{\partial Z}\left(\eta\frac{\partial v}{\partial Z}\right) = 0 \tag{1-2}$$

[equation of continuity]
Equation 2

$$\frac{\partial \rho_{ave}}{\partial t} + \frac{\rho_{ave}}{b}\left\{\frac{\partial}{\partial X}\left(bu_{ave} + \frac{\partial}{\partial Y}(bv_{ave})\right)\right\} = 0 \tag{2}$$

[equation of energy]
Equation 3

$$\rho C_p\left(\frac{\partial T}{\partial t} + u_{ave}\frac{\partial T}{\partial X} + v_{ave}\frac{\partial T}{\partial Y}\right) = \kappa\frac{\partial^2 T}{\partial Z^2} + \eta\left\{\left(\frac{\partial u}{\partial Z}\right)^2 + \left(\frac{\partial v}{\partial Z}\right)^2\right\} \tag{3}$$

In the equations (1-1), (1-2) and (1-3) and in equations to be described hereinafter, symbols stand for the following.

P: pressure (Pa)
X, Y: axial direction of flow plane
Z: thickness direction of cavity
b: ½ of thickness of resin flow layer (m)
u: flow rate of resin in X direction (m/s)
$u_{ave}$: flow rate of resin in X direction, averaged on the basis of thickness of resin flow layer
v: flow rate of resin in Y direction (m/s)
$v_{ave}$: flow rate of resin in Y direction, averaged on the basis of thickness of resin flow layer
$\rho_{ave}$: average density of resin (kg/m$^3$)
$\rho$: density of resin (kg/m$^3$)
$\eta$: viscosity of molten resin (Pa-s)
$\eta_0$: zero-share viscosity (Pa-s)
$\kappa$: thermal conductivity of resin (J/(m-s-K))
$C_p$: specific heat of resin (J/(kg-K))
T: temperature of resin
t: time (second)
n, N: exponent
h: resin compression rate in the direction of cavity thickness (m/s)
A, B, $B_0$, R, $S_0$, $T_b$: constants
$P_c$: constant (pressure Pa)
$\rho_c$: constant (density of resin kg/m$^3$)

In the above equation of continuity (equation (2)), the first term ($\partial\rho_{ave}/\partial t$) of the left side member represents a change of density of the resin with time. When computerized resin flow simulation is carried out while taking the change of density of the resin with time into consideration, an equation of state calculated on the basis of a PVT curve showing the relationship among the pressure, volume and temperature of molten resin can be incorporated. As a equation of state, various equations such as Spencer-Gilmore equation of state and Tait equation of state have been proposed, and can be properly used as required depending upon the properties of the resin used.
[Spencer-Gilmore equation of state]
Equation 4

$$(P + P_c)\left(\frac{1}{\rho} - \frac{1}{\rho_c}\right) = RT \tag{4}$$

[Tait equation of state]
Equation 5

$$V(T,P) = V_0(T)\left\{1 - 0.0894\left(1 + \frac{P}{B(T)}\right)\right\} + V_t(T,P) \tag{5}$$

The flow of a resin is greatly affected by its melt viscosity, so that a constitute equation of viscosity may be incorporated for taking the influence of melt viscosity of a molten resin into account. As a constitute equation of viscosity, for example, a power-low model or a modified Cross model may be properly selected and used depending upon the properties of a resin used and a resin flow simulator used.
[power-low model]
Equation 6

$$\eta = A\dot{\gamma}^{1-n} exp(BT) \tag{6}$$

wherein $\dot{\gamma}$ is a shear rate (1/second).
[modified Cross model]
Equation 7

$$\eta = \frac{\eta_0}{1 + \left(\frac{\eta_0\dot{\gamma}}{S_0}\right)^{(1-N)}} \tag{7-1}$$

$$\eta_0 = B_0 exp(T_b/T) \tag{7-2}$$

wherein $\dot{\gamma}$ is a shear rate (1/second).

In the optimizing method directed to the first aspect of the present invention, numerical analysis of a displacement distribution and/or a stress distribution of a core can be specifically carried out by preparing pressure-loading conditions for conducting stress-strain analysis of a core on the basis of the pressure distribution of the molten resin, and then carrying out the stress-strain analysis with a structural analysis simulator under the pressure-loading conditions. The stress-strain analysis of a core can be more accurately carried out by taking into account the temperature distribution of the molten resin calculated with the resin flow simulator.

As a structural analysis simulator, a generally used structural analysis simulator can be used. The stress-strain analysis is carried out with the structural analysis simulator using the data of the temperature distribution and the pressure distribution of the molten resin calculated with the resin flow simulation, and it is therefore preferred that the resin flow simulator and the structural analysis simulator should have compatibility. When there is no compatibility, however, a data conversion program can be prepared and the format thereof can be rewritten with it.

The above-explained simulation in the optimizing method directed to the first aspect of the present invention can be summarized as follows.

($x_1$) A temperature distribution and a pressure distribution of a molten resin in the injection step are calculated on the basis of the flow behavior of the molten resin with a resin flow simulator.

($y_1$) Stress-strain analysis is carried out on the basis of data of the temperature distribution and the pressure distribution of the molten resin calculated in step ($x_1$), with a structural analysis simulator, whereby a displacement distribution and/or a stress distribution of the core are/is calculated.

By the above numerical analysis, the displacement distribution and/or the stress distribution of the core, which can be expected to occur in the injection step, can be quantitatively grasped, so that the form of the three-dimensional hollow molded article, the form of the core, the mold or the molding conditions can be optimized so as to minimize the deformation of the core. That is, not only the form of the three-dimensional hollow molded article and the form of the core are optimized, but also the optimization of the mold, typified by the position and number of the resin injection portion(s) (resin gate portion) or the determination of the optimum molding conditions is conducted. In other words, on the basis of results of the displacement distribution and/or the stress distribution of the core, the form of the three-dimensional hollow molded article, the form of the core or the mold are re-designed, or the molding conditions are re-determined, and the above-explained optimizing method of an over-molding method for producing the three-dimensional hollow molded article is repeated whereby the over-molding conditions are determined so as to minimize the deformation of the core.

Example 9 is concerned with the optimizing method of an over-molding method, directed to the first aspect of the present invention (to be referred to as "injection/non-compression over-molding method" for convenience's sake hereinafter), in which the number of the resin injection portions and the position of the resin injection portion in a mold are optimized. That is, in Example 9, two resin injection portions are provided in a mold, and the positions of these resin injection portions are optimized so as to minimize the deformation of a core (the fifth embodiment of the over-molding method directed to the first aspect of the present invention).

Figure 37A:
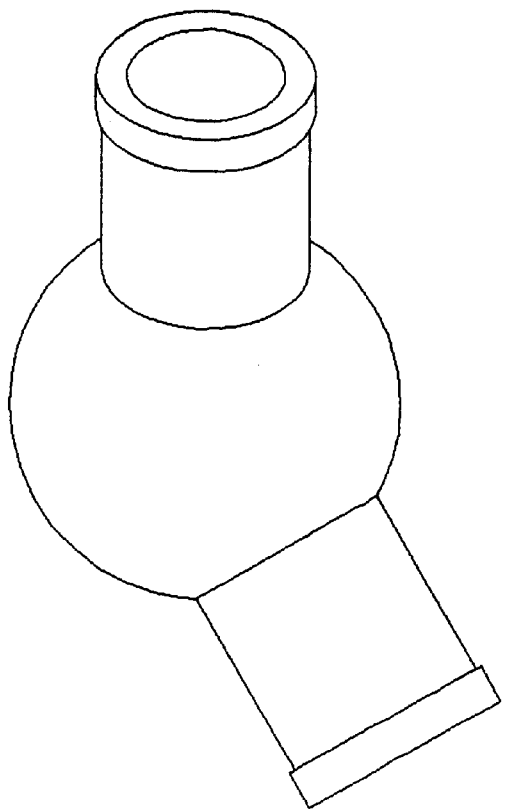
FIGS. 37A and 37B schematically show a three-dimensional hollow molded article in Example 9.
Figure 37B:
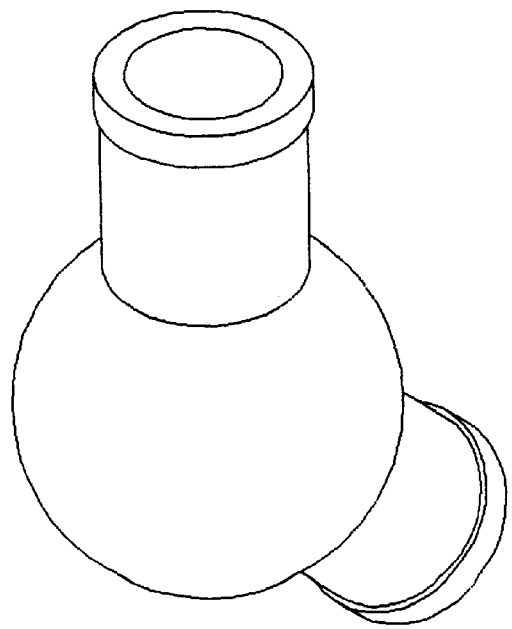
Figure 38A:
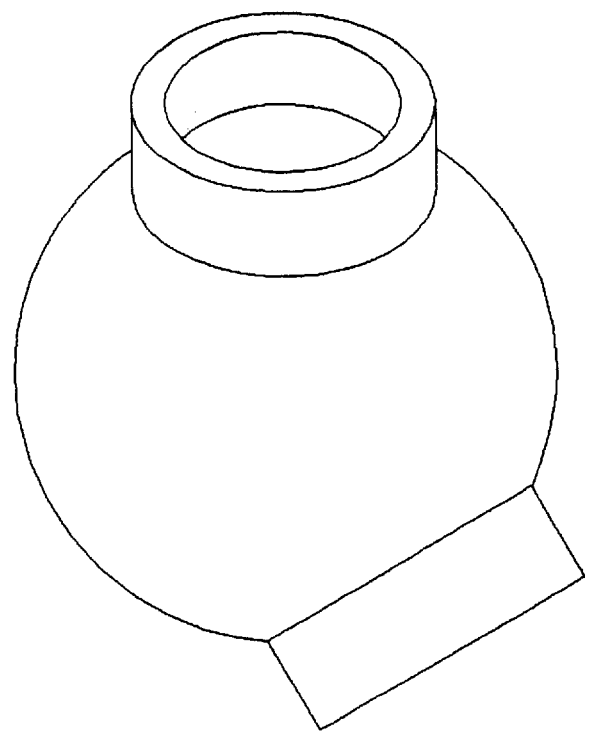
FIGS. 38A and 38B schematically show a core used in Example 9.
Figure 38B:
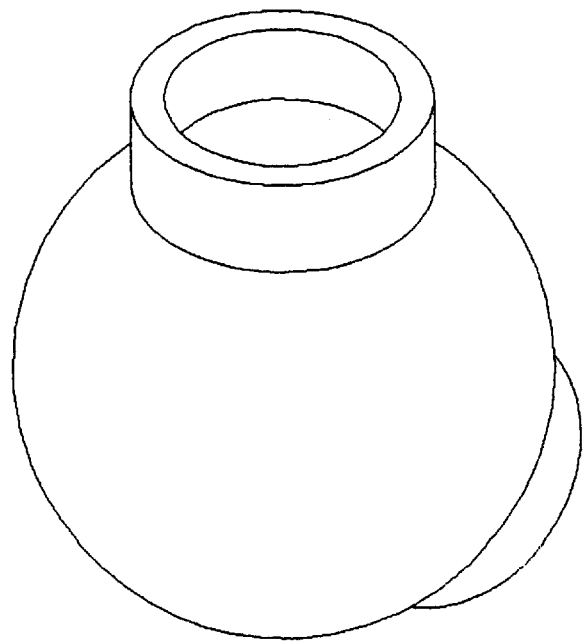

As shown in FIGS. 37A and 37B, the three-dimensional hollow molded article for which the over-molding method is to be optimized in Example 9 is a cylindrical article of which the central portion is formed of a spherical portion having a diameter of about 30 mm. FIGS. 37A and 37B show the three-dimensional hollow molded article viewed from different angles. FIGS. 38A and 38B show a core formed of a resin, and show the core viewed from different angles. The three-dimensional hollow molded article shown in FIGS. 37A and 37B is formed by entirely covering the outer surface of the core shown in FIGS. 38A and 38B. The core has a thickness of 2 mm, and the resin which covers the outer surface of the core is also designed to have a thickness of 2 mm. As a result, the central spherical portion is designed to have a final thickness (wall thickness) of 4 mm. The resin which covers the opening portions of the core is designed to have a thickness of 2.5 mm.

Figure 39:
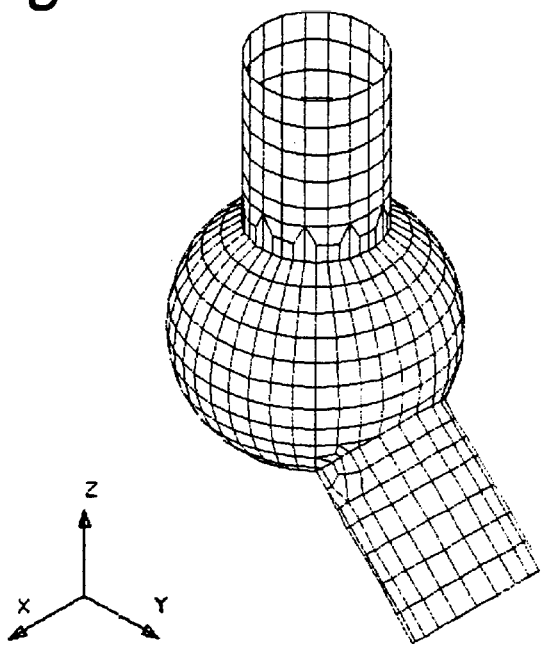
FIG. 39 shows form data used for carrying out resin flow simulation in Example 9.
Figure 40:
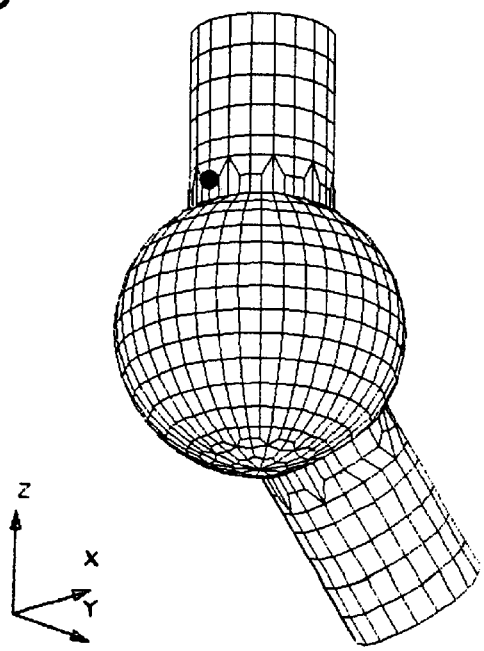
FIG. 40 shows form data used for carrying out resin flow simulation in Example 9, viewed from an angle different from that in FIG. 39, the form data being based on a one-point gate.
Figure 41:
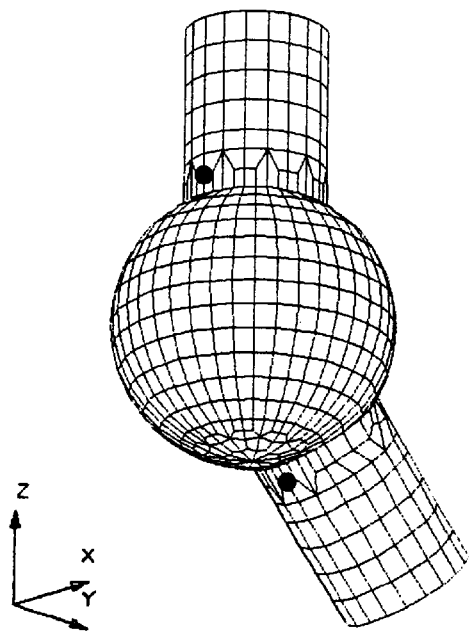
FIG. 41 shows form data used for carrying out resin flow simulation in Example 9, viewed from an angle different from that in FIG. 39, the form data being based on two one-point gates.
Figure 42:
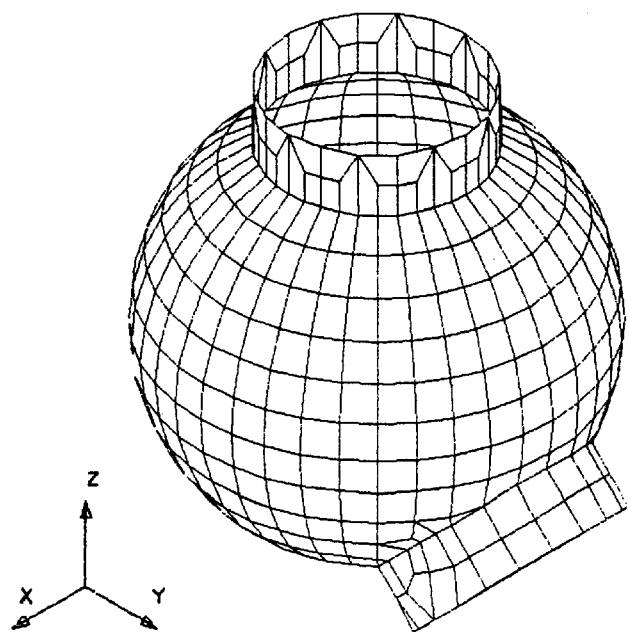
FIG. 42 shows form data used for carrying out stress-strain analysis in Example 9.

Form data for simulation is prepared on the basis of a design drawing of shell form of the above three-dimensional hollow molded article and a design drawing of the core. FIGS. 39 to 41 show the form data used for carrying out the resin flow simulation. FIG. 42 shows the form data used for carrying out the stress-strain analysis [viewing direction (1,1,1)]. FIGS. 39, 40 and 41 show the form data viewed from different angles. That is, the viewing direction for FIG. 39 is (1,1,1), and the viewing direction for FIGS. 40 and 41 is (1,-1,-1). The resin flow simulation in Example 9 is carried out with regard to two cases, one case in which one resin injection portion (resin gate portion) is provided (to be referred to as "one-point gate" hereinafter) as shown in FIG. 40 and the other case in which two resin injection portions (resin gate portions) are provided (to be referred to as "two-point gate" hereinafter) as shown in FIG. 41. The position(s) of the resin injection portion(s) in these resin flow simulations are indicated by black spot(s) in FIGS. 40 and 41.

The molding conditions in the injection step such as resin temperature, mold temperature, injection time, filling time of a molten resin and the like, and data of physical properties of a resin such as melt viscosity, heat conductivity, specific heat, density and the like are inputted, and the resin flow simulation is carried out using the form date shown in FIGS. 39 to 41. That is, the temperature distribution and the pressure distribution of the molten resin in the injection step of injecting the molten resin into the space formed by the core placed in the cavity of the mold and the cavity wall of the mold are calculated by numerical analysis.

In Example 9, physical properties of nylon 66 (corresponding to a second resin material) is used for the resin flow simulation. Nylon 66 is also used as a second resin material in Examples and Comparative Examples to be described later. Further, the amount of the molten resin to be injected is such that the space formed by the core and the cavity wall is completely filled at the time of completion of the injection step. This is also applicable to Examples 10 to 16 and Comparative Examples 4 to 6 to be described later.

Table 1 shows analysis conditions of the resin flow simulation in Example 9. The resin flow simulation uses the equation (1-1), equation (1-2), equation (2), equation (3) and equation (7).

TABLE 1

Physical properties of the resin used;
  Thermal conductivity: $7.23 \times 10^{-4}$ cal/(cm•s•k)
  Specific heat: 0.549 cal/(g•K)
  Density: 1.37 g/cm$^3$
  Constant $B_0$: $2.493 \times 10^{-7}$
  Constant $T_b$: $1.526 \times 10^4$
  Constant N: 0.4938
  Constant $S_0$: $5.459 \times 10^4$
Molding conditions;
  Resin temperature: 300° C.
  Mold temperature: 50° C.
  Injection time of molten resin:
    0.5 second, 1.0 second and 1.5 seconds The resin flow simulator used for the simulation in Example 9 is a resin flow simulator developed by Mitsubishi Gas Chemical Co., Inc. (see "Flow Analysis with consideration of state amount of molten resin", NARAZAKI Norio, SHIRAISHI Yutaka, Plastic Molding Society "Molding", Vol. 6, No. 3 (1994), pages 167 to 172).

In the resin flow simulation in Example 9, FIGS. 43 to 56 show the results of the simulation using a one-point gate. FIGS. 57 to 74 show the results of the simulation using a two-point gate. These figures are outlined in Table 2, in which "melt" in the column of content stands for "melt front history". Each figure has a scale, and the maximum range in the scale corresponds to that part which faces the resin injection portion. In each figure, a maximum range is indicated by "MAX", and a minimum range is indicated by "MIN" in

TABLE 2

| FIG. No. | Injection time of molten resin | Contents | Observation direction |
|---|---|---|---|
| FIG. 43 | 0.5 second | melt | (1,1,1) |
| FIG. 44 | 0.5 second | melt | (1,–1,1) |
| FIG. 45 | 0.5 second | pressure distribution | (1,1,1) |
| FIG. 46 | 0.5 second | pressure distribution | |
| FIG. 47 | 1.0 second | melt | (1,1,1) |
| FIG. 48 | 1.0 second | melt | (1,–1,1) |
| FIG. 49 | 1.0 second | pressure distribution | (1,1,1) |
| FIG. 50 | 1.0 second | pressure distribution | (1,–1,1) |
| FIG. 51 | 1.5 seconds | melt | (1,1,1) |
| FIG. 52 | 1.5 seconds | melt | (1,–1,1) |
| FIG. 53 | 1.5 seconds | pressure distribution | (1,1,1) |
| FIG. 54 | 1.5 seconds | pressure distribution | (1,–1,1) |
| FIG. 55 | 1.5 seconds | temperature distribution | (1,1,1) |
| FIG. 56 | 1.5 seconds | temperature distribution | (1,–1,1) |
| FIG. 57 | 0.5 second | melt | (1,1,1) |
| FIG. 58 | 0.5 second | melt | (1,–1,1) |
| FIG. 59 | 0.5 second | melt | (1,–1,–1) |
| FIG. 60 | 0.5 second | pressure distribution | (1,1,1) |
| FIG. 61 | 0.5 second | pressure distribution | (1,–1,1) |
| FIG. 62 | 0.5 second | pressure distribution | (1,–1,–1) |
| FIG. 63 | 1.0 second | melt | (1,1,1) |
| FIG. 64 | 1.0 second | melt | (1,–1,1) |
| FIG. 65 | 1.0 second | melt | (1,–1,–1) |
| FIG. 66 | 1.0 second | pressure distribution | (1,1,1) |
| FIG. 67 | 1.0 second | pressure distribution | (1,–1,1) |
| FIG. 68 | 1.0 second | pressure distribution | (1,–1,–1) |
| FIG. 69 | 1.5 seconds | melt | (1,1,1) |
| FIG. 70 | 1.5 seconds | melt | (1,–1,–1) |
| FIG. 71 | 1.5 seconds | pressure distribution | (1,1,1) |
| FIG. 72 | 1.5 seconds | pressure distribution | (1,–1,–1) |
| FIG. 73 | 1.5 seconds | temperature distribution | (1,1,1) |
| FIG. 74 | 1.5 seconds | temperature distribution | (1,–1,–1) | some cases. The scale in each figure showing a melt front history shows a period of elapsed time (unit: second) from the initiation of injection. The unit of the scale in each figure showing a pressure distribution is "kgf/cm$^2$". Further, the unit of the scale in each figure showing a temperature distribution is "° C.". Each of the black and white stripes in each figure shows the range of period of elapsed time, the range of the pressure and the range of the temperature. This is also applicable to figures showing melt front histories, figures showing pressure distributions and figures showing temperature distributions thereafter.

The resin flow simulation shows that the maximum pressure value in the pressure distribution in the over-molding with two-point gate is about ½ of the maximum pressure value in the over-molding with one-point gate. It is also found that when injection time is changed from 0.5 second to 1.0 second or a longer period of time is taken for the injection, the maximum pressure value decreases. However, when the injection time is increased to as long as 1.5 seconds, hardly any decrease in the maximum pressure value is observed. Table 3 shows the calculation result of the maximum pressure value in the pressure distribution (unit: kgf/cm$^2$).

TABLE 3

| Injection time | 0.5 seconds | 1.0 seconds | 1.5 seconds |
|---|---|---|---|
| One-point gate | 123 | 103 | 101 |
| Two-point gate | 50 | 41 | 39 |

A displacement distribution and a stress distribution of the core, caused by the pressure on the core under the flow of the molten resin in the injection step, are calculated by numerical analysis on the basis of the calculated temperature distribution and the calculated pressure distribution of the molten resin. That is, the stress-strain analysis is carried out on the basis of the output data of the resin flow simulation. The resin corresponding to a first resin material used for the stress-strain analysis is the same as that used for the resin flow simulation, i.e., nylon 66. Table 4 shows the physical property values of the resin which are inputted for this stress-strain analysis. The stress-strain analysis is carried out with a commercially available structural analysis simulator MARC (supplied by Nippon MARC Corporation).

TABLE 4
Physical properties of resin used
  Elastic modulus: 580 kgf /mm$^2$
  Poisson's ratio: 0.38

When the over-mold method is carried out with a core formed of a resin, the core is placed in a cavity of a mold by inserting a supporting member into the opening portion which is positioned in the end of the hollow portion of the core. As boundary conditions in carrying out the stress-strain analysis, therefore, it is assumed that those portions of the core which are near the opening portion of the core are fixed in all directions and the deformation of the core near its opening portion is prevented (restricted) by the supporting member.

FIGS. 75 to 86 show the stress distributions of the core caused by the pressure on the core under the flow of the molten resin. FIGS. 87 to 90 show the displacement distributions of the core caused by the pressure on the core under the flow of the molten resin, among the results of the stress-strain analysis. FIGS. 75 to 80 and FIGS. 87 and 88 show the simulation results when a one-point gate is used. FIGS. 81 to 86 and FIGS. 89 and 90 show the simulation results when a two-point gate is used. Each figure is outlined in Table 5. Each figure has a scale, and the maximum range of a stress distribution in the scale corresponds to data in that portion which faces the resin injection portion. In each figure, the maximum range is indicated by "MAX". The scale in each of FIGS. 75 to 86 shows a stress (unit: kgf/mm$^2$) expressed as an equivalent tensile stress of von Mises, and each of the black and white stripes in each figure shows the range of the stress. This is also applicable to figures showing stress distributions, to appear thereafter. The scale in each of FIGS. 87 to 90 shows a displacement (unit: mm) in Y direction, and each of the black and white stripes in each figure shows the range of the displacement.

The structural analysis simulation shows the following. As shown in Table 6, when a one-point gate is provided, the maximum stress value (expressed in terms of the maximum equivalent tensile stress of von Mises, unit: kgf/mm$^2$) is, for example, 4.9 kgf/mm$^2$, which when a two-point gate is provided, the maximum stress value is as small as 2.6 kgf/mm$^2$. Further, when the injection time for a molten resin is increased from 0.5 second to 1.0 second, the maximum stress value decreases. However, when the injection time is increased to as long as 1.5 seconds, no decrease in the displacement value (unit: mm) in Y direction when a two-point gate is provided in ½ of that when a one-point gate is provided.

TABLE 5

Figure 79:
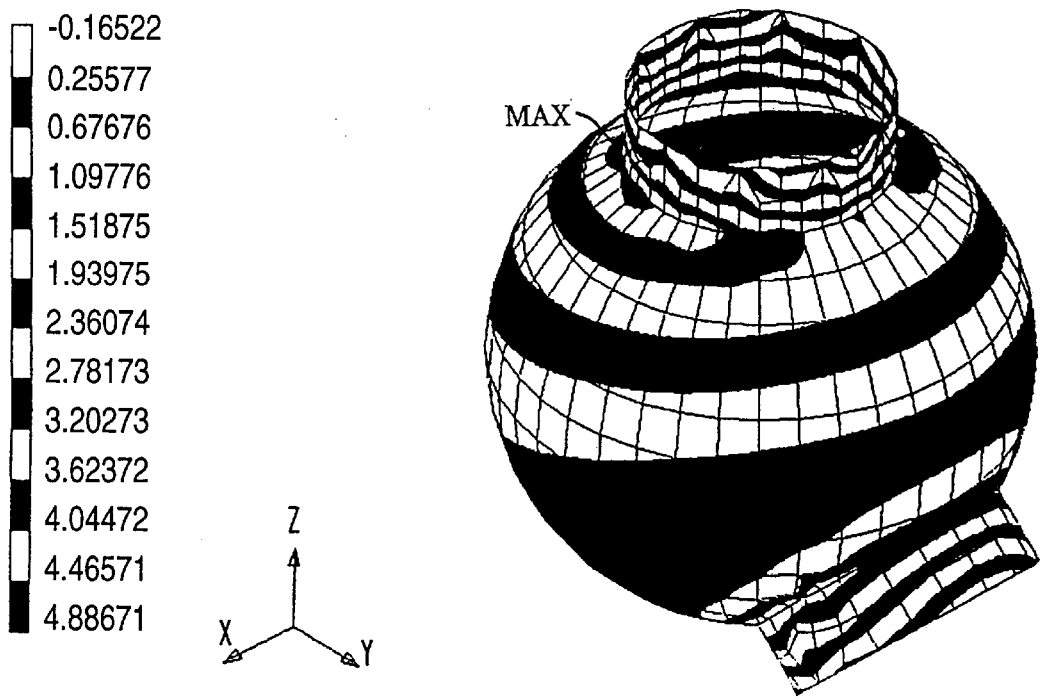
FIG. 79 schematically shows a stress distribution under conditions where a one-point gate is used, the time for injecting a molten resin is 1.5 seconds and the observation direction is (1,1,1).
Figure 80:
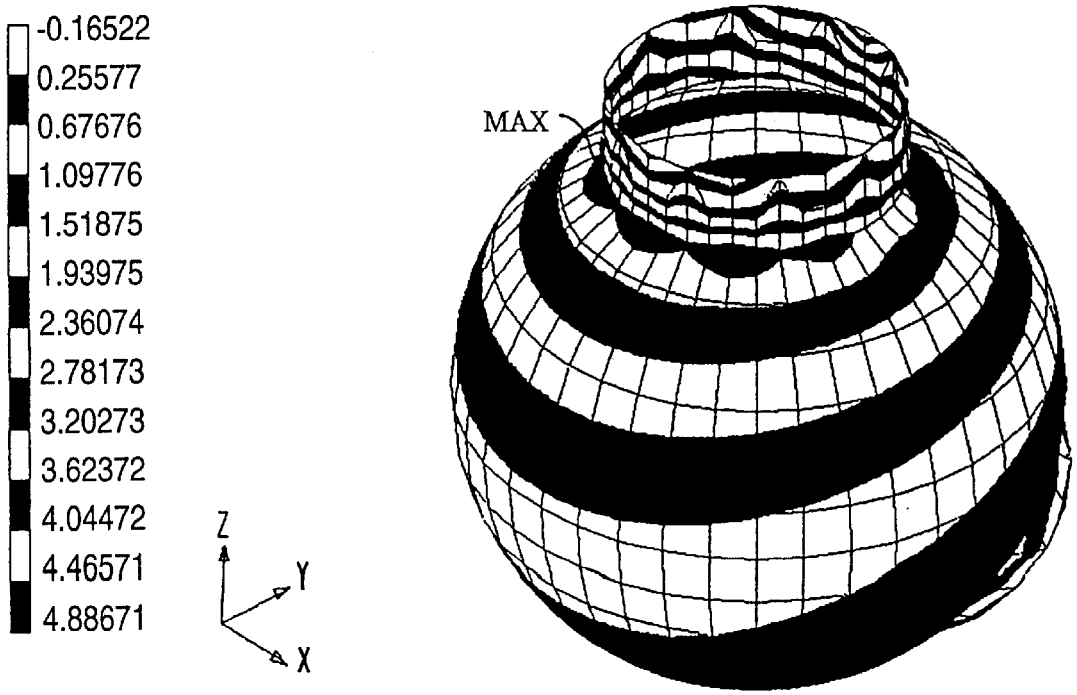
FIG. 80 schematically shows distribution under conditions where a one point gate is used, the time for injecting a molten resin is 1.5 seconds and the observation direction is (1,-1,1).

| FIG. No. | Injection time of molten resin | Observation direction |
|---|---|---|
| FIG. 75 | 0.5 second | (1,1,1) |
| FIG. 76 | 0.5 second | (1,−1,1) |
| FIG. 77 | 1.0 second | (1,1,1) |
| FIG. 78 | 1.0 second | (1,−1,1) |
| FIG. 79 | 1.5 seconds | (1,1,1) |
| FIG. 80 | 1.5 seconds | (1,−1,1) |
| FIG. 81 | 0.5 second | (1,1,1) |
| FIG. 82 | 0.5 second | (1,−1,1) |
| FIG. 83 | 1.0 second | (1,1,1) |
| FIG. 84 | 1.0 second | (1,−1,1) |
| FIG. 85 | 1.5 seconds | (1,1,1) |
| FIG. 86 | 1.5 seconds | (1,−1,−1) |
| FIG. 87 | 1.5 seconds | (1,1,1) |
| FIG. 88 | 1.5 seconds | (1,−1,1) |
| FIG. 89 | 1.5 seconds | (1,1,1) |
| FIG. 90 | 1.5 seconds | (1,−1,−1) |

TABLE 6

| Maximum stress value | | | |
|---|---|---|---|
| Injection time | 0.5 sec | 1.0 sec | 1.5 sec |
| One-point gate | 5.6 | 4.9 | 4.9 |
| Two-point gate | 3.0 | 2.6 | 2.6 |
| Maximum displacement value | | | |
| Injection time | 1.5 sec | | |
| One-point gate | 0.12 | | |
| Two-point gate | 0.06 | | |

REFERENCE EXAMPLE 1

The over-molding method was carried out with regard to a case where a one-point gate was provided and a case where a two-point gate was provided, to confirm the results of

TABLE 7

Resin temperature set: 300° C. (found 302° C.)
Mold temperature set: 50° C. (found 55° C.)
Injection time: About 2.0 seconds
Injection pressure: About 400 kgf/cm²-G Under the above conditions, the over-molding was carried out. When a one-point gate was provided, that portion of the core which was near the resin injection portion was deformed, and no good product was obtained. When a two-point gate was provided, the core was not at all deformed.

EXAMPLE 10 AND
COMPARATIVE EXAMPLE 4

Example 10 is also concerned with the optimizing method of an over-molding method (injection/non-compression over-molding method), directed to the first aspect of the present invention, and more specifically, is concerned with the first embodiment of the optimizing method directed to the first aspect of the present invention. That is, in Example 10, the thickness of that portion of the core which faces the resin injection portion is optimized so as to minimize the deformation of the core. Example 10 corresponds to Example 1. Comparative Example 4 corresponds to Comparative Example 1.

Figure 91:
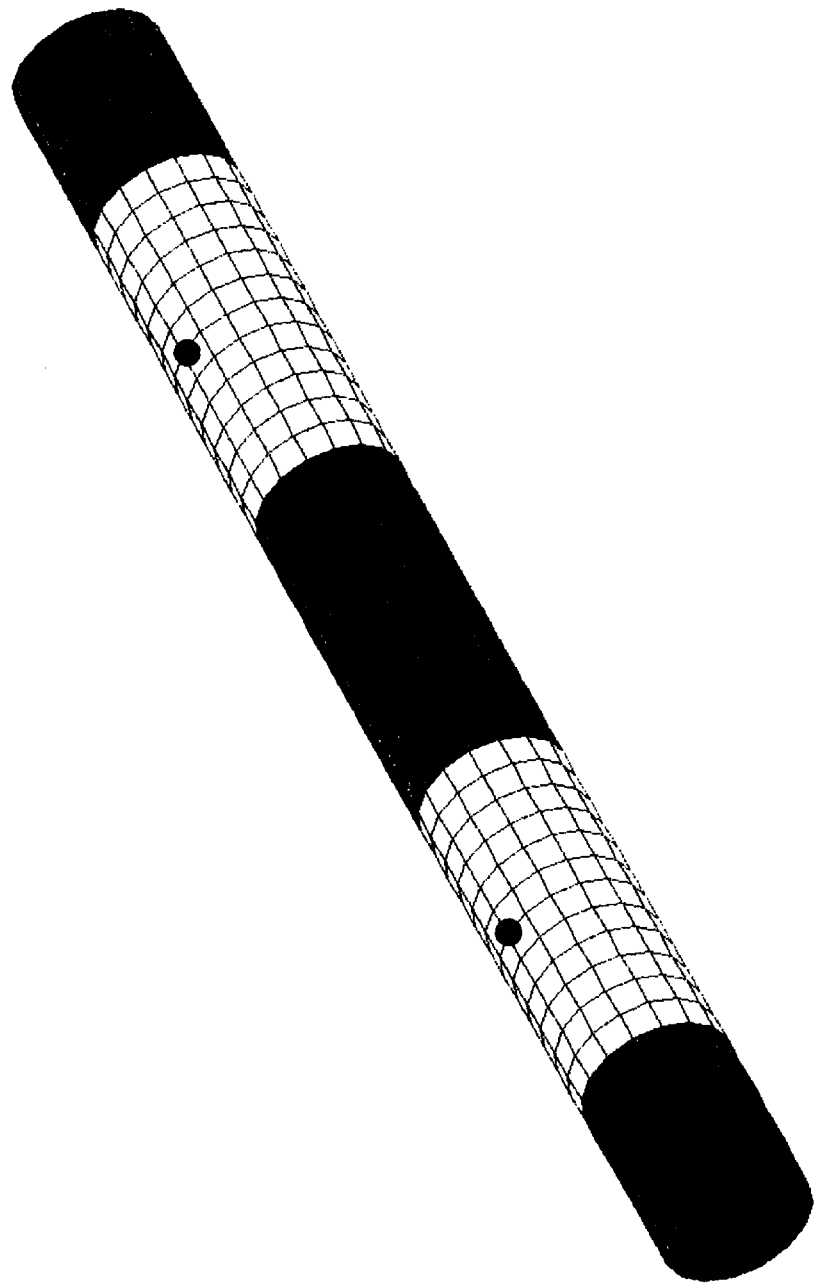
FIG. 91 shows form data of a core used for carrying out the resin flow simulation in the optimizing method of an over-molding method in Example 10.

The three-dimensional hollow molded article and the core for which the over-molding method is optimized are the same as those in Example 1. on the basis of a design drawing of the shell form of the three-dimensional hollow molded article and a design drawing of the core, form data for simulation is prepared. FIG. 91 shows the form data of the core used when the resin flow simulation is carried out. FIG. 91 shows the form data of the core viewed from the direction of (1,1,1). In FIG. 91, the thickness $t_0$ of the core in black regions is 2.0 mm. On the other hand, the thickness $t_0$ of the core in white regions is 3.0 mm. The thickness of the shell form which covers the core in the black and white regions is 2.0 mm. The thickness of the shell form refers to a wall thickness of the shell form.

For comparison (Comparative Example 4), under a condition where the thickness of the core in the white regions is 2.0 mm, the analysis is carried out in the same manner as in Example 10. The thickness of the shell form which covers the core in the black and white regions is 2.0 mm.

Figure 92:
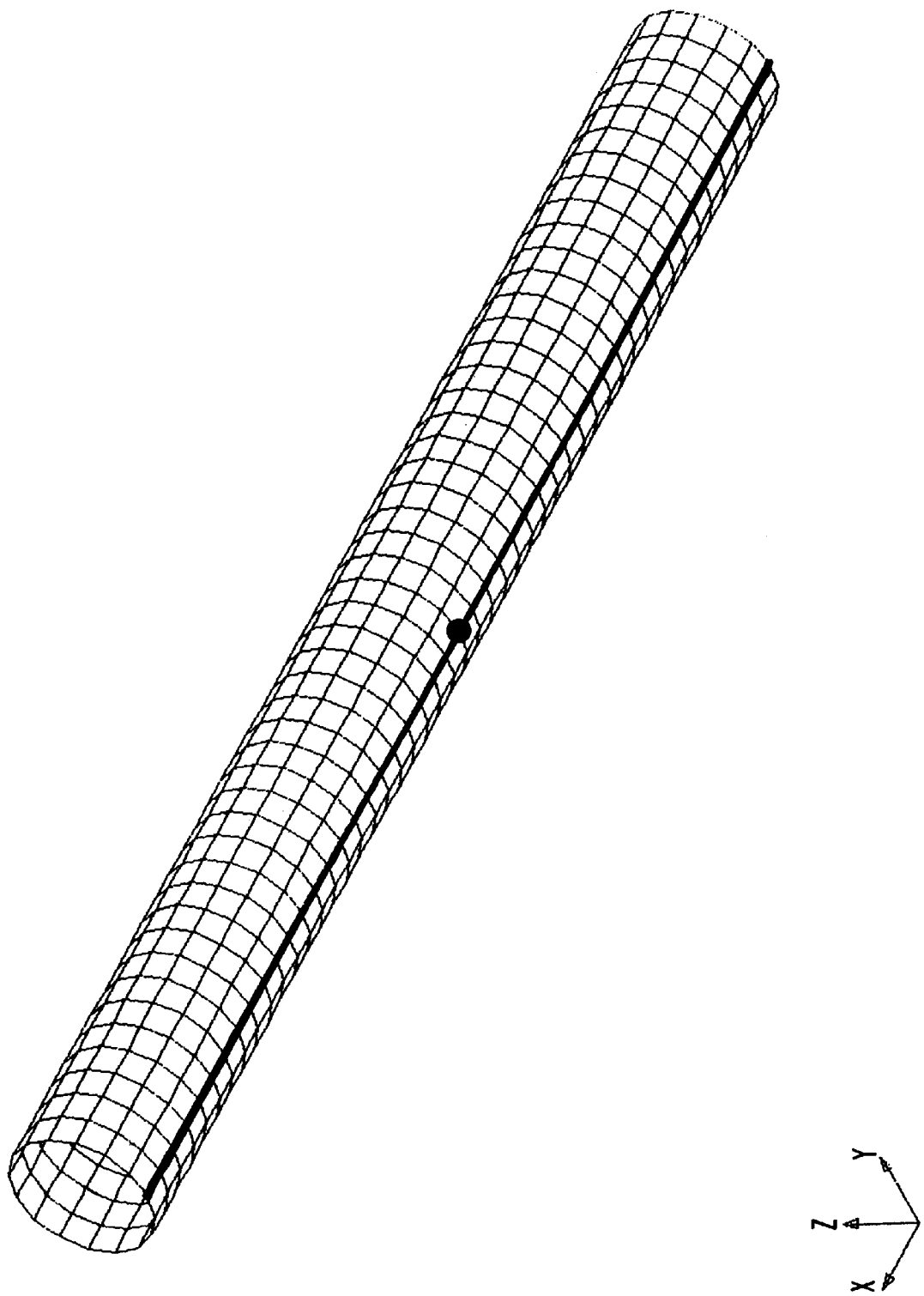
FIG. 92 shows a boundary condition for carrying out a stress-strain analysis in the optimizing method of an over-molding method in Example 10.

In FIG. 91, black spots show the positions of the resin injection portions in each resin flow simulation. As boundary conditions for carrying out the stress-strain analysis, as shown in FIG. 92, it is assumed that a portion indicated by black spots (lower central portion of the core) is fixed in all directions and that a portion indicated by a heavy black line (lower region in parallel with the axial line of the core) is fixed in Y and Z directions. FIG. 92 shows the core viewed from the direction of (1,1,−1).

On the basis of the form date shown in FIG. 91, the temperature distribution and the pressure distribution of a molten resin in the injection step of injecting the molten resin into the space formed by the core placed in the cavity and the cavity wall are calculated by numerical analysis in the same manner as in Example 9. The resin flow simulation is carried out under the same conditions as those in Table 1. However, injection time of molten resin is 1.0 second.

Figure 93:
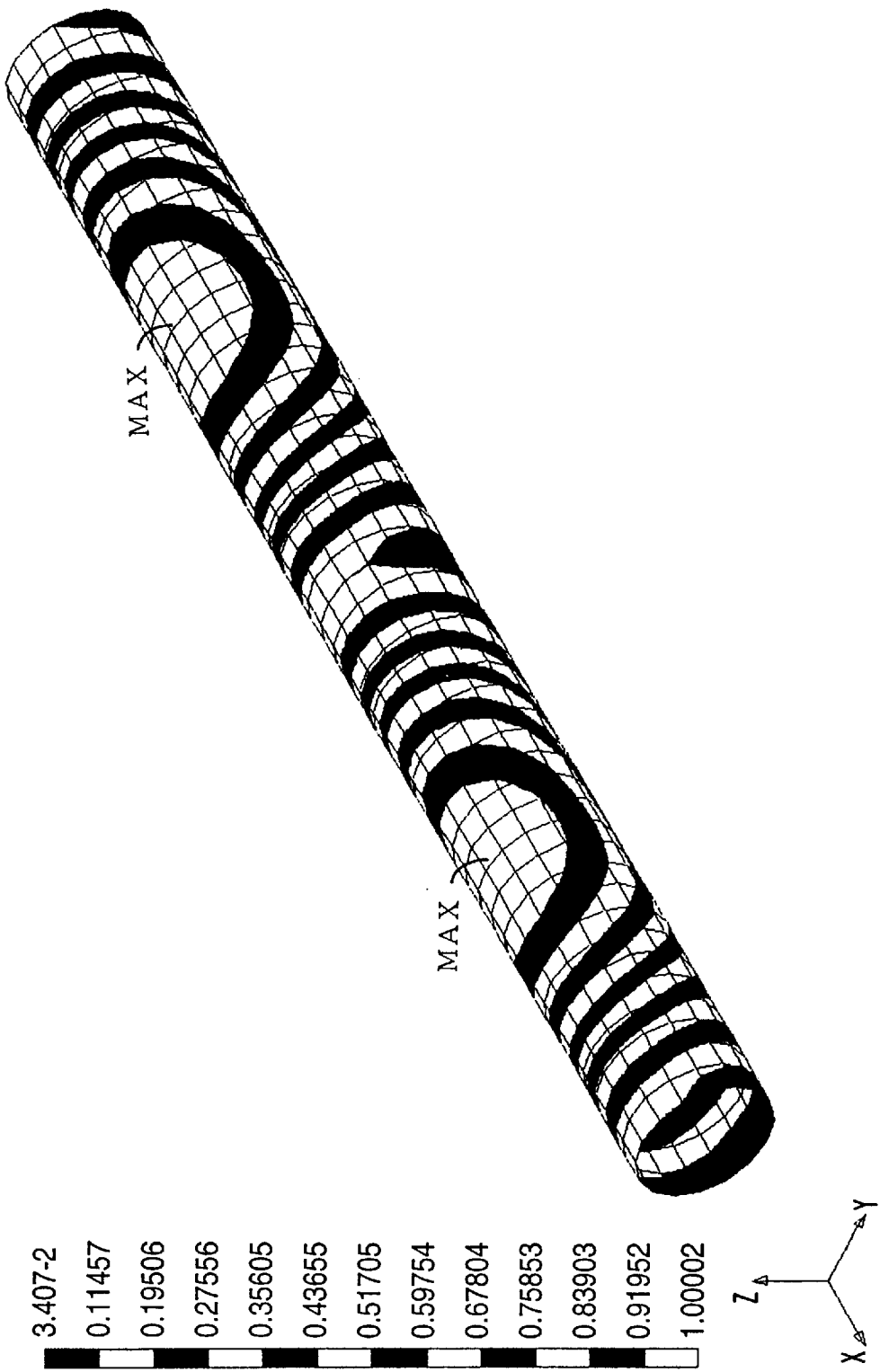
FIG. 93 shows a melt front history among resin flow simulation results in Example 10.
Figure 94:
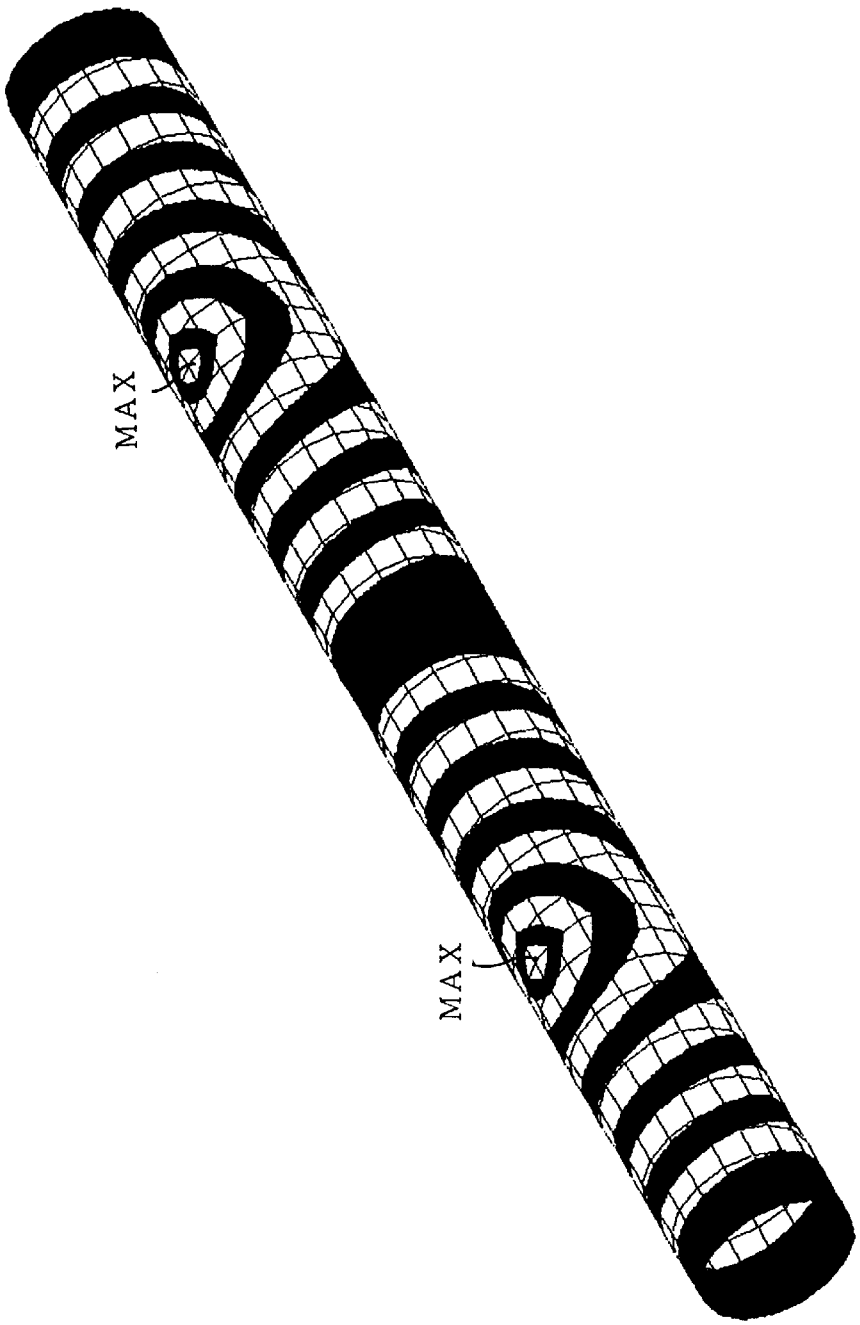
FIG. 94 shows a pressure distribution among resin flow simulation results in Example 10.

FIG. 93 shows the melt front history out of results of the resin flow simulation in Example 10. FIG. 94 shows the pressure distribution. The meaning of the black and white stripes in these figures and figures thereafter are the same as those in Example 9. The melt front history and the pressure distribution in Comparative Example 4 are the same as those in Example 10. The analysis of the pressure distribution shows that the maximum pressure value is 84 kgf/cm².

On the basis of the date of the calculated temperature distribution and the pressure distribution, the displacement distribution and the stress distribution of the core, caused by the pressure exerted on the core under the flow of molten resin, are calculated by numerical analysis. That is, the stress-strain analysis is carried out on the basis of the output data of the resin flow simulation. The data of the resin (corresponding to the first resin material) used for the stress-strain analysis is the data of nylon 206. Table 8 shows the physical property values of the resin used for the stress-strain analysis.

Figure 95:
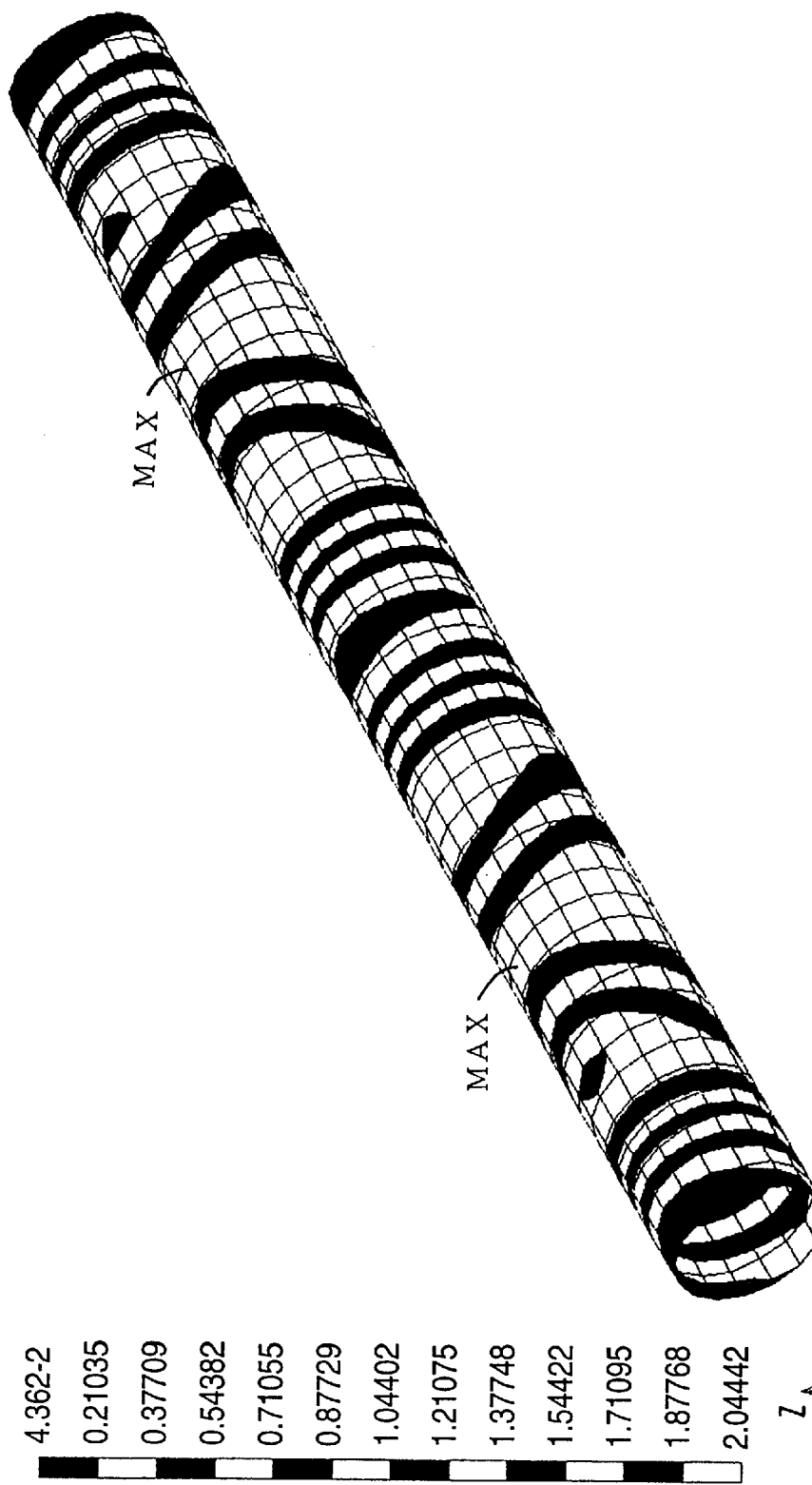
FIG. 95 shows a simulation result of a stress distribution of a core in Example 10.
Figure 96:
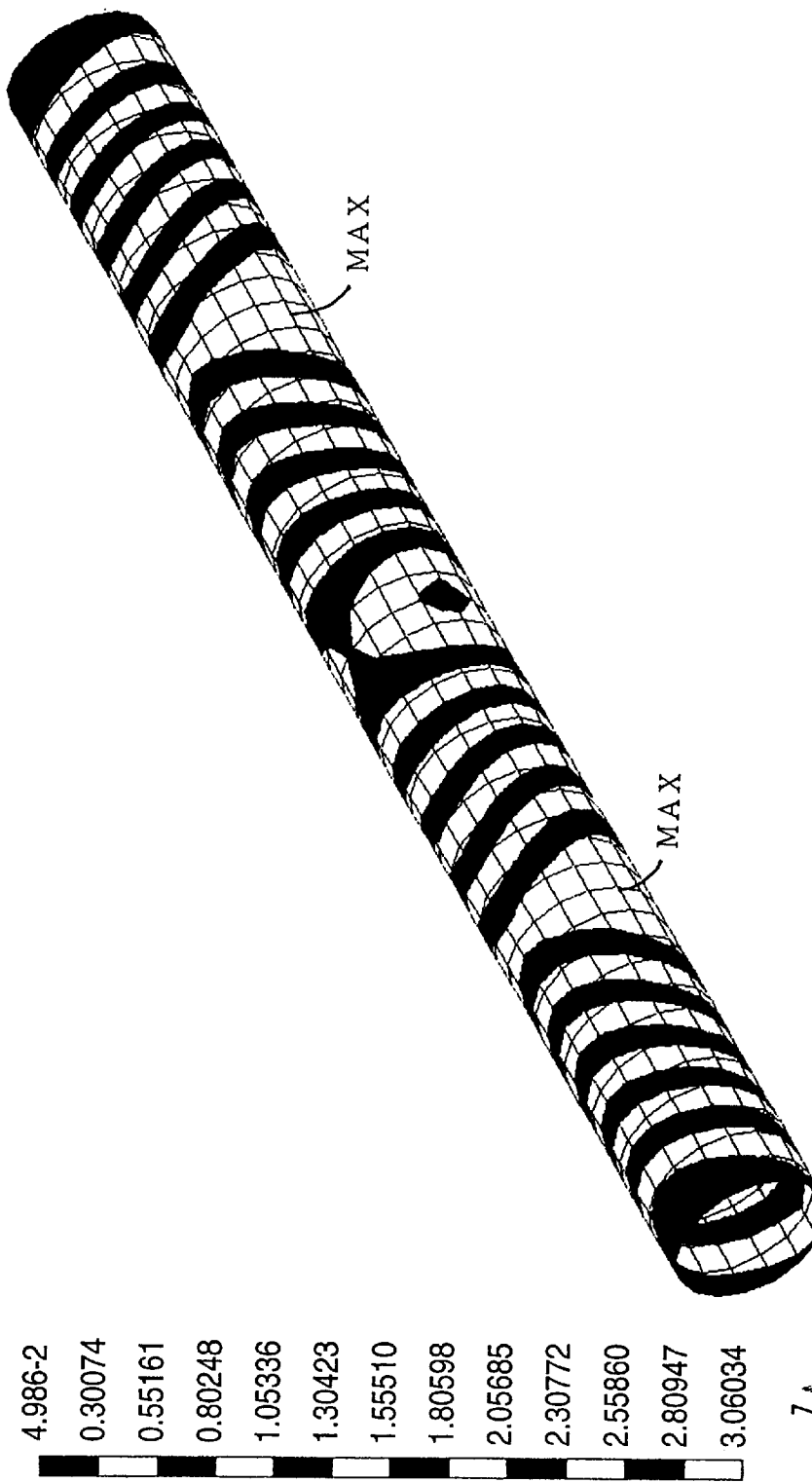
FIG. 96 shows a simulation result of a stress distribution of a core in pressure distribution among results in Comparative Example 4.

TABLE 8
Physical property values of the resin
  Elastic modulus: 450 kgf /mm²
  Poisson's ratio: 0.38
FIG. 95 shows the simulation result of the stress distribution of the core caused by the pressure exerted on the core under the flow of the molten resin, out of the results of the stress-strain analysis in Example 10. FIG. 96 shows the simulation result of the stress distribution of the core in Comparative Example 4. The meaning of the black and white stripes in these figures and figures thereafter are the same as those in Example 9. The simulation results of the stress distribution of the core are summarized as shown in Table 9. These simulation results show that the deformation of that portion of the core which faces the resin injection portion (and the deformation of the three-dimensional hollow molded article) by the pressure caused by the injected molten resin can be prevented by increasing the thickness of that portion of the core which faces the resin injection portion from 2.0 mm to 3.0 mm. This analysis result is well in agreement with the result in Example 1 in which the over-molding method 10 was actually carried out.

TABLE 9

|  | Maximum stress value |
| --- | --- |
| Example 10 | 2.0 |
| Comparative Example 4 | 3.0 |

EXAMPLE 11

Example 11 is also concerned with the optimizing method of an over-molding method (injection/non-compression over-molding method) for producing a three-dimensional hollow molded article, directed to the first aspect of the present invention, and more specifically, is concerned with the second embodiment of the optimizing method directed to the first aspect of the present invention. In Example 11, the thickness (wall thickness) of the resin which covers the outer surface of the core is optimized so as to minimize the deformation of the core.

The three-dimensional hollow molded article and the core for which the over-molding method is optimized are the same as those in Comparative Example 4. In Example 11, the core has a constant thickness of 2.0 mm, and the shell form has a thickness (wall thickness) of 1.0 mm, 1.5 mm, 2.0 mm, 2.5 mm and 3.0 mm, and form data for simulation are prepared based on these thickness data. For the resin flow simulation in Example 11, the resin injection portions are provided in the mold at the same positions as those shown in FIG. 91. The analysis conditions for the resin flow simulation, injection time of the molten resin and the boundary conditions for the stress-strain analysis are the same as those in Example 10.

A temperature distribution and a pressure distribution of a molten resin are numerically calculated in the injection step of injecting the molten resin into the space formed by the core placed in the cavity of the mold and the cavity wall of the mold, in the same manner as that in Example 10. Further, a displacement distribution and a stress distribution of the core, caused by the pressure exerted on the core under the flow of the molten resin in a compression step are numerically calculated in the same manner as those in Example 10, on the basis of the calculated temperature distribution and the calculated pressure distribution.

The analysis results of the pressure distributions (the maximum pressure value, unit: $kgf/cm^2$) and the simulation results of the stress distribution (the maximum stress value, unit: $kgf/mm^2$), when the thickness of the shell form is changed, are shown in Table 10.

TABLE 10

| Thickness of shell form | Maximum pressure value | Maximum stress value |
| --- | --- | --- |
| 1.0 | 440 | 18.5 |
| 1.5 | 173 | 6.9 |
| 2.0 | 84 | 3.1 |
| 2.5 | 56 | 2.0 |
| 3.0 | 40 | 1.4 |

The results show that when the core has a thickness of 2.0 mm, the deformation of that portion of the core which faces the resin injection portion, caused by the pressure exerted on the core under the flow of the molten resin, can be prevented if the thickness of the shell form of the three-dimensional molded article is equal to or more than 2.5 mm.

EXAMPLE 12

Example 12 is also concerned with the optimizing method of an over-molding method (injection non-compression over-molding method), directed to the first aspect of the present invention, and more specifically, is concerned with the third embodiment of the above over-molding method. In Example 12, that portion of a core which faces a resin injection portion is provided with a rib and the rib form is optimized.

The three-dimensional hollow molded article and the core for which the over-molding method is optimized in Example 12 have substantially the same forms as those in Comparative Example 4. That is, the core has a thickness (wall thickness) of 2.0 mm, and the shell form of the three-dimensional hollow molded article has a thickness (wall thickness) of 2.0 mm. The difference of Example 12 from Comparative Example 4 is that that thickness-increased portion of the core which faces the resin injection portion is provided with five ribs having a thickness of 2 mm each. FIG. 97 shows the form data of the rib portion out of form data of the core used for carrying out the resin flow simulation in the optimizing method in Example 12.

The position of the resin injection portion in the resin flow simulation in Example 12 is as shown in FIG. 91. The analysis condition of the resin flow simulation, the injection time of a molten resin and the boundary condition of the stress-strain analysis are also the same as those in Example 10.

A temperature distribution and a pressure distribution of a molten resin are numerically calculated in the injection step of injecting the molten resin into the space formed by the core placed in the cavity of the mold and the cavity wall of the mold, in the same manner as that in Example 10. Further, a displacement distribution and a stress distribution of the core, caused by the pressure exerted on the core under the flow of the molten resin in a compression step are numerically calculated in the same manner as those in Example 10, on the basis of the calculated temperature distribution and the calculated pressure distribution.

Figure 98:
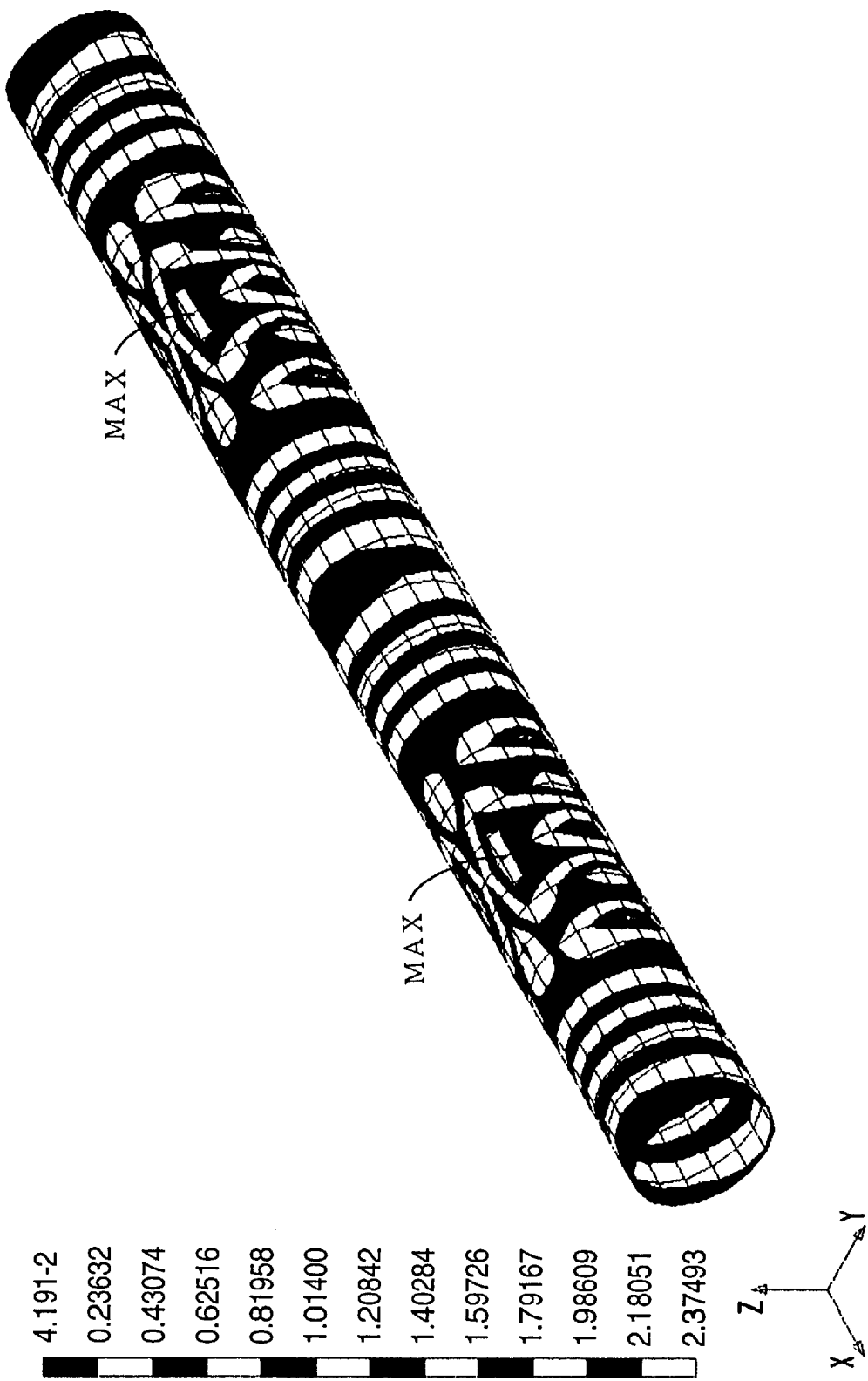
FIG. 98 shows a simulation result of a stress distribution of a core in Example 12.

FIG. 98 shows the simulation results of stress distribution of the core caused by the pressure exerted on the core under the flow of the injected molten resin, out of the stress-strain analysis results in Example 12. The simulation results of the stress distribution are summarized as shown in Table 11. This result shows the following. By providing a rib form to that portion of a core which faces a resin injection portion, the deformation of that portion of the core which faces the resin injection portion (and the deformation of the threedimensional hollow molded article), caused by the pressure exerted on the core under the flow of the molten resin, can be prevented.

TABLE 11

|  | Maximum stress value |
| --- | --- |
| Example 12 | 2.4 |
| Comparative Example 4 | 3.1 |

EXAMPLE 13 AND COMPARATIVE EXAMPLE 5

Example 13 is also concerned with the optimizing method of an over-molding method (injection non-compression over-molding method), directed to the first aspect of the present invention, and more specifically, is concerned with the fourth embodiment of the over-molding method directed to the first aspect of the present invention. In Example 13, the form of a three-dimensional hollow molded article, the form of a core or a mold are optimized such that the core is not present in that region of the mold cavity which faces the resin injection portion so as to minimize the deformation of the core. Example 13 corresponds to Example 5. Comparative Example 5 corresponds to Comparative Example 2.

Figure 99:
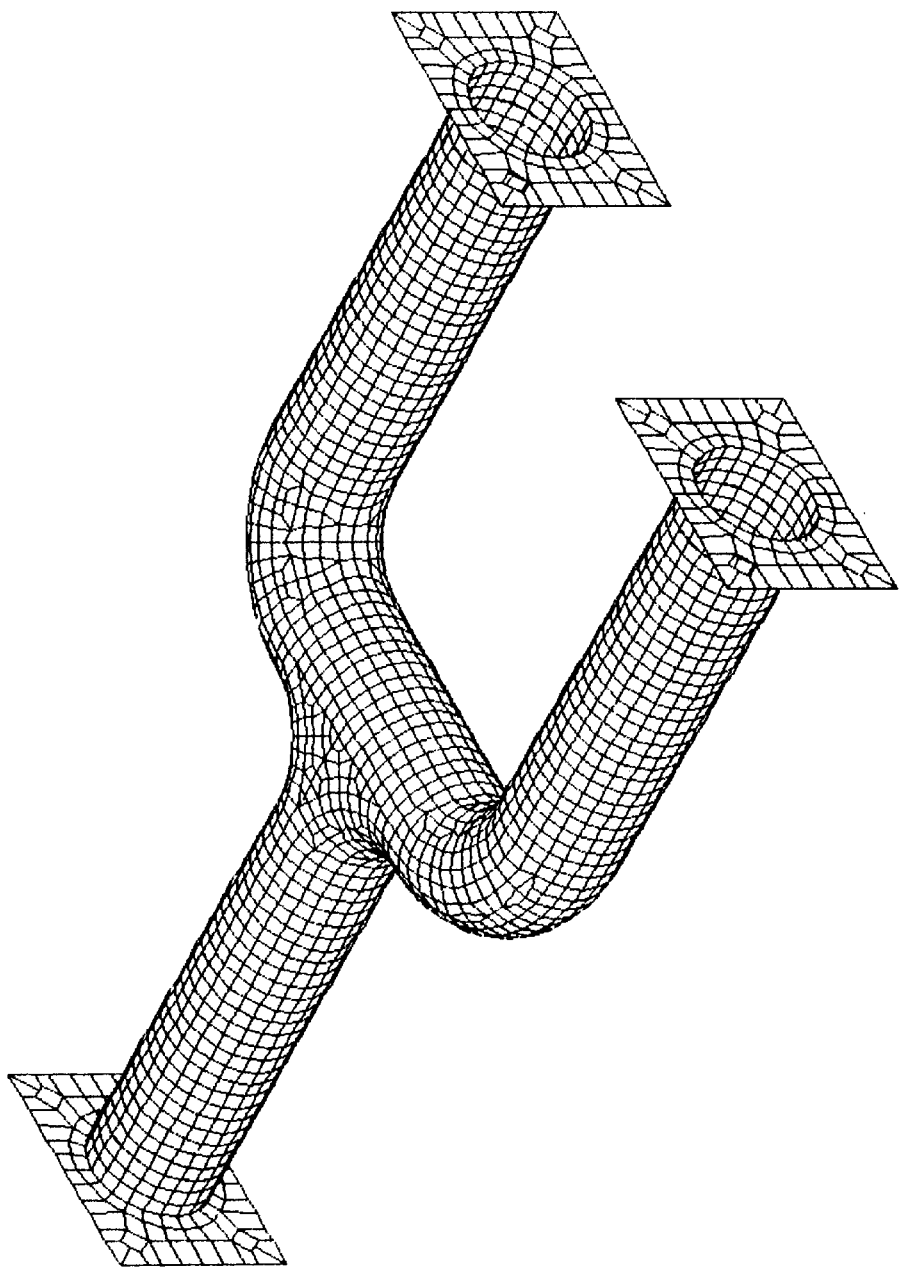
FIG. 99 shows form data based on design drawings of the shell form of a three-dimensional hollow molded article in Example 13.
Figure 100:
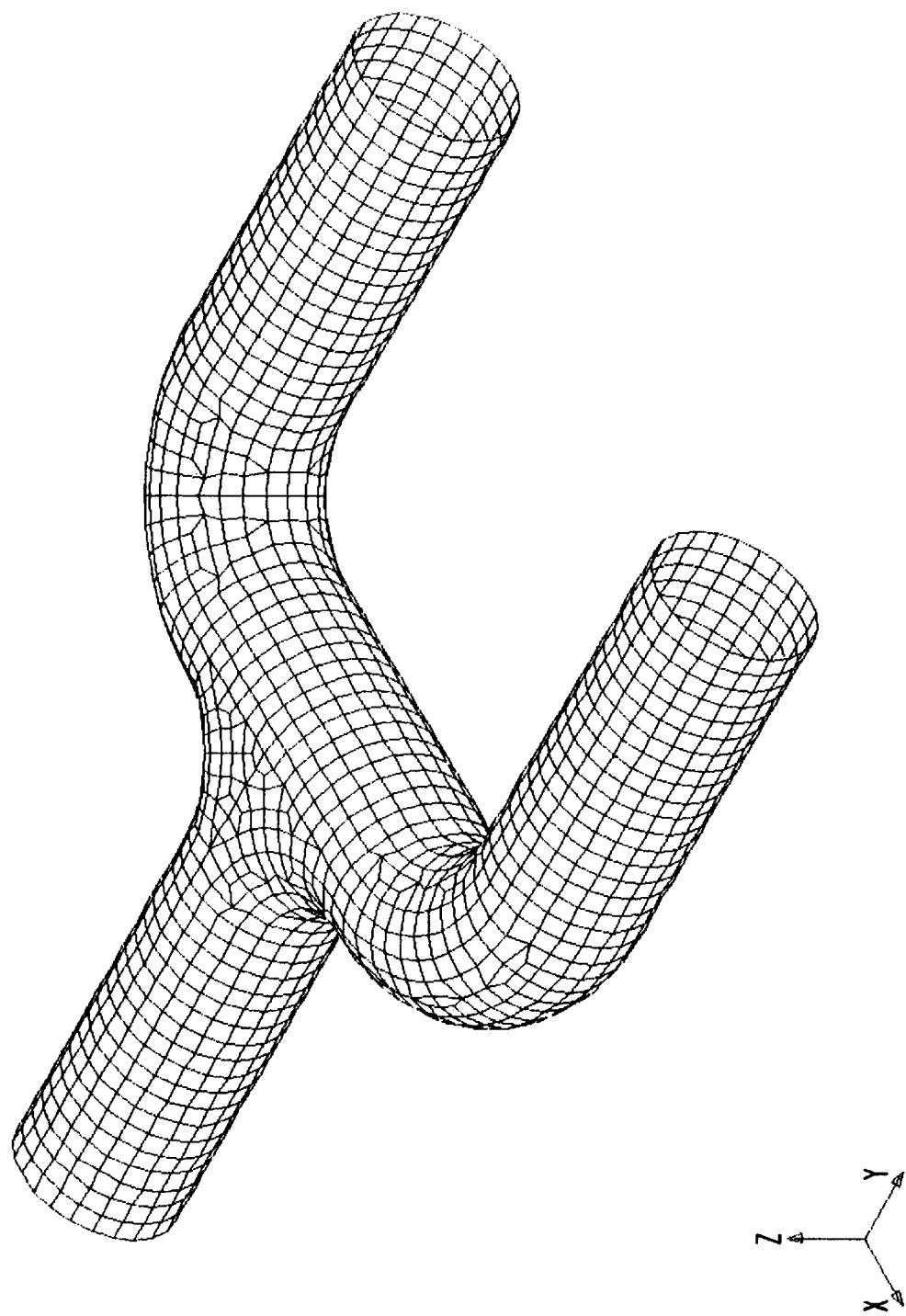
FIG. 100 shows form data based on design drawings of a core in Example 13.
Figure 102:
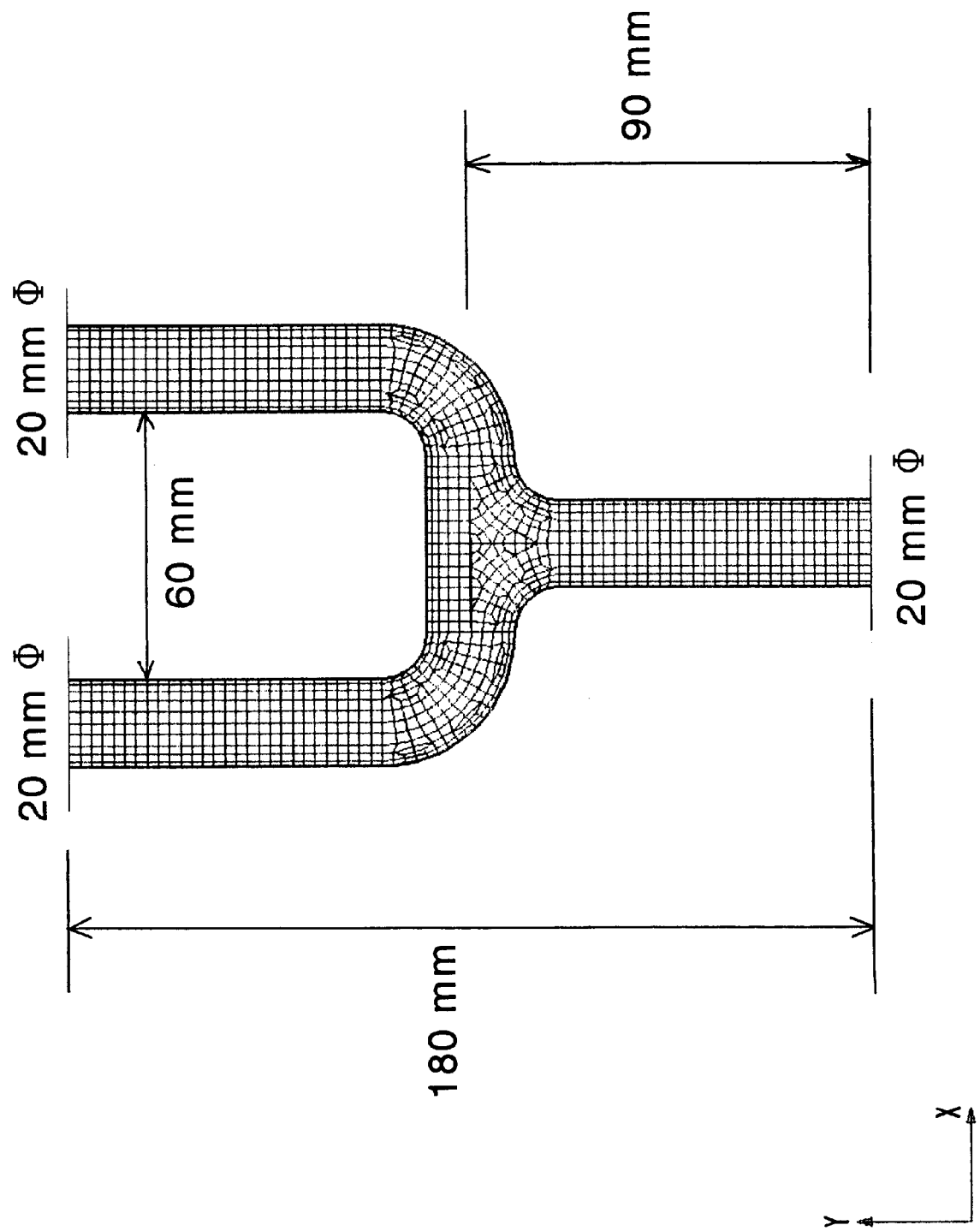
FIG. 102 shows dimensions of the shell form of three-dimensional hollow molded article in Example 13.
Figure 103:
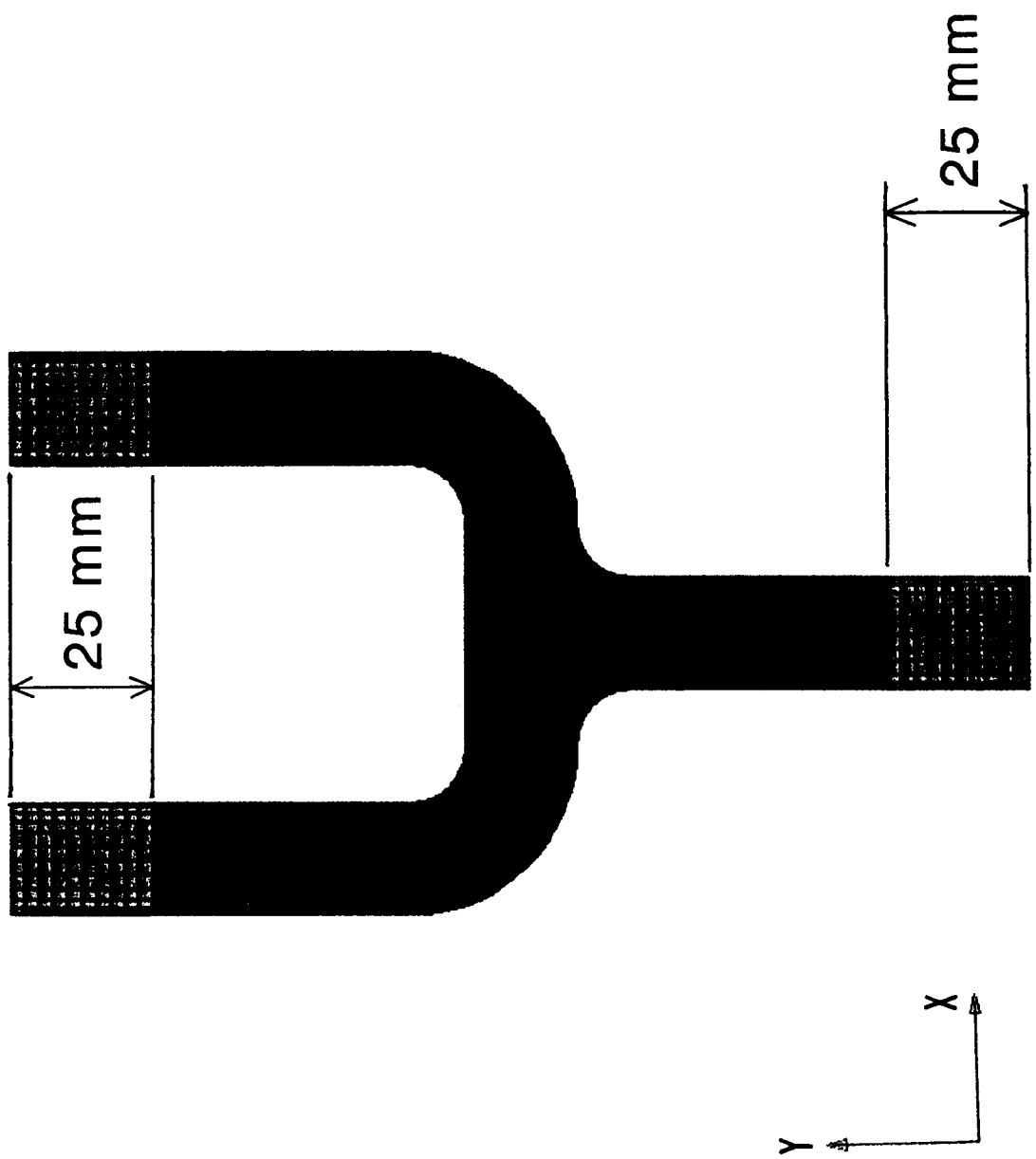
FIG. 103 shows a relationship of the arrangement between the shell form of a three-dimensional hollow molded article and the core in Example 13.

The three-dimensional hollow molded article and the core which are the objects of the over-molding method to be optimized in Example 13 has the same dimensions as those in Example 5. On the basis of a design drawing of the three-dimensional hollow molded article and a design drawing of the core, form data for simulation is prepared. FIGS. 99 to 103 show the form data of the three-dimensional hollow molded article and the core, used for carrying out the resin flow simulation. FIG. 99 shows the form data based on the design drawing of the shell form of the three-dimensional hollow molded article. FIG. 100 shows the form data based on the design drawing of the core. FIG. 101 shows the positional relationship between the shell form of the three-dimensional hollow molded article and the core, in which a black region shows the core. FIG. 102 shows the dimensions of the shell form of the three-dimensional hollow molded article. FIG. 103 shows the positional relationship of the core to the shell form of the three-dimensional hollow molded article. The core has a wall thickness of 2.0 mm, and the shell covering the core has a thickness of 3.0 mm. The average radius $r_0$ of the core is 10 mm.

Arrows A, B and C in FIG. 8A indicate the positions of the resin injection portions in Example 13. Arrow D in FIG. 8A indicates the position of the resin injection portion in Comparative Example 5. As boundary condition for carrying out the stress-train analysis, it is supposed that the deformation of the opening portion of the core and its vicinity is prevented by a supporting member and that vicinity of the opening portion of the core is fixed in all the directions.

On the basis of the form data shown in FIGS. 99 to 103, the temperature distribution and the pressure distribution of the molten resin in the injection step of injecting the molten resin into the space formed by the core placed in the mold cavity and the cavity wall of the mold are calculated by numerical analysis in the same manner as those in Example 9. The analysis conditions of the resin flow simulation in Example 13 are as shown in Table 1. However, the injection time of the molten resin is 2.0 seconds.

Figure 104:
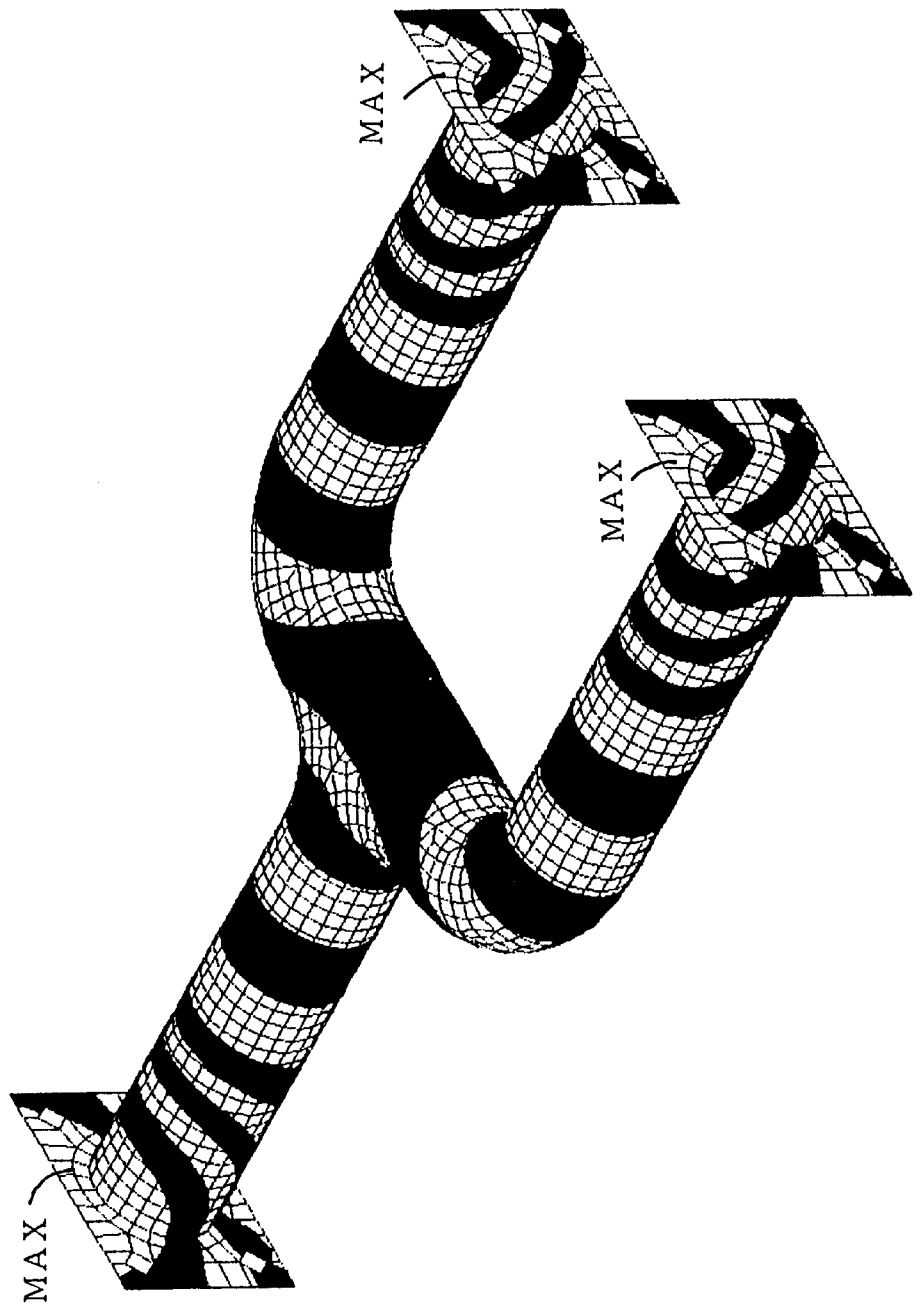
FIG. 104 shows a melt front history among resin flow simulation results in Example 13.
Figure 105:
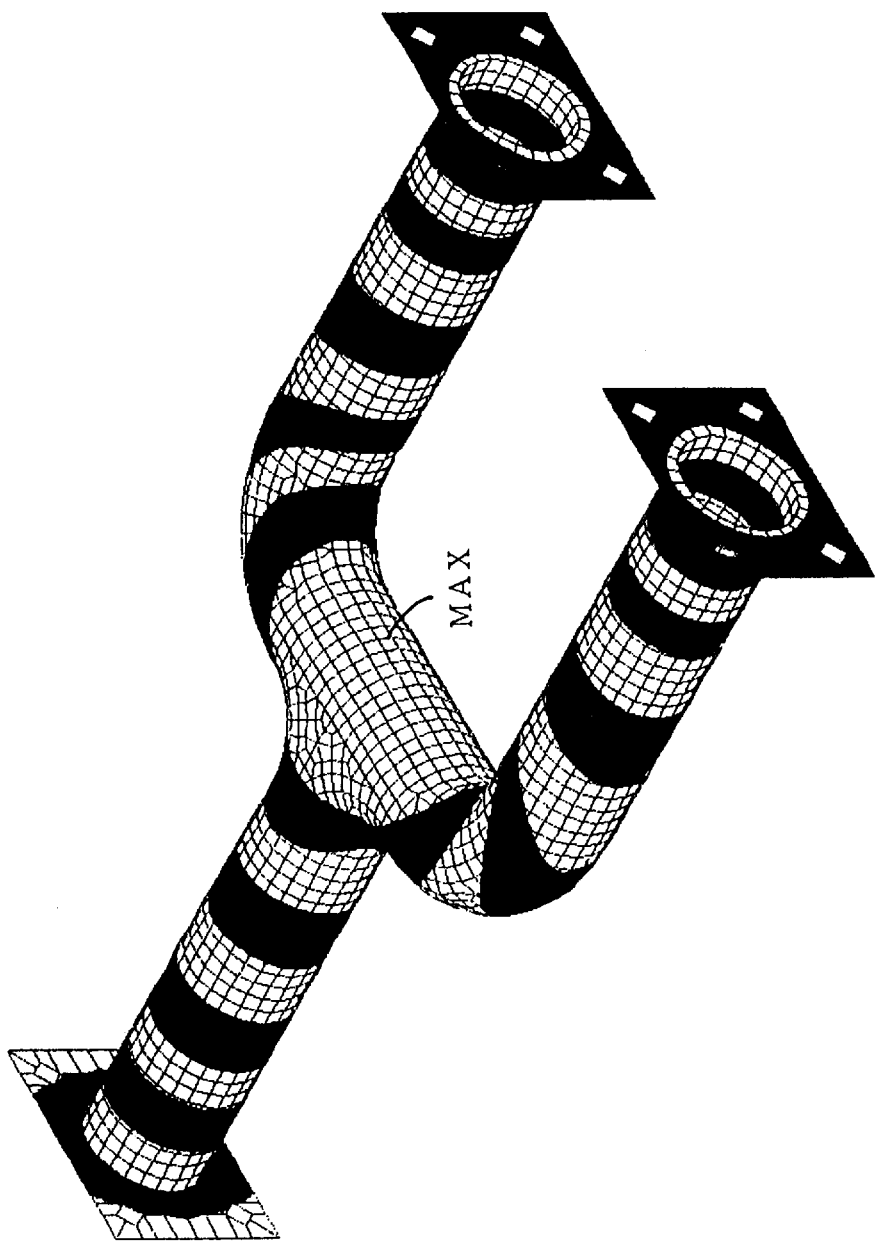
FIG. 105 shows a melt front history among resin flow simulation results in Comparative Example 5.
Figure 106:
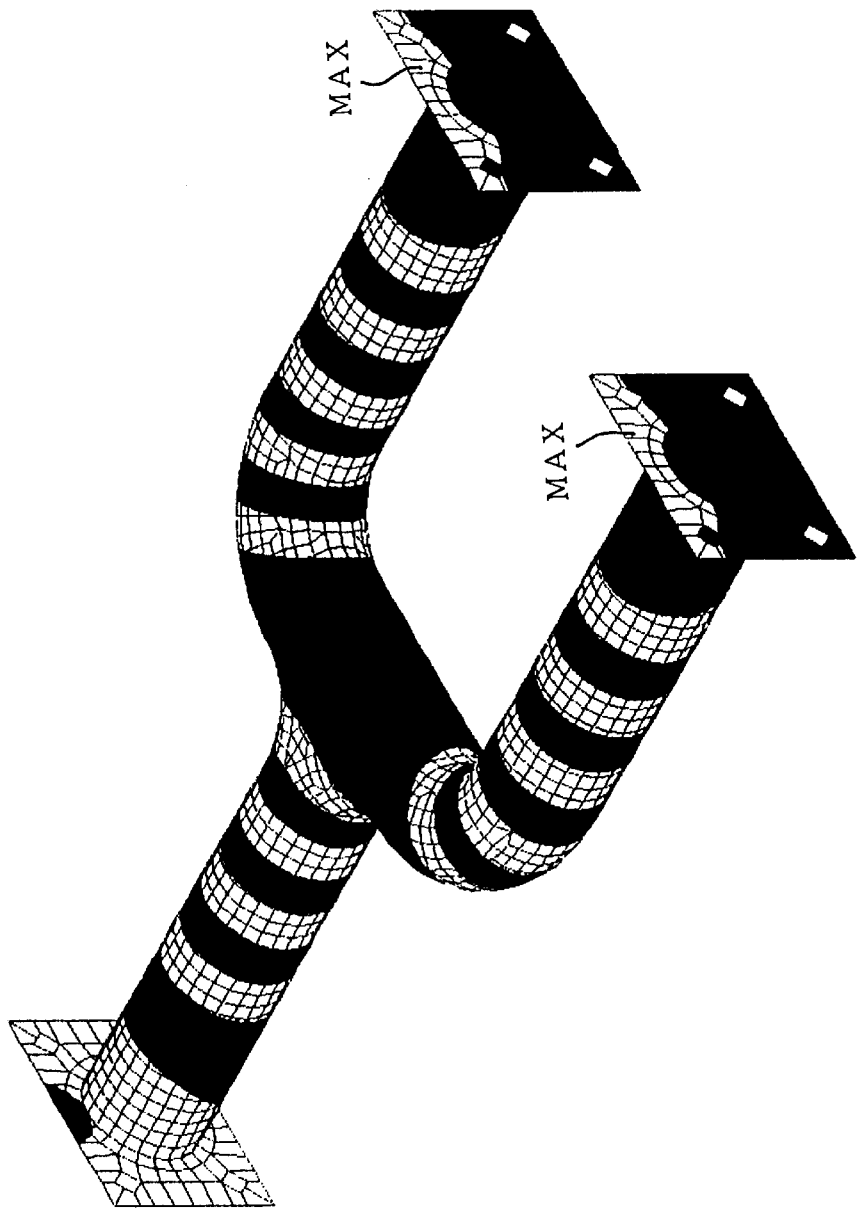
FIG. 106 shows a pressure distribution among resin flow simulation results in Example 13.
Figure 107:
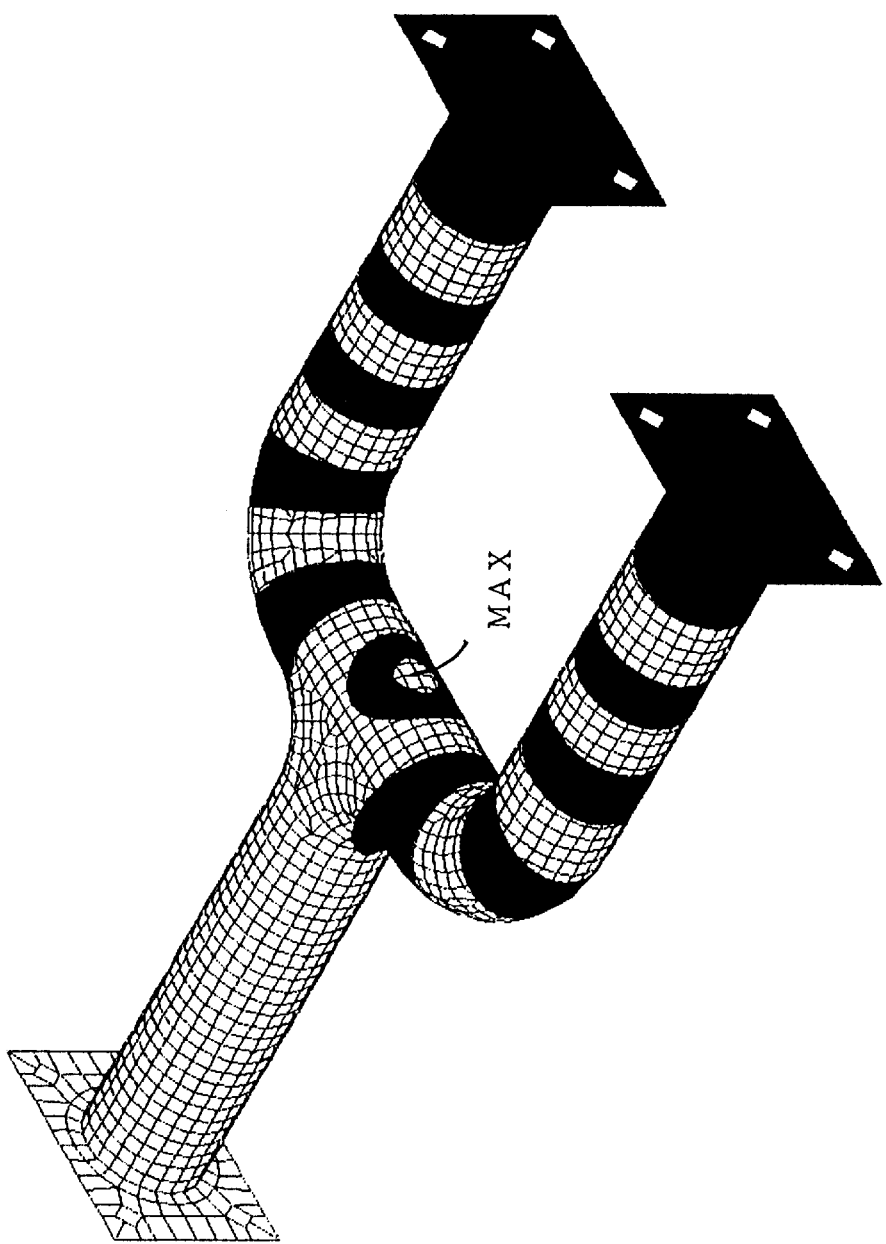
FIG. 107 shows a pressure distribution among resin flow simulation results in Comparative Example 5.

FIGS. 104 and 105 show the melt front history out of the resin flow simulation results in Example 13 and Comparative Example 5, respectively. FIGS. 106 and 107 show the pressure distributions in Example 13 and Comparative Example 5, respectively. The analysis of the pressure distributions shows that the maximum pressure value is 65 kgf/cm$^2$ in Example 13 and that the counterpart in Comparative Example 5 is 101 kgf/cm$^2$.

On the basis of the calculated temperature distribution and the pressure distribution of the molten resin, the displacement distribution and the stress distribution of the core, caused by the pressure exerted on the core under the flow of the molten resin in the injection step, are calculated by numerical analysis. That is, the stress-strain analysis is carried out on the basis of the output data of the resin flow simulation.

Figure 108:
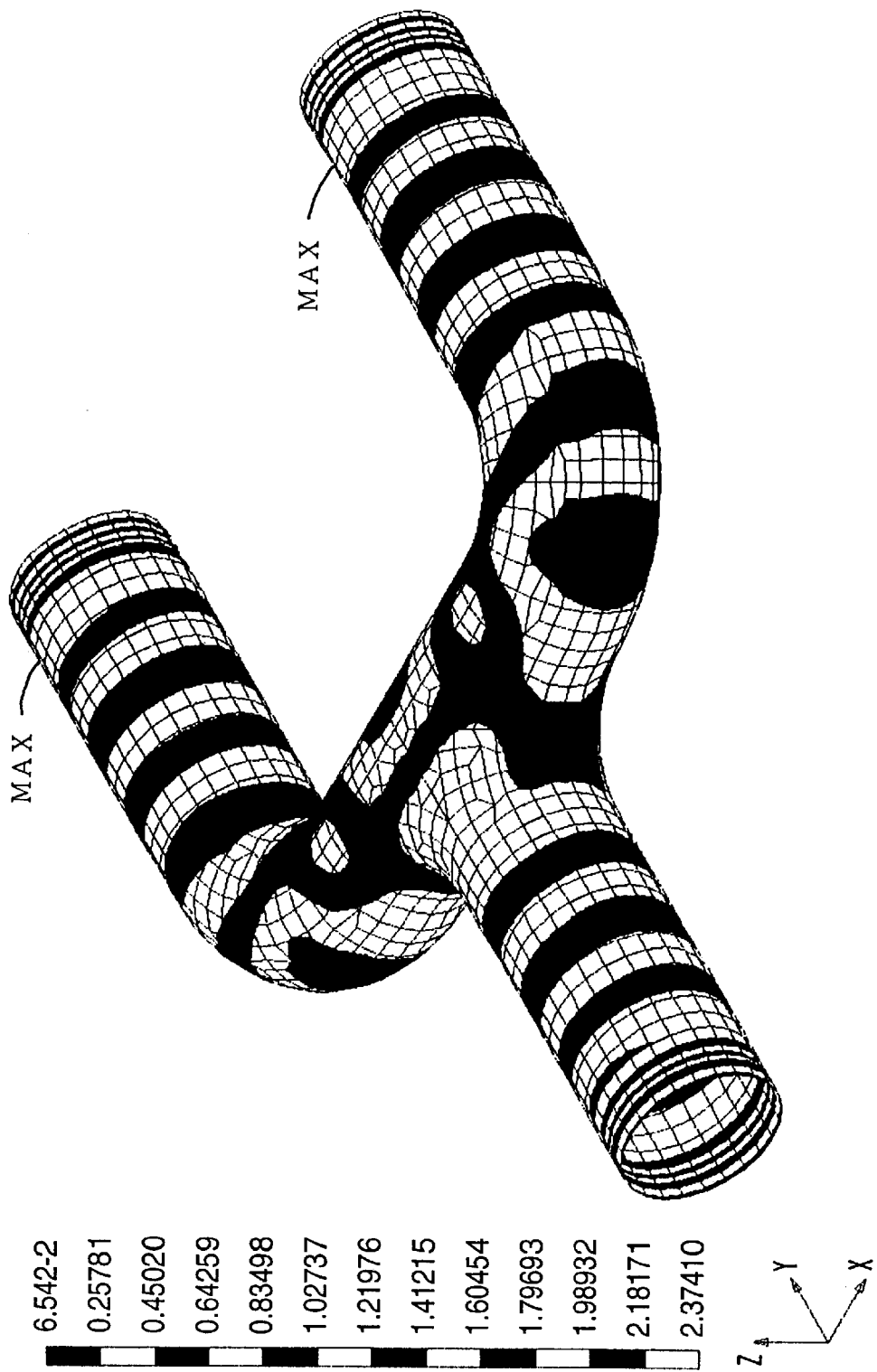
FIG. 108 shows a simulation result of a stress distribution in a core among results of a stress-strain analysis in Example 13.
Figure 109:
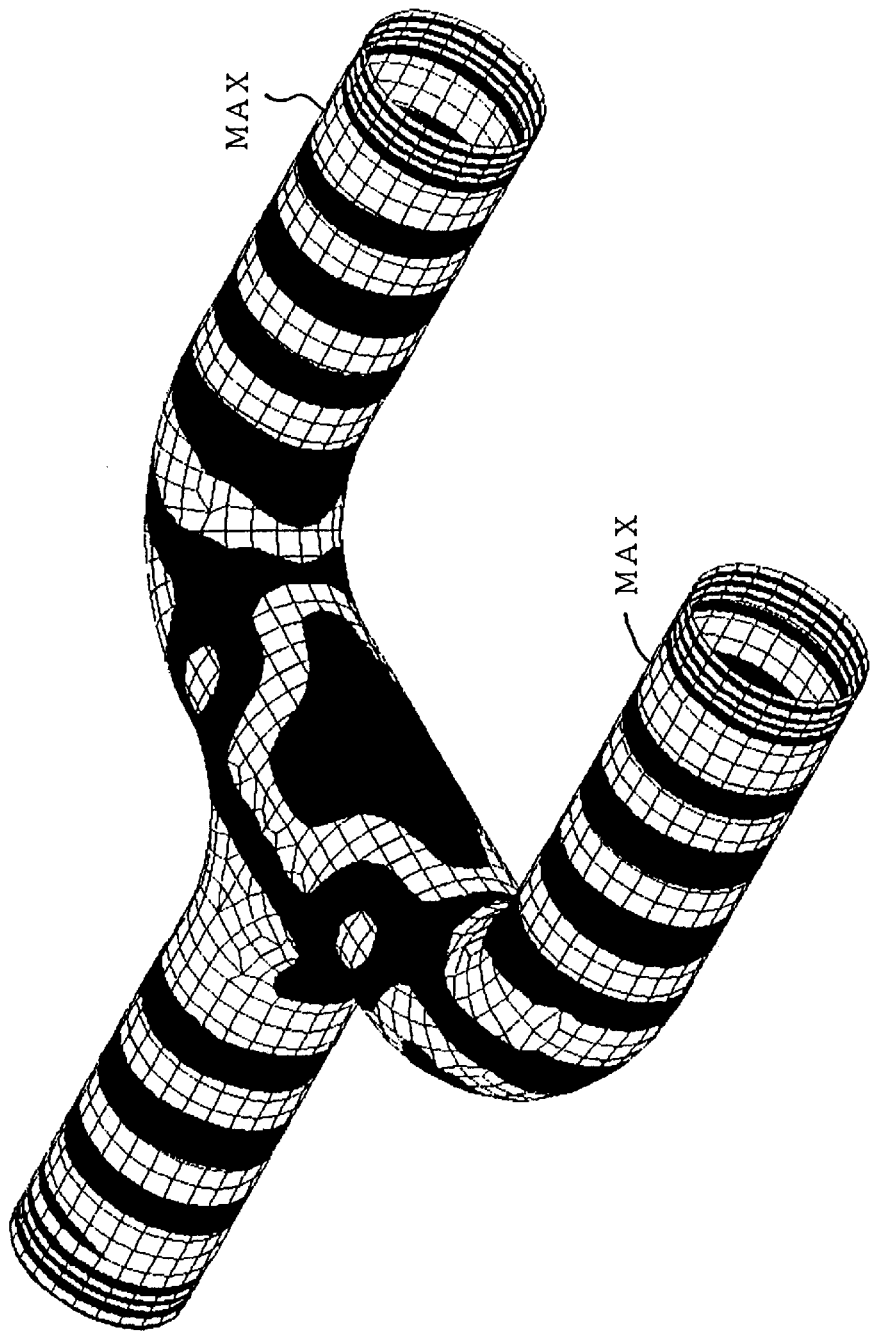
FIG. 109 shows a simulation result of a stress distribution in a core among results of a stress-strain analysis in Example 13, the result being viewed from an angle different from that in FIG. 108.
Figure 110:
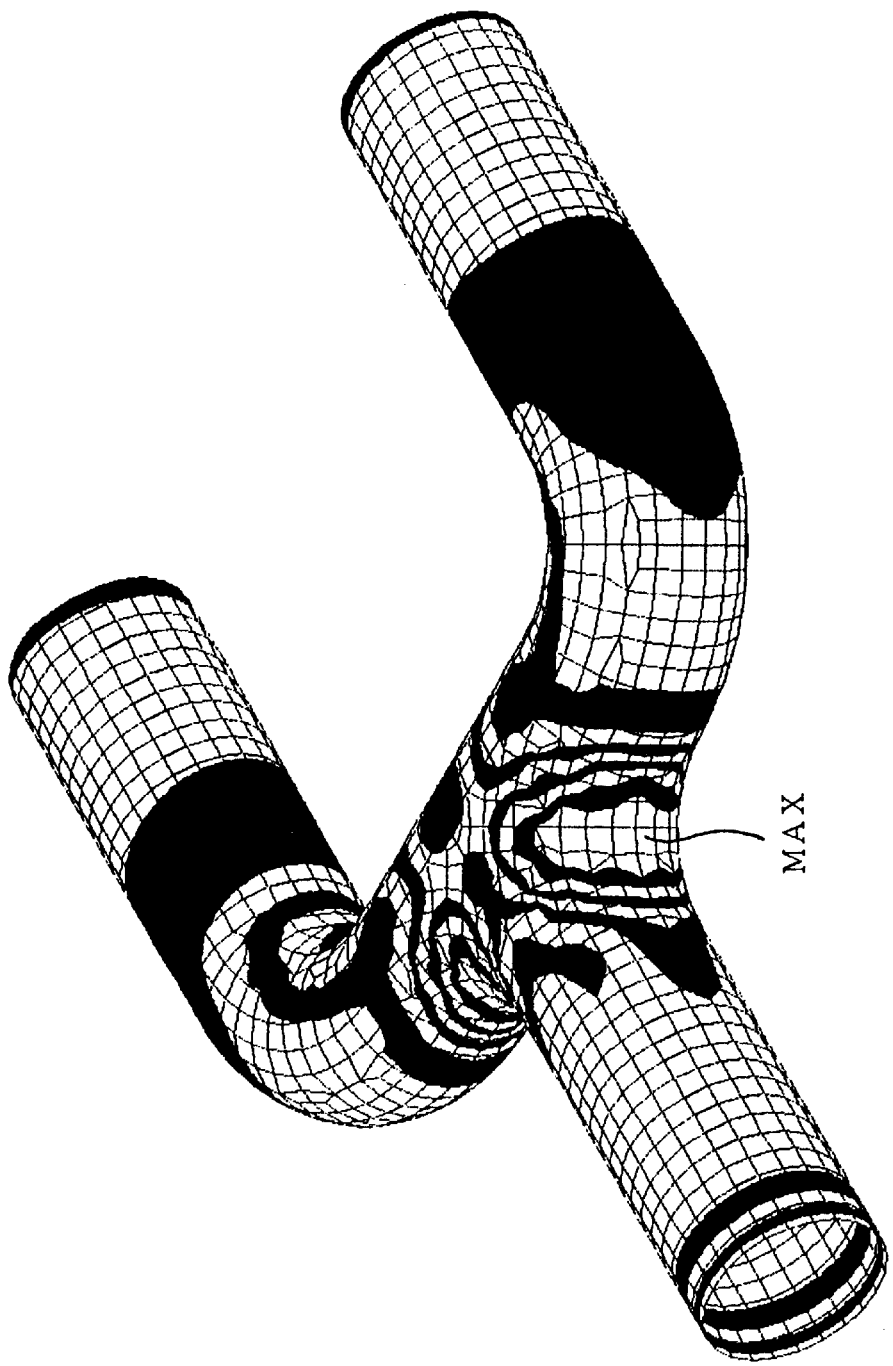
FIG. 110 shows a simulation result of a stress distribution in a core among results of a stress-strain analysis in Comparative Example 5.
Figure 111:
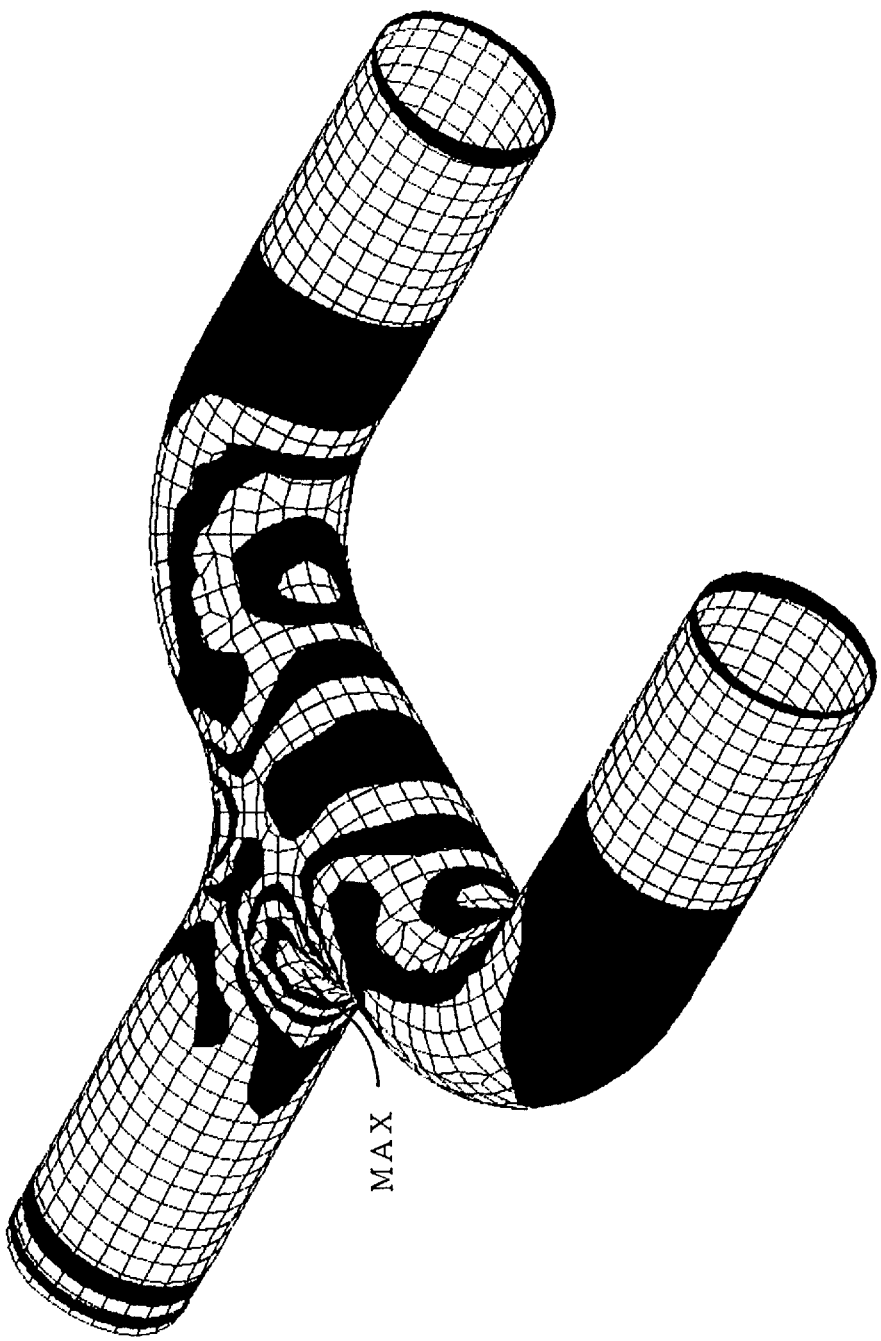
FIG. 111 shows simulation a result of a stress distribution in a core among results of a stress-strain analysis in Comparative Example 5, the result being viewed from an angle different from that in FIG. 110.

FIGS. 108 and 109 show the simulation result of the stress distribution of the core, caused by the pressure exerted on the core under the flow of the molten resin, out of the stress-strain analysis results in Example 13. FIGS. 108 and 109 are views of the stress distribution viewed from different angles. FIGS. 110 and 111 show the simulation result of the stress distribution of the core in Comparative Example 5. FIGS. 110 and 111 are views of the stress distribution viewed from different angles. The simulation results of the stress distribution are summarized as shown in Table 12. These results show the following. By optimizing the form of the three-dimensional hollow molded article, the form of the core or the mold such that the core is absent in that region of the cavity which faces the resin injection portion, the deformation of that portion of the core which faces the resin injection portion (and the deformation of the three-dimensional hollow molded article) can be prevented even if the pressure caused by the injected molten resin is exerted on the core. This analysis result is well in agreement with the result in Example 5 where the over-molding was actually carried out.

TABLE 12

|  | Maximum stress value |
| --- | --- |
| Example 13 | 2.4 |
| Comparative Example 5 | 7.1 |

EXAMPLE 14 AND COMPARATIVE EXAMPLE 6

Example 14 is also concerned with the optimizing method of an over-molding method (injection non-compression over-molding method), directed to the first aspect of the present invention, and more specifically, is concerned with the sixth embodiment of the over-molding method directed to the first aspect of the present invention. In Example 14, the resin injection portion comprises a film gate having an opening portion whose the axial line in the direction of width of the opening portion is nearly in parallel with the axial line of a core, and the thickness of the opening portion of the film gate along the circumferential direction of the core is optimized so as to minimize the deformation of the core. Example 14 corresponds to Example 7. Comparative Example 6 corresponds to Comparative Example 3. That is, in Comparative Example 6, the resin injection portion has a structure of one-point direct gate as shown in FIG. 179.

Figure 112:
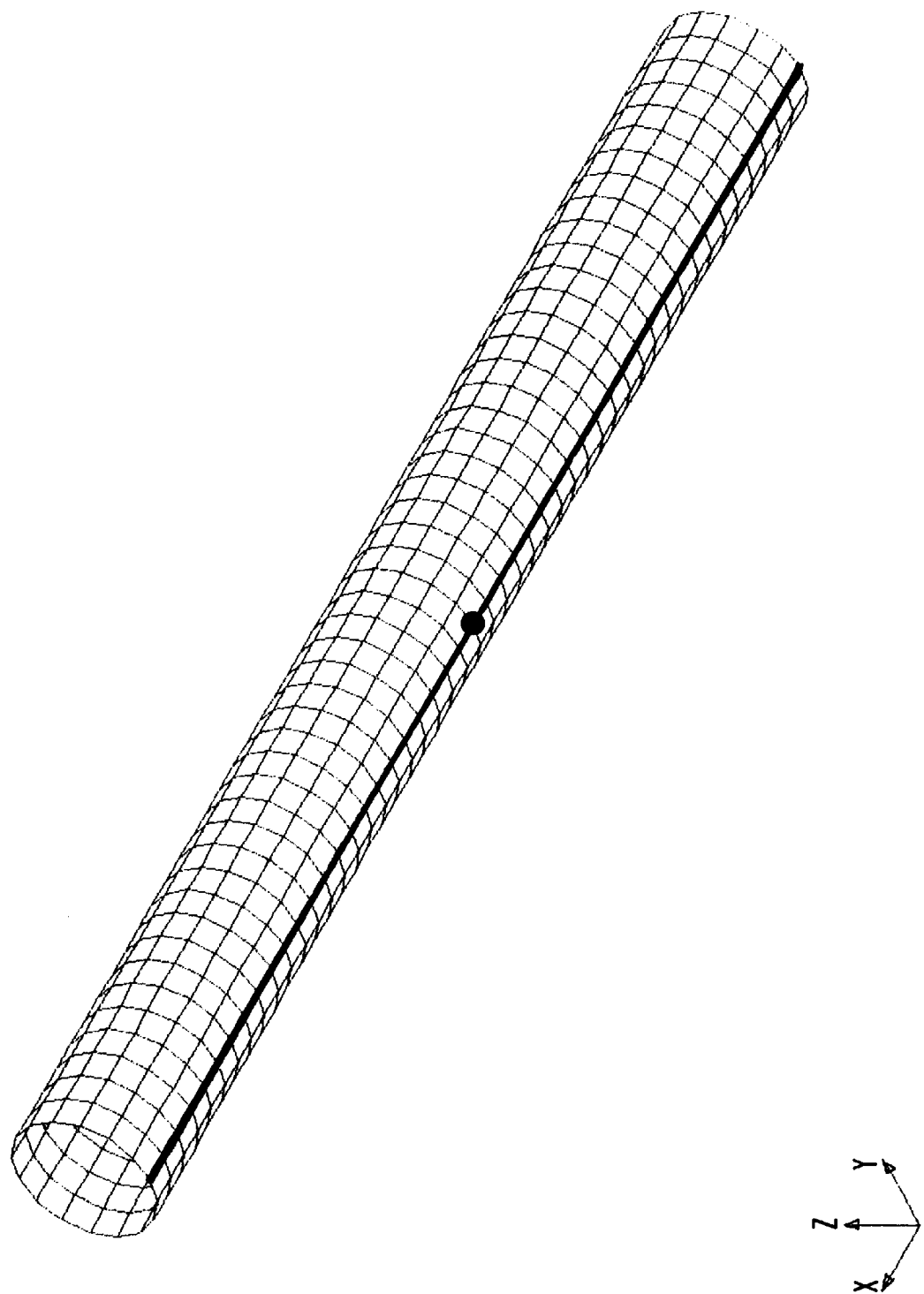
FIG. 112 shows form data of a core used for carrying out resin flow simulation in Examples 14 and 15.

The three-dimensional hollow molded article and the core which are objects of the over-molding method to be optimized in Example 14 are the same as those in Comparative Example 4. On the basis of a design drawing of the shell form of the threedimensional hollow molded article and a design drawing of the core, form data for simulation is prepared. FIG. 112 shows the form data of the core used for carrying out the resin flow simulation. FIG. 112 is a view of the core viewed from the direction of the core viewed from the direction of (1,1,−1). In Example 14, the core has a thickness (wall thickness) of 2.5 mm, a length of 200 mm and an average diameter of 15 mm. The core in Comparative Example 6 has the same dimensions. As boundary conditions for carrying out the stress-strain analysis, it is supposed, as shown in FIG. 112, that a portion indicated by a black spot (lower central portion of the core) is fixed in all directions and that a portion indicated by a heavy black line (lower portion in parallel with axial line of the core) is fixed in Y and Z directions.

Figure 113:
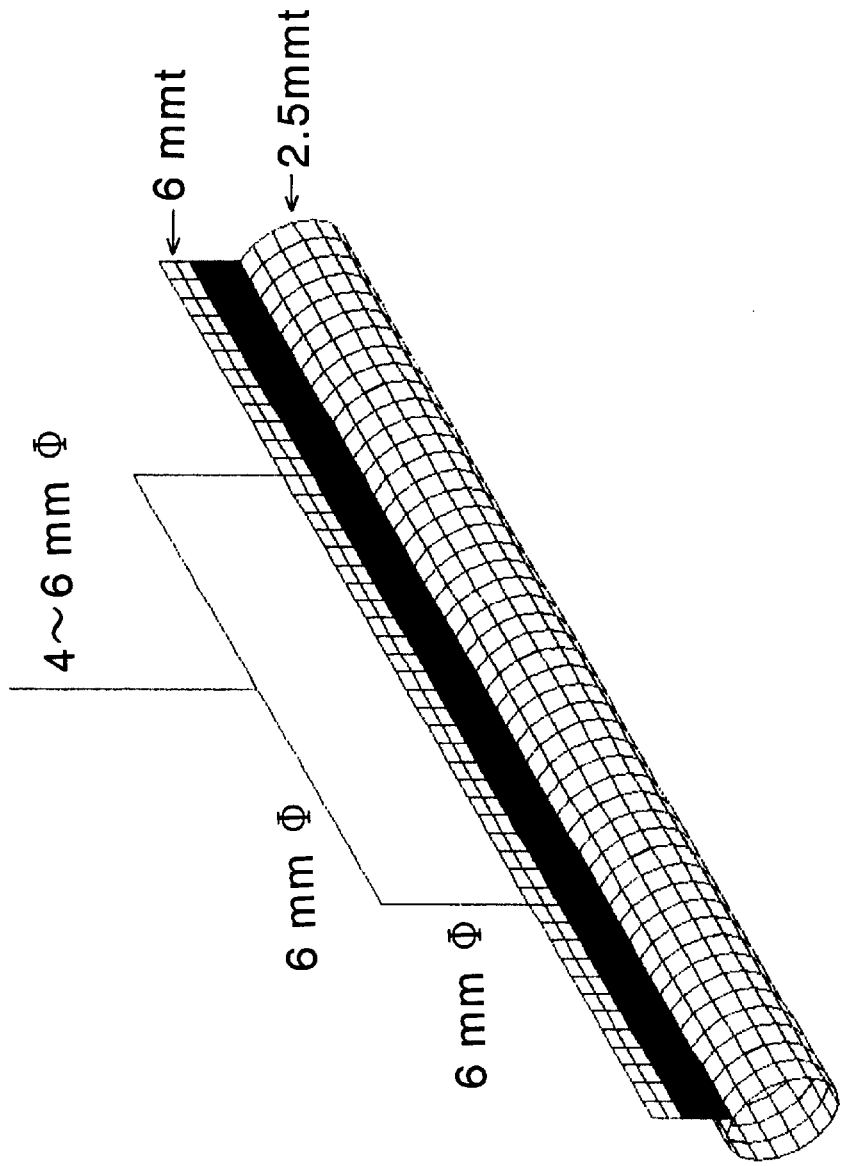
FIG. 113 schematically shows relationships of the arrangement among a main sprue portion, a branched sub-sprue portion, a guide sprue portion and a film gate in Example 14.

FIG. 113 schematically shows the positional relationship among a main sprue portion, a branched sprue portion, a guide sprue portion and the film gate in Example 14. In the model for the analysis, the direction in which the main sprue portion extends is altered such that it can be easily seen. FIG. 114 schematically shows a change of the film gate in thickness. In the film gate, a region indicated by numeral "1" has a thickness of 0.8825 mm (the minimum thickness $H_{FGmin}$ of the opening portion of film gate), a region indicated by numeral "2" has a thickness of 0.8875 mm, a region indicated by numeral "3" has a thickness of 0.9125 mm, a region indicated by numeral "4" has a thickness of 0.9375 mm, A region indicated by numeral "5" has a thickness of 0.9265 mm, and a region indicated by numeral "6" has a thickness of 0.9875 mm (the maximum thickness $H_{FGmin}$ of the opening portion of the film gate). The distance between one region having the maximum thickness and the other region having the maximum thickness of the opening portion is 100 mm. The guide sprue portion has a diameter of 6.0 MM. The film gate is connected to the branched (manifold) subsprue portion (diameter 6.0 mm) through the guide sprue portion. The film gate is structured such that the regions indicated by numeral "1" faces that portion of the guide sprue portion to which the branched subsprue portion is connected.

On the basis of the form date shown in FIG. 113, the temperature distribution and the pressure distribution of the molten resin in the injection step of injecting the molten resin into the space formed by the core placed in the mold cavity and the mold cavity wall of the mold are calculated in the same manner as in Example 9. The analysis conditions in Example 14 are as shown in Table 13.

TABLE 13

| Molding conditions | |
| --- | --- |
| Resin temperature: | 305° C |
| Mold temperature: | 50° C. |
| Injection time of molten resin: | |
| (Example 14) | 2.0 seconds |
| (Comparative Example 6) | 1.5 seconds |

Figure 115:
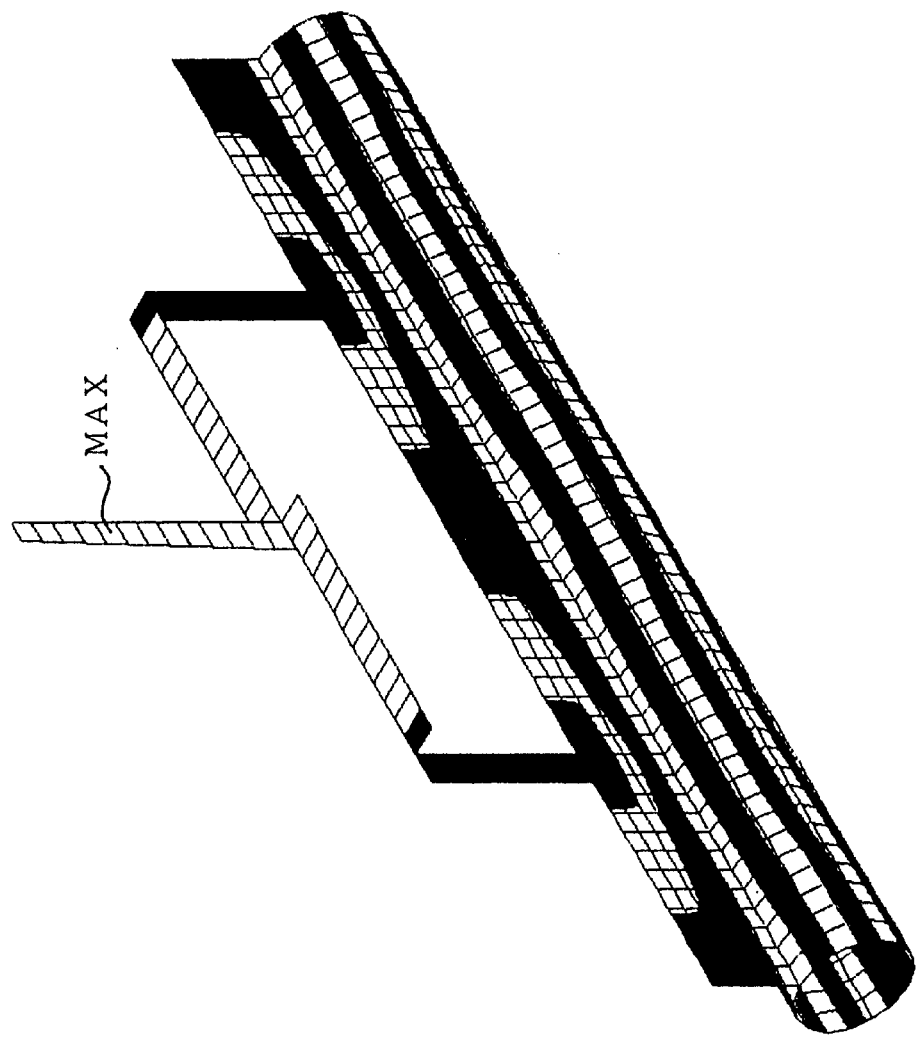
FIG. 115 shows a melt front history among resin flow simulation results in Example 14.
Figure 116:
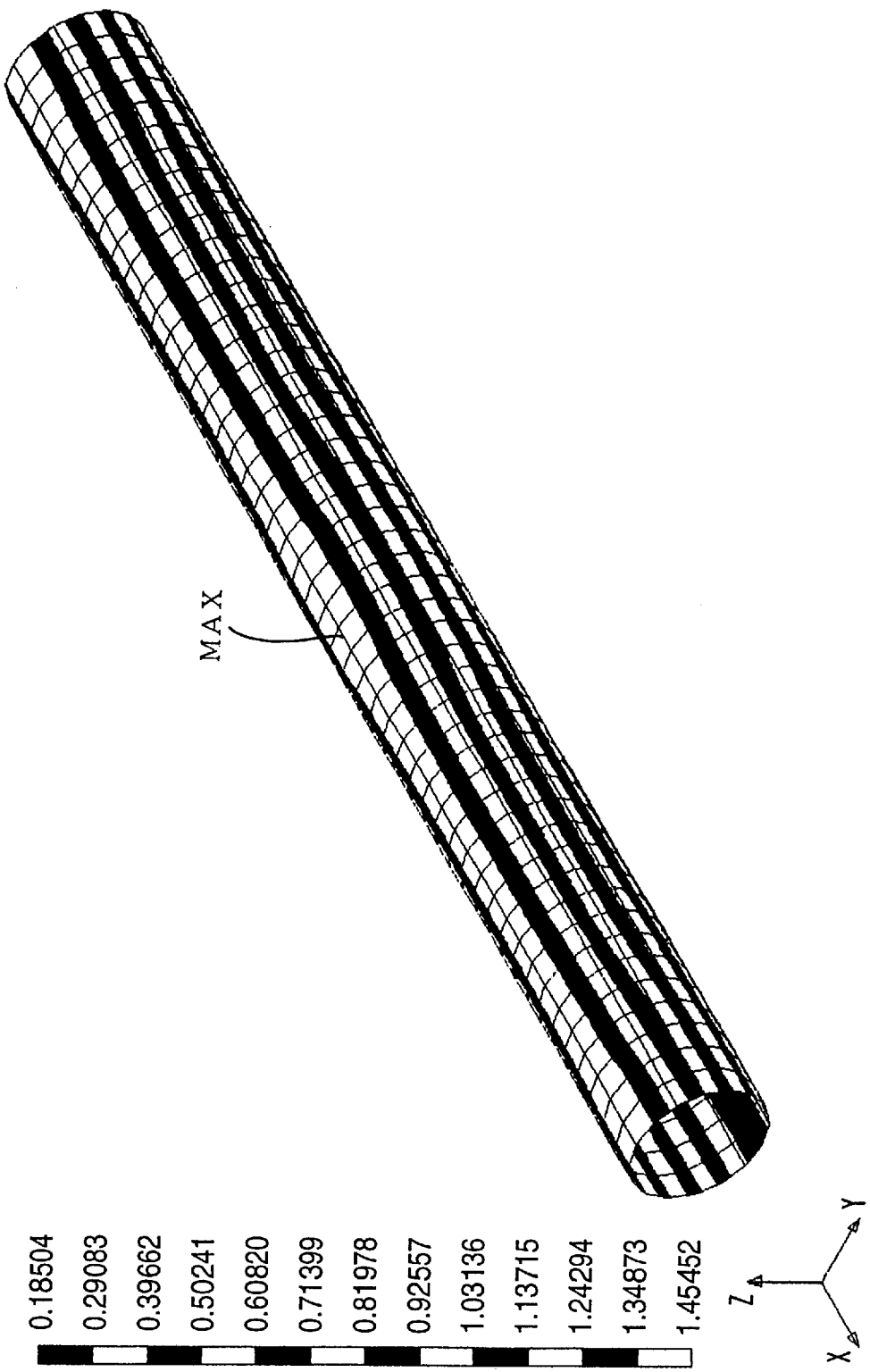
FIG. 116 shows a melt front history in a resin flow layer among resin flow simulation results in Example 14.
Figure 117:
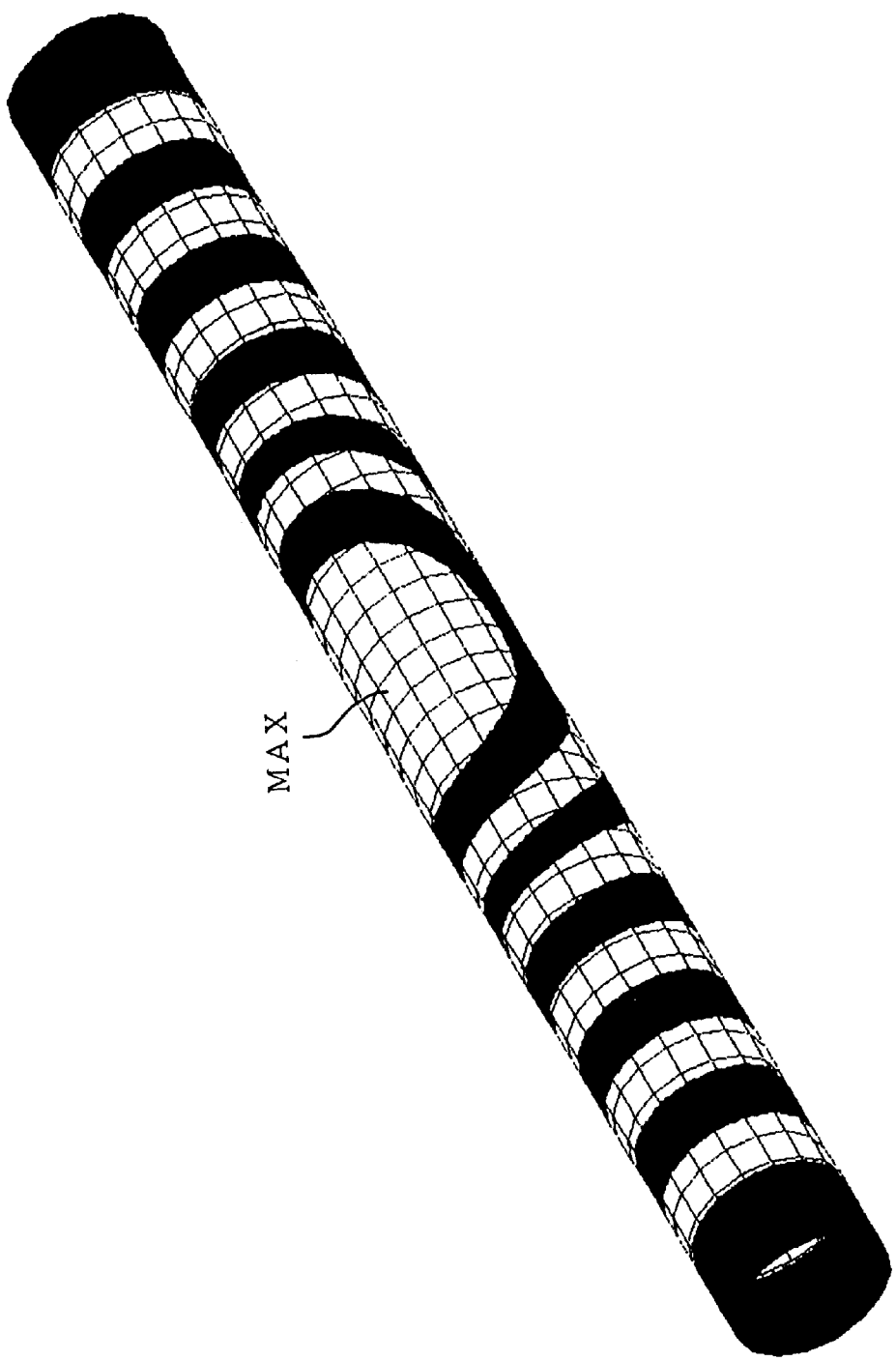
FIG. 117 shows a melt front history among resin flow simulation results in Comparative Example 6.
Figure 118:
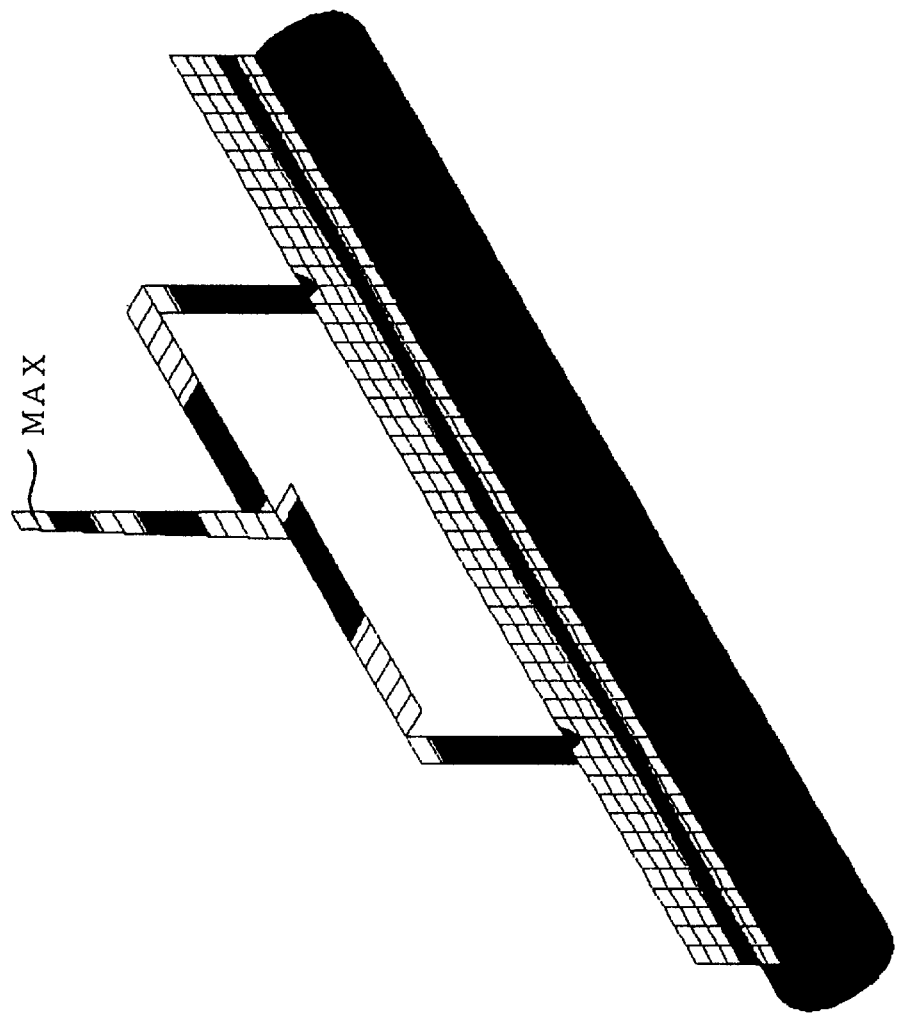
FIG. 118 shows a pressure distribution among resin flow simulation results in Example 14.
Figure 119:
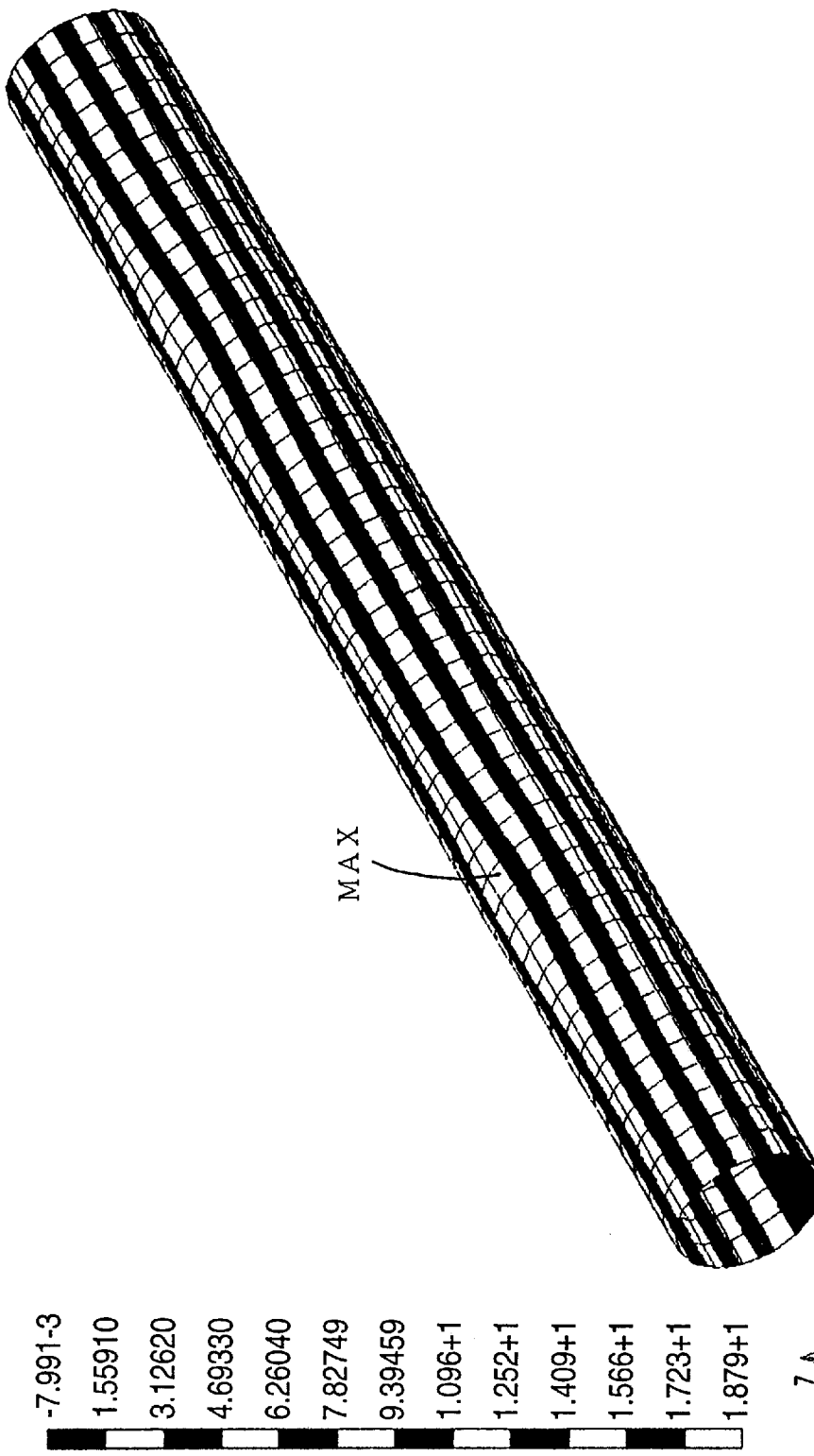
Figure 120:
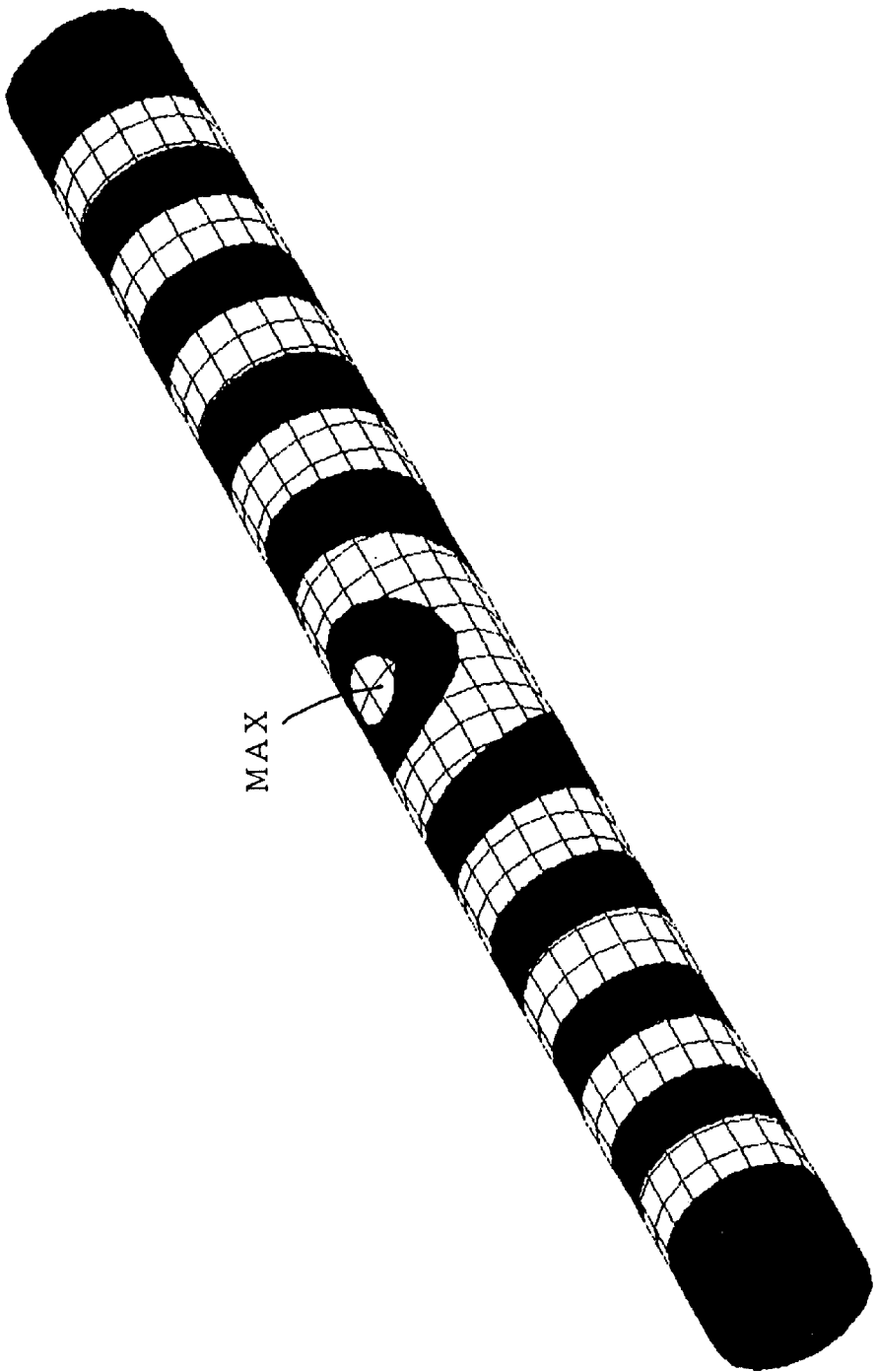

FIGS. 115 shows the melt front history out of the resin flow simulation results in Example 14. FIGS. 116 shows the same melt front history as in FIG. 115, but shows the melt front history in the resin flow layer out of the resin flow simulation results in Example 14. FIG. 117 shows the melt front history out of the resin flow simulation results in Comparative Example 6. FIGS. 118 and 119 show the pressure distribution out of the resin flow simulation results in Example 14. FIG. 119 shows the pressure distribution in the resin flow layer alone. FIG. 120 shows the pressure distribution out of the resin flow simulation results in Comparative Example 6. The analysis of the pressure distribution shows that the maximum pressure value on the core in Example 14 is 19 kgf/cm$^2$. In contrast, the maximum pressure value on the core in Comparative Example 6 is 109 kgf/cm$^2$. On the basis of the calculated temperature distribution and the pressure distribution of the molten resin, the displacement distribution and the stress distribution of the core, caused by the pressure exerted on the core under the flow of the molten resin in the injection step, are calculated by numerical analysis. That is, the stress-strain analysis is carried out on the basis of the output data of the resin flow simulation.

Figure 121:
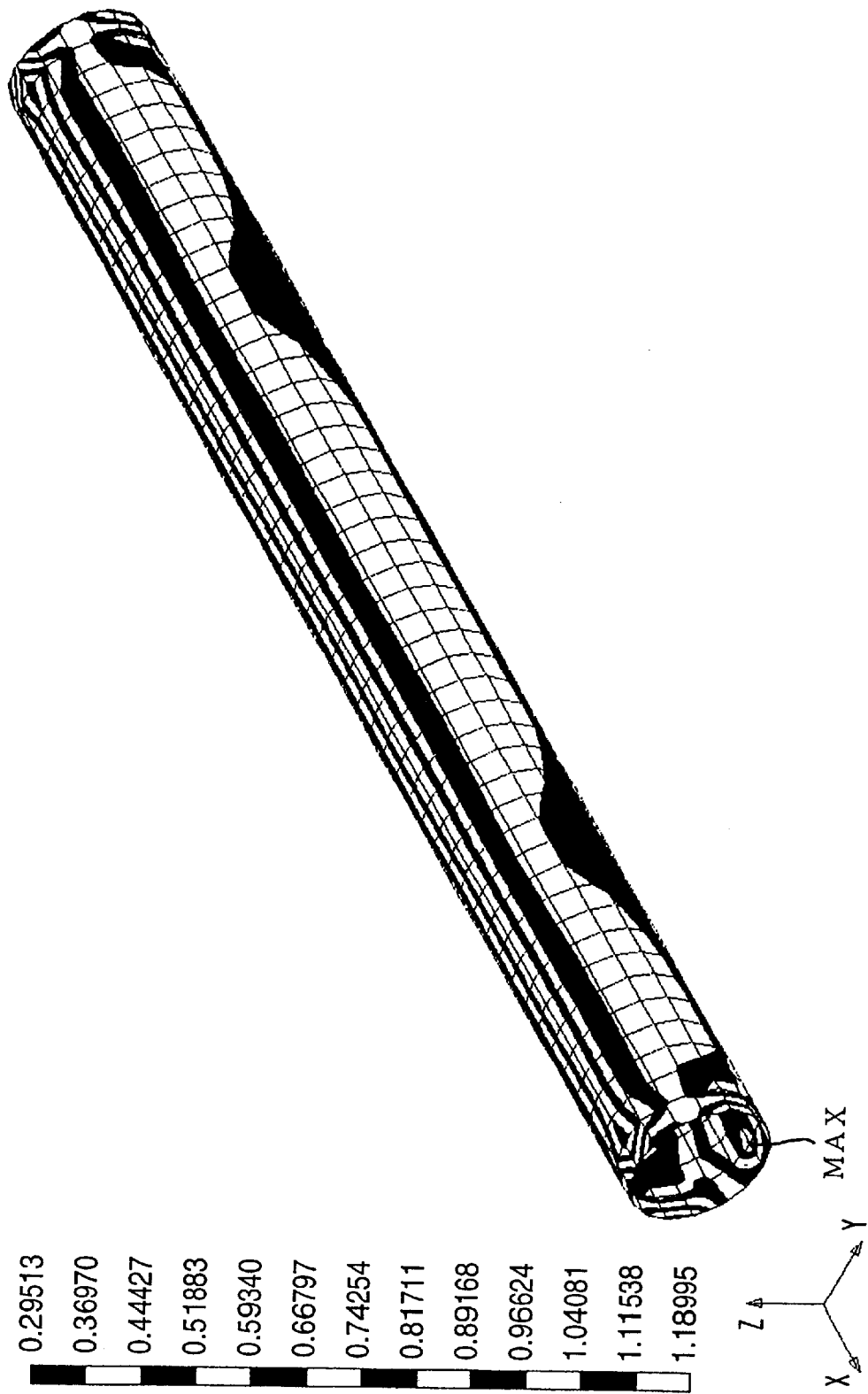
Figure 122:
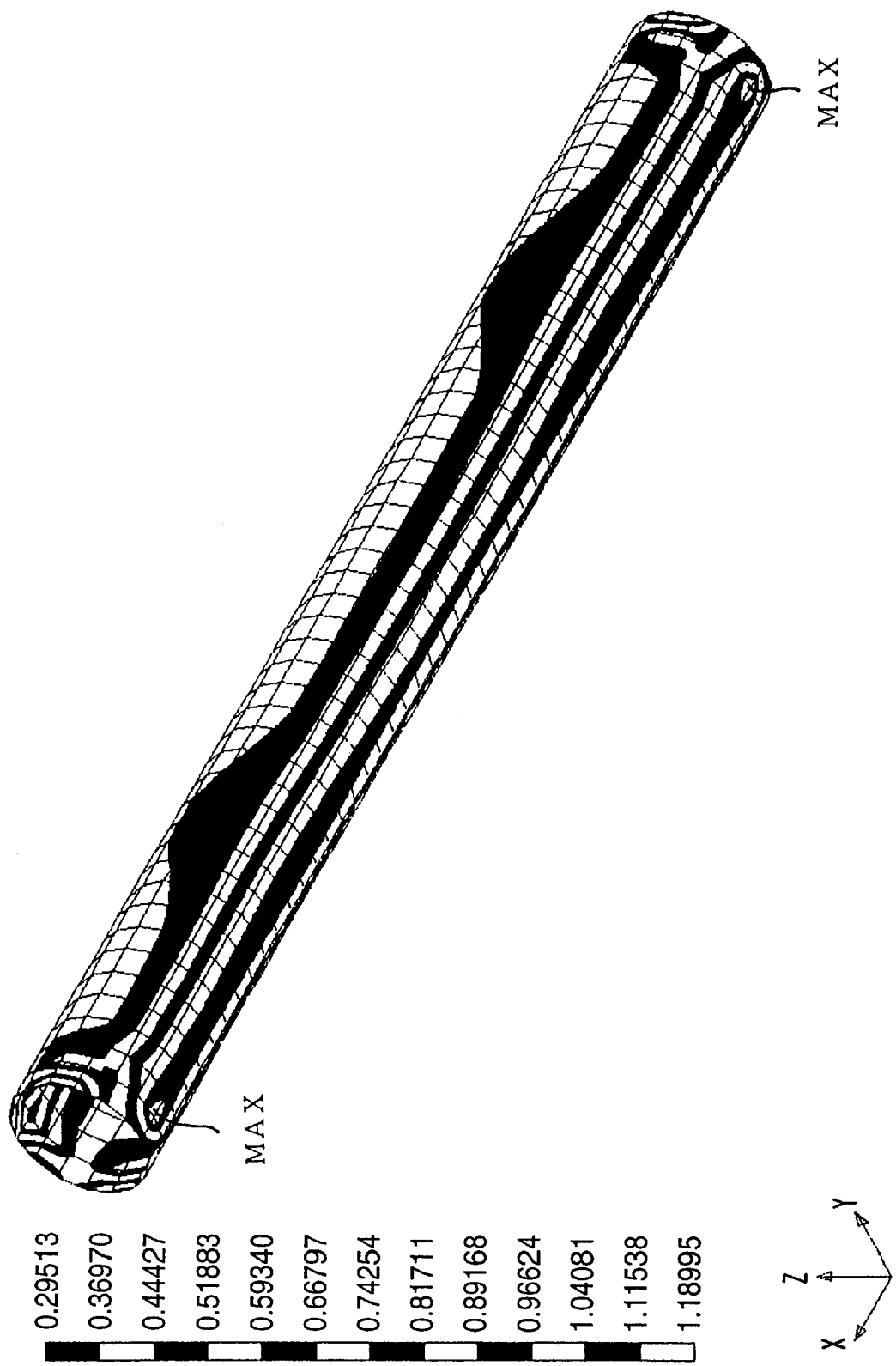
Figure 123:
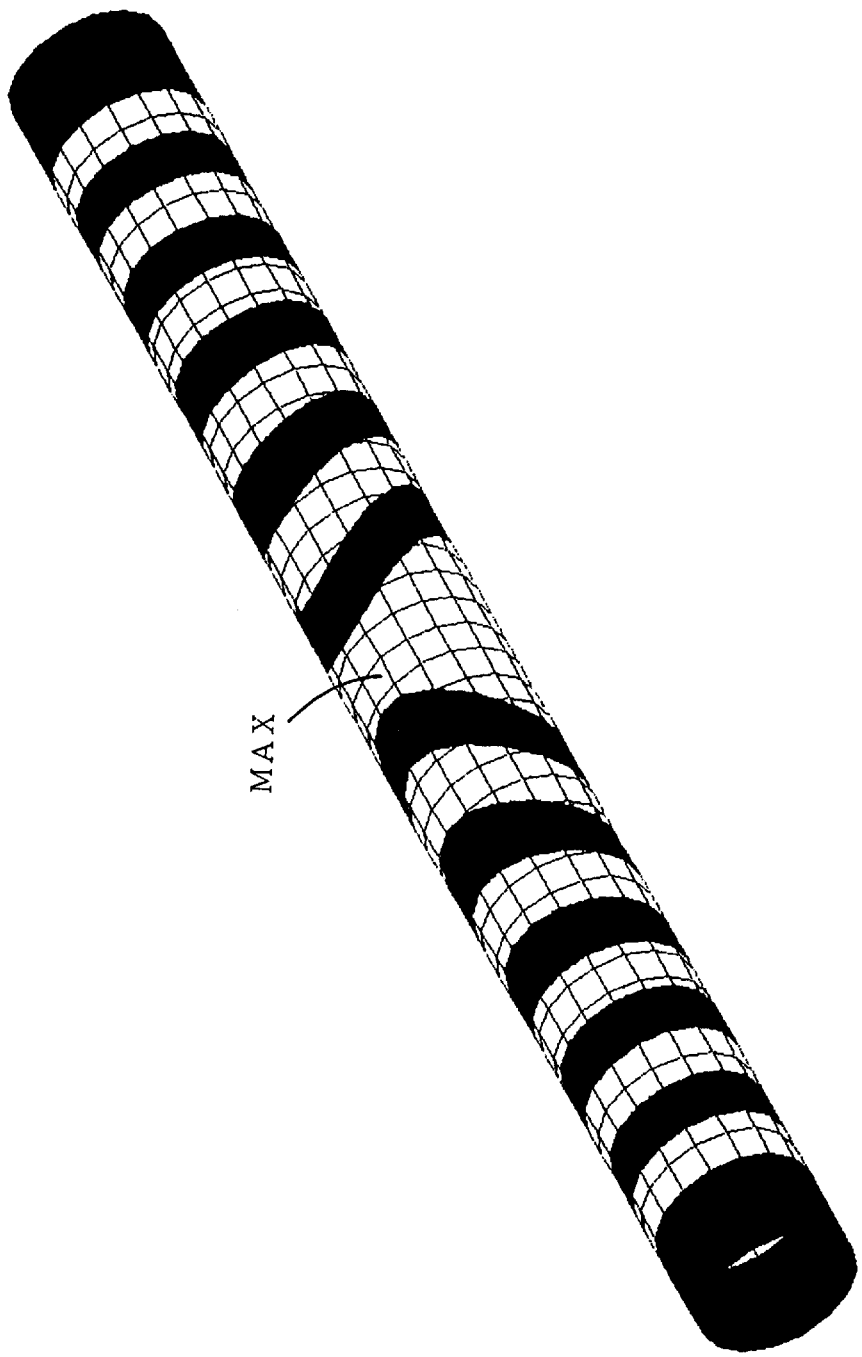
Figure 124:
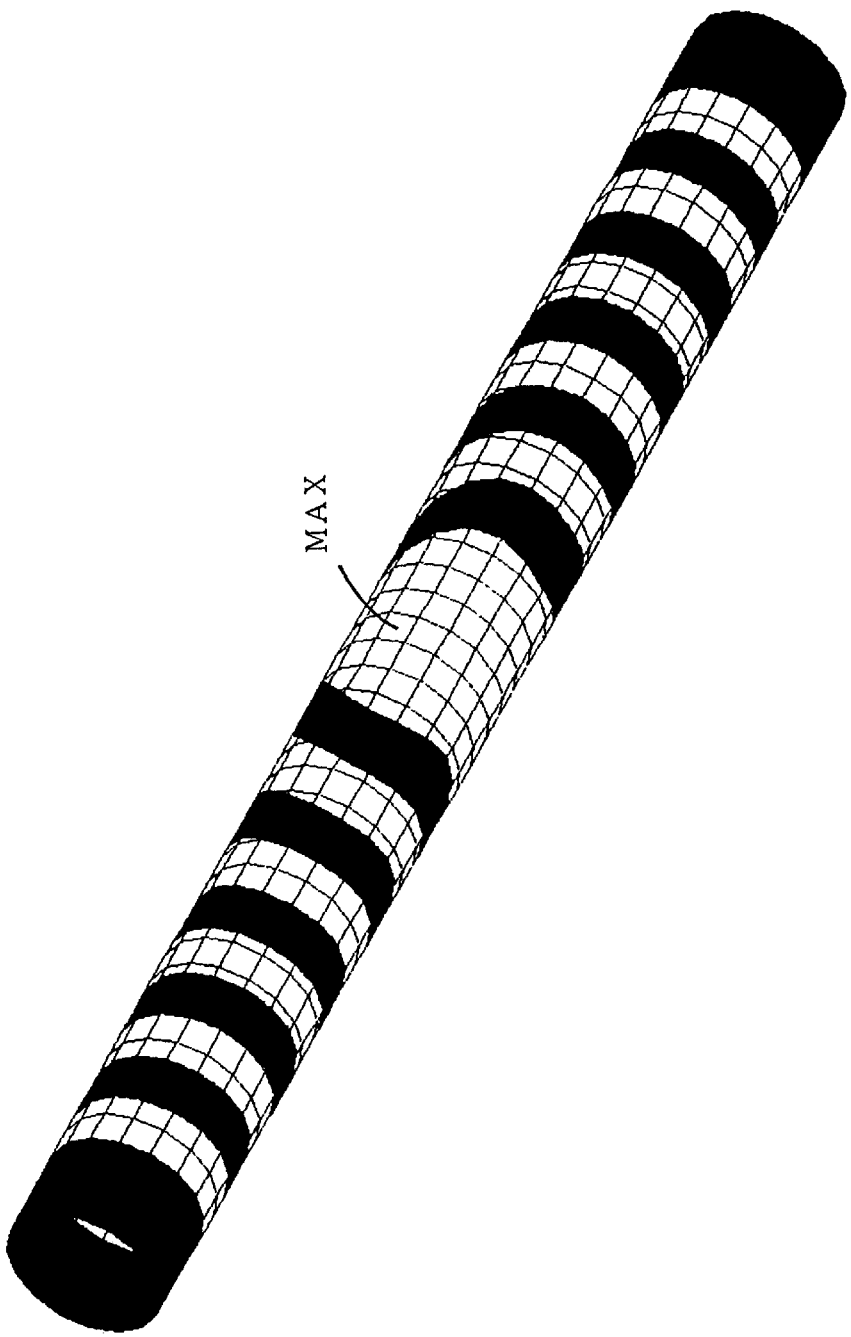

FIGS. 121 and 122 show the simulation result of the stress distribution of the core, caused by the pressure exerted on the core under the flow of the molten resin, out of the stress-strain analysis results in Example 14. FIGS. 121 and 122 are views of the stress distribution viewed from different angles, (1,1,1) direction and (1,1,−1) direction. FIGS. 123 and 124 show the simulation result of the stress distribution of the core in Comparative Example 6. FIGS. 123 and 124 are views of the stress distribution viewed from different angles, (1,1,1) direction and (1,1,−1) direction. The simulation results of the stress distribution are summarized as shown in Table 14. These results show the following. By optimizing the thickness of the film gate along the circumferential direction of the core, the deformation of that portion of the core which faces the resin injection portion (and the deformation of the three-dimensional hollow molded article) can be prevented even if the pressure caused by the injected molten resin is exerted on the core. This analysis result is well in agreement with the result in Example 7 where the over-molding was actually carried out.

TABLE 14

| | Maximum stress value |
| --- | --- |
| Example 13 | 1.2 |
| Comparative Example 6 | 4.7 |

EXAMPLE 15

Example 15 is also concerned with the optimizing method of an over-molding method (injection non-compression over-molding method), directed to the first aspect of the present invention, and more specifically, is concerned with the seventh embodiment of the over-molding method directed to the first aspect of the present invention. In Example 15, the resin injection portion comprises a multi-point pin gate, the openings of the multi-point pin gate are arranged nearly in parallel with the axial line of a core, and the positions of the openings of the multi-point pin gate are optimized so as to optimize the deformation of the core. Example 15 corresponds to Example 8.

The three-dimensional hollow molded article and the core which are objects of the over-molding method to be optimized in Example 15 are the same as those in Comparative Example 4. On the basis of a design drawing of the shell form the three-dimensional hollow molded article and a design drawing of the core, form data for simulation is prepared. The form data of the core used for carrying out the resin flow simulation is as shown in FIG. 112. As boundary conditions for carrying out the stress-strain analysis, it is supposed, as shown in FIG. 112, that a portion indicated by a black spot (lower central portion of core) is fixed in all directions and that a portion indicated by a heavy black line (lower region in parallel with axial line of core) is fixed in Y and Z directions.

FIG. 125 schematically shows the positional relationship among a main sprue portion, a branched (manifold) sprue portion, a guide sprue portion and a 12-points multi-point pin gate. The openings of the multi-point have the same diameters as those in Example 9. The branched subsprue portion and the guide sprue portion have a diameter of 6.0 mm. In the model for the analysis, the direction in which the main sprue portion 10 extends is altered such that it can be easily seen.

On the basis of the form data shown in FIG. 125, the temperature distribution and the pressure distribution of the molten resin in the injection step of injecting the molten resin into the space formed by the core placed in the mold cavity and the cavity wall of the mold are calculated in the same manner as in Example 9. The analysis conditions in Example 15 are as shown in Table 13.

FIG. 126 shows the melt front history out of the resin flow simulation results in Example 15. FIG. 127 shows the temperature distribution out of the resin flow simulation results in Example 15. FIG. 128 shows the pressure distribution out of the resin flow simulation results in Example 15. The analysis of the pressure distribution shows that the maximum pressure value on the core in Example 15 is 23 kgf/cm$^2$.

On the basis of the calculated temperature distribution and the pressure distribution of the molten resin, the displacement distribution and the stress distribution of the core, caused by the pressure exerted on the core under the flow of the molten resin in the injection step, are calculated by numerical analysis. That is, the stress-strain analysis is carried out on the basis of the output data of the resin flow simulation.

FIGS. 129 and 130 show the simulation result of the stress distribution of the core, caused by the pressure exerted on the core under the flow of the molten resin, out of the stress-strain analysis results in Example 15. FIGS. 129 and 130 are views of the stress distribution viewed from different angles, (1,1,1) direction and (1,1,−1) direction. The simulation results of the stress distribution are summarized as shown in Table 15. These results show the following. By optimizing the positions of the openings and the diameters of the openings of the multi-point pin gate, the deformation of that portion of the core which faces the resin injection portion (and the deformation of the three-dimensional hollow molded article) can be prevented even if the pressure caused by the injected molten resin is exerted on the core. This analysis result is well in agreement with the result in Example 8 where the over-molding was actually carried out.

TABLE 15

|  | Maximum stress value |
| --- | --- |
| Example 15 | 1.6 |
| Comparative Example 6 | 4.7 |

EXAMPLE 16

Example 16 is also concerned with the optimizing method of an over-molding method (injection non-compression over-molding method), directed to the first aspect of the present invention, and more specifically, is concerned with the eighth embodiment of the over-molding method directed to the first aspect of the present invention. In Example 16, a resin flow channel is provided on the cavity wall of the mold, and the form and the position of the resin flow channel are optimized so as to minimize the deformation of a core. In Example 16, the resin flow channel is provided nearly in parallel with the circumferential direction of the core and nearly in parallel with the axial direction of the core.

The forms of the three-dimensional hollow molded article and the core which are objects of the over-molding method to be optimized in Example 16 are the same as those in Comparative Example 4. That is, in Example 16, the core has a wall thickness of 2.0 mm, and the shell form of the three-dimensional hollow molded article has a wall thickness of 2.0 mm. Example 16 differs from Comparative Example 4 in that the mold in Example 16 is provided on the cavity mold, along the circumferential direction of the core, with two ring-shaped resin flow channels which communicate with two resin injection portions and that the mold is further provided on the cavity mold, along the axial line of the core, with one strip-shaped resin flow channel which communicates with the two resin injection portions. Each resin flow channel has a width of 8 mm and a thickness of 6 mm. FIG. 131 schematically shows, as black regions, the ring-shaped resin flow channels provided on the cavity wall along the circumferential direction of the core and the resin flow channel provided on the cavity wall along the axial line of the core.

In the resin flow simulation in Example 16, the resin injection portions are positioned as shown in FIG. 91. Further, the analysis conditions of the resin flow simulation, the injection time of the molten resin and the boundary conditions for carrying out the stress-strain analysis are also the same as those in Example 10.

A temperature distribution and a pressure distribution of a molten resin are numerically calculated in the injection step of injecting the molten resin into the space formed by the core placed in the cavity of the mold and the cavity wall of the mold, in the same manner as that in Example 10. Further, a displacement distribution and a stress distribution of the core, caused by the pressure exerted on the core under the flow of the molten resin in a compression step, are numerically calculated in the same manner as those in Example 10 on the basis of the calculated temperature distribution and the calculated pressure distribution.

FIG. 132 shows the melt front history out of the resin flow simulation results in Example 16. FIG. 133 shows the pressure distribution out of the resin flow simulation results. Further, FIG. 134 shows the simulation result of the stress distribution on the core in Example 16. The simulation results of the pressure distribution and the stress distribution are summarized as shown in Table 16. These results show the following. By providing resin flow channel(s), the deformation of that portion of the core which faces the resin injection portion (and the deformation of the three-dimensional hollow molded article), caused by the pressure of the injected molten resin in the over-molding, can be prevented.

TABLE 16

|  | maximum pressure value | Maximum stress value |
| --- | --- | --- |
| Example 16 | 42 | 1.6 |
| Comparative Example 6 | 84 | 4.7 |

EXAMPLE 17

Figure 36:
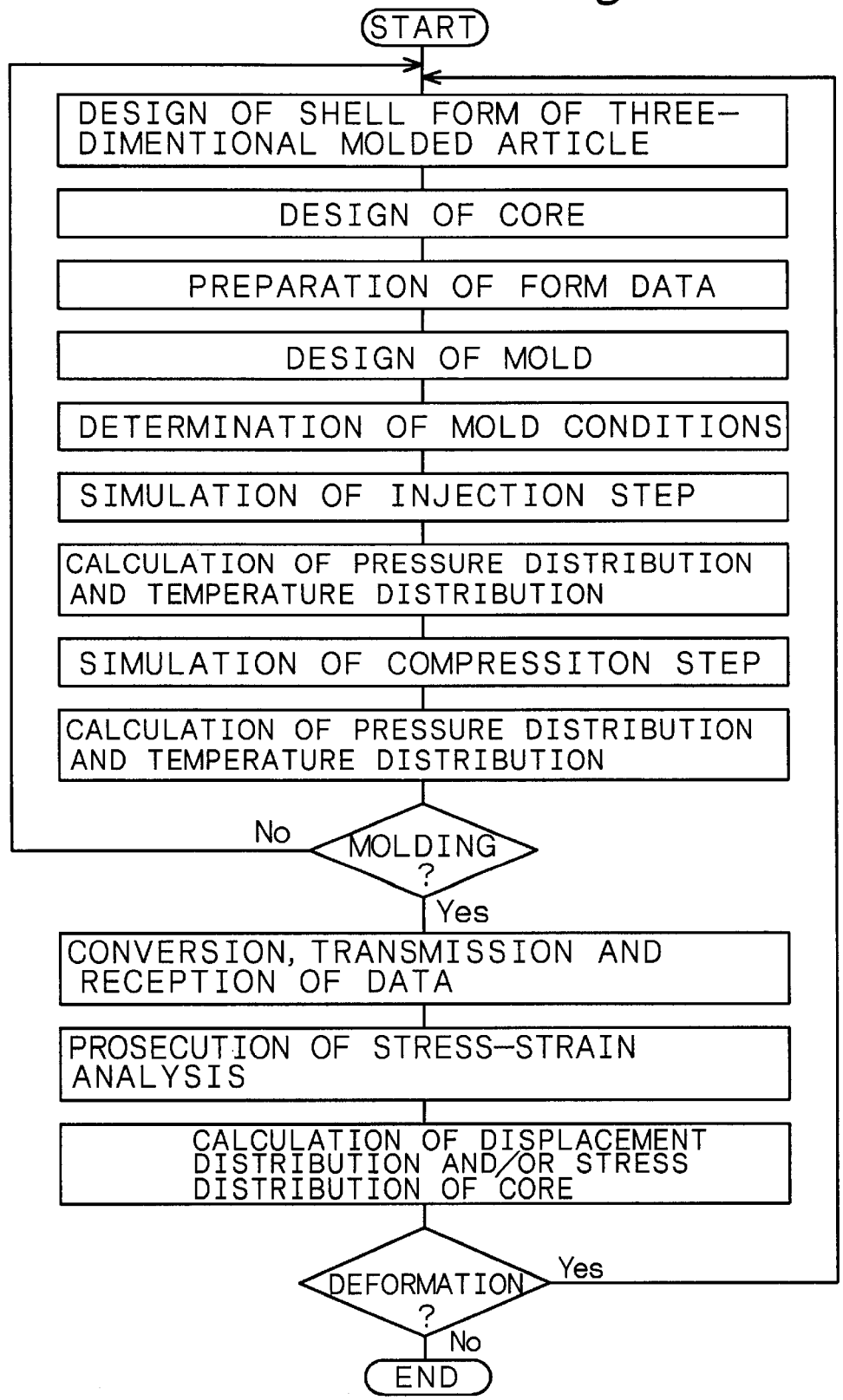
FIG. 36 is a flow chart of an optimizing method of an over-molding method, directed to a second aspect of the present invention.

Example 17 is concerned with the method of optimizing method of an over-molding method, directed to the second aspect of the present invention. FIG. 36 shows a flow chart of the optimizing method of the second aspect of the present invention.

In the over-molding of producing a three-dimensional hollow molded article, when the size of three-dimensional hollow molded article is large or when the size of the hollow portion is large, it is sometimes difficult to produce a desired three-dimensional hollow molded article by an injection/non-compression over-molding method. In this case, the pressure caused by the injected molten resin can be decreased to a great extent by the over-molding method (to be referred to as "injection/compression over-molding method" for convenience's sake) optimized by the optimizing method directed to the second aspect of the present invention, so that the above three-dimensional hollow molded article can be produced by the over-molding method.

In the injection/compression over-molding method, a movable mold member is kept a predetermined distance away from a fixed mold member in the injection step of injecting the molten resin. As a result, the pressure caused on the core by the flow of the molten resin is very small as compared with the pressure on a core in the injection/non-compression over-molding method, so that the deformation of the core can be effectively prevented.

The above injection/compression method includes an injection step and a compression step. However, the resin flow in the compression step cannot be analyzed by a conventional resin flow simulator. That is because a conventional resin flow simulator is based on the assumption that the flow of a molten resin is a two-dimensional flow (X and Y directions), and the flow behavior of the molten resin in the cavity thickness direction (Z direction) is not taken into consideration. In the injection/compression over-molding method, the cavity thickness changes with a change of the movable mold member in position relative to the fixed mold member, and the resin flows in the cavity thickness direction. The flow behavior in this case cannot be analyzed with a conventional resin flow simulator.

When the resin flow simulation in the injection/compression over-molding method is carried out, it is required to use an injection/compression over-molding resin flow simulator developed for the injection/compression over-molding method. The injection/compression over-molding resin flow simulator is composed of two modules, one module for calculating the flow behavior of a resin in the injection step as a first step of the injection/compression over-molding method and the other module for calculating the flow behavior of the resin in the compression step as a second step. For calculating the flow behavior of a molten resin and the temperature and pressure distributions of the molten resin in the injection step, the resin flow simulator using the above equations (1-1), (1-2), (2) and (3), for the optimizing method directed to the first aspect of the present invention, can be used.

On the other hand, for calculating the temperature distribution and the pressure distribution based on the flow behavior of the resin in the compression step, the above equations (1-1), (1-2) and (3) are used. Meanwhile, as an equation of continuity, the following equation is used taking into consideration the flow behavior of the molten resin in the cavity thickness direction with the cavity thickness changes with a change of the movable mold member in position relative to the fixed mold member.

[equation of continuity 2]
Equation 8

$$\frac{\partial \rho_{ave}}{\partial t} + \frac{\rho_{ave}}{b}\left\{\frac{\partial}{\partial X}(bu_{ave}) + \frac{\partial}{\partial Y}(bv_{ave})\right\} + \frac{\rho_{ave}}{2b}\frac{\partial h}{\partial t} = 0 \qquad (8)$$

In the equation of continuity (8), the fourth term $\{(\rho_{ave}/2b)(\partial h/\partial t)\}$ on the left side represents the flow behavior of the resin in the cavity thickness direction with a change of the cavity thickness. The flow behavior of the molten resin in the compression step can be accurately calculated with this equation (8).

When the temperature distribution and the pressure distribution in the injection step and the compression step are numerically analyzed with the injection/compression over-molding resin flow simulator, there is no precise analytical distinction between the injection step and the compression step. The injection/compression over-molding resin flow simulation is continuously executed along the analysis conditions, and the analysis data can be automatically exchanged between the injection step and the compression step. Moreover, in the injection/compression over-molding resin flow simulation, the simulation of the resin flow in the compression step can be carried out while referring to the resin flow simulation result in the injection step.

In the optimizing method directed to the second aspect of the present invention, specifically, the numerical analysis of the displacement distribution and/or the stress distribution of the core can be carried out by preparing pressure-loading conditions for conducting stress-strain analysis of the core on the basis of the calculated pressure distribution data of the molten resin, and then carrying out the stress-strain analysis with the structural analysis simulator under the pressure-loading conditions. As a structural analysis simulator in the injection/compression over-molding, the structural analysis simulator used for the optimizing method directed to the first aspect of the present invention can be used. By referring to the temperature distribution of the molten resin calculated with the injection/compression over-molding resin flow simulator, the stress-strain analysis in the structural analysis simulation can be accurately carried out.

The optimizing method directed to the second aspect of the present invention is briefly summarized as follows.

($x_2$) The temperature distribution and the pressure distribution of the molten resin in the injection step are calculated on the basis of the flow behavior of the molten resin with the resin flow simulator.

($y_2$) On the basis of the calculated temperature distribution and the pressure distribution of the molten resin in step ($x_2$), the temperature distribution and the pressure distribution of the molten resin in the compression step are calculated on the basis of the flow behavior of the molten resin with the injection/compression over-molding resin flow simulator.

($z_2$) On the basis of the calculated temperature distribution and the pressure distribution of the molten resin in step ($y_2$), the stress-strain analysis is carried out with the structural analysis simulator, whereby the displacement distribution and/or the stress distribution of the core are/is calculated.

In Example 17, the injection/compression over-molding resin flow simulation is carried out. The structure of the resin injection portion is the structure of a so-called film gate. In Example 17, the superiority of the injection compression over-molding method (great decrease in the stress of the core) over the injection/non-compression over-molding method will be explained while being contrasted with Comparative Example 7.

The three-dimensional hollow molded article for which the over-molding method is optimized by the optimizing method directed to the second aspect of the present invention is a hollow tube having a flange portion and a length of about 130 mm in its longitudinal direction, as shown in FIGS. 135 and 136. FIGS. 135 and 136 show the hollow tube viewed from different angles. The core formed of a resin has the form of this three-dimensional hollow molded article from which its resin flow layer is removed or a form obtained by reducing the size of the three-dimensional hollow molded article shown in FIG. 135. In the three-dimensional hollow molded article, the larger part of its cylindrical portion has a diameter of about 36 mm, a core has a (wall) thickness of 3 mm and a resin which covers the entire outer surface of the core has a thickness of 2.5 mm. That is, the three-dimensional hollow molded article (including the core) has a (wall) thickness of 5.5 mm.

On the basis of a design drawing of the shell form of the above three-dimensional hollow molded article and a design drawing of the core, form data for simulation is prepared. FIG. 137 shows the form data for analysis used for carrying out the injection/compression over-molding resin flow simulation. FIG. 138 shows the form data used for carrying out the stress-strain analysis.

On the basis of the form data shown in FIG. 137, molding conditions (resin temperature, mold temperature, and injection time of molten resin) for the over-molding method and resin property data (melt viscosity, specific heat and density of the resin) are inputted, and the injection/compression over-molding resin flow simulation is carried out. The data of nylon 66 is used as the data of the second resin material. The over-molding conditions in Example 17 are as shown in table 17. The injection/compression over-molding resin flow simulator used in Example 17 is basically the same as that in Example 9 except that the equation (8) is referred to in the compression step in place of the equation (2). The amount of the molten resin to be injected is set such that the space formed by the core and the cavity wall is completely filled after completion of the compression step. The movement of the movable mold member in the mold-closing direction (-X direction) in the compression step is set such that the three-dimensional hollow molded article is formed by the movement of the movable mold member. These are also applicable to Examples 18 to 23 to be described later. In the compression step, that portion which is positioned on the left side of the film gate in FIG. 137 is to be moved in -X direction. In Examples 18 to 23, that portion which is positioned on the left side of the resin injection portion is moved in -X direction. The physical properties of the resin used for the injection/compression over-molding resin flow simulation in Example 17 are the same as those shown in Table 1.

TABLE 17

| Molding conditions | |
| --- | --- |
| Resin temperature: | 300° C. |
| Mold temperature: | 50° C. |
| Injection time of molten resin: | 1.0 second |
| Time of initiation of compression step: | at a time when the injection of the molten resin is completed. |
| Movement of movable mold member in compression step: | 5 mm |
| Movement rate of movable mold member in compression step: | |

TABLE 17-continued

| Initiation of compression - 1.4 seconds | | |
| --- | --- | --- |
| | | 5.00 mm/second |
| 1.4 | -1.9 seconds | 2.00 mm/second |
| 1.9 | -2.9 seconds | 1.00 mm/second |
| 2.9 | -6.0 seconds | 0.32 mm/second |

FIGS. 139 and 140 show the melt front history out of the injection/compression over-molding resin flow simulation in Example 17. In FIGS. 139 and 140, the melt front history at the time of completion of the compression step is viewed from different angles. FIGS. 141 and 142 show the pressure distribution. In FIGS. 141 and 142, the pressure distribution at the time of completion of the compression step is viewed from different angles.

On the basis of the calculated temperature distribution and the pressure distribution, the displacement distribution and the stress distribution of the core, caused by the pressure exerted on the core under the flow of the molten resin, are calculated by numerical analysis. That is, on the basis of the output data of the above injection/compression over-molding resin flow simulation, the stress-strain analysis is carried out, and the displacement distribution and the stress distribution of the core are determined by the structural analysis simulation. The physical property values of the resin inputted for the stress-strain analysis are as shown in Table 4. The data of the resin (first resin material) is that of nylon 66. In Examples 18 to 23 and Comparative Examples 7 and 8 to be described later, the data of nylon 66 is used. The stress-strain analysis is carried out with the same commercially available structural analysis simulator MARC (Supplied by Japan Mark Corp.) as that used in Example 9.

When the over-molding method using a core formed of a resin is carried out, the core is placed in a cavity by inserting a supporting member into the opening portion which is positioned in the end of the hollow portion of the core. As boundary conditions in carrying out the stress-strain analysis, therefore, it is assumed that the deformation of the opening portion of the core and its vicinity is prevented by the supporting member and that the opening portion of the core and its vicinity are fixed in all directions.

FIGS. 143 and 144 show the stress distribution result of the core obtained by the stress-strain analysis in Example 17. In FIGS. 143 and 144, the stress distribution is viewed from different angle.

COMPARATIVE EXAMPLE 7

The injection/non-compression over-molding method is used. That is, the same film gate as that in Example 9 is used. On the basis of the same form data for simulation as those in Example 17, molding conditions (resin temperature, mold temperature, and injection time of molten resin) for the over-molding method and resin property data (melt viscosity, specific heat and density of the resin) are inputted, and without the compression step, the same resin flow simulation and the structural analysis simulation are carried out in the same manner as in Example 9. However, the injection time of the molten resin is 2.0 seconds.

FIG. 145 shows the melt front history out of the resin flow simulation results in Comparative Example 7. FIG. 146 shows the pressure distribution. FIG. 147 shows the stress distribution out of the structural analysis simulation.

When Example 17 and Comparative Example 7 are compared, it is found that the stress on the core in the over-molding by the injection/compression over-molding method is far lower than that in the over-molding by the injection/non-compression over-molding method as shown in Table 18.

TABLE 18

|  | Maximum stress value |
| --- | --- |
| Injection/compression over-molding method | 2.6 |
| Injection/non-compression over-molding method | 6.5 |

REFERENCE EXAMPLE 2

On the basis of the simulation results in Example 17 and Comparative Example 7, three-dimensional hollow molded articles were actually produced according to the injection/compression over-molding method and the injection/non-compression over-molding method. The molding conditions were as shown in Table 19.

TABLE 19

| Resin temperature: | 300° C. | |
| --- | --- | --- |
| Mold temperature: | 50° C | |
|  | Injection/compression over-molding method | Injection/non-compression over-molding method |
| Time for filling molten resin | about 1 second | about 2 seconds |
| Compression step | about 5 seconds | nil |

Three-dimensional hollow molded articles were produced under the above conditions. As a result, in the injection/non-compression over-molding method, the core was deformed, and no good product was obtained. In the injection/compression over-molding method, the core was not deformed, and a good product was obtained.

EXAMPLE 18 AND COMPARATIVE EXAMPLE 8

Example 18 is also concerned with the optimizing method of an over-molding method (injection/compression over-molding method) for producing a three-dimensional hollow molded article, directed to the second aspect of the present invention, and more specifically, is concerned with the first embodiment of the optimizing method directed to the second aspect of the present invention. In Example 18, the thickness (wall thickness) of the core is optimized so as to minimize the deformation of the core.

FIG. 148 shows the form data for the analysis used for carrying out the injection/compression over-molding resin flow simulations in Example 18 and Comparative Example 8. In Example 18, the number of the resin injection portions is one and it is arranged on the prolongation line which extends from the point where the X-Y plane passing the axial line of the core intersects with the plane perpendicular to the axial line of the core and passing the center point of the axial line of the core. The direction of injection of the molten resin is in –X direction. The movable mold member is moved toward –X direction in the compression step.

FIG. 149 shows the form data of the core for simulation in Example 18. The core has the form of a straight tube, and has a length of 150 mm and an outer diameter of 40 mm. When the core is cut through the Y-Z plane passing the axial line of the core, one half of the core on the resin injection portion side has a thickness (wall thickness) of 3.0 mm, and is indicated as a white region in FIG. 149. The other half of the core on the opposite side to the resin injection portion has a thickness (wall thickness) of 2.0 mm, and is indicated as a black region in FIG. 149. In the form data of the core for simulation in Comparative Example 8, the core has the form of a straight tube, and has a length of 150 mm, an outer diameter of 40 mm and a constant thickness (wall thickness) of 2 mm. The shell form of the three-dimensional hollow molded article has the form of a straight tube, and has a length of 150 mm, an inner diameter of 40 mm and a thickness (wall thickness) of 2.5 mm.

The boundary conditions in Example 18 and Comparative Example 8 are as follows. The portion of the core obtained by cutting the core through the plane perpendicular to the axial line of the core and passing the center point of the axial line of the core is fixed in the Y direction. The portion of the core obtained by cutting the core through the X-Z plane passing the axial line of the core is fixed in the X and Z directions. The portion of the core obtained by cutting the core through the X-Y plane passing the axial line of the core is fixed in the Z direction.

Injection/compression over-molding resin flow simulation is carried out using the form data shown in FIG. 148, in the same manner as that in Example 17. The molding conditions are the same as those shown in Table 17. In the compression step, the movable mold member is moved 5 mm in the mold closing direction (–X direction). The direction and the amount of movement of the movable mold member and the time period of the compression step are the same in the Examples to be described later.

FIG. 151 shows the melt front history among the results of the injection/compression over-molding resin flow simulations in Example 18 and Comparative Example 8. FIG. 152 shows the pressure distribution. Further, FIGS. 153 and 154 show numerical analysis results of the stress distributions in the cores caused by the pressure exerted on the core under the flow of the molten resin, in a compression step in Example 18 and Comparative Example 8, respectively.

As shown in Table 20, the results show that the stress in the core caused by the pressure exerted on the core under the flow of the molten resin can be greatly decreased in Example 18. The maximum displacement value (unit:mm) in —X direction in the displacement distribution of the core is shown in Table 20.

TABLE 20

|  | Example 18 | Comparative Example 8 |
| --- | --- | --- |
| Maximum pressure value | 22 | 22 |
| Maximum stress value | 1.3 | 1.9 |
| Maximum displacement value | 0.122 | 0.268 |

EXAMPLE 19

Example 19 is also concerned with the optimizing method of an over-molding method (injection/compression over-molding method) for producing a three-dimensional hollow molded article, directed to the second aspect of the present invention, and more specifically, is concerned with the third embodiment of-the optimizing method directed to the second aspect of the present invention. In Example 19, the core is provided with a rib, and the form and position of the rib are optimized so as to minimize the deformation of the core.

The form data for analysis used for carrying out the injection/compression over-molding resin flow simulation in Example 19 are the same as those in Example 18 shown in FIG. 148. FIG. 155 shows the form data of the core for simulation in Example 19. Only ribs are shown in FIG. 155. The core has the form of a straight tube, and a length of 150 mm, an outer diameter of 40 mm, and a thickness (wall thickness) of 2.0 mm. For example, when the core is cut through the Y-Z plane passing the axial line of the core, one half of the core on the resin injection portion side is provided with the ribs in the hollow portion. The shell form of the three-dimensional hollow molded article has the form of a straight tube, and has a length of 150 mm, an inner diameter of 40 mm, and a thickness (wall thickness) of 2.5 mm.

The boundary conditions for the stress-strain analysis in Example 19 are the same as those shown in FIG. 150. The injection/compression over-molding resin flow simulation is carried out in the same manner as in Example 18, using the form data shown in FIG. 148. FIG. 156 shows the numerical analysis result of the stress distribution of the core caused by the pressure exerted on the core under the flow of the molten resin.

The results show that the stress of the core caused by the pressure exerted on the core under the flow of the molten resin in Example 19 is equal to that in Comparative Example 8. However, the maximum displacement value in —X direction in Example 19 is low compared with that in Comparative Example 8.

TABLE 21

|  | Example 19 | Comparative Example 8 |
| --- | --- | --- |
| Maximum pressure value | 22 | 22 |
| Maximum stress value | 1.9 | 1.9 |
| Maximum displacement value | 0.113 | 0.268 |

EXAMPLE 20

Example 20 is also concerned with the optimizing method of an over-molding method (injection/compression over-molding method) for producing a three-dimensional hollow molded article, directed to the second aspect of the present invention, and more specifically, is concerned with the eighth embodiment of the optimizing method directed to the second aspect of the present invention. In Example 20, a resin flow channel is provided on the cavity wall of the mold, and the form and the position of the resin flow channel are optimized so as to minimize the deformation of the core. In Example 20, the resin flow channel is provided on the cavity wall along a circumferential direction of the core.

FIGS. 157 and 158 show the form data for analysis used for carrying out the injection/compression over-molding resin flow simulation in Example 20. In FIGS. 157 and 158, white regions correspond to the resin flow channels of the strip-like form provided on the cavity wall along the circumferential direction of the core. on the other hand, black regions correspond to the space formed by the core and the cavity wall of the mold. FIG. 157 shows the form data for analysis viewed from the direction of (1,1,1). FIG. 158 shows the form data for analysis viewed from the direction of (−1,−1,1). The form data of the core and the shell form are the same as those in Comparative Example 8. The boundary conditions for the stress-strain analysis in Example 20 are the same as those shown in FIG. 150.

The injection/compression over-molding resin flow simulation is carried out in the same manner as in Example 17, using the form data shown in FIGS. 157 and 158.

FIGS. 159 and 160 show the melt front history among the results of the injection/compression over-molding resin flow simulation in Example 20. FIGS. 161 and 162 show the pressure distribution. FIG. 163 shows the numerical analysis result of the stress distribution of the core caused by the pressure exerted on the core under the flow of the molten resin. FIGS. 159 and 161 show the results viewed from the direction of (1,1,1). FIGS. 160 and 162 show the results viewed from the direction of (−1,−1,1).

The results show that the stress of the core caused by the pressure exerted on the core under the flow of the molten resin in Example 20 is greatly decreased compared with that in Comparative Example 8. Further, the maximum displacement value of the core in X direction, caused by the pressure exerted on the core under the flow of the molten resin, in Example 20 is greatly decreased compared with that in Comparative Example 8.

TABLE 22

|  | Example 20 | Comparative Example 8 |
| --- | --- | --- |
| Maximum pressure value | 15 | 22 |
| Maximum stress value | 1.3 | 1.9 |
| Maximum displacement value | 0.159 | 0.268 |

EXAMPLE 21

Example 21 is also concerned with the optimizing method of an over-molding method (injection/compression over-molding method) for producing a three-dimensional hollow molded article, directed to the second aspect of the present invention, and more specifically, is concerned with the fifth and sixth embodiments of the optimizing method directed to the second aspect of the present invention. In Example 21, at least two resin injection portions are provided in the mold, and the positions of the resin injection portions are optimized so as to minimize the deformation of the core. Further, in Example 21, a resin injection portion comprises a film gate having an opening portion whose axial line in the direction of width of the opening portion is nearly in parallel with the axial line of the core, and the width, the thickness and the length of the film gate are optimized so as to minimize the deformation of the core. In Example 21, two resin injection portions comprising film gates are provided in the mold.

FIG. 164 shows the form data for analysis used for carrying out the injection/compression over-molding resin flow simulation in Example 21. In FIG. 164, two black regions correspond to the film gate. On the other hand, a white region corresponds to the shell form of the three-dimensional hollow molded article. The shell form has the form of a straight tube, and has a length of 150 mm, an inner diameter of 40 mm and a thickness (wall thickness) of 2.5 mm. The thickness ($H_{FG}$) of the opening portion of the film gate is 2 mm, and the film gate length ($L_{FG}$) is 6 mm. The form data of the core for simulation in Example 21 is the same as that of Comparative Example 8. The boundary conditions for the stress-strain analysis in Example 21 are the same as those shown in FIG. 150.

The injection/compression over-molding resin flow simulation is carried out in the same manner as that in Example 17, using the form data shown in FIG. 164.

FIGS. 165 and 166 show the melt front history among the results of the injection/compression over-molding resin flow simulation in Example 21. FIGS. 167 and 168 show the pressure distribution. FIG. 169 shows the numerical analysis result of the stress distribution of the core caused by the pressure exerted on the core under the flow of the molten resin. FIGS. 165 and 167 show the results viewed from the direction of (1,1,1). FIGS. 166 and 168 show the results viewed from the direction of (−1,−1,1).

The results show that the stress of the core caused by the pressure exerted on the core under the flow of the molten resin in Example 21 is greatly decreased compared with that in Comparative Example 8. Further, the maximum displacement value of the core in −X direction, caused by the pressure exerted on the core under the flow of the molten resin, in Example 21 is greatly decreased compared with that in Comparative Example 8.

TABLE 23

|  | Example 21 | Comparative Example 8 |
| --- | --- | --- |
| Maximum pressure value | 17 | 22 |
| Maximum stress value | 1.5 | 1.9 |
| Maximum displacement value | 0.162 | 0.268 |

EXAMPLE 22

Example 22 is also concerned with the optimizing method of an over-molding method (injection/compression over-molding method) for producing a three-dimensional hollow molded article, directed to the second aspect of the present invention, and more specifically, is concerned with the fifth and seventh embodiments of the optimizing method directed to the second aspect of the present invention. In Example 22, at least two resin injection portions are provided in the mold, and the positions of the resin injection portions are optimized so as to minimize the deformation of the core. Further, in Example 22, a resin injection portion comprises a multi-point pin gate and the openings of the multi-point pin gate are arranged nearly in parallel with an axial line of the core, and the positions of the openings are optimized so as to minimize the deformation of the core. In Example 22, the multi-point pin gate having five openings is provided in the mold.

FIG. 170 shows the form data for analysis used for carrying out the injection/compression over-molding resin flow simulation in Example 22. In FIG. 170, the black spots indicate the openings of the multi-point pin gate. White regions correspond to the shell form of the three-dimensional hollow molded article. The shell form has the form of a straight tube, and has a length of 150 mm, an inner diameter of 40 mm and a thickness (wall thickness) of 2.5 mm. The form data simulation in Example 22 is the same Comparative Example 8. The boundary stress-strain analysis in Example 22 are the same as those shown in FIG. 150.

The injection/compression over-molding resin flow simulation is carried out in the same manner as that in Example 17, using the form data shown in FIG. 170.

FIG. 171 shows the melt front history among the results of the injection/compression over-molding resin flow simulation in Example 22. FIG. 172 shows the pressure distribution. FIG. 173 shows the numerical analysis result of the stress distribution of the core caused by the pressure exerted on the core under the flow of the molten resin, on the basis of the calculated temperature distribution and the calculated pressure distribution.

The results show that the stress of the core caused by the pressure exerted on the core under the flow of the molten resin in Example 22 is greatly decreased compared with that in Comparative Example 8, as shown in the following Table 24. Further, the maximum displacement value of the core in −X direction, caused by the pressure exerted on the core under the flow of the molten resin, in Example 22 is greatly decreased compared with that in Comparative Example 8.

TABLE 24

|  | Example 22 | Comparative Example 8 |
| --- | --- | --- |
| Maximum pressure value | 15 | 22 |
| Maximum stress value | 1.3 | 1.9 |
| Maximum displacement value | 0.199 | 0.268 |

EXAMPLE 23

Example 23 is also concerned with the optimizing method of an over-molding method (injection/compression over-molding method) for producing a three-dimensional hollow molded article, directed to the second aspect of the present invention, and more specifically, is concerned with the second embodiment of the optimizing method directed to the second aspect of the present invention. In Example 23, the thickness of the resin which covers the outer surface of the core is optimized so as to minimize the deformation of the core.

The form data for analysis used for carrying out the injection/compression over-molding resin flow simulation in Example 23 is the same as that shown in FIG. 148. The form data of the core for simulation in Example 23 is the same as that of Comparative Example 8. The shell form has the form of a straight tube, and has a length of 150 mm, an inner diameter of 40 mm, and a thickness (wall thickness) of 2.0 mm and 3.0 mm. The boundary conditions for the stress-strain analysis in Example 23 are the same as those shown in FIG. 150.

The injection/compression over-molding resin flow simulation is carried out in the same manner as that in Example 17, using the form data shown in FIG. 148.

FIGS. 174 and 175 show the pressure distributions among the results of the injection/compression over-molding resin flow simulation in Example 23. FIGS. 176 and 177 show the numerical analysis results of the stress distributions of the cores caused by the pressure exerted on the cores under the flow of the molten resin, on the basis of the calculated temperature distribution and the calculated pressure distribution. FIGS. 174 and 176 show the results when the shell form has a thickness (wall thickness) of 2.0 mm. FIGS. 175 and 177 show the results when the shell form has a thickness (wall thickness) of 3.0 mm.

The numerical analysis results and the maximum displacement values are shown in Table 25. The results show that the maximum stress value and the maximum displacement value greatly decrease with an increase in the thickness of the shell form.

The present invention has been explained with reference to preferred Examples hereinabove, but the present invention shall not be limited thereto. The conditions, forms of various members (materials), and the like are illustrative and can be properly altered as required. As shown in the schematic cross section of a three-dimensional hollow molded article in FIG. 178, a core material 30 may cover the outer surface of a conjunction portion and its vicinity alone.

TABLE 25

|  | thickness of the shell form (mm) | Maximum injection pressure value | Maximum stress value | Maximum displacement value |
|---|---|---|---|---|
| Example 23 | 3.0 | 14 | 1.2 | 0.146 |
| Comparative Example 8 | 2.5 | 22 | 1.9 | 0.268 |
| Example 23 | 2.0 | 41 | 3.6 | 0.526 |

When, in the optimizing method directed to the second aspect of the present invention, the form of a three-dimensional hollow molded article, the form of a core or a mold are optimized such that the core is absent in that region of a cavity which faces a resin injection portion so as to minimize the deformation of the core, basically, the optimization method explained in Example 13 can be applied to the optimization method directed to the second aspect of the present invention.

In the three-dimensional hollow molded article or the over-molding method of the present invention, when a core is formed by bonding at least two core members of a resin formed in a split form each, the conjunction portion of each member may be thickness-increased. The term "conjunction portion" refers not only to the conjunction portion of the core members but also to a portion in the vicinity of the conjunction portion. In this case, the thickness $t_p$ of the thickness-increased conjunction portion preferably satisfies $1.1t_0 \leq t_p \leq 3t_0$ more preferably $1.1t_0 \leq t_p \leq 2.5t_0$. When the core has the form of a tube, the length Lp of the thickness-increased conjunction portion and a portion in the vicinity thereof (length along the circumference of the core) preferably satisfies $(\pi/12)r_0 \leq L_p \leq (\pi/3)r_0$. Or, the hollow portion of the core has an opening portion, and the vicinity of the opening portion may be thickness-increased. In this case, the thickness $t_{op}$ of the thickness-increased portion preferably satisfies $1.1t_0 \leq t_{op} \leq 3t_0$, more preferably $1.1t_0 \leq t_{op} \leq 2.5t_0$. When the core has the form of a tube, the length L.p of the thickness-increased portion and a portion in the vicinity thereof (length along the circumference of the core), preferably satisfies $(\pi/12)r_0 \leq L_{op} \leq (\pi/3)r_0$.

In the three-dimensional hollow molded article directed to the first aspect of the present invention and the over-molding method directed to the first aspect of the present invention, that portion of a core which faces a resin injection portion is thickness-increased, whereby that portion of the core which faces the resin injection portion has high rigidity. As a result, the deformation of that portion of the core which faces the resin injection portion, caused by the pressure of the injected molten resin, can be effectively prevented. As a result, the production of the three-dimensional hollow molded article can be remarkably improved in terms of a defective product occurrence ratio.

In the three-dimensional hollow molded article directed to the second aspect of the present invention and the over-molding method directed to the second aspect of the present invention, the pressure of a injected molten resin on a core in over-molding can be decreased. As a result, the deformation of the core placed in the cavity of the mold, caused by the pressure of the injected molten resin, can be effectively prevented. As a result, the production of the three-dimensional hollow molded article can be remarkably improved in terms of the defective product occurrence ratio.

In the over-molding method directed to the third aspect of the present invention, the deformation of that portion of a core which faces a resin injection portion, caused by the pressure of an injected molten resin, can be prevented in over-molding due to the presence of a supporting member. As a result, the production of the three-dimensional hollow molded article can be remarkably improved in terms of the defective product occurrence ratio.

Further, providing two or more resin injection portions, the pressure of an injected molten resin on a core placed in the cavity of the mold can be further decreased during over-molding.

In the over-molding method directed to the fourth or fifth aspect of the present invention, the resin injection portion is designed while taking into consideration the pressure caused by an injected molten resin on a core in over-molding. Therefore, the pressure exerted on the core caused by the injected molten resin can be decreased, and the core is free from being deformed in over-molding, and a good product can be easily produced. As a result, the production of the three-dimensional hollow molded article can be remarkably improved in terms of the defective product occurrence ratio.

In the optimizing method of an over-molding method, provided by the present invention, before the actual over-molding is carried out, the temperature distribution and the pressure distribution of a molten resin and the displacement and/or the stress distribution state of a core, based on the flow behavior of the molten resin in a space formed by a core and a cavity of a mold, are calculated by computerized simulation. Therefore, the forms of the three-dimensional hollow molded article and the core, the mold or the over-molding conditions can be evaluated or optimized before carrying out the actual over-molding, so that various over-molding conditions can be reliably determined for a short period of time without requiring skill. As a result, those three-dimensional hollow molded articles which are so far difficult to put into practical use due to difficulties in grasping or expecting the deformation of a core, can be easily produced, and those three-dimensional hollow molded articles can be produced by the over-molding method according to the present invention.

What is claimed is:

1. An optimizing method of an over-molding method for producing a three-dimensional hollow molded article by the steps of placing a core formed of a resin and having a hollow portion in a cavity of a mold, then injecting a molten resin into a space formed by the core and a cavity wall of the mold through a resin injection portion provided in the mold and thereby covering at least part of the outer surface of the core with the resin, said optimizing method of an over-molding method comprising the steps of:

(a) calculating a temperature distribution and a pressure distribution of the molten resin in the step of injecting the molten resin into the space by numerical analysis;

(b) calculating at least one of a displacement distribution and a stress distribution of the core caused by pressure applied to the core by flow of the molten resin in the step of injecting the molten resin into the space by numerical analysis on the basis of the calculated temperature distribution and the calculated pressure distribution; and (c) optimizing at least one of a form of the three-dimensional hollow molded article, a form of the core, the mold and molding conditions on the basis of at least one of the calculated displacement distribution and the calculated stress distribution so as to minimize deformation of the core.

2. The optimizing method of an over-molding method according to claim 1, in which the thickness of that portion of the core which faces the resin injection portion is optimized so as to minimize deformation of the core.

3. The optimizing method of an over-molding method according to claim 1, in which the thickness of the resin covering the outer surface of the core is optimized so as to minimize deformation of the core.

4. The optimizing method of an over-molding method according to claim 1, in which the core is provided with a rib, and the form and position of the rib are optimized so as to minimize deformation of the core.

5. The optimizing method of an over-molding method according to claim 1, in which, so as to minimize deformation of the core, one of the form of the three-dimensional hollow molded article, the form of the core and the mold are optimized such that the core is absent in that region of the cavity which faces the resin injection portion.

6. The optimizing method of an over-molding method according to claim 1, in which at least two resin injection portions are provided in the mold, and the positions of the resin injection portions are optimized so as to minimize deformation of the core.

7. The optimizing method of an over-molding method according to claim 1, in which the resin injection portion comprises a film gate having an opening portion having an axial line in a direction of width of the opening portion that is substantially parallel with an axial line of the core, wherein the width, the thickness and the length of the film gate are optimized so as to minimize deformation of the core.

8. The optimizing method of an over-molding method according to claim 1, in which the resin injection portion comprises one gate of a multi-point pin gate and a multi-point side gate, the one gate having openings arranged substantially parallel with an axial line of the core, and positions of the openings and diameters of the openings are optimized so as to minimize deformation of the core.

9. The optimizing method of an over-molding method according to claim 1, in which a resin flow channel is provided on the cavity wall of the mold, and the form and position of the resin flow channel are optimized so as to minimize deformation of the core.

10. An optimizing method of an over-molding method for producing a three-dimensional hollow molded article by the steps of:

(A) an injection step of placing a core formed of a resin and having a hollow portion in a cavity of a mold formed of a fixed mold member and a movable mold member and provided with a resin injection portion, then injecting a predetermined amount of a molten resin into a space formed by the core and a cavity wall of the mold (B) a compression step of moving the movable mold member a predetermined amount of distance in a mold-closing direction after the resin is injected, and thereby covering at least part of the outer surface of the core with the resin;

the optimizing method of an over-molding method comprising the steps of:

(a) calculating a temperature distribution and a pressure distribution of the molten resin in the injection step by numerical analysis, (b) calculating a temperature distribution and a pressure distribution of the molten resin in the compression step by numerical analysis on the basis of the calculated temperature distribution and the calculated pressure distribution in step (a), (c) calculating at least one of a displacement distribution and a stress distribution of the core caused by pressure applied to the core by flow of the molten resin in the compression step by numerical analysis on the basis of the calculated temperature distribution and the calculated pressure distribution in step (b), and (d) optimizing one of a form of the three-dimensional hollow molded article, a form of the core, the mold and molding conditions on the basis of at least one of the calculated displacement distribution and the calculated stress distribution of the core so as to minimize deformation of the core.

11. The optimizing method of an over-molding method according to claim 10, in which the thickness of the core is optimized so as to minimize deformation of the core.

12. The optimizing method of an over-molding method according to claim 10, in which the thickness of the resin covering the outer surface of the core is optimized so as to minimize deformation of the core.

13. The optimizing method of an over-molding method according to claim 10, in which the core is provided with a rib, and the form and position of the rib are optimized so as to minimize deformation of the core.

14. The optimizing method of an over-molding method according to claim 10, in which, so as to minimize deformation of the core, one of the form of the three-dimensional hollow molded article, the form of the core and the mold are optimized such that the core is absent in that region of the cavity which faces the resin injection portion.

15. The optimizing method of an over-molding method according to claim 10, in which at least two resin injection portions are provided in the mold at positions that are optimized so as to minimize deformation of the core.

16. The optimizing method of an over-molding method according to claim 10, in which the resin injection portion comprises a film gate having an opening portion having an axial line in a direction of width of the opening portion that is substantially parallel with an axial line of the core, and the width, the thickness and the length of the film gate are optimized so as to minimize deformation of the core.

17. The optimizing method of an over-molding method according to claim 10, in which the resin injection portion comprises one gate of a multi-point pin gate and a multi-point side gate, the one gate having openings arranged substantially parallel with an axial line of the core, wherein positions of the openings and diameters of the openings are optimized so as to minimize deformation of the core.

18. The optimizing method of an over-molding method according to claim 10, in which a resin flow channel is provided on the cavity wall of the mold, and a form and position of the resin flow channel are optimized so as to minimize deformation of the core.

* * * * *